United States Patent [19]

Feather

[11] 4,205,371

[45] May 27, 1980

[54] DATA BASE CONVERSION SYSTEM

[75] Inventor: Harvey E. Feather, Hudson, Mass.

[73] Assignee: Honeywell Information Systems Inc., Waltham, Mass.

[21] Appl. No.: 628,671

[22] Filed: Nov. 3, 1975

[51] Int. Cl.[2] .......................... G06F 9/00; G06F 13/00

[52] U.S. Cl. ...................................................... 364/200

[58] Field of Search ............................... 444/1; 445/1; 340/172.5; 364/200 MS File, 900 MS File, 300

[56] References Cited

U.S. PATENT DOCUMENTS

| | | | |
|---|---|---|---|
| 3,374,466 | 3/1968 | Hanf et al. | 340/172.5 |
| 3,413,613 | 11/1968 | Bahrs et al. | 340/172.5 |
| 3,514,772 | 5/1970 | Banan et al. | 340/172.5 |
| 3,618,045 | 11/1971 | Campbell et al. | 340/172.5 |
| 3,766,532 | 10/1973 | Liebel | 340/172.5 |
| 3,766,533 | 10/1973 | Black et al. | 340/172.5 |
| 3,781,807 | 12/1973 | Saltini | 340/172.5 |
| 3,891,974 | 6/1975 | Coulter et al. | 340/172.5 |
| 4,025,901 | 5/1977 | Bachman et al. | 364/200 |
| 4,042,912 | 8/1977 | Bachman et al. | 364/200 |
| 4,084,235 | 4/1978 | Hirtle | 364/200 |
| 4,130,867 | 12/1978 | Bachman et al. | 364/200 |

*Primary Examiner*—Mark E. Nusbaum

*Attorney, Agent, or Firm*—Faith F. Driscoll; Ronald T. Reiling; Nicholas Prasinos

[57] ABSTRACT

A data processing system includes means for enabling programs originated for a system structured for operating in a first data base environment to be executed by the system which is structured to operate in a second data base environment through the inclusion of stored tables and special routines without having to rewrite the programs to operate in the second data base environment.

25 Claims, 42 Drawing Figures

```
WORKING-STORAGE SECTION

01          MPO5ROOT-SSA
            03   FILLER                      PIC     X(23)
              VALUE "MPO5ROOT*---(MPROOTKY∇=".
            03   ROOT-VALUE                  PIC     9(9).
            03   FILLER                      PIC     XX
                                             VALUE     ")∇".

01     GET-UNIQUE                            PIC     X(4)
                                             VALUE     "GU∇∇".
01     I-O-AREA                              PIC     X(256).
01     MEMBER-PCB.
            03   DBD-NAME                    PIC     X(8).
            03   LEVEL-NUMBER                PIC     99.
            03   STATUS-CODE                 PIC     XX.
            03   FILLER                      PIC     X(90).

PROCEDURE DIVISION
                •
                •
                •
              MOVE INPUT-VALUE TO ROOT-VALUE.

              CALL CBLTDL USING GET-UNIQUE, MEMBER-PCB,
                   I-O-AREA, MPO5ROOT-SSA.

              IF   STATUS-CODE NOT = SPACES
                   GO TO MEMBER-NOT-FOUND.
MEMBER-FOUND
```

Fig. 3c.

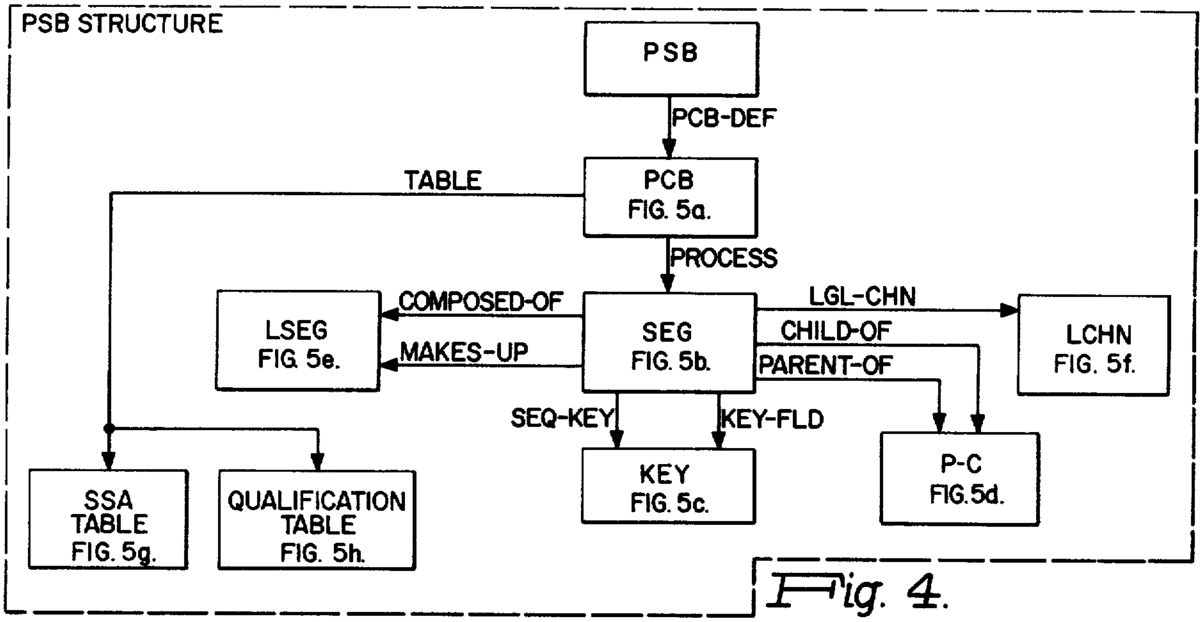
Fig. 4.
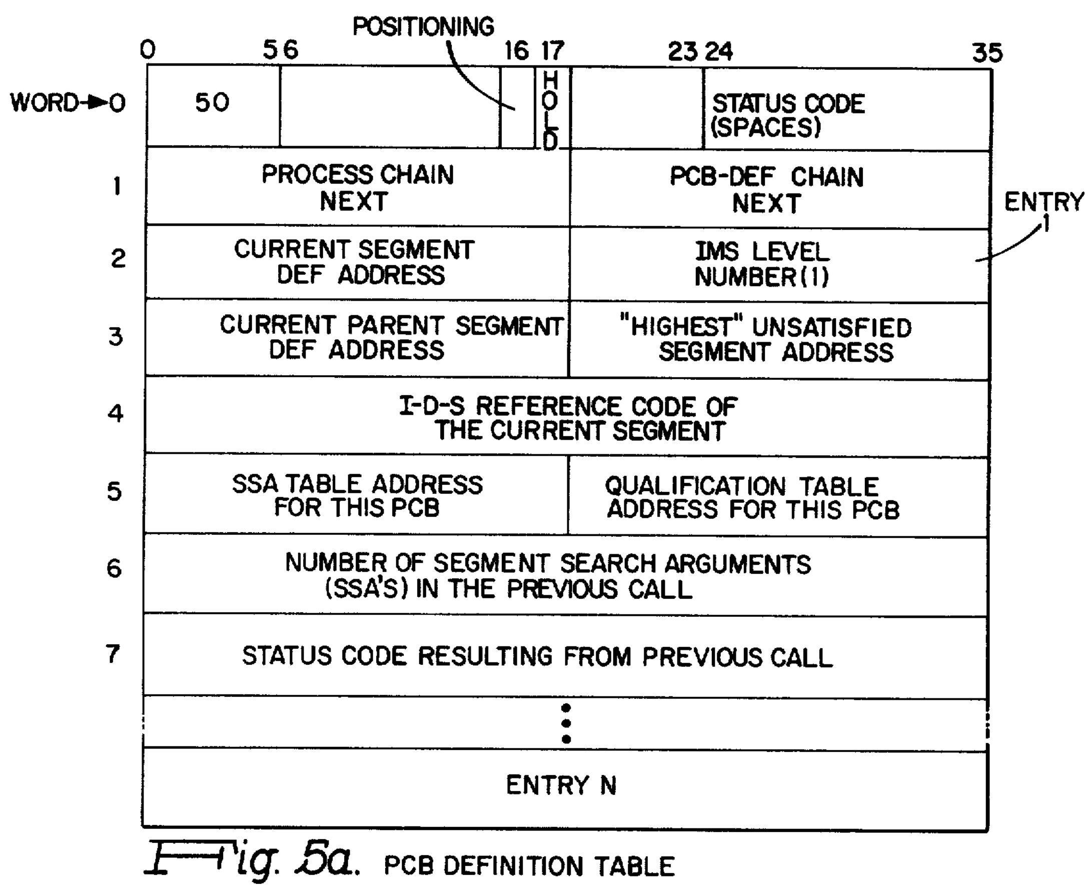
Fig. 5a. PCB DEFINITION TABLE

| WORD | 0 | 5 | | 17 | | 35 |
|---|---|---|---|---|---|---|
| 0 | 51 | LENGTH (SEG) | | SEQ-KEY ADDRESS | | |
| 1 | PROCESS CHAIN NEXT | | | KEY-FLD CHAIN NEXT | | |
| 2 | CHILD-OF CHAIN NEXT | | | PARENT-OF CHAIN NEXT | | |
| 3 | COMPOSED-OF CHAIN NEXT | | | MAKES-UP CHAIN NEXT | | |
| 4 | I-D-S RECORD DEFINITION POINTER | | | LOGIC-CHAIN CHAIN NEXT | | |
| 5 | IMS LEVEL NUMBER | | | IMS RECORD NUMBER | | |
| 6 | UNUSED | AREA FLAG | CURRENT AREA | LOWEST AREA | HIGHEST AREA | INDEX INDICATOR |
| 7 | G PERMIS-SION | I PERMIS-SION | R PERMIS-SION | D PERMIS-SION | K PERMIS-SION | P PERMIS-SION |
| 8 | INSERT RULE | LOGICAL INSERT | LOGICAL REPLACE | LOGICAL DELETE | MBZ | PHYSICAL INDICATOR (ENTRY 1) |
| 9 | P-C HOLD AREA | | | ZERO | | |
| 10 | I-D-S CURRENCY FOR THIS SEGMENT | | | | | |
| 11 | IMS SEGMENT NAME | | | | | |

Fig. 5b. SEG DEFINITION TABLE

| WORD | 0 | 5 | 15 | 17 | 35 |
|---|---|---|---|---|---|
| 0 | 54 | MBZ | RETRIEVAL CODE | DEPENDENCY OWNER | |
| 1 | CHILD-OF CHAIN MASTER | | | PARENT-OF CHAIN MASTER | |
| 2 | CHILD-OF CHAIN NEXT | | | PARENT-OF CHAIN NEXT | |
| 3 | LSEG ADDRESS | | | | |

Fig. 5d. P-C DEFINITION TABLE

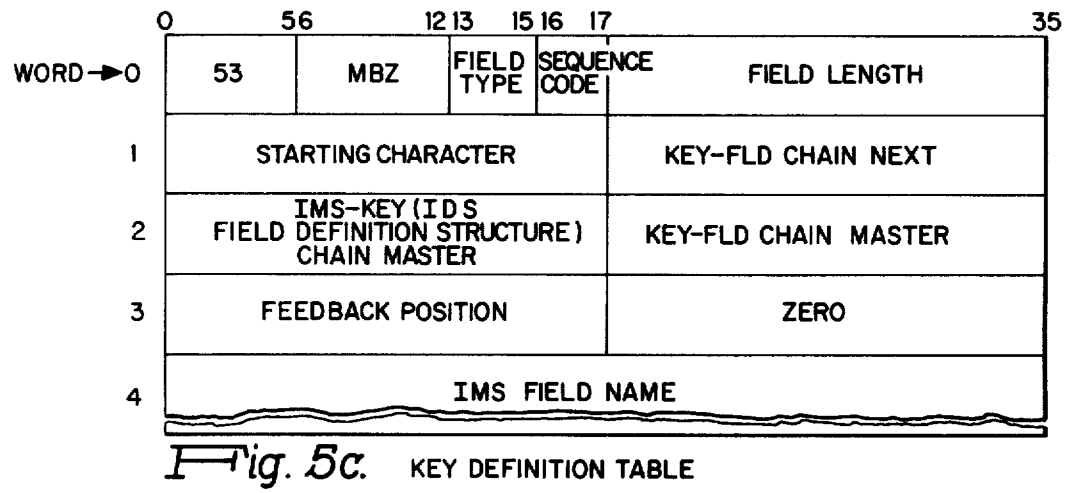
Fig. 5c. KEY DEFINITION TABLE
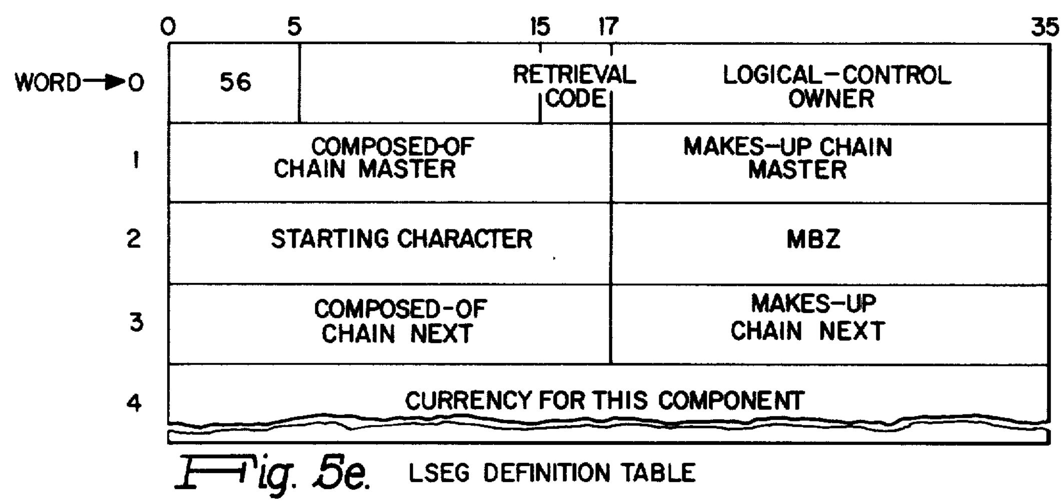
Fig. 5e. LSEG DEFINITION TABLE
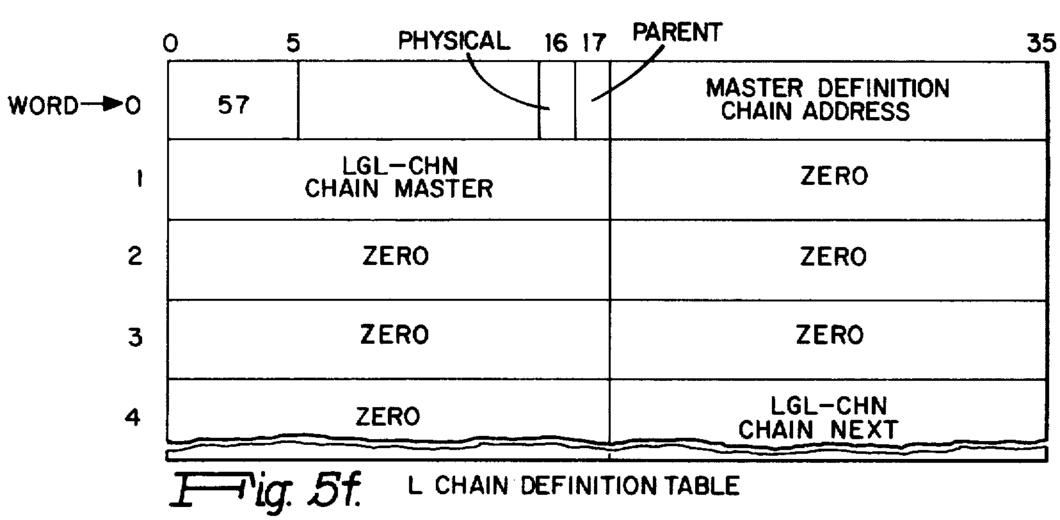
Fig. 5f. L CHAIN DEFINITION TABLE

| WORD | 0 | 17 — 35 |
|---|---|---|
| 0 | SEG DEFINITION TABLE ADDRESS (EX-MPO5ROOT) | USER-SUPPLIED SWITCH |
| 1 | I-O-AREA TALLY WORD | |
| 2 | UNIQUENESS INDICATOR | |
| 3 | I-O-AREA EXTENDED INST. SET (EIS) DESCRIPTOR | |
| 4 | COMMAND CODE "D" | COMMAND CODE "N" |
| 5 | COMMAND CODE "F" | COMMAND CODE "L" |
| 6 | COMMAND CODE "U" | COMMAND CODE "V" |
| 7 | COMMAND CODE "P" | MBZ |
| 8 | NUMBER OF QUALIFIERS | |
| 9 | INDEX TO FIRST ENTRY IN QUALIFICATION TABLE | |

Fig. 5g. SSA TABLE

| WORD | 0 — 35 |
|---|---|
| 0 | BOOLEAN CODE (O) |
| 1 | KEY DEFINITION ADDRESS |
| 2 | COMPARISON OPERATOR CODE (=) |
| 3 | COMPLETE ADDRESS (TALLY WORD) OF THE SEARCH VALUE |

Fig. 5h. QUALIFICATION TABLE

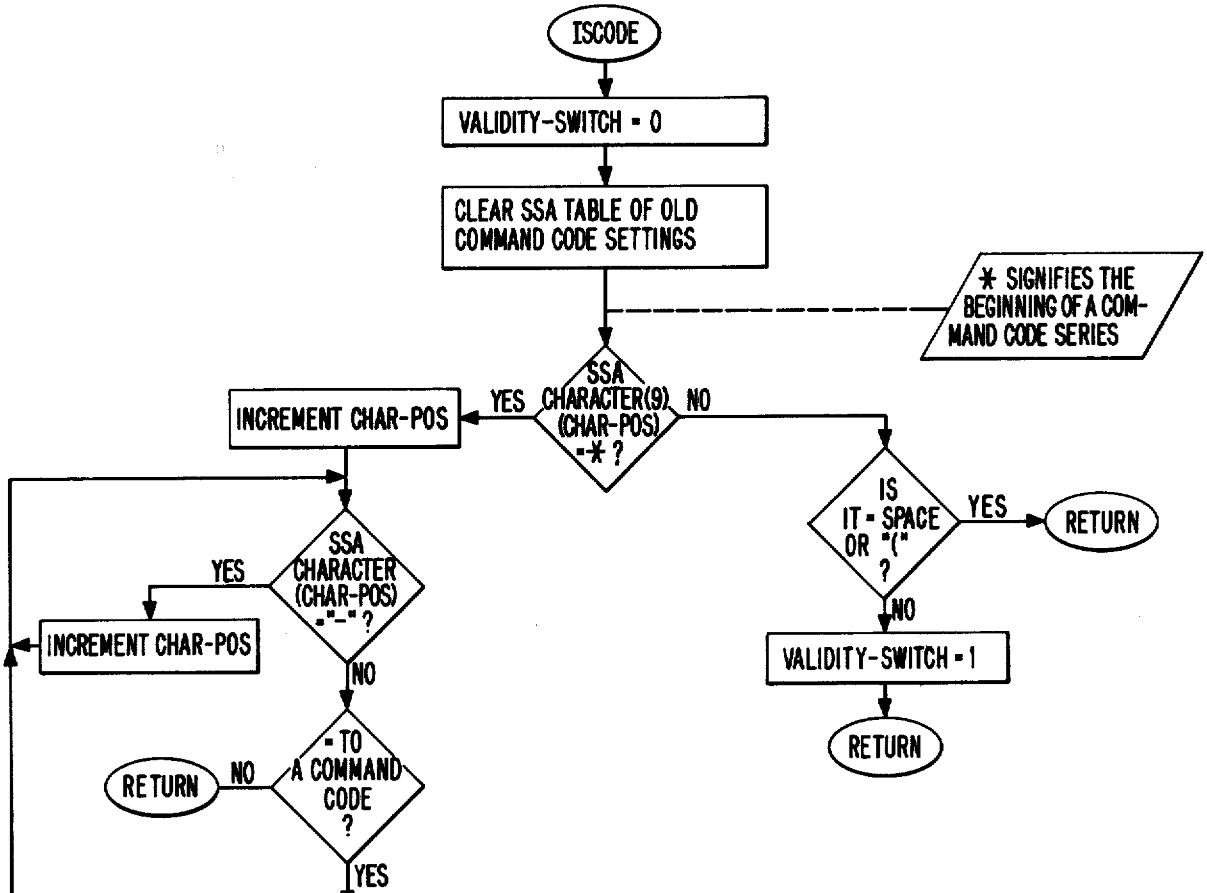
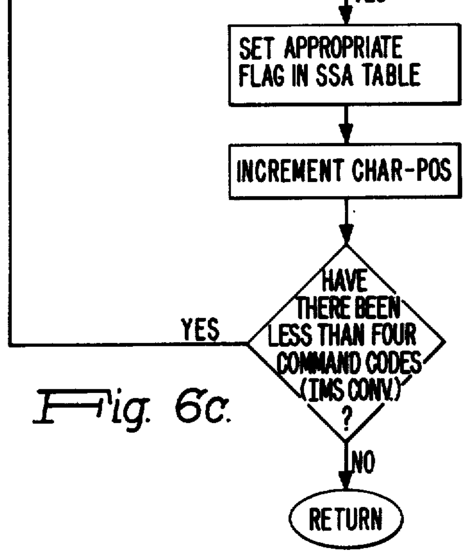
Fig. 6c.
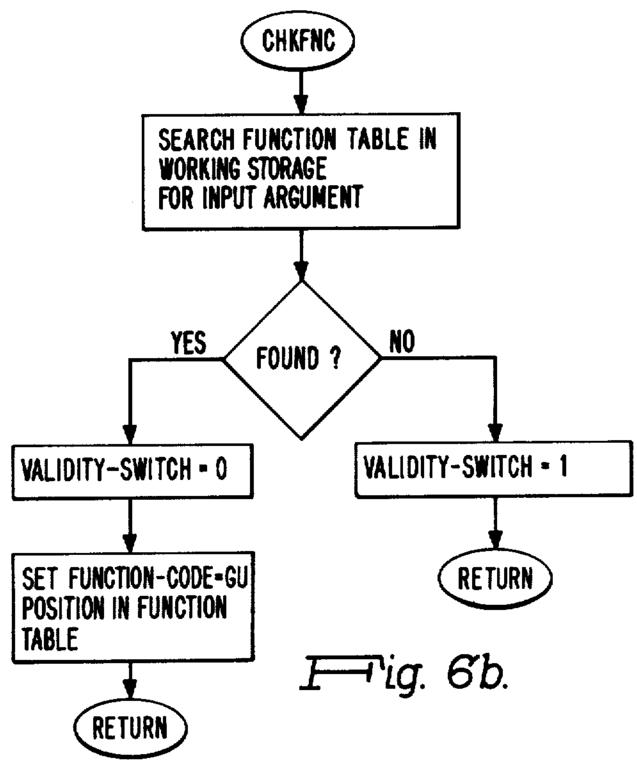
Fig. 6b.

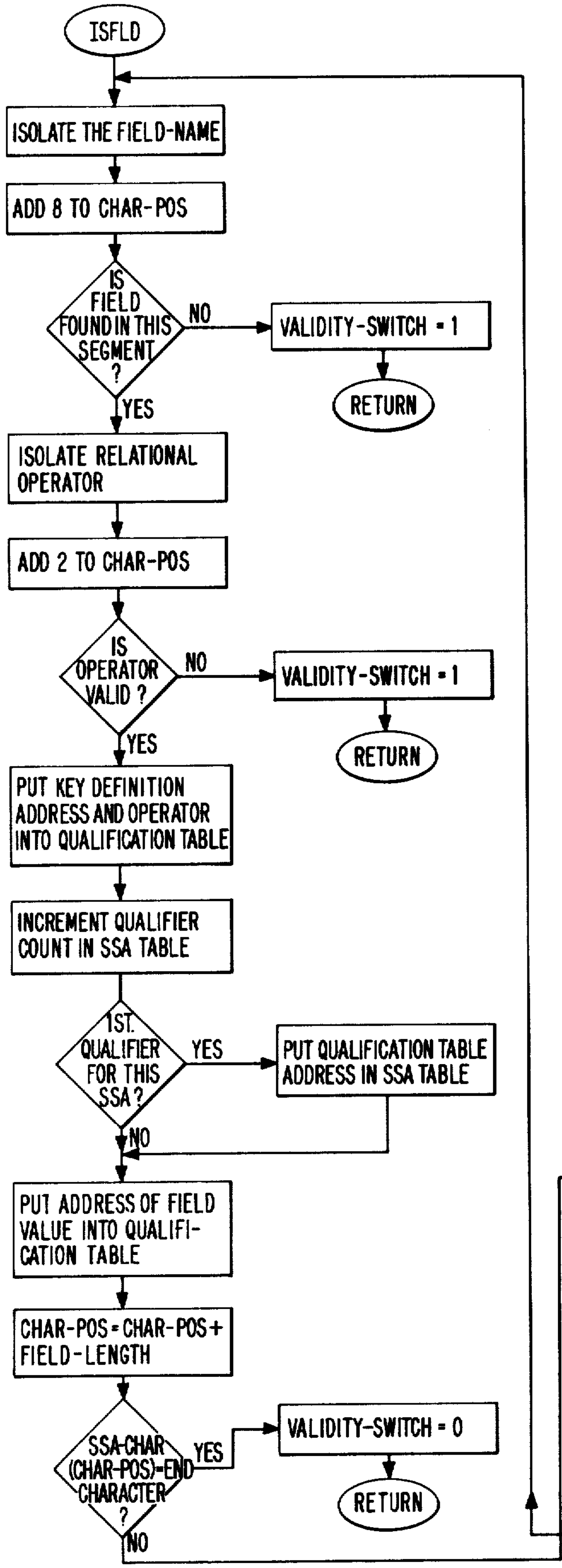
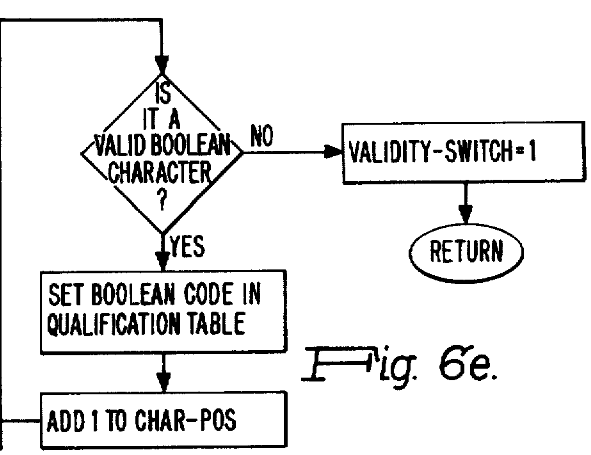
Fig. 6e.
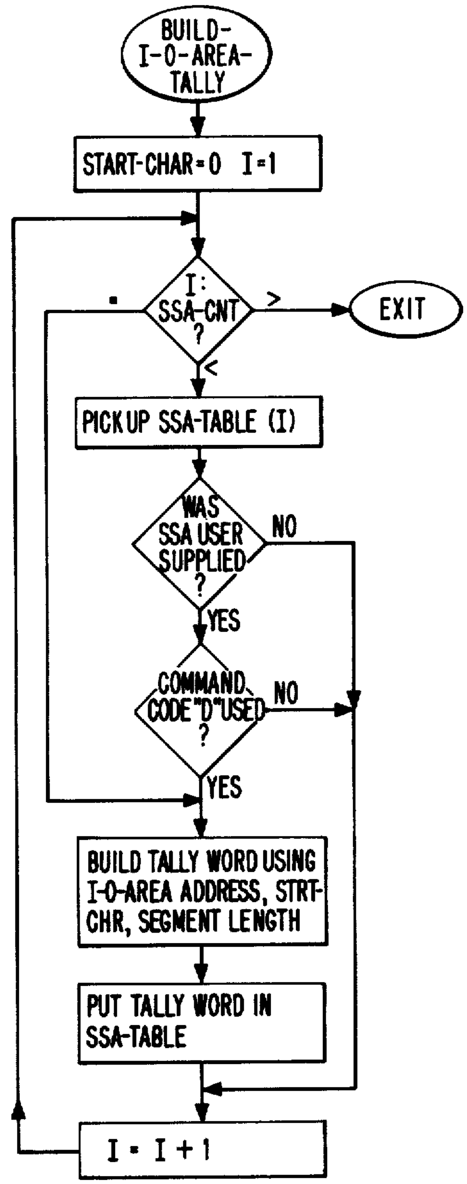
Fig. 6g.

```
DATA DIVISION.
FILE SECTION.
FD      INPUT-FILE.
        LABEL RECORDS ARE STANDARD
        DATA RECORD IS INPUT-RECORD
01      INPUT-RECORD.
        03      INPUT-SUBSCRIBER-NUMBER              PIC     9(9).
        03      INPUT-NAME                           PIC     X(15).

WORKING-STORAGE SECTION.
01      GHU                                          PIC     X(4).
                                                     VALUE   "GHU."
01      REPL                                         PIC     X(4).
                                                     VALUE   "REPL".
01      PCB.
        03      DBD-NAME                             PIC     X(8).
        03      SEG-LEVEL                            PIC     99.
        03      STATUS-CODE                          PIC     XX.
        03      FILLER                               PIC     X(72).
01      I-O-AREA.
        03      I-O-SUBSCRIBER-NUMBER                PIC     9(9).
        03      I-O-NAME                             PIC     X(15).
01      ROOT-SSA.
        03      FILLER                               PIC     X(23).
                    VALUE "MPO5ROOT*---(MPROOTKY∇= ".
        03      SUBSCRIBER-NUMBER                    PIC     9(9).
        03      FILLER                               PIC     XX.
                                                     VALUE   ")∇".
PROCEDURE DIVISION.
                •
                •
                •
                OPEN INPUT INPUT-FILE.
GET-NEXT-INPUT-RECORD.
                READ INPUT-FILE AT END GO TO END-OF-JOB.
                MOVE INPUT-SUBSCRIBER-NUMBER TO SUBSCRIBER-NUMBER.
                CALL CBLTDL USING GU, PCB, I-O-AREA, ROOT-SSA.
                IF STATUS-CODE NOT = SPACES GO TO MEMBER-NOT-FOUND.
                MOVE INPUT-NAME TO I-O-NAME.
                CALL CBLTDL USING REPL, PCB, I-O-AREA.
                GO TO GET-NEXT-INPUT-RECORD.
MEMBER-NOT-FOUND.
                DISPLAY  "*** ERROR ***∇".
                         "MEMBER NUMBER∇" SUBSCRIBER-NUMBER.
                         "∇ NOT ON DATABASE".
                GO TO GET-NEXT-INPUT-RECORD.
END-OF-JOB.
                CLOSE INPUT-FILE.
                EXIT PROGRAM.
```

Fig. 7a.

DATA BASE CONVERSION SYSTEM

BACKGROUND OF THE INVENTION

FIELD OF THE INVENTION

The present invention relates to apparatus and method for the translation and conversion of programs.

BACKGROUND OF THE INVENTION

With the rapid development of different types of digital computer systems, the need to be able to utilize existing programs on new or different computer systems has become of considerable importance to users. In general, where a user desires to convert to another system, it becomes necessary to rewrite every program to be utilized on the new system. Additionally, it is necessary to translate the files utilized on the first system to a form useable by the second system. Of course, this conversion process becomes exceedingly time consuming and costly.

Accordingly, it is a primary object of the present invention to facilitate conversion of programs originated for a first system for use in a second system.

It is a further object of the present invention to allow users to be able to execute data base type programs on another system without having to make changes affecting the logic of such programs.

SUMMARY OF THE INVENTION

The above objects are achieved in a preferred embodiment of the present invention which includes a plurality of stored tables. The tables include information in the form of a data base description which defines the description of the first data base system in terms of the data base system upon which the program or programs are to be run. The system further includes a plurality of emulator routines arranged to perform a number of primitive operations. During the running of a program, the program generates a call to the operating system of the data processing system which in turn causes the selection of a particular group of the emulator routines for processing that call. The routines are operative to reference different ones of the stored tables for interpreting the call and for generating the appropriate information in order to execute the operation specified by the program as written originally. The routines also invoke the appropriate one of a number of data base routines of the system to perform the primitive operations required for satisfying that call. Upon the completion of the operations required, the routines are operative to provide the required appropriate return information to the original program so that program operates in the same manner as when it is run on the data base system for which it was originally written.

By including stored tables and additional operating system routines in accordance with the present invention, the system is able to run all of the data base type programs originated for another system without modifying the logic of such programs. Further, the arrangement of the invention maximizes the use of the facilities present in the system for executing programs written for its data base thereby sharing routines normally included in the system to perform data base operations for its own data base.

While in the preferred embodiment, the existing data base operations are implemented by program routines, they could also be performed by other means such as hardware or firmware. Examples of the systems arranged to perform such operations are described in the patent applications referenced in the introductory portion of the specification. Because of the desire to utilize the facilities and functions of existing computer systems, the present invention lends itself to a program general purpose machine implementation disclosed herein.

The above and other objects of this invention are achieved in the preferred embodiment disclosed hereinafter. Novel features which are believed to be characteristic of the invention both as to its organization and method of operation, together with further objects and advantages thereof will be better understood from the following description when considered in connection with the accompanying drawings. It is to be expressly understood, however, that these drawings are for the purpose of illustration and description only and are not intended as a definition of the limits of the present invention.

FIG. *3a* illustrates diagrammatically the translation performed by the host system.

FIG. *3b* illustrates the memory organization of the host system in accordance with the present invention.

FIG. *3c* is an IMS program used in explaining the operation of the present invention.

FIG. *3d* illustrates diagrammatically the program conversion performed in accordance with the present invention.

FIG. *3e* illustrates the organization of emulator modules for processing one type of data base operation in accordance with the present invention.

FIG. *3f* illustrates in greater detail the organization of *3e*.

FIG. 4 illustrates the organization of tables in accordance with the present invention.

FIGS. *5a* through *5h* illustrate in greater detail the format of each of the tables of FIG. 4.

FIGS. *6a* through *6s* are flow charts of the modules of FIG. *3e*.

FIG. *7a* is another IMS program used to explain the operation of the present invention.

FIG. *7b* illustrates diagrammatically the operation of the program of FIG. *7a*.

FIG. *7c* illustrates the organization of emulator modules for processing another type of data base operation in accordance with the present invention.

FIG. *7d* is a flow chart of other ones of the emulator modules of FIG. *7b*.

FIGS. *7e* and *7f* show in greater detail certain modules of FIG. *7d*.

FIG. *7g* illustrates diagrammatically the changes in file structure in accordance with the present invention.

GENERAL SYSTEM DESCRIPTION

Figure 1:
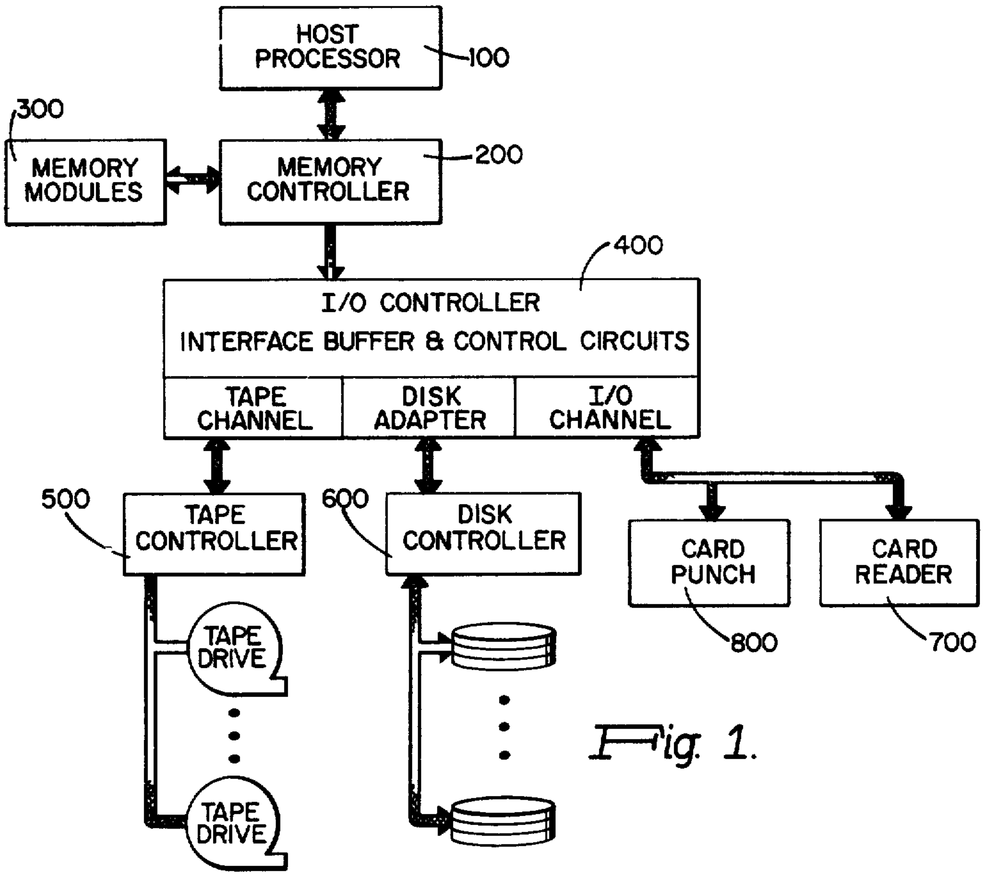
FIG. 1 shows in block diagram form a system which utilizes the arrangement of the present invention.

FIG. 1 illustrates a data processing system which includes the arrangement of the present invention. Referring to the figure, it is seen that the system includes a processor 100 which couples to a memory controller 200 for accessing a number of memory modules 300. The memory controller connects to one of a number of ports of an I/O controller 400 which controls the operation of a number of input/output devices by means of adapters which connect to controllers 500 and 600 as shown in FIG. 1. Additionally, card reader and card punch devices 700 and 800 also connect to the controller 400 as shown.

The systems of FIG. 1 may take the form of the system disclosed in U.S. Pat. Nos. 3,413,613 and 3,514,772. The management controls subsystem for supervising and managing the operation of the data processing systems referenced above in a preferred embodiment may take the form of the system described in U.S. Pat. No. 3,618,045.

GENERAL DESCRIPTION OF DATA BASE SYSTEMS

Before discussing the system of the present invention, a brief discussion of data base management concept will be given. In the context of the present invention, the term "data base" refers to a set of files maintained by a data base management system for use in user specified creation, updating and interrogation processes. In general, the files of a data base are accessed through names or other identifiable data by the user in a prior definition process. The data base management system impairs a data base to be utilized through a combination of hardware and software facilities and operational conventions. The data base management systems just described have been characterized as being a "most language" group in contrast to a "self-contained" group. This group is dependent upon and supported by an already existing "host" language.

IDS Data Base System

The system of FIG. 1 utilizes the Integrated Data Store (IDS) system. This system is described in considerable detail in a publication "IDS/I User's Guide Series 60 Level 66)/6000" published by Honeywell Information Systems Inc., Copyright 1974 designated by Order No. DC53, Rev. O. The data base management system is associated with one or more programming language compilers and operating systems. The compiler in this instance is COBOL and the operating system is described in the aforementioned patent and User's Manual. Additionally, reference may also be made to the text titled "Computer Data Management and Data Base Technology" by Harry Katzan, Jr., Van Nostrand Rinehold Company, Copyright 1975 by Litton Educational Publishing Company.

The basic unit of data in the IDS system is the record. A number of records comprises a file. The records in the data base are linked to one another through the use of chains which consist of a master record and a number of subordinate or detail records. In the present system, the user program defines a data record in a conventional fashion and the IDS system supplies the identification and chain fields. At least one chain field exists for each chain in which the record participates as a "member". A chain field contains the reference code (i.e., page and line number) of the "next" record in the ring structure. Additionally, the language used to describe the structure of an IDS data base in the IDS section of an IDS program enables a record to be linked to a prior record and to the master record for each chain in which it participates. Thus, the arrangement employs the so-called set concept which is used to recognize and represent the structural relationship between the data stored in the file. A set is an accessible collection of associated logical records representing a simple relationship between physical entities. Thus, any data base can be viewed as consisting of a number of logical files, each consisting of a number of logical records associated into a data base set wherein each record generally represents data concerning a physical entity and each set generally represents data concerning some logical relationship between the physical entities. In general, the records and sets accessed are classified according to a data structure diagram comprising at least two record-classes and at least one set-class. All of the records are individually processed through a data base management system using set access methods. The user employs a data definition language (DDL) which describes the structural information represented by the data structure diagram although a data processing system can create the data structure concerned in such a way to enable production of information through the use of the set access methods. For further background information regarding the Integrated Data Store system, the aforementioned references should be consulted.

IMS Data Base System

The other data base system is defined as the Information Management System (IMS). As indicated, a data base provides for the integration or sharing of common data in the fashion that obviates the need for changing the data and programs of previously integrated applications. Thus, it makes the application program independent of the specific data organization and specific physical devices. This data base is also characterized as a host language system which means that programs can be written in a common programming language which is COBOL. The program interface is through the CALL program statement as explained herein.

In contrast to the IDS data base system, the IMS data base system comprises tree structured entities from which logical data files are defined by the user. In the process of defining data, the following definitions are applicable. A segment is the basic data element that has an interface between the program and defining data language. The segment which includes one or more logically related data fields is fixed in lengths. A logical data record is a hierarchal tree structure of segments which can be referenced independently of its physical representation. Data within the IMS system is organized from top to bottom, left to right segment order. When the program is required to access data within an IMS data base, it accesses segments as compared to accessing records in the IDS system. The major unit of data storage is the logical data base which consists of a set of logical data base records stored in accordance with one of a number of IMS organization techniques and is accessible by different ones of the defined access methods all well known in the art.

Before an application program can utilize an IMS data base, a description of the data base must be generated by the data processing system. The data base description (DBD) is specified through the use of a set of DBD macro instructions which generate an object code version of the data base description, the DBD is stored and used during program execution. The generation of the data base description includes the specifying of the data base name, segment names, and attributes, intersegment relationships, field names and attributes, data base organization and access methods. A description of the data in the data base to which a program is "sensitive" is included in a program specification block (PSB) also referenced during program execution. The PSB is generated separately in the same manner as the DBD. The PSB normally includes the definition of the data base that can be used by the program, a specification of an operational mode (e.g. retrieve only, update, etc.) and a specification of the segments to which program that has access (is "sensitive").

In general, when the IMS system form is included in a batch processing environment, the operating system initially passes control to the program and a parameter list that accompanies the call from the so-called IMS load module, called a region controller, provides access to information included in the program's PSB. That is, in the IMS system, the region controller initiates data base processing by calling the user program. At that time, as indicated, the controller passes the PCB addresses as arguments in the order in which they appear in the programs PSB. Since the PSB, as mentioned, includes a description of each data base accessed by the user program, the PSB consists of one or more PCB's.

The IMS user program communicates with Data Language/I modules through call statements each of which in COBOL has the general form: CALl 'CBLTDLI' USING (parmcount) FUNCTION, PCB-NAME, I/O AREA, SSA1, SSA2, . . . SSAn. When making an input or output call, the user program or "host language program" specifies the following required and optional parameters:

1. Symbolic name of the desired input or output function (e.g., INSERT).
2. PCB -name (e.g., CALL 'CBLTDLI' using (parmcount) function, PCB name).
3. Input/output work area (e.g., I/O area SSA1, . . . SSAn).
4. Optical "segment search arguments".

The segment search argument is used by a user program to specify a desired segment by field names and field names in parent segments leading to the desired segment.

The format of the PCB is:

| | | |
|---|---|---|
| ϕ1 PCB-NAME | | |
| ϕ2 | DBD-NAME | PIC X(8) |
| ϕ2 SEG-LEVEL | PIC XX | |
| ϕ2 STATUS-CODE | PIC XX | |
| ϕ2 PROC-OPTIONS | PIC X(4) | |
| ϕ2 RESERVED | PIC S9(5) | COMP-1 |
| ϕ2 SEGMENT-NAME | PIC X(8) | |
| ϕ2 FB-KEY-LENGTH | PIC S9(5) | COMP-1 |
| ϕ2 SEN-SEG-COUNT | PIC S9(5) | COMP-1 |
| ϕKEY-FEEDBACK | PIC X(n) | |

The program interacts with the system data language modules to access the data base. Upon receiving a call from the program, the data language module references the PSB and DBD control blocks to verify the validity of the request and to obtain descriptive information on the data requested by the program. The data language module provides two interfaces with the program. The first is a means of describing the logical structure of the data base and the second is a program linkage for specifying input and output requests from the program.

Summarizing the above, the major differences between the two are as follows. Both IMS and IDS systems employ different "currency philosophies" in the data base. In the IDS case, the currency is maintained through IDs reference codes or IDS storage device (disk) addresses expressed in page and line number. The data base structure is ringed or chained implemented by means of "threaded lists". In IMS, the data base structure is sequential and currency information must be retained for higher levels.

As mentioned previously, information in IMS is organized on a top to bottom, left to right segment order. That is, for example, in an arrangement where one segment is at a first level, two segments are at a second level and one segment is at a third level, segment 1 would be at level 1, segment 2 at level 2 (left most), segment 3 at level 3, and segment 4 would be the right most segment at level 2. Since each segment has a different segment number, the segments can be regarded as separate. As discussed above, this is not the case in IDS.

Another significant point of difference concerns the manner of communicating between user programs and data bases. IDS is a compiler oriented system and hence call parameters must be "bound" or fixed before execution. For example, whenever a retrieve call statement is included, it will always retrieve the same kind or type of record. In IMS, the interpretation of the call can be qualified by means of qualifier codes or parameters. Hence, the call parameters are not bound until execution time enabling a different type or kind of record to be retrieved by a call statement.

A still further difference relates to the description of the data base. In IDS, the description of the data base is resident in the user's program. In IMS, as mentioned above, the description of the data base is maintained externally and the programmer is advised of its location.

Another major difference relates to the way in which items are stored in the data base and the manner in which the data base is maintained or kept current. As mentioned, IDS has a completely random file structure whereas IMS has a fixed file format and the type of addressing is sequential. Accordingly, IMS user programs in many instances are written to take advantage of the sequential nature of the IMS data base.

DESCRIPTION OF PREFERRED EMBODIMENT

From the foregoing, the significant differences in the characteristics of the two data base systems can be seen. In order to accomplish conversion, a number of preliminary operations are performed by both the original system and the system upon which the unconverted programs are to be run. The operations are illustrated diagrammatically by FIG. 2.

Figure 2:
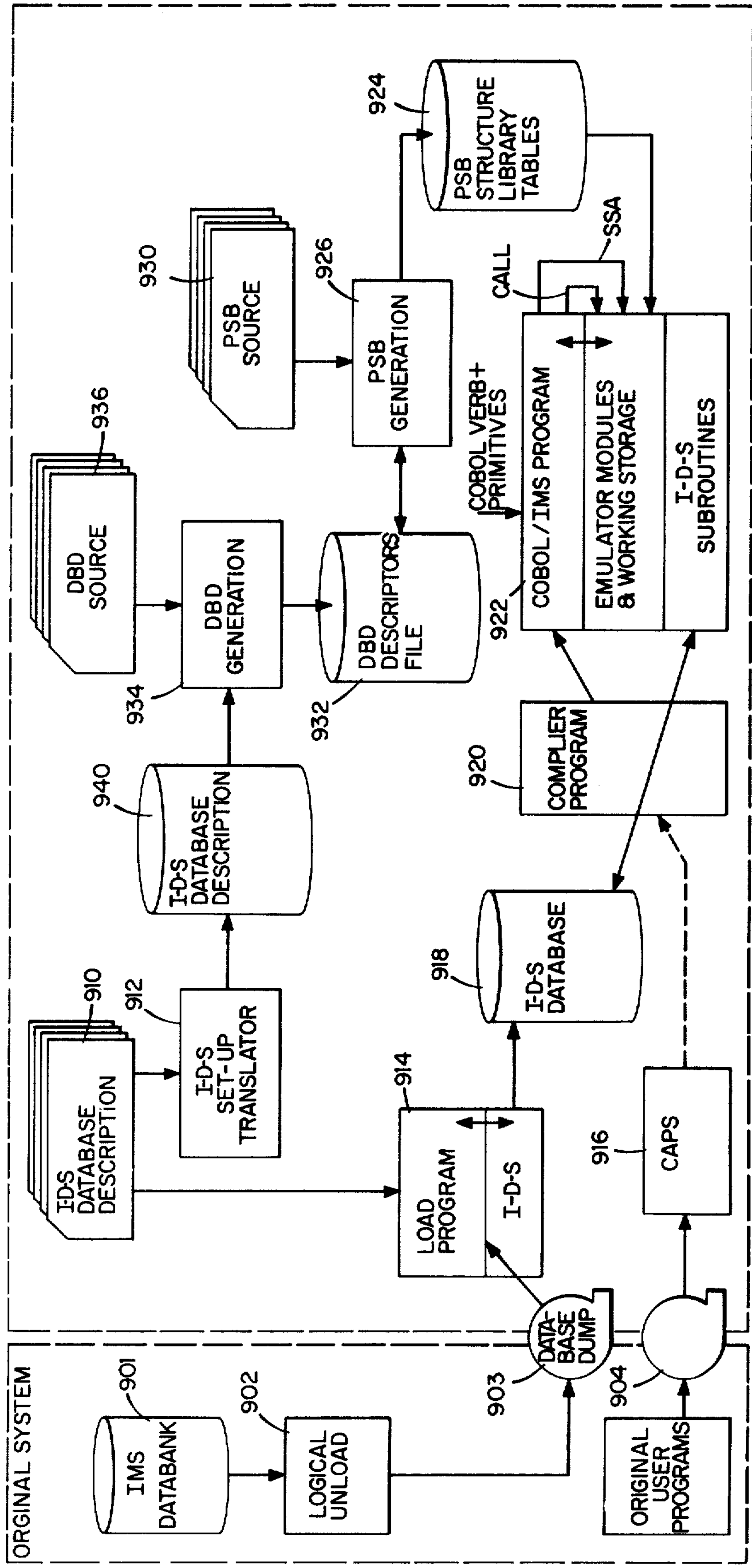
FIG. 2 illustrates diagrammatically the conversion performed by the system of FIG. 1.

Referring to FIG. 2, it is seen that the original system includes the IMS data base stored on file 901 and that the system includes a utility program represented by block 902 which writes the data base contents onto magnetic tape 903. As indicated by the figure, each of the original user programs written in COBOL are also loaded onto magnetic tape 903 as illustrated by block 904.

It will be appreciated that the two tapes 903 and 904 are placed on magnetic tape devices of the host data base system. The operations just described with respect to the original system are carried out in a well known manner.

Figure 3A:
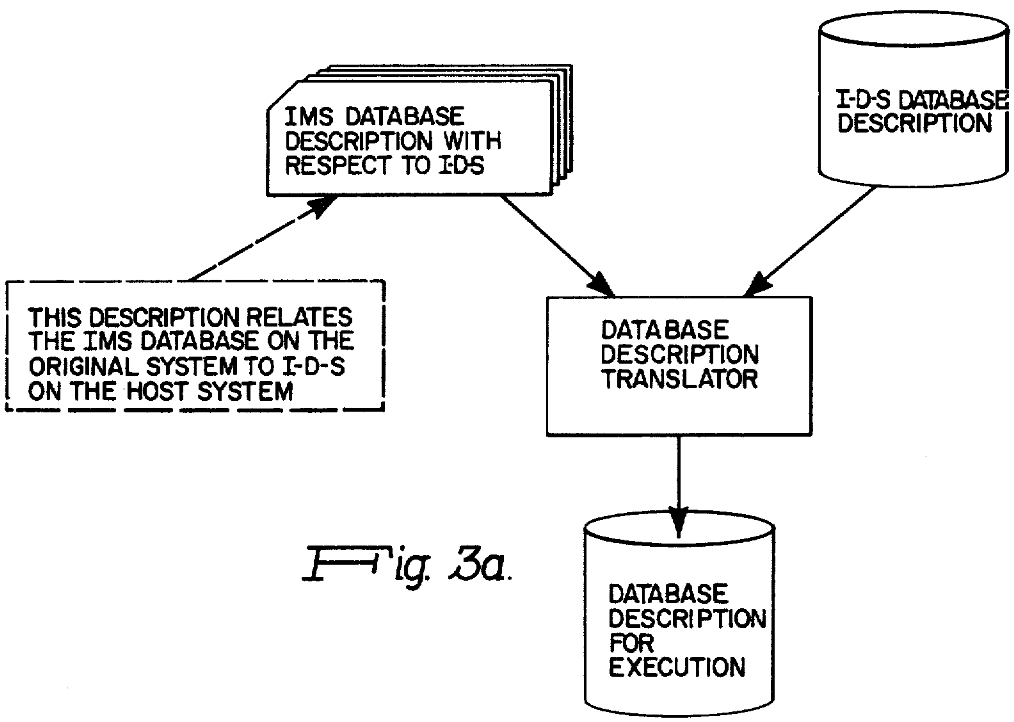

It will be appreciated that because of the differences in architecture between the two systems it is necessary to translate the original COBOL programs so that they can be run directly on the host system. However, the translation does not affect the logic of the program itself. Except for changes required by the COBOL to COBOL conversion, all calls remain unchanged. Thus, the calling sequence is still CALL CBLTDL using FUNCTION CODE, PCB-NAME, I-O AREA, SSA-1, . . . SSA-7, or CALL CBLTDL using ARG- COUNT, FUNCTION CODE, PCB-NAME, I-O AREA, SSA-1, . . . SSA-6. Accordingly, it is possible to use conventional COBOL translators. For example, in the arrangement of the present invention, a conversion aids programming system (CAPS) illustrated in FIG. 3*d*.

Before a source program can be converted, the user prepares parameter cards to identify the source program, specify its characteristics and select certain options. The user also prepares job control language (JCL) cards for specifying how the program is to be run on the operating system. When the conversion takes place, the conversion aids program (CAPS) object deck is loaded into the processor and the user prepared JCL and parameter cards are also loaded into the system. The conversion is performed and the output takes the form of a listing of the translator program source code. It will be appreciated that the conversion program constructs a source program that is logically and functionally equivalent to the input program. Thereafter, the translator program undergoes some hand tailoring which may involve a manual patching or coding of a program to the source language of the new system via a terminal device. Hand tailoring is necessary in order to correct those instances where the conversion aid program may not have been able to convert source language for a specific peripheral device on the new system and it is necessary to modify manually the coding of the program to correct this problem. However, such tailoring will not affect the logic of the program.

It can also be seen from FIG. 2 that the tape containing the data base is converted via a load program into an IDS data base. Stated differently, the files containing, for example, numbers of the subscribers organized according to subscriber number is formatted to the IDS format. The format takes the form of that described in the aforementioned IDS manual. It will be appreciated that part of the format modifications are necessary in that the format of the disk files on each of the systems are arranged in an entirely different fashion.

While it is necessary to reformat the files in the original system to the IDS file structure in the old system, this is time consuming, but only to be done once.

It can be seen from FIG. 2 that the file translation operation requires information defining the data base description of the IDS data base. This information which characterizes how that data base is organized in the host system is utilized by an IDS translator of block 912 which translates the IDS user data base description into object code to be used at execution time by IDS routines. During the translation, the translator 912 is operative to store information enabling the translation to be reversible. Stated differently, the translator is arranged to provide information which describes the IMS data base in an IDS form to be used by the host system. Therefore, instead of having the translation be performed to completion, the IDS translator 912 is interrupted and an intermediate form of code which relates the IMS file information to the IDS information is stored on file 940 (e.g., relationship of a subscriber record (IMS) to a membership record [IDS]).

The intermediate form of code serves as an IDS data base description which is in turn used by other translators corresponding to blocks 934 and 926, to generate the resulting PSB information stored on file 924. Before describing the operations of these translators, it will be noted that each IMS job required data base descriptions in card form as illustrated by block 936. This information is supplied to translator 934 along with the IDS data base description. The translator in a manner analogous to the translation performed by the IMS translator produces an intermediate data base description stored on file 932. The translator 934 utilizing the IMS data base description as well as the IDS data base description on file 940 produces the intermediate file as mentioned which represents a combination of the IDS description in terms of the IMS data base.

The translator 926 satisfies requirements of the IMS data base relating to defining the data bases to be used by a particular program. Normally before you can execute a program in the IMS data base, it is necessary to perform program specification block generation which indicates to a particular program what data bases it is going to utilize, what records and fields out of those data bases it will utilize and with what permission (e.g., can it read a record, write a record, delete a record, insert a record, etc.). The result of the PSB generation is normally stored in a file and fetched during execution time by the system.

In a fashion similar to that described above, the translator 924 performs checks for determining whether the data base and records are valid and generates a result which is stored on file 924. As explained herein, this file comprises a number of tables which can be divided into two sections: an IDS section and an IMS section. In accordance with the present invention, the emulation routines utilize the IDS section while the user IMS program uses the IMS section. Thus, the emulation routine provides an interface between the IDS and the IMS program responding to calls by the IMS program and initiating the one or more IDS operations necessary to satisfy the request given. Additionally, the emulation routines provide the appropriate information that the IMS program would normally expect to receive and operate in its original environment. Thus, the logic of the program is maintained in this manner.

Figure 3B:
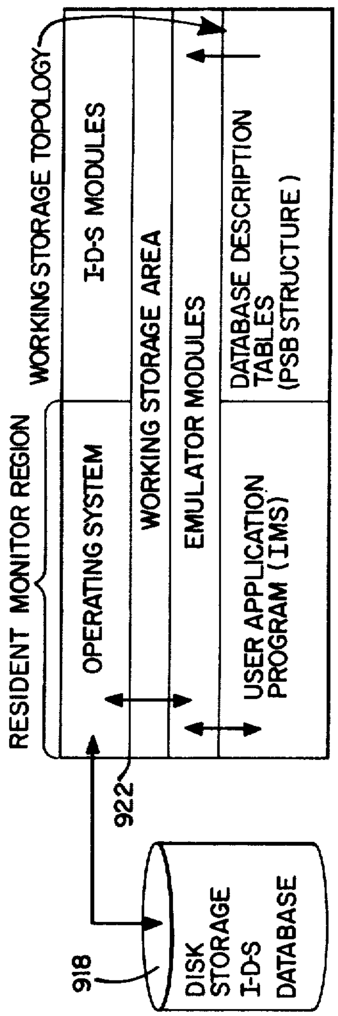
Figure 3D:
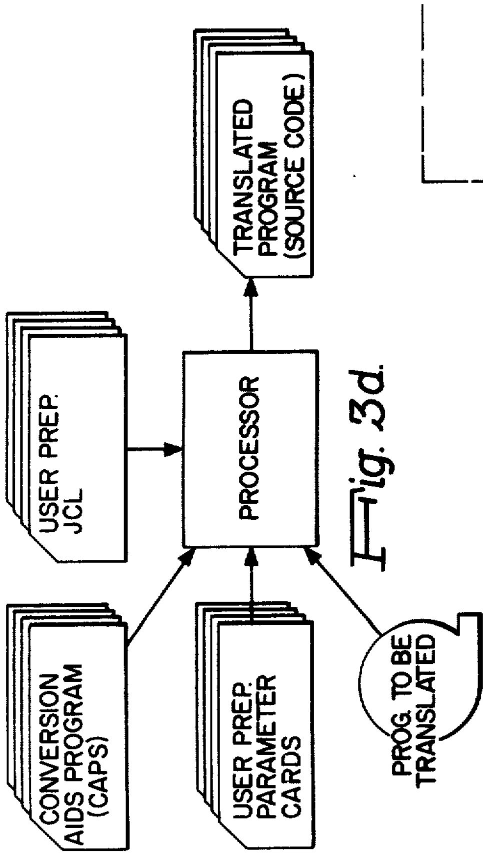
Figure 3E:
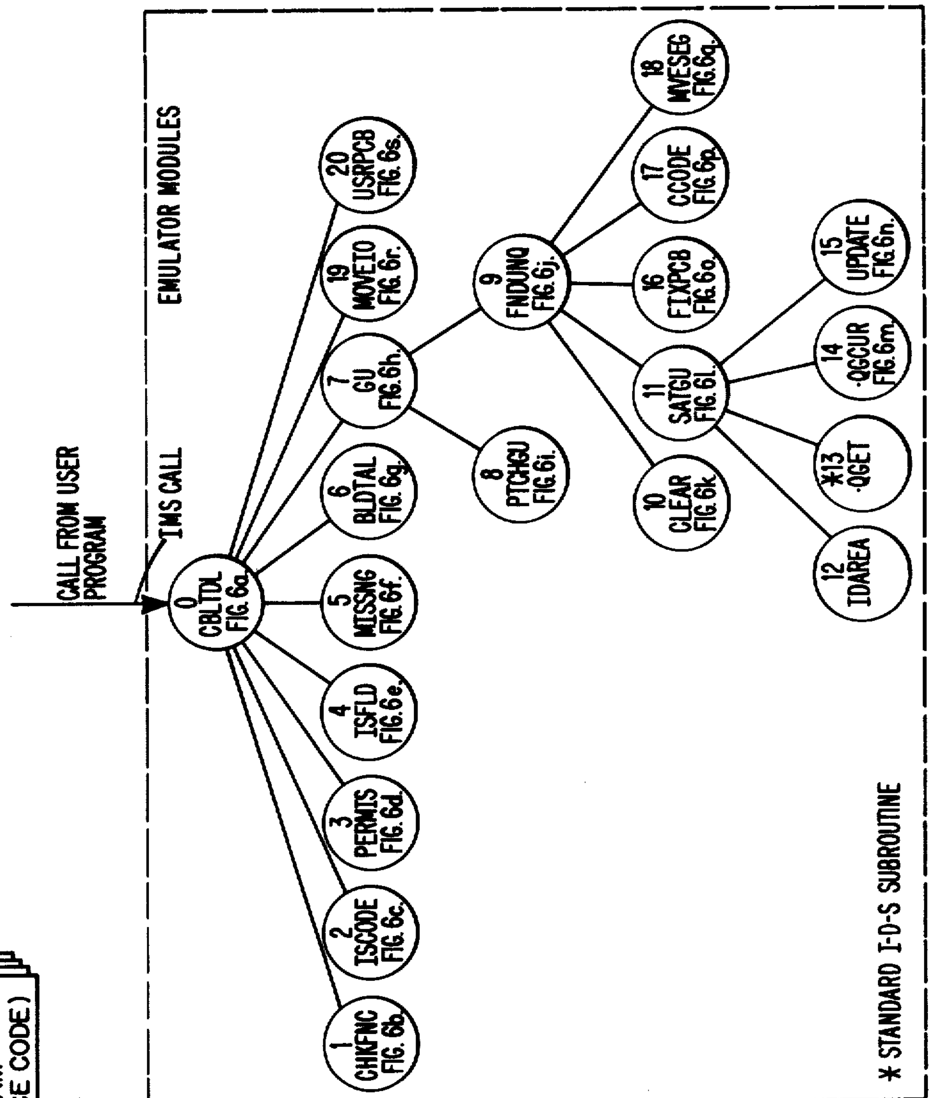
Figure 3F:
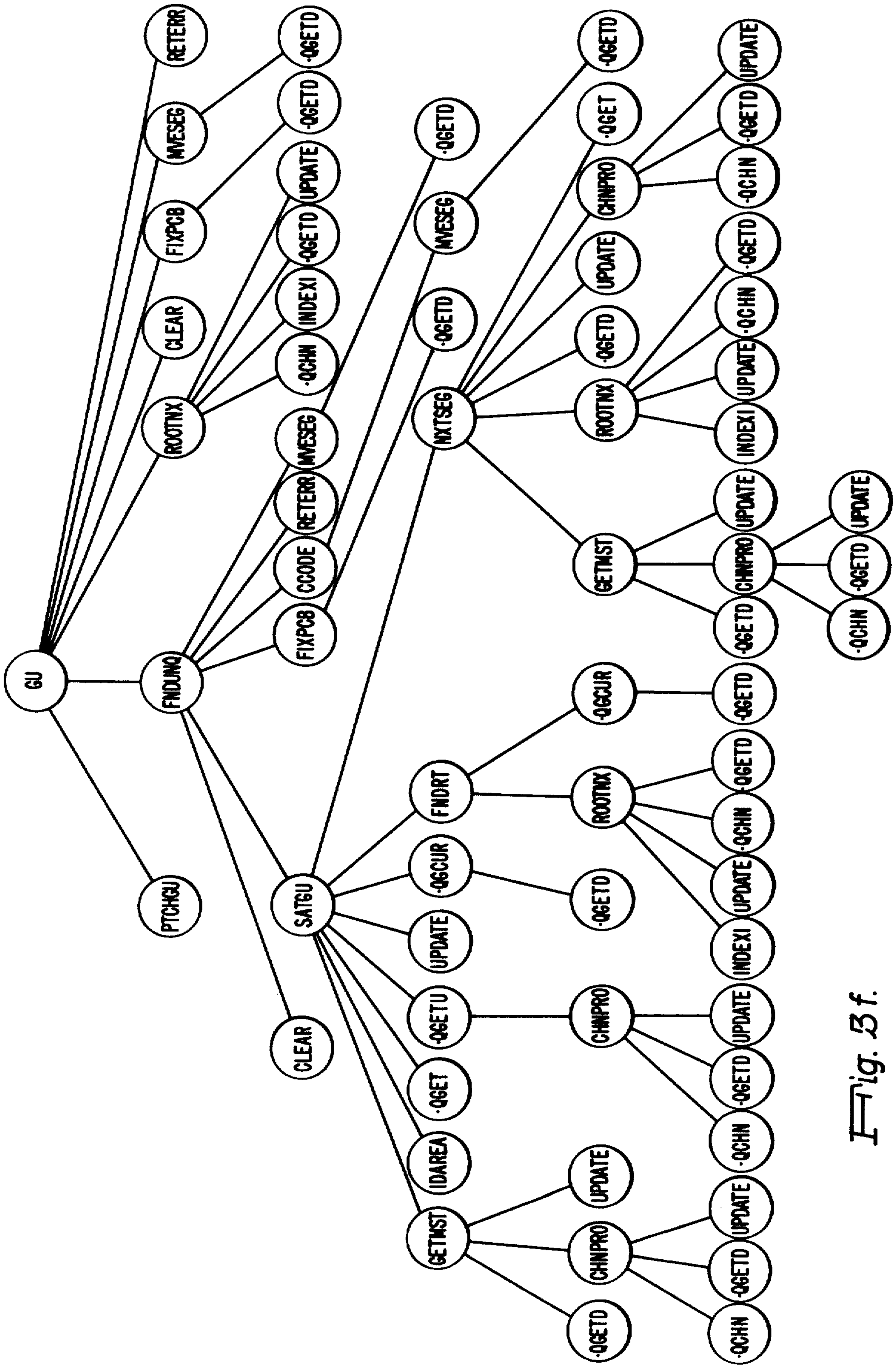

FIG. 3*b* illustrates diagrammatically the organization of memory 300 during the execution of user IMS programs. As seen from the figure, the memory 300 has resident, the various modules which comprise the operating system and IDS modules. Additionally, the memory stores the emulator routines while the data description tables and user IMS program are stored in a slave program area in accordance with the organization described in U.S. Pat. No. 3,618,045. The IDS data base representative of the files which have been previously converted reside on disk storage as illustrated diagrammatically by FIG. 3*b*. FIG. 3*e* illustrates diagrammatically a number of the emulator routines used to process an IMS data base call as described herein in greater detail. The various modules which comprise the routines of FIG. 3*e* are illustrated in greater detail in FIGS. 6*a* though 6*s*. FIG. 3*f* illustrates in further detail those emulator modules which can be referenced by the particular module of FIG. 3*e*.

GENERAL DESCRIPTION OF PSB/IDS TABLES

Before describing the operation of the system of the present invention, the organization of the set of tables which make up the PSB structure stored in file 924 will be discussed in connection with FIG. 4. The table organization is illustrated by the data structure diagram of FIG. 4. Referring to the figure, it is seen that the PSB structure comprises a number of definition tables, each including a plurality of entries and referenced by the named entries listed next to the different lines in the figure.

The PSB definition table exists for each program and contains a number of half word (i.e., 18 bit) pointers which serve to identify the program as an IMS program which is going to utilize the emulator routines. The "PSB" is an IMS term which stands for program specification block and is a table which is generated by an IMS utility routine. The pointer contents of the PSB table enable it to reference all of the tables within the structure.

The first table referenced is the program control block (PCB) definition table. The system contains a PCB definition table for each data base which the program is going to reference. As explained herein, the table contains information which points to all of the segments or in "IDS terms" to all of the records the program can reference. In addition, it contains information indicating the permissions the program has with respect to those records.

The PCB definition table points to two groups of items which do not have any meaning in the IMS terms. These are the SSA table and qualification table. Both the SSA table and qualification table are completely empty at the time of PCB translation. There is no data stored in either table until the user program is executed. The data stored in either table is dependent upon a call at a given time. This is in contrast to the rest of the tables in which the information contained therein remains constant through program running, the tables having been loaded by the translator. The SSA table contains information for the segment involved in a call required for qualification criteria if any, information indicating the operation to be performed in connection with the call (e.g., move, etc.), when it wants an IMS command code set, etc. The Qualification table contains information further specifying the type of qualification.

There is a segment definition table for every segment the program can reference. A segment corresponds very closely to an IDS record. The segment definition table includes information such as the name of the segment, the permissions the program has against the segment, what kind of segment it is, what its equivalent IDS record is, if any, and a pointer to the equivalent IDS record if it exists. As seen from FIG. 4, the segment definition tables serve as the central point in relation to the rest of the tables. The major tables that it points to include the PC definition table. This table includes information which relates the segments to their children and to their parents, as indicated by the two lines. Since the contents primarily serve to define the IMS tree structure in terms of a table, the actual data content is not particularly important to the present invention. The segment definition table also points to a key record table which contains the keys important to the user program. These are the: IMS keys which in IDS terms correspond to fields which the program can inquire against. That is, the program uses the keys to qualify the retrievals it makes. The key definition table contains such information as the name of the key, the length of the key, where it starts in the record.

The logical segment (LSEG) table pointed to by the segment definition table is complex. It was included to handle those situations where the IMS segment is not equivalent to the IDS record. For example, in an IMS system, it is possible for a segment to be composed of more than one IDS record. The logical segment definition table contains information in the form of how the one segment is mapped to multiple IDS records.

The last table is the logical chain (LCHN) definition table which provides compatibility with the IDS data base system. It is referenced in situations where there is an IMS segment which can reference more than one IDS chain. The table ensures the integrity of the data base by specifying where a particular segment is involved in a number of chains. This is necessary in order to enable a segment to be deleted or added and still ensure that the IDS data base does not contain invalid records or include broken chains.

The various octal codes specified in each of the tables are employed for integrity checking purposes. Each unique code identifies the particular table and it is checked to verify that the correct table is being referenced at any given point in time. This arrangement is usually employed in IDS data base systems. The PSB table is arranged to contain a pointer which points to the first PCB entry which in turn points to the next PCB, etc., until finally the last PCB entry contains a pointer pointing back to the PSB table thereby providing a ring. This technique is used throughout all the tables. For example, the PCB table through the process chain entry will point to the first segment definition table which will in turn point to the next segment definition table, etc., until it points back to the PCB table. By including pointers within the tables which point to other tables, this in effect provides a way of structuring an in core data base. It can be said that in general, the arrangement is similar to IDS chains which are used in connection with the translator of FIG. 2. The arrangement allows you to run programs originated to operate with IMS data bases to be run on the system of FIG. 1. The actual information contained within the tables makes the established structure specific to one individual IMS data base. Thus, the generalized structural arrangement of the tables in accordance with the present invention allows any IMS data base program to be run on the system of FIG. 1.

Detailed Description of PSB/IDS Tables

FIGS. 5*a* through 5*h* illustrate the formats of each of the tables of FIG. 4. FIG. 5*a* illustrates the format of the PCB Definition Table. Each PCB table includes 8, 36 bit words which are coded as follows:

| PCB DEFINITION | |
|---|---|
| Word 0 | |
| BITS | |
| 0–5 | PCB Definition Code — OCTAL 50 |
| 6–15 | Zero |
| 16 | Positioning indicator with two possibilities:<br>0 — Single positioning<br>1 — Multiple positioning |
| 17 | "HOLD" Indicator with two possibilities:<br>0 — The last IMS get function was not the hold type.<br>1 — The last IMS get function was the hold type. |
| 18–23 | Zero |
| 24–35 | Current IMS Status Code.* |
| Word 1 | |
| BITS | |
| 0–17 | PROCESS CHN NEXT — The address of the next definition in the PROCESS chain. |
| 18–35 | PCB-DEF CHN NEXT — The address of the next definition in the PCB-DEF chain. |
| Word 2 | |
| BITS | |

-continued

PCB DEFINITION

0–17 Current segment address — The address of the current SEG definition.
18–35 IMS level number — The hierarchical level number of the current IMS segment.*

Word 3
BITS
0–17 Current parent segment address — The address of the SEG definition on which parentage was last established.*
18–35 The segment definition address for the segment with the highest level number which the emulator tried and failed to find during an unsuccessful get-type call.*

Word 4
BITS
0–35 IDS reference code — the full I-D-S reference code (including AREA identification) of the most recently accessed segment in this PCB. (contained in IDS communication control block = direct reference-page and line number).*

Word 5
BITS
0–17 The address of the SSA table to be used for calls referencing this PCB.
18–35 The address of the qualification table to be used by calls referencing this PCB.

Word 6
BITS
0–17 Zero
18–35 Old SSA level — the lowest level SSA supplied in the last call using this PCB.*

Word 7
BITS
0–17 Zero
18–35 IMS Status produced by the last call using this PCB.*

* = Result of last call

FIG. 5*b* illustrates the format of the Segment Definition Table. Each table includes 13, 36 bit words which are coded as follows:

SEG DEFINITION

Word 0
BITS
0–5 SEG definition code — OCTAL 51.
6–17 Segment length in characters.
18–35 SEQ-KEY address — the address of the KEY definition for the sequence key for this segment. If the segment has no sequence key, this value is zero.*

Word 1
BITS
0–17 PROCESS CHN Next — the address of the next definition in the PROCESS chain.*
18–35 KEY-FLD CHN Next — the address of the next definition in the KEY-FLD chain.*

Word 2
BITS
0–17 CHILD-OF CHN Next — the address of the next definition in the CHILD-OF chain.*
18–35 PARENT-OF CHN Next — the address of the next definition in the PARENT-OF chain.*

Word 3
BITS
0–17 COMPOSED-OF CHN Next — the address of the next definition in the COMPOSED-OF chain.*
18–35 MAKES-UP CHN Next — the address of the next definition in the MAKES-UP chain.*

Word 4
BITS
0–17 QRD pointer — the address of the I-D-S record definition structure which is equivalent to this segment. If there is no equivalent segment (e.g., logical), this value will be zero. (See I-D-S User's Manual)*

-continued

SEG DEFINITION

18–35 LGL-CHN CHN Next — the address of the next definition in the LGL-CHN chain.*

Word 5
BITS
0–17 IMS level number — the hierarchical level of this segment in the IMS data base.*
18–35 IMS record number — the structural position of this segment in top-to-bottom left-to-right IMS sequence.*

Word 6
BITS
0–5 Currently unused.
6–11 Area flag — A one character code outlining this segment's participation in I-D-S areas. Possible values are:*
0 — No area.
1 — Some fixed area.
2 — Segment can occur in multiple I-D-S areas.
12–17 Current area — A one character variable containing the area number of the current segment of this type.
18–23 Lowest area — In a multi-area segment, this character contains the lowest area number in which the segment may occur. In a fixed-area segment, this character contains the segment's area number.*
24–29 Highest area — In a multi-area segment, this character contains the highest area number in which the segment may occur. In a fixed-area segment, this character contains the area number.*
30–35 Index Indicator — A switch indicating whether or not a sequentially ordered index (I-D-S range masters) is maintained for this segment. Values are:*
0 — No index is kept.
1 — An index is kept.

Word 7 (SENSITIVITY WORD)
BITS
0–5 G permission — GET sensitivity for this segment (zero indicates no permission).*
6–11 I permission — ISRT sensitivity for this segment (zero indicates no permission).*
12–17 R permission — REPL sensitivity for this segment (zero indicates no permission).*
18–23 D permission — DLET sensitivity for this segment (zero indicates no permission).*
30–35 P permission — Path Call sensitivity for this segment (zero indicates no permission).*

Word 8
BITS
0–5 Insert Rule — Encoded rule for segment placement on an insertion — the code values have the following meanings:*
0 — Last
1 — First
2 — Here
6–11 Logical insertion parameter — Rule for segment insertion when this segment is part of a logical segment. The code values have the following meanings:*
0 - Logical (IMS rule)
1 — Virtual
2 — Physical
12–17 Logical replace parameter — Rule for segment replacement when this segment is part of a logical segment. The code values have the following meanings:*
0 — Logical (IMS rule)
1 — Virtual
2 — Physical
18–23 Logical deletion parameter — Rule for segment deletion when this segment is part of a logical segment. The code values have the following meanings:*
0 — Logical (IMS rule)
1 — Virtual
2 — Physical
24–29 Zero
30–35 Physical Indicator — Flag telling whether this segment is physical or logical. The flag values have the following meanings:*
0 — Physical -continued

SEG DEFINITION

1 — Logical

Word 9

BITS

0–17 P-C Hold Area — A work area used by the emulator to hold a P-C address when it processes the structure for multiple positioning PCB's.

18–35 Zero.

Word 10

BITS

0–35 Currency for this segment — The I-D-S reference code for the current instance of this segment. If there is no current instance, this value will be zero. (Result of last time named segment was referenced.)

Words 11–12

Segment name — The name of the IMS segment (only the first eight characters are used).*

* = Result of PSB generation.

FIG. 5c illustrates the format of the Key Definition Table. Each table entry includes 5, 36 bit words, each of which are coded as follows:

KEY DEFINITION

Word 0

BITS

0–5 KEY definition code — OCTAL 53.

6–12 Zero.

13–15 Field Type* — Encoded description of the field type.
The code values have the following meanings:
0— Character string.
1 — Binary.
2 — Packed decimal.

16–17 SEQ KEY code — Encoded description of the key field.
The code values have the following meanings:
0 — Field is not a sequence key.
1 — Field is a sequence key, no duplicates allowed.
2 - Field is a sequence key, duplicates are allowed.

18–35 Field length — The length of this key field in characters.*

Word 1

BITS

0–17 Starting character — the starting character position of this field in the IMS segment.*

18–35 KEY-FLD CHN Next — The address of the next definition in the KEY-FLD chain.*

Word 2

BITS

0–17 IMS-KEY master — The address of the IDS Field definition corresponding to this IMS key field.*

18–35 KEY-FLD CHN Master — The address of the SEG definition which is the master of this chain.*

Word 3

BITS

0–17 Starting character position of this field in the key feedback area.*

18–35 Zero.

Words 4–5

IMS Field Name.*

* = Result of PSB generation.

The P-C Definition Table has the format shown in FIG. 5d. Each table entry includes 4, 36 bit words, coded as follows:

P-C DEFINITION

Word 0

-continued

P-C DEFINITION

BITS

0–5 P-C definition code — OCTAL 54.

6–14 Zero.

15–17 Retrieval Code — Coded description of the type of retrieval required to get a child segment. The coded values have the following meanings:*
0 — Next of chain.
1 — Retrieve direct using some field in the parent segment.
2 — Retrieve record — name using some field in the parent segment.
7 — Not applicable — child is a logical segment composed of more than one IDS record type.

18–35 DEPENDENCY Owner — The address of the IDS MD or FD specified for retrieving the child segment.* (see I-D-S User's Manual)

Word 1

BITS

0–17 CHILD-OF CHN Master — The address of the master of the CHILD-OF chain.*

18–35 PARENT-OF CHN Master — The address of the master of the PARENT-OF chain.*

Word 2

BITS

0–17 CHILD-OF CHN Next — The address of the next definition in the CHILD-OF chain.*

18–35 PARENT-OF CHN Next — The address of the next definition in the PARENT-OF chain.*

Word 3

BITS

0–17 LSEG address — The address of the appropriate LSEG definition if the parent segment is "logical".*

18–35 Zero

* = Result of PSB generation.

The L segment Definition Table has the format shown in FIG. 5e. Each table entry includes 5, 36 bit words coded as follows:

LSEG DEFINITION

Word 0

BITS

0–5 LSEG Definition Code — OCTAL 56.

6–14 Zero.

15–17 Retrieval Code* — Coded description of the type of retrieval required to get a component of the logical segment. The code values have the following meaning:
0 — Next Retrieve chain.
1 — retrieve direct using some field in either the parent segment or in the previous logical segment component.
2 — Retrieve record-name using some field in either the parent segment or in the previous segment component.
3 — Master of chain.

18–35 LOGICAL-CONTROL Owner* — The address of the IDS Master Definition or Field Definition tables specified for retrieving this component of the logical segment (see I-D-S User's Guide for descriptions of IDS tables).

Word 1

BITS

0–17 COMPOSED-OF CHN Master* — The address of the master of the COMPOSED-OF chain.

18–35 MAKES-UP CHN Master* — The address of the master of the MAKES-UP chain.

Word 2

BITS

0–17 Starting Character* — The initial character position for this component in the concatenated logical segment.

18–35 Zero.

Word 3

BITS

-continued

LSEG DEFINITION 0-17 COMPOSED-OF CHN Next* — The address of the next definition in the COMPOSED-OF chain.
18-35 MAKES-UP CHN Next* — The address of the next definition in the COMPOSED-OF chain.

Word 4

BITS 0-35 Currency for this component — The IDS reference code (full 36 bit) of the current instance of this component. (Last time the named logical segment was referenced.)

* = Result of PSB generation.

FIG. 5*f* illustrates the format of the L Chain Definition Table. Each table entry has 5, 36 bit words coded as follows:

LCHN DEFINITION

Word 0

BITS 0-5 LCHN Definition Code — OCTAL 57.
6-15 Zero.
16 Physical-Virtual switch* — Two possibilities:
0 — Segment physically contains the key of the master (has meaning only for detals in a relationship).
1 — Segment does not contain the key of the master.
17 Parent-Child switch* — Two possibilities:
0 — Segment participates in this relationship as a child.
1 — Segment participates in this relationship as a parent.
18—35 The address of the IDS chain definition (MD) further describing this relationship.*

Word 1

BITS 0-17 LGL-CHN CHN Master* — The address of the master definition of the LGL-CHN chain.
18-35 Zero.

Word 2

BITS 0-35 Zero.

Word 3

BITS 0-35 Zero.

Word 4

BITS 0-17 Zero.
18-35 LGL-CHN CHN Next* — The address of the next definition in the LGL-CHN chain.

* = Result of PSB generation.

The SSA Table has the format shown in FIG. 5*g*. Each table entry has 10, 36 bit words coded as follows:

SSA DEFINITION

Word 0

BITS 0-17 Address of the segment definition for the segment specified in this SSA.
18-35 User-supplied switch — two possible values
0 — SSA was user-specified.
1—SSA was implied (system-supplied).

Word 1

BITS 0-35 Tally word for the segment in the I-O-AREA.

Word 2

BITS 0-35 UNIQUENESS INDICATOR — two possible values
0 — this SSA may be satisfied by many different data base segments.
1 — This SSA may be satisfied by only one data base segment.

Word 3

BITS 0-35 The extended instructions set (EIS) Descriptor (in binary coded decimal form) for the segment in the I-O-AREA.

Word 4

BITS 0-17 Command Code "D" — two possible values
0 — "D" was not specified
1 — "D" was specified
18-35 Command Code "N" — two possible values
0 — "N" was not specified
1 — "N " was specified Word 5

BITS 0-17 Command Code "F"
0 — "F" was not specified
1 — "F" was specified
18-35 Command Code "L"
0 — "L" was not specified
1 — "L" was specified Word 6

BITS 0-17 Command Code "U"
0 — "U" was not specified
1 — "U" was specified
18-35 Command Code "V"
0 — "V" was not specified
1 — "V" was specified Word 7

BITS 0-17 Command Code "P"
0 — "P" was not specified
1 — "P" was specified
18-35 Zero (currently unused)

Word 8

BITS 0-35 The number of qualifiers specified in this SSA.

Word 9

BITS 0-35 The index in the qualification table of the first qualifier for this SSA.

The last table which corresponds to the Qualification Table has the format shown in FIG. 5*h*. Each such table entry has 4, 36 bit words coded as follows:

QUALIFICATION TABLE

Word 0

BITS 0-35 Boolean Code — code giving logical connector specified for this qualifier. Possible values are:
0 — "AND"
1 — "OR"

Word 1

BITS 0-17 Key definition address — the address of the IMS definition table entry for the IMS Field specified in this SSA.
18-35 Zero (currently unused).

Word 2

BITS 0-35 Comparison operator code — code specifying the comparison to be performed. Possible values are:
0 — "EQUAL"
1 — "GREATER THAN"
2 — "GREATER THAN OR EQUAL TO"
3 — "NOT EQUAL TO"
4 — "LESS THAN"
5 — "LESS THAN OR EQUAL TO"

Word 3

-continued

| QUALIFICATION TABLE |
|---|
| BITS |
| 0–35 Tally word for the field value specified for this qualification entry. |

GENERAL DESCRIPTION OF EMULATOR MODULES OF FIG. 3*e*

The function of each of the emulator modules of FIG. 3*e* will be described. The first module is designated CBLTDLI. This module is the common entry for all IMS Data Language/I call statements. It directs the interpretation of the call statement and its arguments/-parameters in addition to insuring that the proper data base manipulating modules are invoked for the various IMS data base operation calls such as get unique (GU), get next (GN), get next within parent (GNP), insert (ISRT), replace (REPL), and delete (DLET). The functions performed by each of these modules are as mentioned above.

Also mentioned previously, the results of the above basic IMS functions can be modified by including coded arguments (command codes) in the appropriate fields in the segment search arguments of the IMS call statement. The significance of the various command codes D, F, L, N, P, U, V, and C are given in the glossary. Accordingly, the input arguments to the CLBTDLI module in addition to including optional segment search arguments describing the segments to be manipulated are coded to include the IMS function to be performed, the PCB describing the data base to be used and the user's I/O area.

Figure 6A:
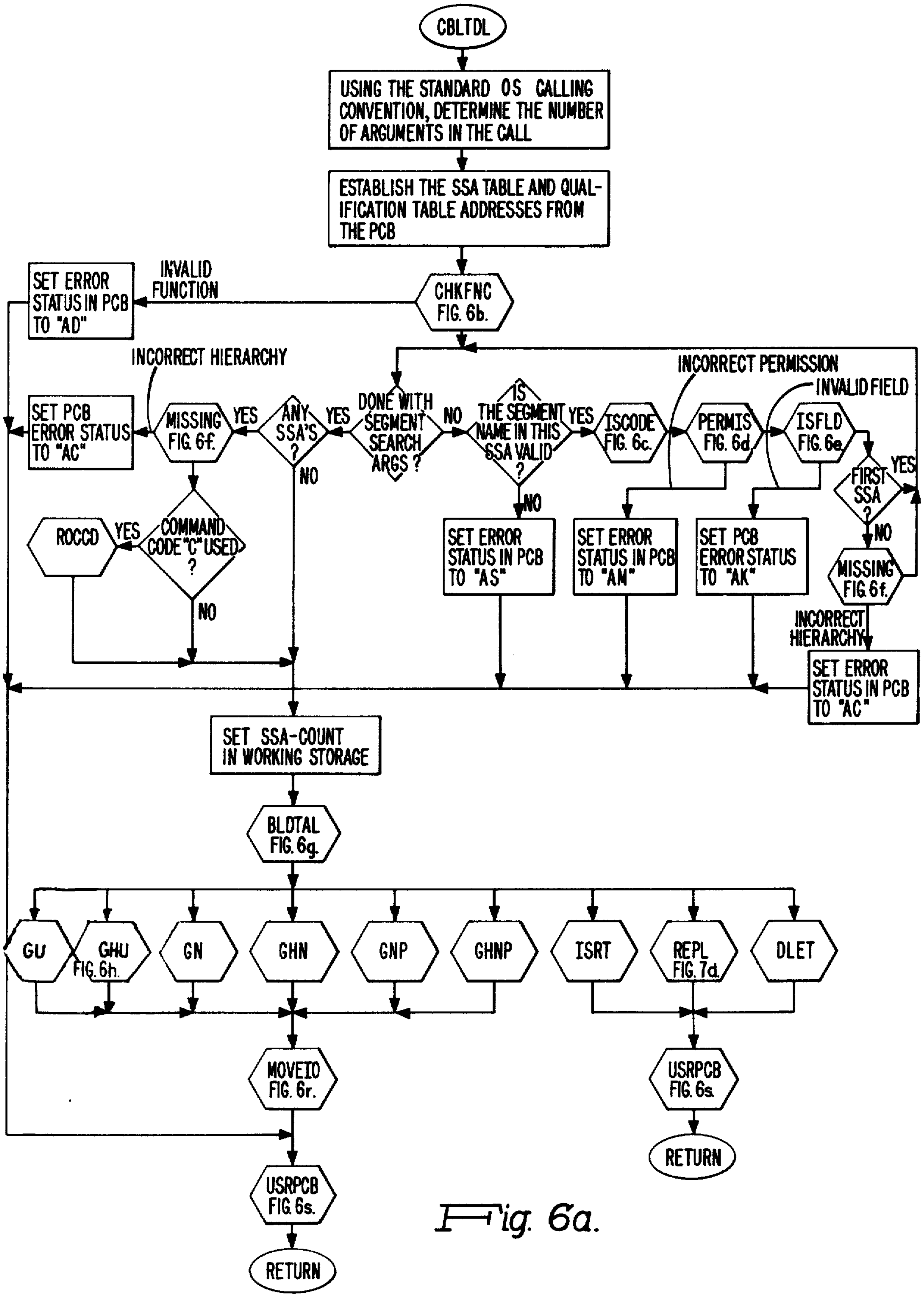

The module as illustrated in greater detail in FIG. 6*a* produces the following results:

(1) returns a status code in the user's PCB indicating the successful or unsuccessful performance of the function;

(2) modifies the segment level and segment name fields in the PCB to reflect the current segment;

(3) updates key feedback length and key feedback area to reflect the concatenated IMS key of the current segment;

(4) stores the segment's data portion in the user's I/O area after a get type call and leaves the area unchanged after an update tupe call; and (5) causes requested operation to be performed on the data base.

As seen from FIGS. 3*e* and 6*a*, the CBLTDL module invokes each of the modules shown. The CHKFNC module, shown in greater detail in FIG. 6*b*, is operative to validate the function argument codes supplied by the user program. The module produces the following results:

(1) Sets a validity switch to indicate whether or not the function was a legal one; and (2) Assigns a numeric code to represent the specific function such as zero for get unique (GU), 1 for get hold unique (GHU), etc. As illustrated in FIG. 3*e*, the CHFMC module does not call any other module.

The ISCODE module shown in greater detail in FIG. 6*c* is operative to scan the command codes for a given segment search argument (SSA). This module receives input arguments, codes designating the SSA to be scanned and the character position in the SSA at which the command codes begin. The results produced by the module are as follows: Modifies the SSA table to store the command codes included in the input segment search argument; stores information indicating the character position which signified the end of the command codes; and, sets a validity switch indicating whether or not the command codes were syntactically valid. The ISCODE module as illustrated by FIG. 3*e* does not reference further modules.

Figure 6D:
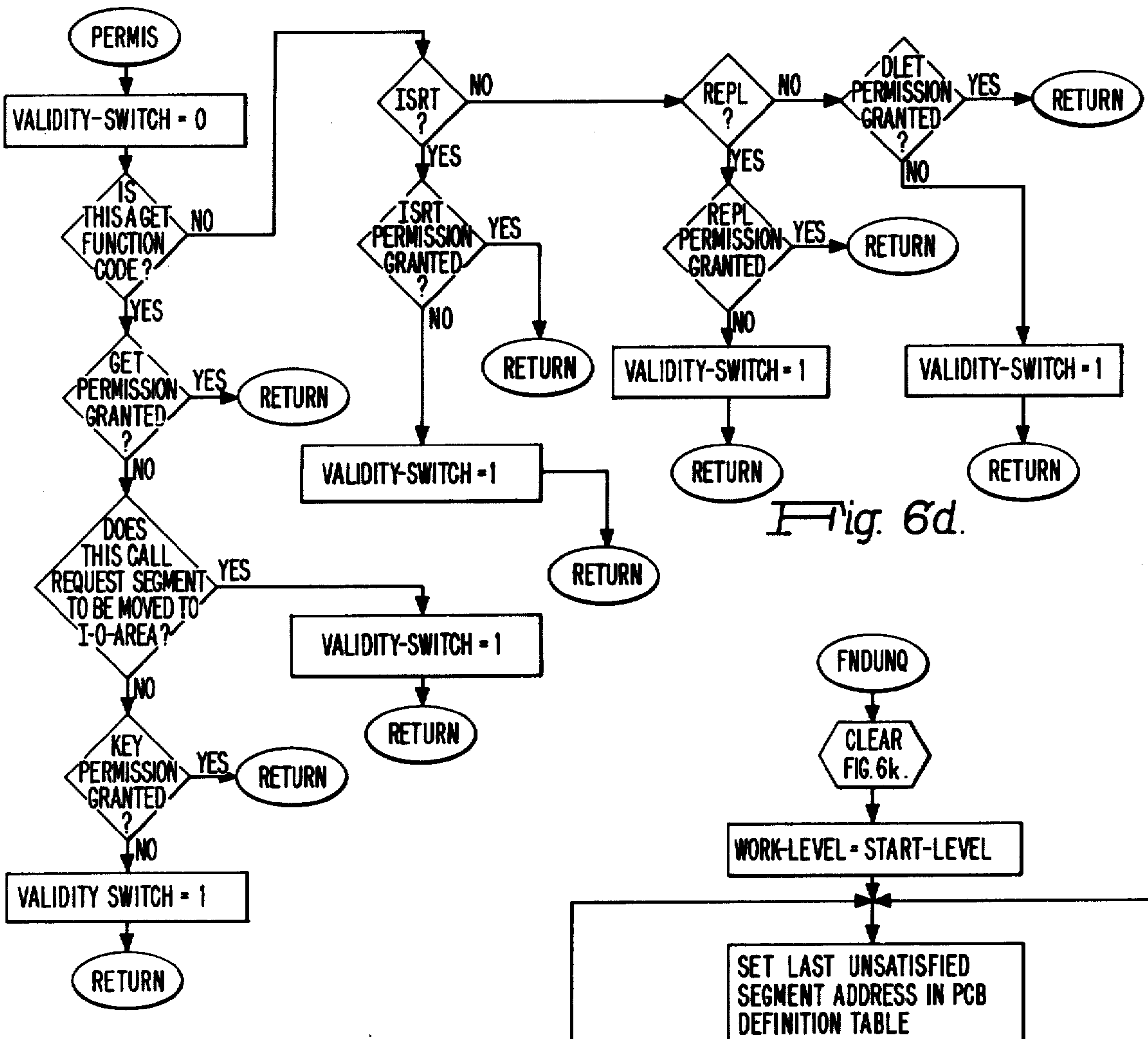

The PERMIS module shown in greater detail in FIG. 6*d* determines whether or not the user program has the proper sensitivity permission to access the requested segment. This module receives the address of the segment search argument table for the requested segment and sets a validity switch to indicate whether or not the user program has the proper permissions. The PERMIS module does not call any other modules.

The ISFLD module shown in greater detail in FIG. 6*e* is operative to scan a segment search argument for isolating and verifying for accuracy all of the IMS key fields used in the segment search argument. The module receives input arguments coded to designate the segment search argument to be scanned and the character position in that argument at which scanning is to begin. The module is operative to produce the following results:

(1) Stores in the argument table any qualifiers found in the argument;

(2) Stores in the qualification table the coded form of the qualifiers along the comparison operators, Boolean codes in search of values; and (3) Sets a validity switch indicating whether or not the key fields scanned were syntactically correct. Similar to the other modules, the ISFLD module does not call any other modules.

The BLDTAL module shown in greater detail in FIG. 6*g* builds "tally words" and Extended Instruction Set (EIS) descriptions used by the host system for segments which are to be moved into or out of the user's program's I/O area by the call. The module receives as input arguments, the addresses of the SSA tables. The module produces as output results the tally words and EIS descriptors for each segment to be moved which it places in the appropriate place in the SSA table. As seen from FIG. 3*e*, the module is required to call no other modules, but returns control back to the CBLTDL module.

The GU module, shown in greater detail on FIG. 6*u*, performs the main processing for the IMS function get unique. The module receives as input arguments, the hierarchical level of the segment requested in the call and the contents of internal tables which have been constructed to reflect the call. The module produces the following results:

(1) Stores the results of an attempt to locate the requested segment in a common position in the internal tables;

(2) Where the attempt is successful, internal tables are updated to reflect the "currency" of the requested segment and the moving of the segment contents to the user's I/O area. As seen from FIG. 3*e*, the GU module calls the two modules PTCHGU and FNDUNQ.

The MOVEIO module illustrated in FIG. 6*a* performs the key switching specified by the IMS handling of logical segments in the user's I/O area. This module receives as input agruments, the SSA table with the assumption that the data portion of the logical components is available in the emulator I/O area for a retrieval function or in the user's I/O area in the case of an update function. The module produces the following results:

(1) For a get function involving a logical segment the user's I/O area will have the following format—logical parent key, logical child data, logical child key and logical parent data;

(2) For an update function involving a logical segment the emulator I/O area will contain information having the following format—logical child key, logical child data, logical parent key and logical parent data; and (3) For physical segments, the module takes no action. As seen from FIG. 3*e*, the module returns control back to the calling module and calls no other modules.

Figure 6J:
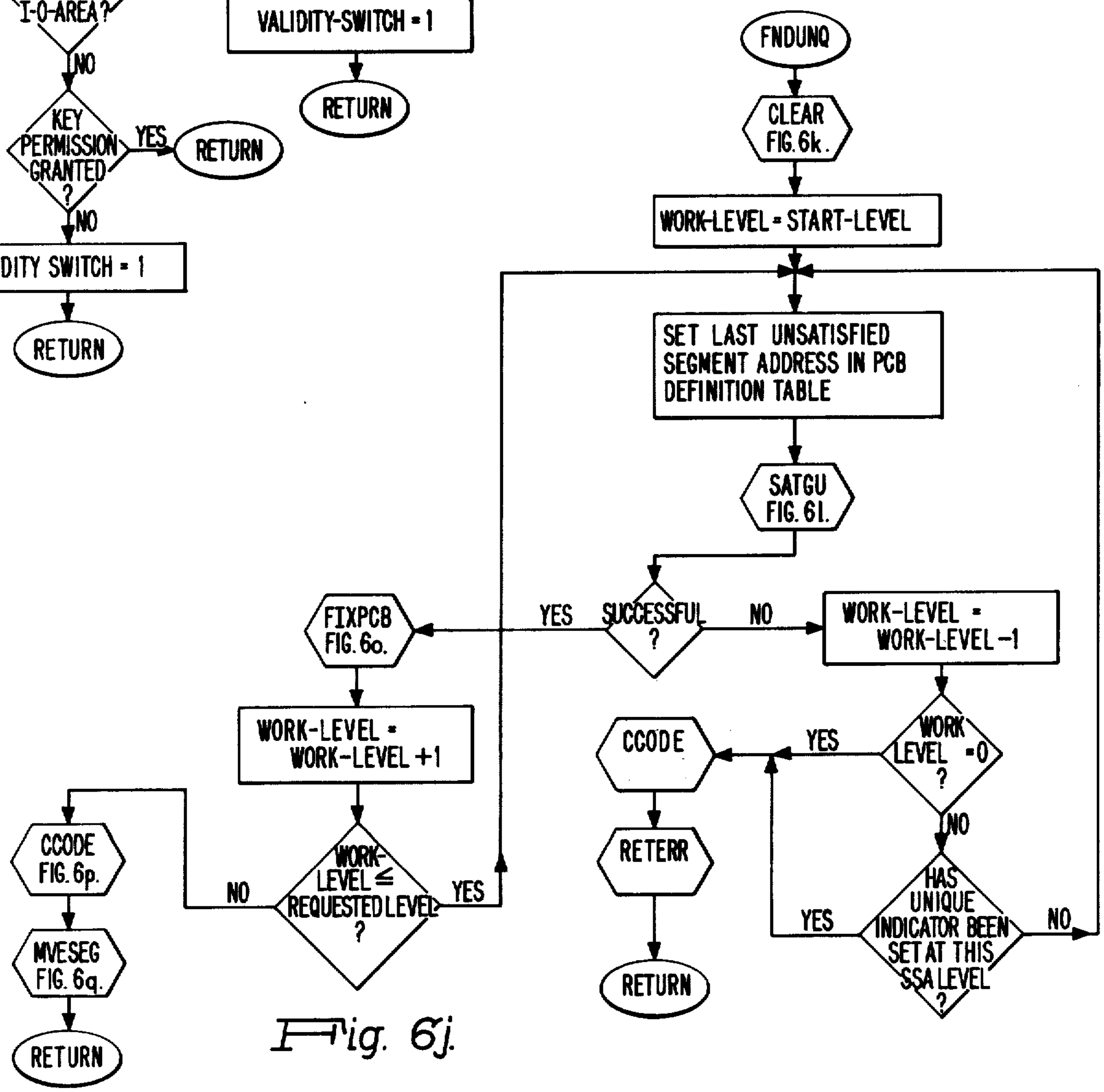
Figure 6F:
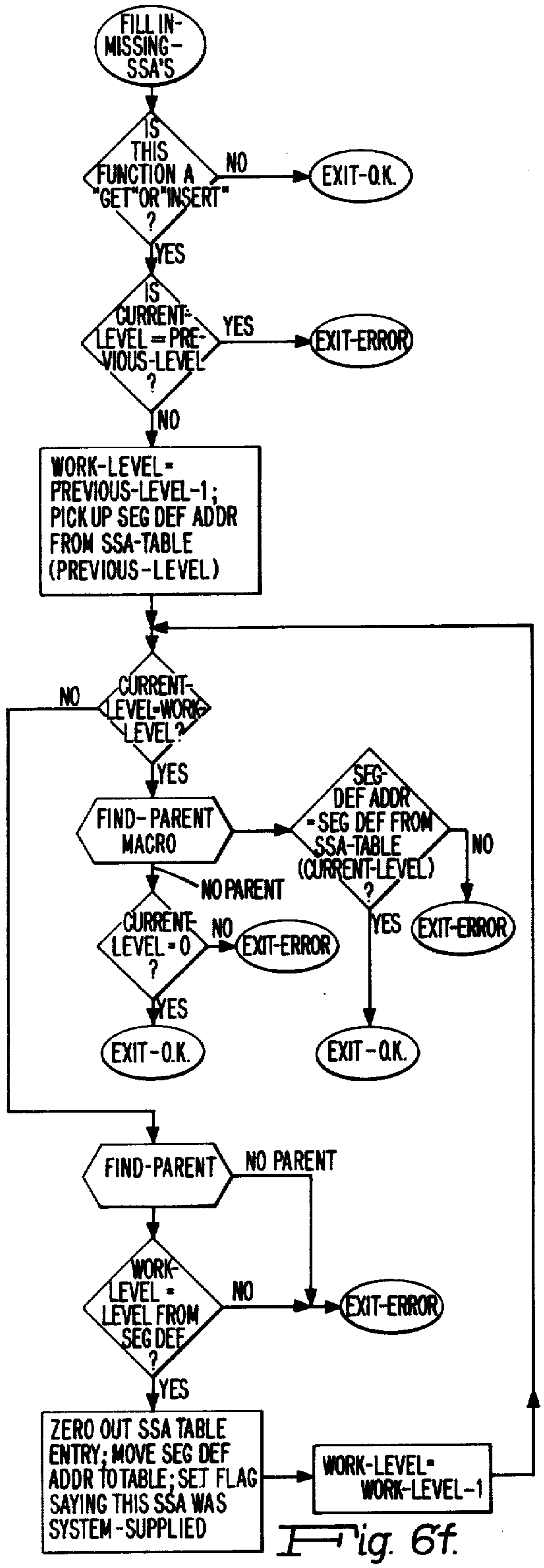
Figure 6K:
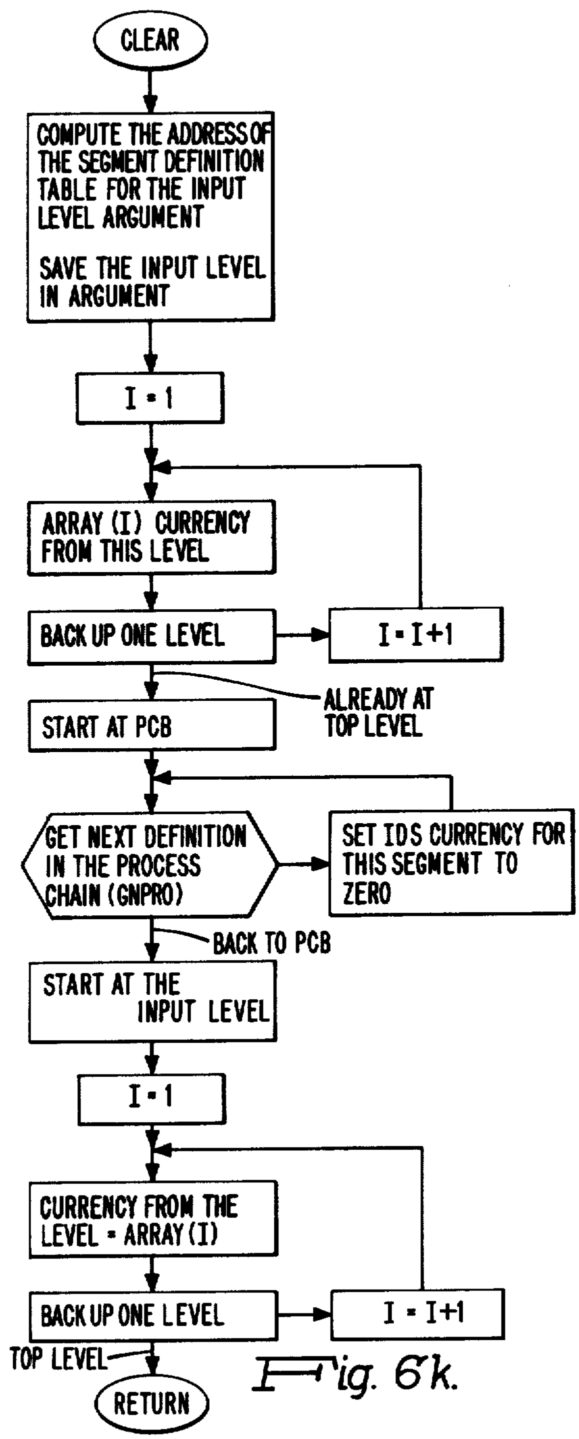
Figures 6H, 6I:
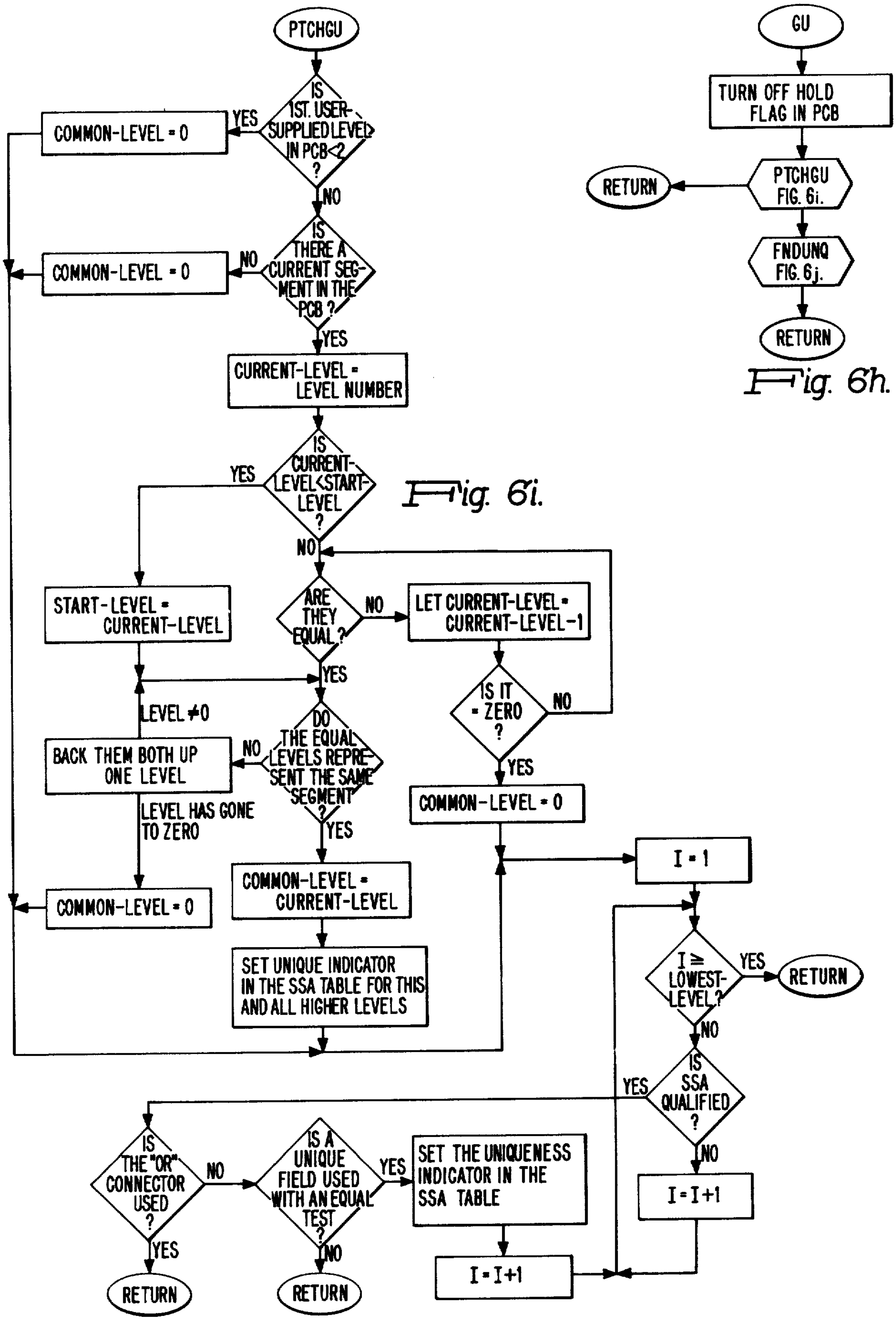
Figure 6L:
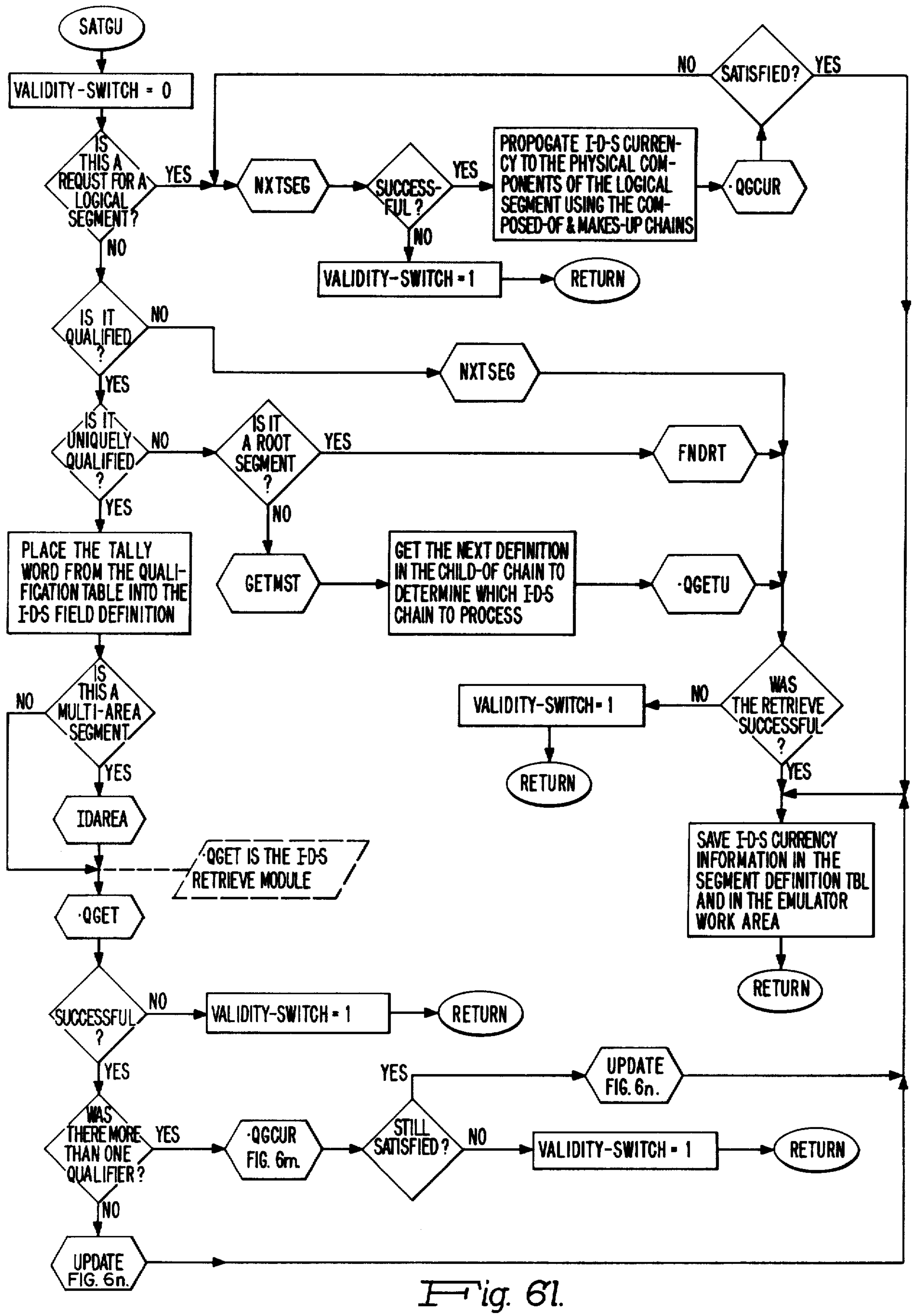
Figure 6M:
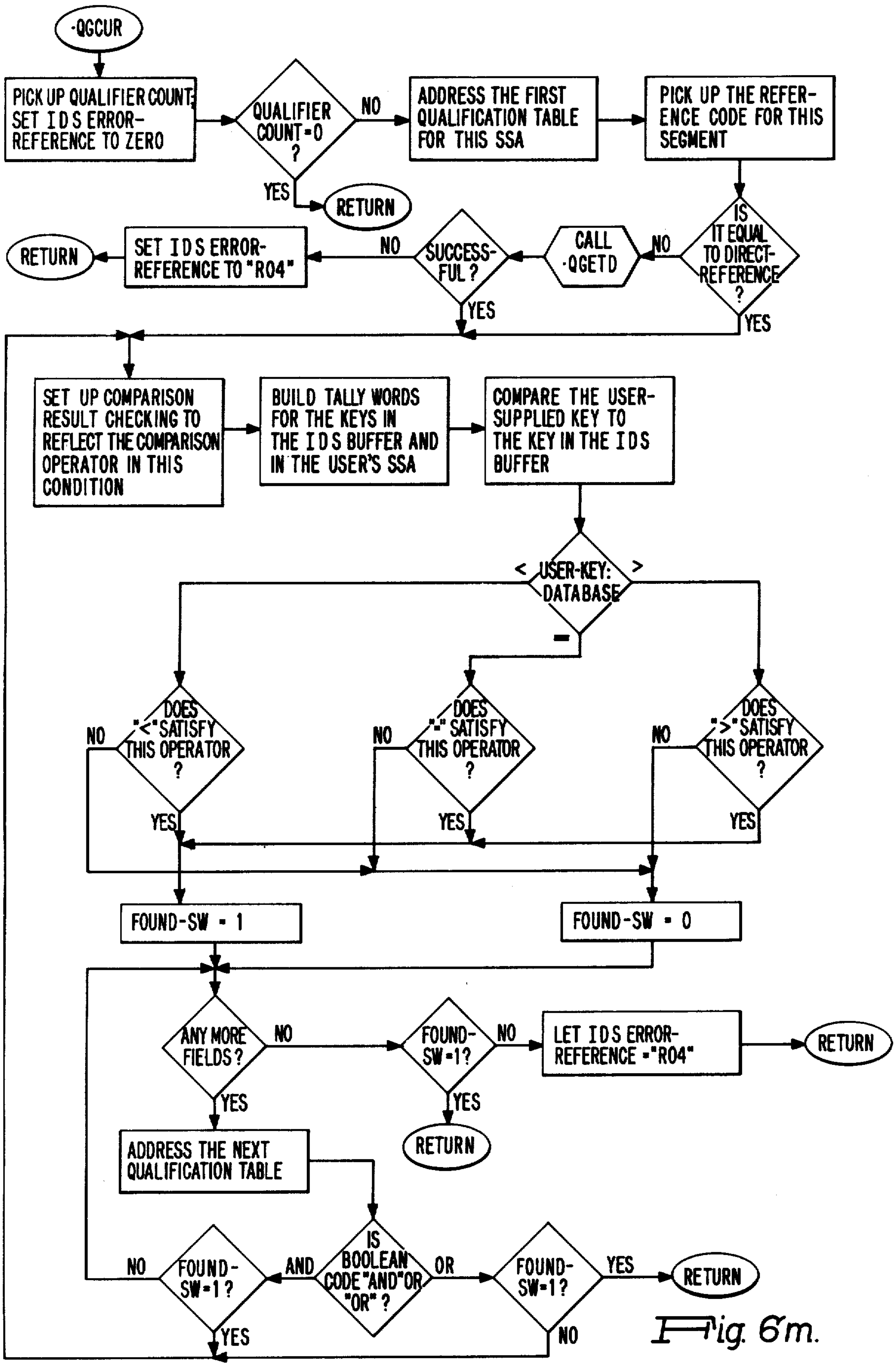
Figure 6N:
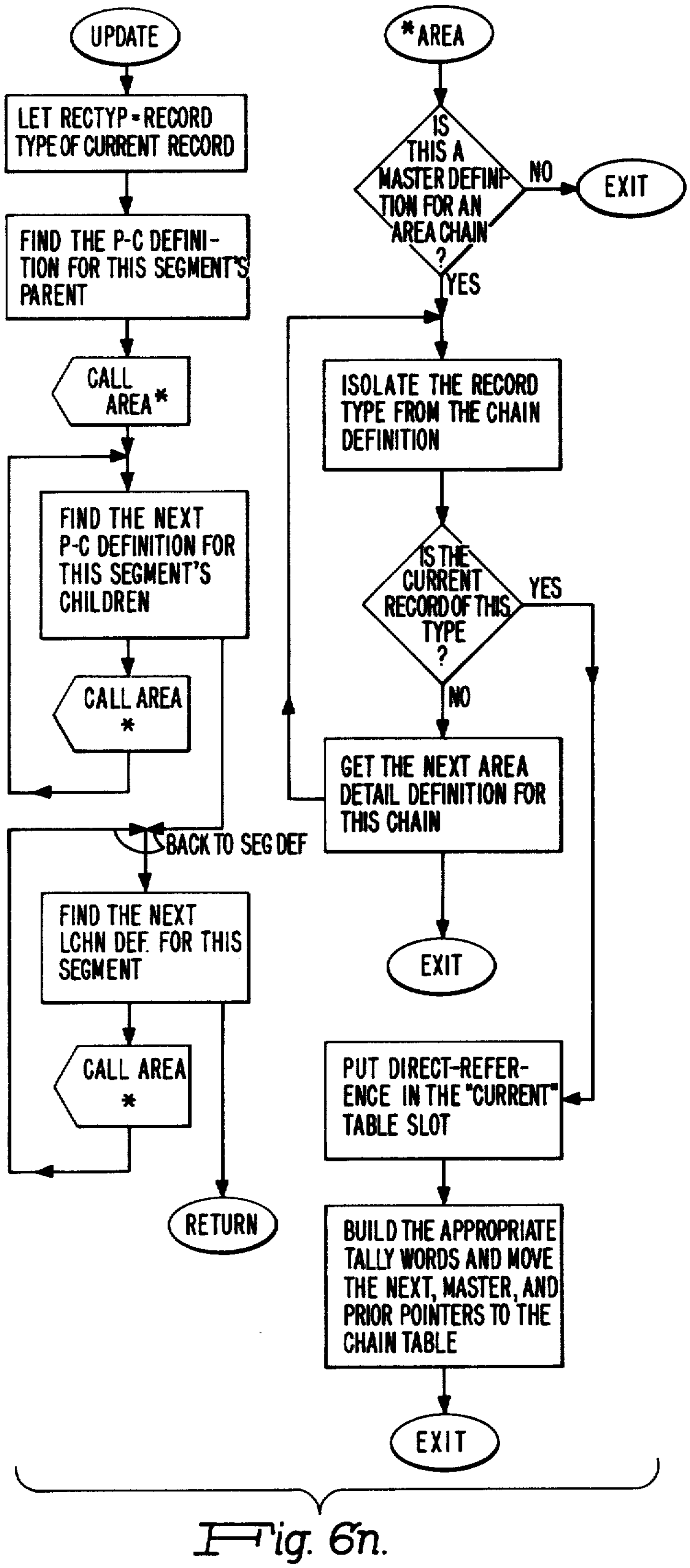

The next module is USRPCB, shown in greater detail in FIG. 6*n*, which is operative to place values indicating the results of an IMS call into the user program's PCB area. These values include: status code; segment name; segment level and key feedback area. The module receives as input arguments, the address of the user's PCB area and the PCB definition for the data base just referenced. The module produces as output results values outlining the results of the last IMS call as mentioned. As seen from FIG. 3*e*, the module is required to call no other modules, but returns control back to the CBLTDL module.

The next module PTCHGU, shown in greater detail in FIG. 6*i*, determines the hierarchical level at which retrieval should begin. In addition, the module examined the qualification table isolating the retrieval specifications which can be satisfied by a single record. The module receives as input arguments, the hierarchical level number of the lowest level segment in the IMS call. The module is operative to produce as output results:

(1) The level number at which further retrieval should begin which is the lowest common level between the call and the current data base position;

(2) Marking the search argument tables for uniquely qualified segment search arguments. As seen from FIG. 3*a*, the PTCHGU module does not call further modules, but returns control back to the CBLTDL module.

The next module FNDUNQ, shown in greater detail in FIG. 6*j*, appears as the main work routine for processing a get unique call. It is operative to cause the correct record(s) to be retrieved and to update the user program's PCB to reflect the identity of the segments found. The module receives as an input argument, the level number at which retrieval should begin. The module is operative to produce the following as output results:

(1) Signals indicating an attempt to find the requested segments;

(2) Updating the user's PCB to reflect the results of the attempt; and (3) Movement of the found segments to the user's I/O area.

As illustrated by FIG. 3*e*, the FNDUNQ module is operative to reference the modules CLEAR through MVESEG.

The next module is the CLEAR module shown in greater detail in FIG. 6*k*. This module initializes the "currency" words in the segment definitions contained in the current PCB. The module receives as an input argument the level number for the lowest level segment whose currency is to be retained. The module produces as output results the setting of the currency words to zeros contained in the segment definition segments other than the input argument and its parents. As seen from FIG. 3*e*, the CLEAR module is not referenced by other modules, but returns control back to the FNDUNQ module.

The next module referenced by the FNDUNQ module is the SATGU module shown in greater detail in FIG. 6*e*. This module is operative to perform the retrieval against a data base for a get unique call (GU). It attempts to satisfy the request for the segment search argument for one particular level specified in the call. The module receives as an input argument the level number to be satisfied. The module produces as output results the following:

(1) Signal indications of an attempt to find the requested segment—if found, it will be the current segment and the current IDS record; and (2) The setting of a validity switch for indicating whether or not retrieval was successful.

As seen from FIG. 3*e*, the SATGU module is able to call modules ID AREA through UPDATE.

Figure 6O:
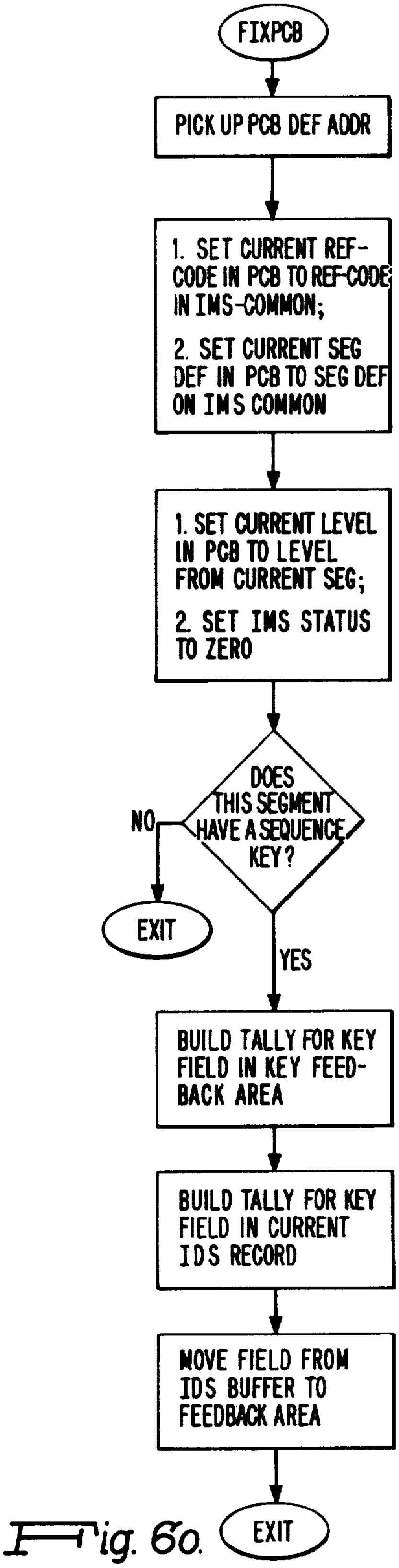

The FIXPCB module, shown in greater detail in FIG. 6*o*, is operative to modify fields in the PCB definition tables to reflect the segments most recently retrieved. Since the module works entirely from the emulator's common area and definition tables, it does not receive any input arguments. As mentioned above, the module is operative to produce the modification of the current PCB definition table to indicate the identity of the current segment. As seen from FIG. 3*e*, the FIXPCB module is not required to call further modules, but returns control back to the FNDUNQ module.

Figure 6P:
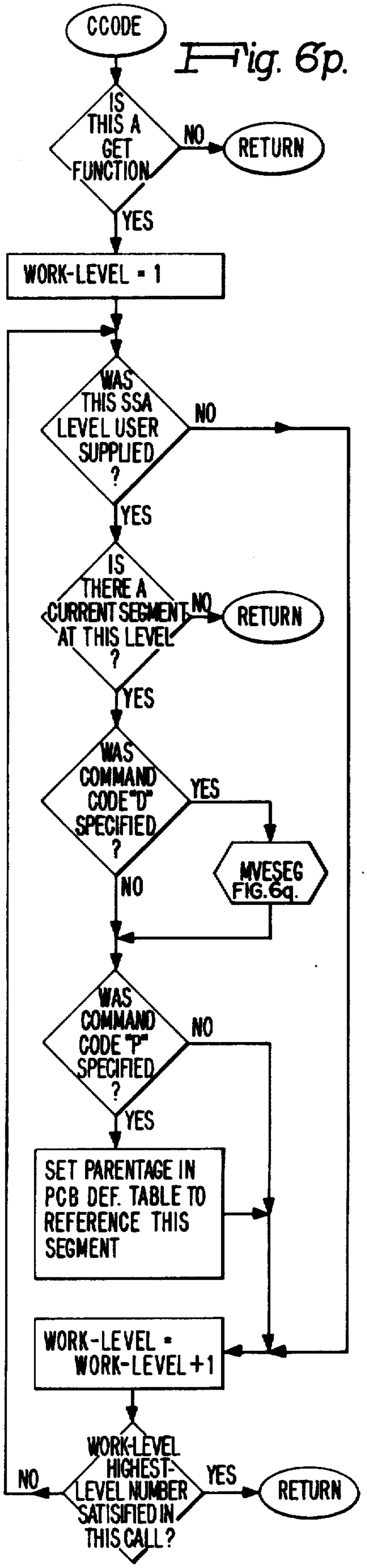

The other modules referenced by the FNDUNQ module correspond to the CCODE module and MVESEG module shown in greater detail in FIGS. 6*p* and 6*a* respectively. The CCODE module processes command codes (D) and (P) after the completion of a get call. The module receives as an input argument the highest level number for which the segment was retrieved by the call. The module is operative to produce the following results:

(1) For a (D) command code, it moves the contents of the segment at the level to the user program's I/O area; and (2) For a (P) command code, the module sets the parentage call in the PCB definition table to indicate that the segment at that level is to be the current parent.

As seen from FIG. 3*e*, the CCODE module can either call the MVESEG module or return control back to the FNDUNQ module.

Figure 6Q:
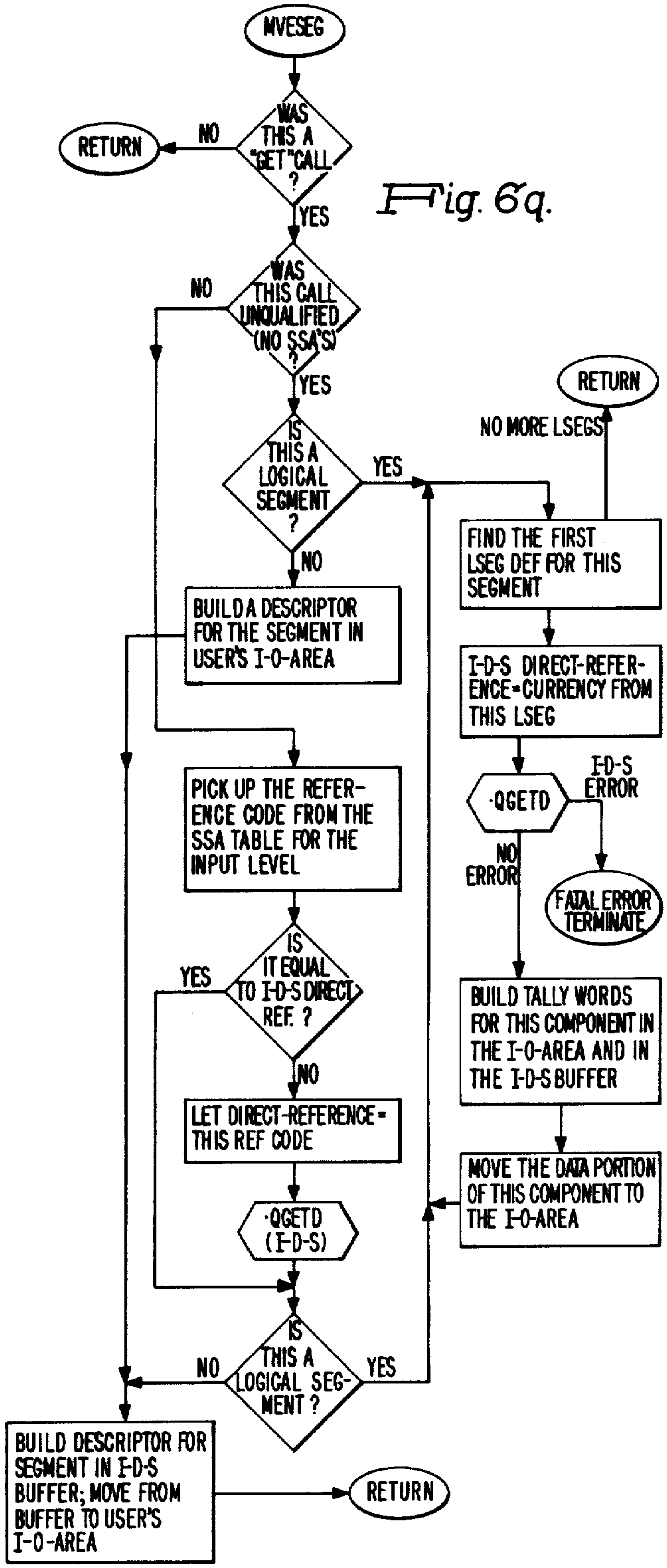

The MVESEG module shown in greater detail in FIG. 6*q* moves the data portions of the most recently accessed segment to the user program's I/O area. This module is similar to the CCODE module and works entirely from the emulator's common area and the definition tables. Hence it receives no input arguments. The MVESEG module can return control back to the FINDUNQ module or call another module designated .QETD, not shown. The .QGETD module takes the form of a standard IDS module which functions to retrieve a record through its reference code (i.e., page and line number). The manner in which this module operates is described in the aforementioned and publications and patent applications mentioned hereinafter.

The group of modules referenced by the SATGU module mentioned above will be discussed briefly. The IDAREA module will not be discussed in greater detail herein since it usually takes the form as a user coded routine which determines the correct area for a segment which may encompass or "participate" in more than one area. For the purpose of the present invention, this module can be considered conventional in design.

The next module is .QGET. As indicated in FIG. 3e, this module is an IDS module which performs in the fashion similar to the IDS function retrieve record-name. This module searches the records and one chain (either a normal IDS chain or an area chain) looking for a record that satisfies the segment search argument. The module receives as input arguments the address of the master definition of the chain to be searched together with the address of the SSA table which references the values for which the search will be made. The module is operative to produce the following results:

(1) store a zero in the IDS cell error reference to indicate that a record was found satisfying the search criteria while a non-zero indicates that no record was found; and (2) setting of all currency indicated to reflect the finding of a record (all indicators remain in their original status if no qualified record can be found).

The .QUGET module can return control to the SATGU module as shown in FIG. 3e or referenced in further modules not shown.

The last two modules referenced by the SATGU module correspond to .QGCUR and UPDATE module shown in greater detail in FIGS. 6m and 6n respectively. The .QCUR module checks the segment search argument to determine whether or not the current segments satisfy the supplied search criteria. The module receives as an input argument the contents of index register 3 (×3) which contains the address of the segment search argument table to be checked. The module produces the following results.

It sets the error-reference IDS communication cell to indicate the results of the check wherein a zero indicates success while a non-zero indicates that the search criteria had not been met.

The module as indicated by FIG. 3e can return control to the SATGU module. It also can call a standard IDS subroutine for retrieving a record based upon the reference code.

The UPDATE module updates the area chain tables for all area chains in which the current record participates. That is, "updating a chain table" means that the chain pointers in the table (current, next, master, and prior) are replaced by the current record and its pointers. The module receives as an input argument the contents of the next register 4 (×4) which points to the segment definition table. As seen from FIG. 3e, this module returns control back to the SATGU module.

The above description indicates the basic operations performed by each of the modules of FIG. 3e and the input parameter requirements.

DESCRIPTION OF OPERATION

Figure 6R:
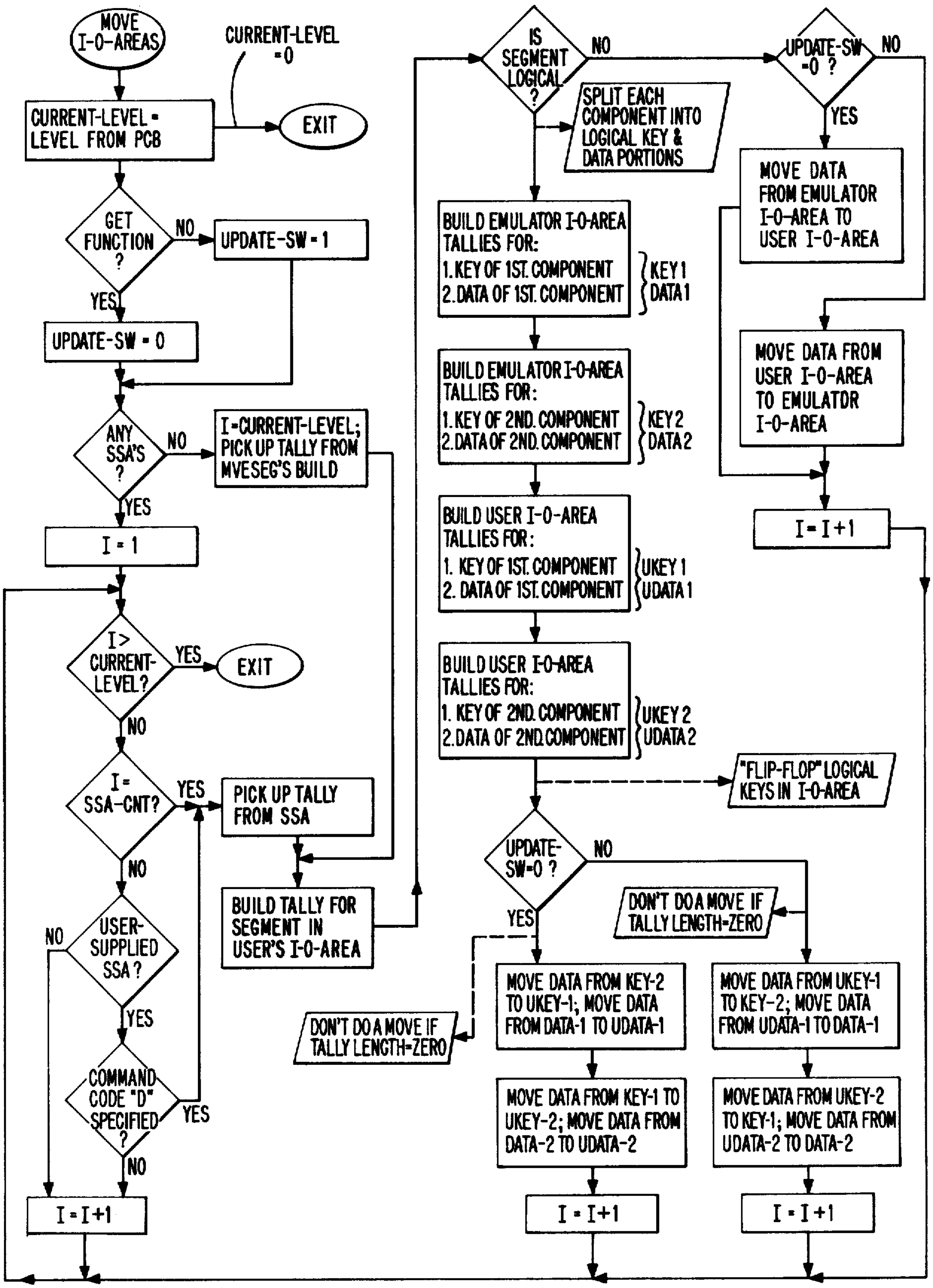
Figure 6S:
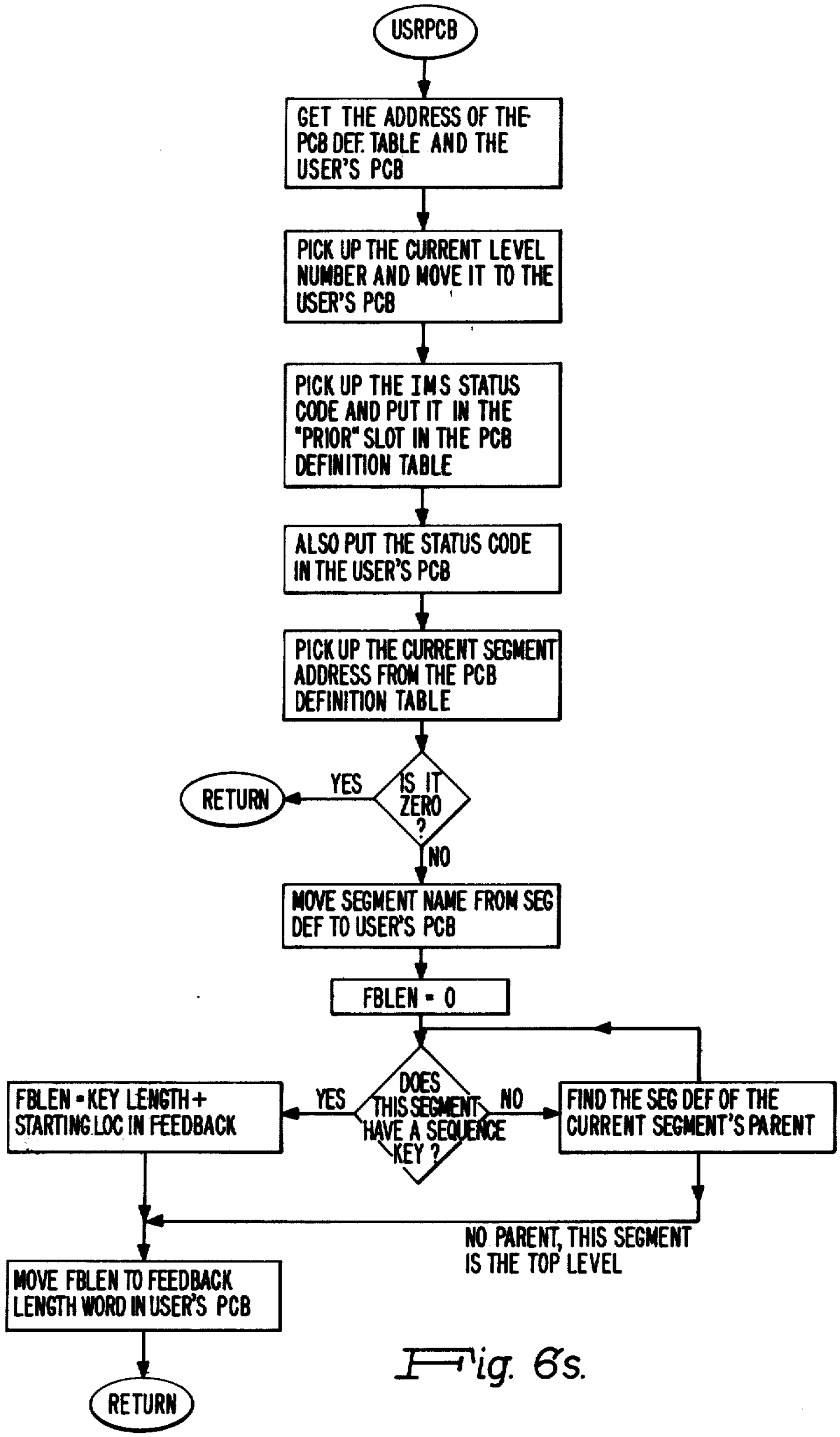

For a more complete understanding of the preferred embodiment of the present invention, the following example will be considered in connection with the detailed flow charts of FIGS. 6a through 6s. For further information on the specific modules, reference may be made to the source listings included in the attached Appendix. The listings are for the most part written in Honeywell 6000 assembly code language described in the publications previously cited.

FIG. 3c outlines a sequence of user COBOL program statements for having the host processor determine whether or not the file of a "member" is contained within the data base. In general, the user program includes a data base GET UNIQUE call causing the host processor to find out if a new record or "subscriber" exists in the data base files 918 of FIG. 2. If it does exist, the user program causes the host processor to move its contents back to the program's working area so that the program can print it or perform any other operations it desires.

In greater detail, as mentioned, every IMS data base call is received by the CBLTDL module of FIG. 3e which is operative to examine the call to find out the type of call. The user program or calling program includes four arguments (i.e., get unique, member PCB, I/O area and MPO5ROOT-SSA). These arguments are passed to the CBLTDL module. Of course, the module is arranged so that it can accept more or less than four arguments. In the host system, every program call to the operating system is translated into the following subroutine: (1) there is a branch to the CBLTDL module; (2) there is a transfer around all of the arguments; (3) there is some error linkage word in case of a problem; and (4) the addresses of all of the arguments. Generally, the number of arguments is determined by subtracting addresses. That is, following the transfer statement, there is another transfer around all of the arguments. By taking the number specified in the last transfer and its address, subtracting from it the address to which there is a transfer, the number of arguments can be established. It will be understood that the manner by which the module determines the number of arguments can be considered conventional. Here, it corresponds to that of the operating system. The CBLTDL module is then operative to initialize to zeros the different areas contained within the segment search argument table and the qualification table of FIG. 4. At that time, CBLTDL module is operative to establish the SSA table and qualification table addresses. These addresses are derived from the information contained within the segment search argument (i.e., from the character positions). It will be appreciated that the segment search argument is a string of characters (BCD) arranged in the following format.

| | Command Codes | | | Qualification Statement | | | End Qual. or Connector |
|---|---|---|---|---|---|---|---|
| Seg. Name | * | Codes | Begin Qual. ( | Field Name | RO | Compar. Value | ) or* or+ |
| 8 char. | 1 char. | var. no. of char. | 1 char. | 8 char. | 2 char. | 1 to 255 char. | 1 char. |

The eight segment name characters specify the type of segment. The command code characters when included augment or qualify the data base operation or function. A list of these codes is given in the glossary. The field name provides an eight character key field in the specified segment and the comparative value characters provide a value which must be equal size and type to the field with which it is being compared.

Next, the module references the CHKFNC module for examining the call parameters to determine whether or not the call is "legal". If it is legal, the CHKFNC module is operative to convert the call into a numeric code and pass it back to the calling CBLTDL module.

As seen from FIG. *6b*, the CHKFNC module takes the call parameter code and performs a type of table lookup operation using this to reference the search function table included as part of the PCB located in working storage. Since the PCB should contain the segment search arguments as discussed earlier, the CHKFBC module is operative to set the validity switch bit to a binary ZERO followed by setting the function code included by the CBLTDL module in the call equal to the position in the table (i.e., translates code into "O" for GU). If for some reason the argument is not found, the module sets the switch to a binary ONE. The CHKFNC module then returns control back to CBLTDL module. The signaling of an invalid function causes the CBLTDL module to insert the appropriate IMS error code into the first entry of the PCB table of FIG. *5a*. The meanings the codes have to the IMS user program are set forth in the glossary. It will be appreciated that these codes provide the same status information to the program that it would have received when executed in its original system.

As seen from FIG. *6a*, next the CBLTDL module tests to determine whether or not the processing of the segment search arguments has been completed. The host processor maintains a count of the number of SSA's in working storage so that it can be referenced by other modules. Initially, the CBLTDL module sets the SSA count and the count remains at that value until the processing of the call is completed. Before exiting, as seen in FIG. *6a*, the module puts the SSA count into working storage. The SSA's in the last call normally provide for a look backward capability required for processing REPL and DLET commands.

Since it is assumed that processing of the SSA's is just beginning, the CBLTDL module next tests to determine if the segment name in the SSA is valid. This was stored in the first part of word 0 of the SSA table of FIG. *5g*. It does this by checking its length and coding. From FIG. *3c*, it is seen that the name is MPO5ROOT and that it is eight characters in length. The detection of the asterisk symbol can be used for verifying the length of the segment name.

Since the name is valid, the CBLTDL module next references the ISCODE module fo FIG. *6c*.

Referring to FIG. *6c*, it is seen that this module sets the validity switch indicator bit to zero and clears the table of command code settings.

In greater detail, from the format discussed previously, it is seen that the asterisk symbol denotes the beginning of the command code field within the SSA. In this example, the field contains dashes which indicate that this is a "null" call command requiring no action. As seen from FIG. *6c*, the ISCODE module takes the value indicating the character position within the SSA and increments the value by one upon detecting the asterisk character symbol. It continues incrementing this value until all of the null character codes have been processed. Since there were no command codes present, the ISCODE module returns control back to the CBLTDL module.

As seen from FIG. *6a*, the CBLTDL module next references the PERMIS module of FIG. *6d*. This module tests the function code previously stored in working storage by the CHFNC module and tests it. Since it is a get unique operation, the module takes the segment name MPO5ROOT and references the first segment definition table entry of FIG. *5b* to determine whether or not the user program has the correct permission (i.e., G permission=1) to perform the indicated operation. When permission is not granted, the module sets the appropriate error status in the PCB entry. Assuming that permission has been granted, the PERMIS module returns control back to the CBLTDL module as shown.

As seen from FIG. *6a*, the CBLTDL module next references the ISFLD module of FIG. *6e*. This module isolates the IMS unrecorded BCD characters stored in the qualification statement field and verifies their correctness. Also, the module stores the pertinent characters in the first qualification table entry of FIG. *5h*.

In greater detail, the ISFLD module detects the parenthesis character symbol in the program of FIG. *3c*. This signals the start of the qualification statement field which includes the eight character key field "MPROOTKY" followed by a space designated by a triangle character symbol. The module adds 8 to the character position count to determine whether the field found is in the specified segment. Since it specifies a key field, the result of the test is positive.

Next, the module isolates the relational operator (i.e., RO) and increments the character position by 2. The operator (RO) is an = sign which means that the key must be equal to the key specified.

Since the = sign is a valid symbol, the result of the next test is positive. The key definition address and operator are stored in the first qualification table entry of FIG. *5h* as indicated. The qualifier count in the SSA table of FIG. *5g* is fetched by the module and incremented by one. As mentioned, the SSA can contain from 1 to 255 characters. In the present example, this field contains the root value which is specified as being 9 characters in length which is the length of unique identifiers for subscriber roots.

The ISFLD module, as seen from FIG. *6e*, stores the qualification table address in word 9 of the first SSA table entry (FIG. *5g*) and stores the address of the field or comparative value in to word 3 of the first qualification table entry. As seen from FIG. *6e*, the module sums the character position value and the length of the field (9 characters) and examines the character code at that position. From FIG. *3c*, it is seen that this code corresponds to a right parenthesis character symbol. This signals the end of the qualification field and that the module has completed its processing of the SSA. It will be noted that the remaining operations shown in FIG. *6e* are performed when the SSA contains other qualifiers signaled by a valid connector character symbol (i.e., * or +). Since there is no connector character, the boolean code in word 0 of the qualification entry remains 0 as indicated in FIG. *5h*. Summarizing the above, it is seen that the modules CHKFNC through ISFLD load the SSA and qualification table entries of FIGS. *5g* and *5h* with values obtained from the user program of FIG. *3c*. As mentioned, by contrast the remaining tables are loaded with appropriate values at translation time. These values are indicated in the attached Appendix.

At this time, the host processor of FIG. 1 has evaluated the get unique data base call, established that the call is valid and that there have been no errors. The emulator modules now proceed to find the record the user program has requested.

Referring to FIG. *6a*, it is that the CBLTDL module tests to determine whether this is the first SSA. Since it is the first SSA, the module next tests to determine whether all of the SSA arguments have been processed. The result of this test is also positive and the module tests to establish whether there were any SSA's. Again, the result is positive.

The positive result of the last test causes the CBLTDL module to call the MISSING module of FIG. 6*f*. This module essentially checks to see that the user program has included the correct information in the call in conformance with IMS procedure. For example, a user program cannot request two segments at the same level in a call. Also, the user program must request the segments in the proper hierarchical sequence (i.e., level 1, level 2, . . . , etc.). As mentioned, the IMS structure can be viewed as a hierarchy of fixed length segments emanating from a root segment for each data base. In the IMS system contemplated, the data base can include up to 255 segment types arranged in a maximum of fifteen levels and each segment type may occur any number of times or not at all under a given root. Thus, the module operates to enforce the IMS data base requirements. Also, the MISSING module is required to provide the level number information in the segment definition table entry for all levels above the level requested.

In the present example, the user call specified the root segment which corresponds to the first level. Accordingly, the MISSING module need only insert the level number information into the first segment definition table entry of FIG. 5*b*.

Referring to FIG. 6*f*, it is seen that the MISSING module is operative to compare the current level and previous level values stored in the PCB definition table and segment definition table. Assuming the user call is correct, the result of this test should be negative which causes the module to set the work level value equal to the previous level-1 and fetch the address of the segment definition table entry from the SSA table entry of FIG. 5*h*.

Next, the module compares the current level with the work level and the result is positive which causes the module to reference the FIND-PARENT "macro" of FIG. 6*f*. The term "macro" is used in its conventional sense to denote a source language instruction which calls in a special routine to perform a particular function (e.g., find the parent of the segment).

Briefly, the FIND-PARENT macro tests to determine whether the named segment has a parent. In the present example, since the segment specified is the root segment and has no parent, the MISSING module returns control back to the CBLTDL module. That is, the macro decrements the level number (i.e., 1) by one which causes the result of testing the current level to be positive.

Referring to FIG. 6*a*, it will be noted that when the "hierarchy" is correct, the MISSING module causes the CBLTDL module to test for the presence of command code C. However, if user program provided an incorrect call, the CBLTDL module as seen from FIG. 6*a* enters the appropriate error status code into the PCB.

The C command code as described in the glossary denotes the presence of a concatenated key. Since there were no command codes in the call, the result of this test is negative. Next, the CBLTDL module sets the SSA count in working storage and then calls the BLDTAL module of FIG. 6*g*.

As mentioned previously, the BLDTAL module "builds" the addresses (tally words and EIS descriptors) necessary for the host processor to fetch the segment from the IDS data base. In the host processor, addresses must be provided indicating where the segment is, where it is to be moved, etc. The addresses are discussed in greater detail in the aforementioned references.

Referring to FIG. 6*g*, it is seen that the BLDTAL module generates a "tally word" for each SSA using the I/O area address, starting character and segment length information obtained from the segment definition table of FIG. 5*b*. The module then stores the tally word in the SSA table entry of FIG. 5*g*. The module also generates the appropriate descriptor information in a well known fashion.

In the present example, after generating the tally word for the root segment, the BLDTAL module returns control to the CBLTDL module. As seen from FIG. 6*a*, the CBLTDL module next calls the appropriate one of the modules GU through DLET to perform the actual data base operation. Since the operation specified by the user program of FIG. 3*c* was a get unique operation, the CBLTDL module calls the GU module, shown in greater detail in FIG. 6*h*. The GU module examines the call and the contents of the SSA and qualification tables to determine what levels in the IMS hierarchical structure is the segment located. In the present example, as mentioned, the user program call specified the root or first level segment.

Referring to FIG. 6*n*, it is seen that the GU module operates to turn off or reset the hold flag indicator in the first entry in the PCB definition table of FIG. 5*a* (bit position 17 of word 0). This indicates that the IMS data base operation is not a "hold" operation which was described previously. As seen from FIG. 6*h*, the GU module then calls the PTCHGU module of FIG. 6*i*.

As seen from FIG. 6*i*, the PTCHGU module is operative to make changes to the SSA and qualification tables which specializes them for the get unique call which is to be processed by the other emulator modules. In greater detail, the PTCHGU module performs a number of tests involving the user's supplied level information stored in the PCB definition table entry. As from FIG. 6*i*, the first test the module makes determines whether the level number is less than 2. Since the level here is the first level, the module switches the common-level information to zero and sets the variable I=1. Next, the module tests the value of I to determine whether it is greater or equal to the lowest level. Since it is in this example, the PTCHGU module returns control back to the CBLTDL module. The other tests performed by the PTCHGU module enable the modules to sequence in effect through the hierarchical structure which is characteristic of the IMS data base.

As seen from FIG. 6*h*, the GU module then calls the FNDUNQ module shown in detail in FIG. 6*j*. This module performs the necessary data base retrieval operation. Referring to FIG. 6*i*, it is seen that the FNDUNQ module first transfers control to the CLEAR module of FIG. 6*k*. This module insures that there is no incorrect IDS currency information contained within the PCB and segment definition tables for the named segment. That is, it validates the currency information contained in the PCB definition table and segment definition table.

As seen from FIG. 6*k*, the CLEAR module first computes the address of segment definition table for the input level (level number) stored in the PCB and segment definition table entries. This information is passed to the CLEAR module by the calling module. The CLEAR module saves the level number and then sets the variable I=1 in a location in working storage for that module. It then sequences back one level by incrementing the stored value for I. The module then tests to determine whether it is already at the top level of the hierarchical structure. Assuming that it is, the module then starts at the PCB definition table level and references the GNPRO macro.

GNPRO is a macro used whenever the host processor is requested to find a ROOT segment. The macro eliminates the currency information in all of the segments in the data base which belong to the ROOT segment. In this example, all of the segments in the particular data base definition are cycled through and cleared. Since all of the segments are chained together in a ring structure starting from the PCB, the macro begins its operation at that point. It sequences through the process chain next referencing the segment definition table and clears its currency to ZERO. Upon completing a loop through the process chain, the macro exits from the loop and resets any currencies (here, there would be none). The CLEAR module then returns control back to the FNDUNQ module.

It is seen from FIG. 6*j* that the FNDUNQ module next sets the work level to equal the start level. It then sets the last unsatisfied segment address into the appropriate word location in the PCB definition table (i.e., bit positions 18–35 of word 3). In this example, this would correspond to the current segment definition address which is the ROOT segment.

The FUDUNQ module then references the SATGU module of FIG. 61. The SATGU module is called once for every level in the hierarchy required for the user program call (i.e., for level requested and all higher levels). In the present example, the SATGU module is called once to locate the ROOT segment. The module looks at the SSA and qualification tables, information describing the physical characteristics of the data base, determines the type of IDS data base it is, that is, its area, etc., as explained herein. In greater detail from FIG. 61, it is seen that the SATGU module first sets the validity switch located in segment definition table to a binary ZERO. It then tests to determine whether the named segment is a logical segment by testing the contents of the segment definition table entry. Since it is not a logical segment, the SATGU module then tests to see if the segment has been qualified (tests the state of indicator). In this example, the segment has been uniquely qualified by the call. Since the state of the uniqueness indicator bit stored in the SSA table had been set, the SATGU module then places the tally word in the IDS field definition table entry of FIG. 5*b*. This information identifies a physical area of the data base disk file storage 918 of FIG. 2.

Next, the SATGU module tests the segment definition table to see whether this is a multiarea segment. In the IDS data base, the user program can access a data base composed of up to 64 areas. This module provides or assigns the area in working storage required for the segment. That is, the segment length stored in the segment definition table entry is defined by the user at the time the data base is loaded by the host processor. When the segment encompasses more than one area (i.e., a multiarea segment), the SATGU module calls the user program IDAREA module.

Assuming that in this example, the segment involves a single area, the SATGU module next references the IDS .QGET module. As mentioned, this module is an IDS module which performs in IDS terms a "retrieve function". This module is one of the IDS primary subroutines which performs the actual operation upon the data base external to the host processor. The operations performed by the .QGET module are described in the previously referenced publications in addition to the publication "GE625-635 Integrated Data Store Flow Charts", publication no. CPB-1332, by General Electric Company, copyright 1966. It will be appreciated that such operations could also be performed as described in the following patent applications:

(1) "Data Base Instruction Find Direct" invented by Benjamin S. Franklin et al bearing Ser. No. 535,392, filed Dec. 23, 1974, now abandoned, and assigned to the same assignee as named herein; and (2) "Data Base Instruction Find Owner" invented by Benjamin S. Franklin et al bearing Ser. No. 588,434, filed June 19, 1975, now U.S. Pat. No. 4,025,901, and assigned to the same assignee as named herein.

As seen from FIG. 61, following the retrieval of the segment by the .QGET module, control is returned to the SATGU module. The module then examines the results of the call. Since the segment was found and call was satisfied, the testing of the successful indicator is positive. Next, the SATGU module tests to see if there are any more qualifiers. That is, the SATGU module determines whether the segment was qualified on more than one key field by examining the qualifier count contained in the SSA table. If the module determines that the user program supplied more than one key, the module calls the .QGCUR module. This module, shown in greater detail in FIG. 61, again checks the qualifier count and when greater than 1, the module checks the current record to determine if it still satisfies the other keys besides the unique one.

In this example, since there are no other keys except a single key, the SATGU module is operative to call the UPDATE module of FIG. 6*m*.

The UPDATE module is operative to update the IDS currency information to ensure that the record is current with all of the chain tables. This is done to make sure that both the emulator modules and IDS modules reference the same records.

As seen from FIG. 6*n*, the UPDATE module references the PC definition table for the segment's parent and calls the AREA macro. The marco performs the tests indicated which result in the building of the appropriate tally word information and the altering of the next, master, and prior pointers as required. The UPDATE module then returns control back to the SATGU module. As seen from FIG. 61, the SATGU module stores the IDS currency information in the segment definition table and work area for further reference. It then returns control back to the FNDUNQ module. As seen from FIG. 6*j*, the FNDUNQ module tests to determine whether or not the SATGU module found the record whose key was equal to the key provided by the user program. Since it did, the FNDUNQ module then calls the FIXPCB module of FIG. 6*o*.

The FIXPCB module sets the appropriate conditions in the user program's PCB area to indicate that the particular record requested was located, indicate the type of record it was (MPO5ROOT) and store cerrtain information in different areas. The important area in this instance is the so-called feedback area in which the key(s) of the current record are stored. This enables the FIXPCB module to move the stored key values (i.e., ROOT value) back into the user program's PCB area.

As seen from FIG. 6o, the FIXPCB module references the PCB definition table to fetch the address. It then sets the IDS reference code of the segment in the PCB definition table entry to the current reference code stored in the IMS common area (i.e., area of store). Also as illustrated in FIG. 6o, the FIXPCB module sets the current level number in the PCB definition table entry to the level contained within the current segment. It also sets the IMS status code to ZEROS as indicated (spaces).

Next, the FIXPCB module tests to determine whether the segment has a sequence key. When it does, the module then builds a "tally" for the key field which is stored in the key feedback area. Also, it builds a "tally" for the key field in the current IDS record and moves the field from the IDS buffer to the feedback area. The FIXPCB module then returns control back to the FNDUNQ module of FIG. 6j.

As seen from FIG. 6j, the FNDUNQ module increases the work level value by one and tests its value. Since in this example, the work level was the first level, the result of the test is negative and the FNDUNQ module calls the CCODE module of FIG. 6q. As indicated previously, where the work level is other than the first level, the FNDUNQ module calls the SATGU module the number of times required to obtain the segments for all other levels.

As mentioned, the CCODE module processes any command codes found previously by the ISCODE module. Since there were no command codes, the CCODE module after sequencing and performing tests returns control back to the FNDUNQ module of FIG. 6j.

As a final operation, the FNDUNQ module transfers control to the MVESEG module of FIG. 6q. This module performs the actual transfer of the record to the user program's I/O area. That is, as indicated above, the IDS .QGET module brings an entire IDS page into the main store 922 of FIG. 3b. The MVESEG module takes the record to be moved into the I/O area.

In greater detail, referring to FIG. 6a, it is seen that the MVESEG module makes the tests indicated and builds a description for the segment in the specified user program's I/O area. The module calls another IDS subroutine .QGETD which performs the retrieve direct function which retrieves the record identified by the reference code contained in the direct reference field. The MVESEG module returns control back to the FNDUNQ module of FIG. 6j.

Since retrieval has been completed, the record removed and the PCB updated, the FUDUNQ module returns control back to the CBLTDL module.

The remaining operations to be performed are in the nature of housekeeping or clean-up operations. As seen from FIG. 6a, the CBLTDL module calls the MOVEIO module of FIG. 6r. This module moves the information within the IMS logical segment area as a consequence fo modifications of keys in various records. From FIG. 6r, it is seen that the MOVEIO modules sets the current-level equal to the level number obtained from the PCB. Since the call specified a get function, the MOVEIO module sets the update switch to zero. The result of the test for I greater than current is negative while the test for I=SSA-CNT is positive (level number=1). The module then proceeds to build up the tally for the segment in the user program's I/O area. The MOVEIO module then tests whether the segment is a logical segment and if a logical segment it performs the modifications to the keys indicated for the logical segment. Since the segment here is not a logical segment, the MOVEIO module tests the update switch and then moves the data from the emulator I/O area to the user program's I/O area. Following that, it then returns control to the CBLTDL module.

As shown in FIG. 6a, the CBLTDL module transfer control to the USRPCB module of FIG. 6s. The module fetches the addresses of the PCB definition table and user's PCB area in order to store the current level number in the user's PCB area. Also, the USRPCB module takes the IMS status code and places it in the "prior" slot in the PCB definition table entry. It also stores the status code in the user program's PCB area.

The USRPCB module then tests the current segment address value. Since the address is not zero, the module moves the segment name (MPO5ROOT) from the segment definition table entry to the user program's PCB area. It also sets the feedback length (FBLEN) to zero. Since the segment found in this example does have a sequence key, the feedback length is arranged to store the key length for starting location. The USRPCB module moves these values to the feedback length word in the user program's PCB. This completes the operations to be performed by the CBLTDL module. Accordingly, the module returns control back to the user program. At this point, the call has been completed, the ROOT segment has been found and moved to the user program's I/O area. Also the status code has been filled in and the call completed.

The user program moves to the next statement which specifies testing the results stored in the PCB. More specifically, the user program tests the status code to see if it equals spaces. If it does not equal spaces, this means that the record was not found. Since in this example the record was found, the status code has the space value which signals the user program that the segment is located in the user program's I/O area. Thus, the user program can now perform the operations it desires with the record.

Figure 7B:
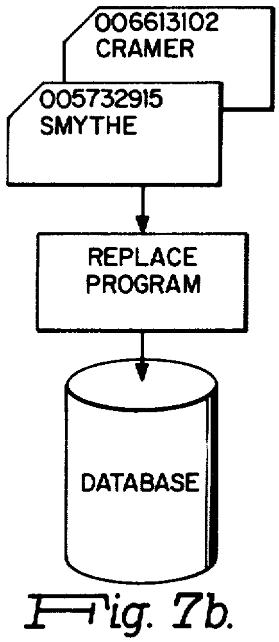

FIG. 7a shows another example of a user program used to illustrate how the system of the present invention modifies the data base records (subscribers) in response to data base calls included in the program.

Figure 7C:
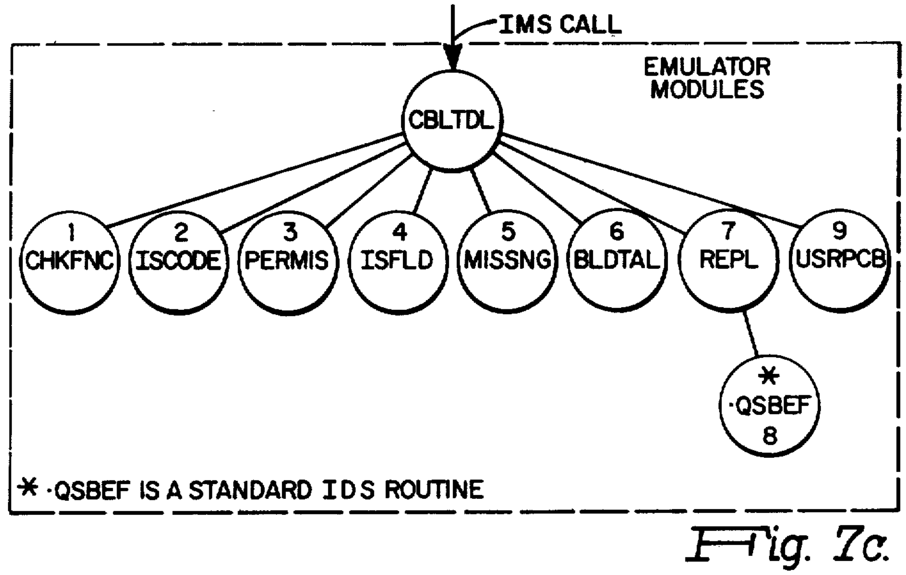
Figure 7G:
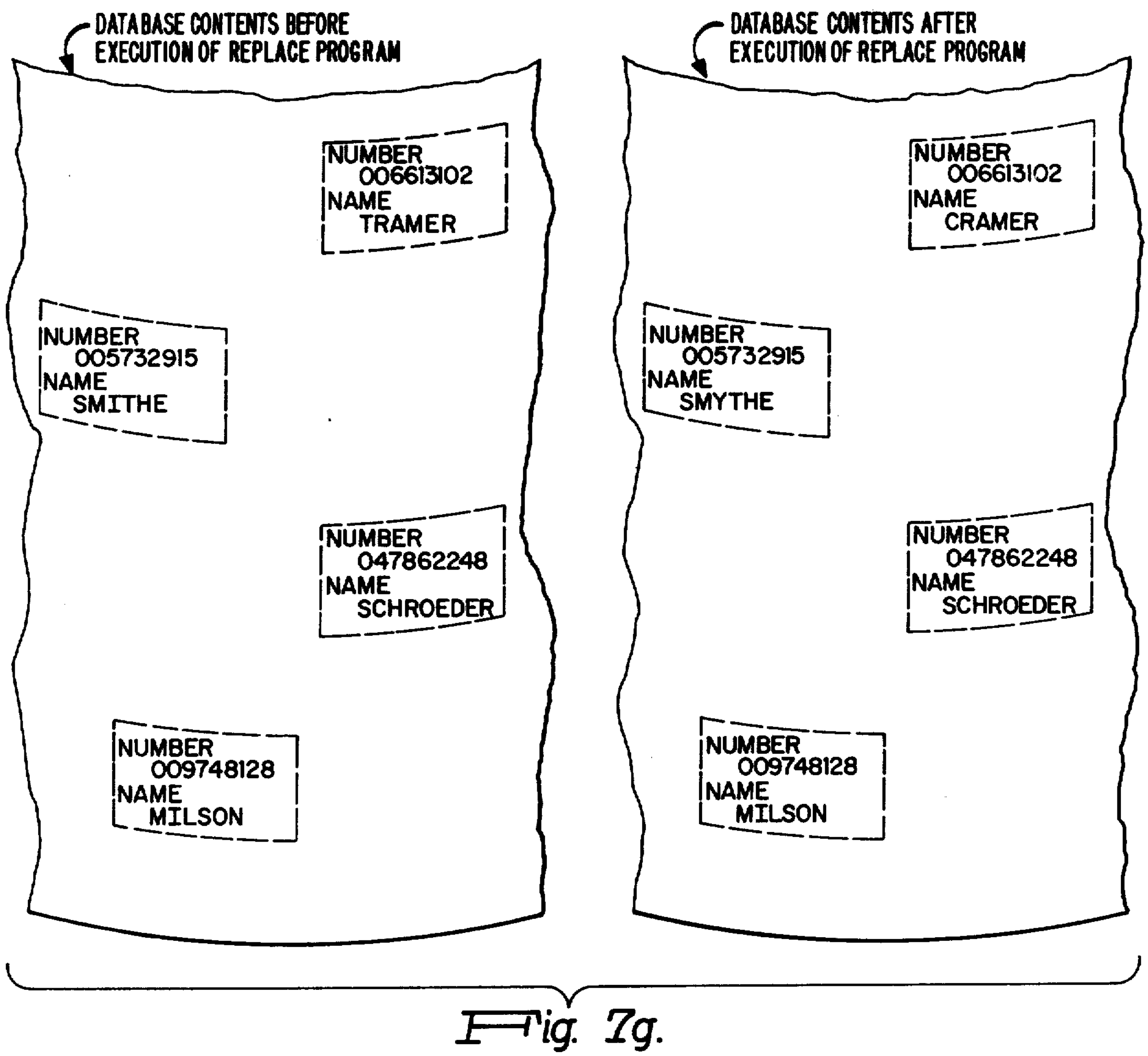

It is assumed that the program (replace program) is performing a series of transactions to change names which are incorrectly spelled on the data base of FIG. 7g. The data flow of replace program is diagrammatically illustrated in FIG. 7b. The two point cards contain the changes to be made to the data base by the replace program.

Referring to FIG. 7a, it will be noted that the program in part performs in a fashion similar to the program of FIG. 3c. It finds or reads an input record which is identified by subscriber number corresponding to some number of a given plan (e.g., insurance plan). It retrieves it using the IMS function GU. When the program finds a good member record containing a given subscriber number, it changes the name using the IMS function REPL. The program cycles through all of the input records until it reaches the end. To perform this task, the program includes a procedure division shown. It will also be noted that the program specifies the required information in working storage and a description of the input file containing the records.

FIG. 7g illustrates the data base before the replace program is run and the data base after running the replace program. As shown, the data base includes a series of records, four example records, that contain certificate numbers and names. The changes to be made to the data base involve two of the example records. Specifically, in one record, "SMITHE" spelled with an "i" is to be changed to "SMYTHE". In the other record, "TRAMER" is to be changed to "CRAMER".

In greater detail, each of the two records are retrieved by the emulator modules in the manner illustrated in FIG. 3e. Following retrieval, the emulator modules make the specific changes in the manner illustrated in FIG. 7c. Since the operation of the host processor in performing a GU function was discussed in considerable detail in connection with the first example user program, only the operation of the emulator modules of FIG. 7c will be discussed further herein.

Referring to FIG. 7c, it will be noted that in response to the REPL call, the CBLTDL module in turn calls modules CHKFNC through BLDTAL. These modules operate in the manner described previously in connection with FIG. 6a. From that Figure, it is seen that the CBLTDL module in response to the REPL function now calls the REPL module of FIG. 7d in lieu of the GU module.

In general, the REPL module verifies the correctness of the replace request of the user program, performs IDS journalization and physically replaces the segment(s) in question. The module is "driven" by information contained in the SSA tables, the definition tables and the currency values in the data base.

The REPL module produces the following output results:

(1) If any errors are encountered during the processing of the replace function, the module includes the appropriate status code in the user program's PCB and makes no changes to the data base; and (2) In the absence of errors, the module physically replaces the segment(s) on the data base and reflects the modification in the IDS journal.

Figure 7D:
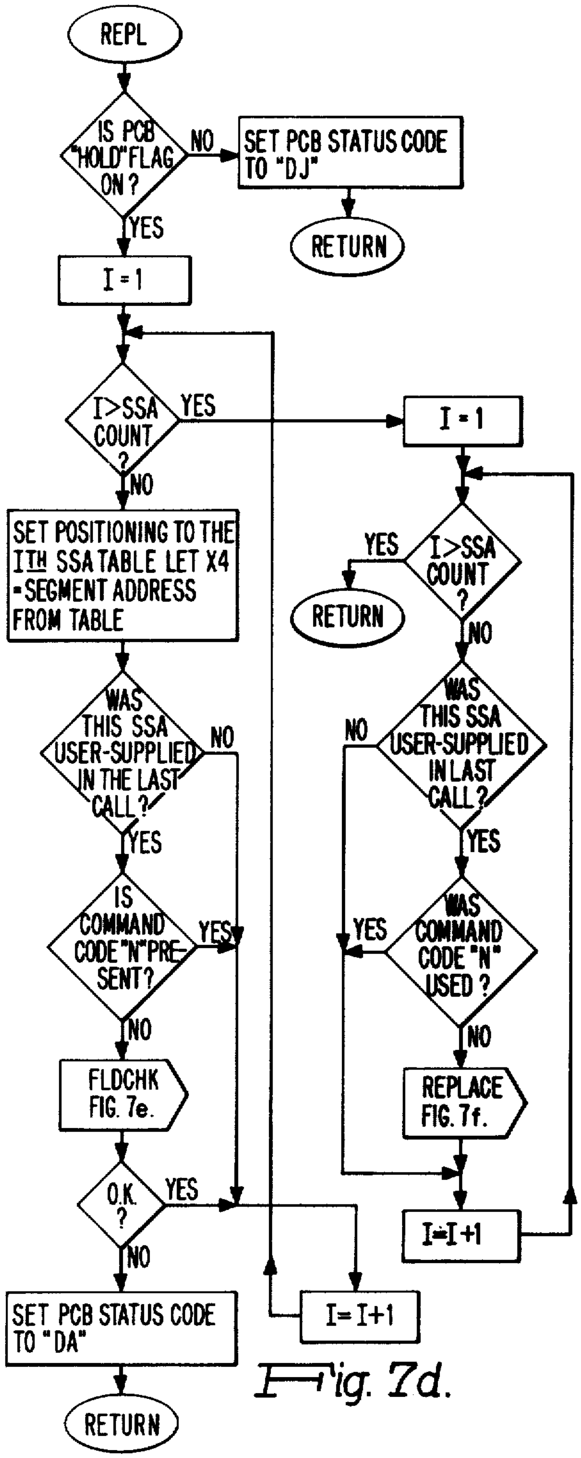

Referring to FIG. 7d, it is seen that the REPL module includes two internal subroutines FLDCHK and REPLACE. The FLDCHK routine makes certain that none of the IMS key fields in a segment have been changed. In IMS, it is illegal to change a key without deleting the segment and storing a new one. Thus, this routine ensures that this IMS procedure is followed by user programs. The REPLACE routine physically replaces the segment on the data base. In doing this, it may call an IDS subroutine .QGETD, but it always calls the module QSBEF which is a journalization subroutine in IDS.

Similar to the CLEAR module, the FLDCHK and REPLACE routines include two macros, "GNCOMP" and "GNMAKE". As indicated, GNCOMP stands for get next definition in the composed-of-chain and GNMAKE stands for get the master definition in the makes-up-chain. These chains were described previously in connection with the tables of FIG. 4. Since they are used primarily for logical segments and are not pertinent to the present example, they will not be described herein.

Figure 7E:
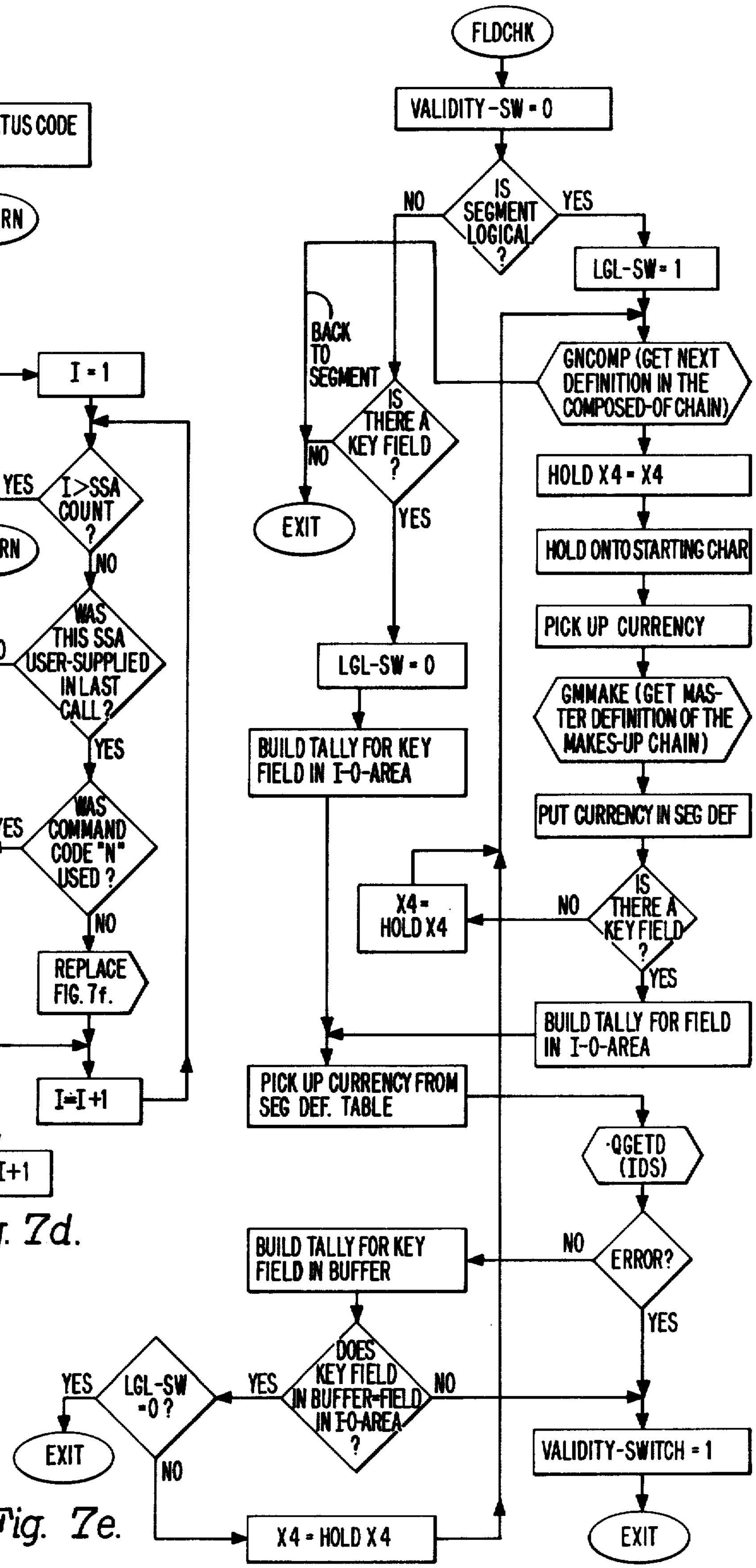

In operation, as seen from FIG. 7d, the REPL module sets I to a 1 since the hold flag bit in the PCB definition table entry should be set to a binary ONE for a REPL function. Because I should not be greater than 1, the module sets up the segment address to fetch the record. Since this SSA was supplied in the last call (i.e., GU function), the REPL module calls the FLDCHK routine of FIG. 7e.

As mentioned, the FLKCHK routine checks the key fields to ensure that they have not been changed. The routine after establishing there is a key field sets the legal switch indicator to zero. It then builds a "tally" for the key field in the program's I/O area and fetches the currency from the segment definition table of FIG. 5b.

The FLDCHK routine next calls the IDS routine QGETD which actually fetches the key. Next, the routine tests for an error indicating a change in the key. Assuming no error, the FLDCHK routine builds a "tally" for the key field in the buffer. Since the fields in the buffer and I/O area should be the same, the routine tests the LGL-SW indicator and returns control back to the REPL module.

The REPL module tests the state of the validity switch which should be zero and increments the value I by one. Since I is now greater than the SSA count, the REPL module calls the REPLACE routine of FIG. 7f.

Figure 7F:
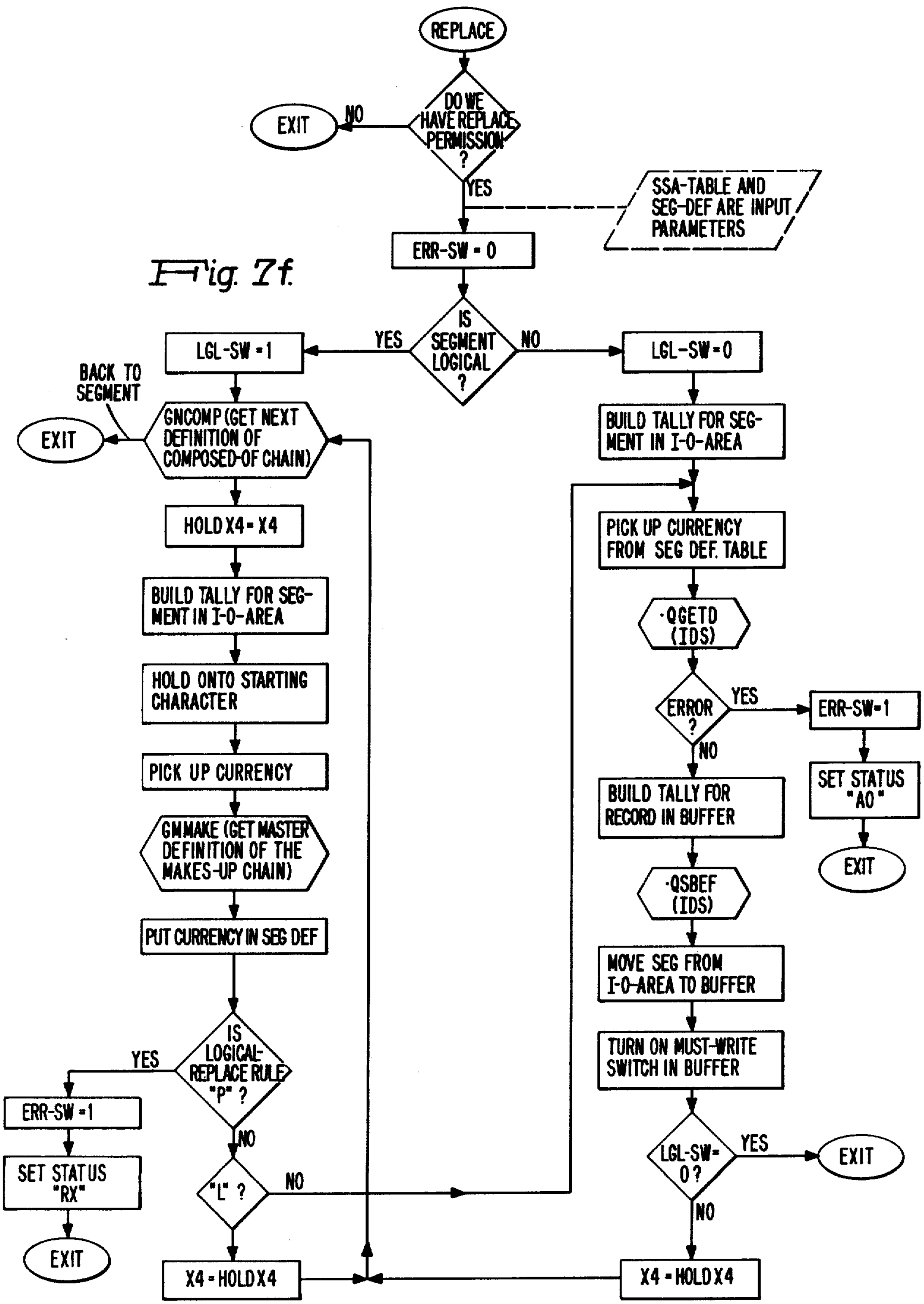

As seen from FIG. 7f, the REPLACE routine first tests the permission indicator bit in the segment definition table entry of FIG. 5b. After determining the segment is not a logical segment, the routine builds a tally for the segment, fetches the currency information and then calls the IDS routine .QGETD. Following the fetching of the segment containing the desired record by the QGETD routine, the REPLACE routine then builds a "tally" for obtaining the record in the buffer. It then calls the .QSBEF routine which performs the journalization of the IDS page which is about to be changed.

The REPLACE routine next moves the segment from the user program's I/O area to the buffer and turns on the must write buffer switch. The routine then returns control back to the CBLTDL module. Thereafter, the host processor writes the changed record into the data base producing the result as illustrated in FIG. 7g. The above operations when repeated result in the replacing of the second record.

From the above example programs, it is seen how the host processor is able to process the data base requests included therein. It will be appreciated that only the emulator modules necessary for processing the example calls were described. FIG. 3f further illustrates the organization of other emulator modules for processing other types of calls in connection with the GU function. It will be obvious to those skilled in the art how organizations similar to those shown can be employed for handling other data base functions.

From the foregoing, it is seen how the host system of the present invention provides for the execution of IMS user programs written for execution on a given system having substantially different data base. The system enables such programs to perform operations it performed when executed by the original system. The arrangement of the present invention performs other operations such that the IMS user program can be viewed as still operating in its own data base, employing the same set of rules. This arrangement enables IMS user programs to be run on the host system without having to change or alter the logic of the program in any fashion.

More importantly, the arrangement of the present invention enables the host system to run IMS user programs efficiently preserving the advantages obtained from the user programs as written originally. It will also be appreciated that the emulation control system of the present invention also provides for efficient execution of such user programs taking advantage of the existing data base facilities included in the host system with a minimum of increase in additional apparatus to the host system.

In addition to the above, it will be appreciated that the arrangement allows the host system to run both IMS user programs and IDS user programs and access records of the same data base as part of its normal mode of operation. Other advantages of the present invention will be readily appreciated by those skilled in the art.

To prevent undue burdening the description within the ken of those skilled in the art, a block diagram approach has been followed with a detailed functional description of each block and specific identification of the circuits represented. The individual engineer is free to select elements and components such as registers, etc., from the individual's own background or from available standard references such as those referenced herein.

Also, the exact coding for all modules was not disclosed since it is not believed necessary for an understanding of the present invention. While the invention has been disclosed in terms of "software modules", the invention as mentioned may be implemented in various ways such as by "firmware", hardware or combinations thereof. For example, the macros disclosed and the IDS modules may be implemented by "firmware".

For purposes of completeness, the source listings of the softward modules are included in an appendix. It will be noted that the code listings for the most part are written in the Series 600/6000 Macro Assembler Program (GMAP) language. The assembly code language is described in the publication "Series 600/6000 Macro Assembler Program" by Honeywell Information Systems Inc., copyright 1973, designated by order number 13N86Rev. 2. Other code listings are written in the COBOL programming language which is described in the Series 600/6000 COBOL Reference Manual published by Honeywell Information Systems Inc., copyright 1972, designated by order number B508Rev. 1.

Also, the appendix includes illustrations of the types of values stored in the emulation tables for the examples given and the sources of the values (e.g., IDS tables). In this regard, the appendix also includes the Syntax Definition for DBD and PSB File Generation to facilitate understanding as to how the specific information stored in certain ones of the tables are generated. As mentioned, for the purpose of the present invention, the translators can be considered conventional in design and may take the form of units currently employed in the different data base systems themselves.

GLOSSARY

The input and output operations that can be specified include the following:

| CALL | DATA BASE OPERATION | ACTION |
|---|---|---|
| GU | Get Unique | Retrieve a segment within the data base independent of current position. |
| GN | Get Next | Retrieve next segment in a path of segments by moving forward from previously established position in the data base. |
| GNP | Get Next Within Parent | Retrieve a segment independent of current position within the data base but limited to dependent segments of an established parent. |
| GHU<br>GHN<br>GHNP | Get Hold Unique<br>Get Hold Next<br>Get Hold Next Within Parent | Before the contents of the data base can be changed by a DLET or REPL call, the segment must first be obtained by the user program. After the change, the segment is returned to the data base. The HOLD option obtains the segment to enable its return. |
| ISRT | Insert | Used to load segments during generation of data base and to insert new information of an existing segment type into the data base. |
| DLET | Delete | Used to delete a segment from the data base following its retrieval with a GET HOLD call. |
| REPL | Replace | used to return a modified segment to the data base following its retrieval by a GET HOLD call. |

COMMAND CODES

It is possible to modify the effect of a basic IMS function by supplying coded arguments in the appropriate fields in the Segment Search Arguments (SSA's) in any IMS call. These coded arguments, called command codes, are defined as follows:

| CODE | MEANING |
|---|---|
| D | The "path" call, allowing more than the lowest level (hierarchically speaking) segment to be placed in the user's I/O area as a result of this call. |
| F | Start with the first occurrence of this segment under its parent when attempting to satisfy this call. |
| L | Find the last occurrence of this segment under its parent which satisfies this call. |
| N | When a REPL call follows a path call, all segments found will be replaced unless modified with this code. |
| P | Establish parentage at this hierarchical level. |
| U | This call must be satisfied using the current segment on which position has been established at this level. |
| V | Same as "U" except that position is frozen at all higher hierarchical levels as well. |
| C | Data in this SSA is the concatenated key of this and all hierarchically higher segments. |

| | STATUS CODES RETURNED BY THE EMULATOR MODULES |
|---|---|
| AB | No I-O-Area provided in call. |
| AC | Hierarchical error in SSA's. |
| AD | Invalid function. |
| AH | An SSA is required, but none is provided. |
| AJ | Invalid SSA qualification. |
| AK | Invalid field name in an SSA. |
| AM | Sensitivity violation. |
| AO | Data base I/O error. |
| DA | A segment key field has been changed. |
| DJ | A REPL or DLET was attempted without a previous Get Hold call. |
| DX | Delete rule violated. |
| GA | A hierarchical level was crossed, moving to a higher level (returned on unqualified |

-continued

| CODE | MEANING |
|---|---|
| | calls only). |
| GB | End of data base. |
| GE | Segment not found. |
| GK | A different segment type at the same hierarchical level was found (returned on unqualified calls only). |
| GP | A GNP was attempted with no parent established or in a GNP the requested segment level is not lower than the parent level. |
| II | Attempt to insert a duplicate segment. |
| IX | An insert rule was violated. |
| RX | A replace rule was violated. |
| VV | No error encountered. |

APPENDIX

Part 1—Source Listings for Modules ANLZR through USRPCB.

Part 2—Values Table Used In Examples.

Part 3—Syntax Definition For DBD and PSB File Generation.

APPENDIX - Part 1

```
IMS CALL ANALYZER

                      LBL     ANLYZR
                      TTL     IMS CALL ANALYZER



                              THIS ROUTINE IS THE MAIN EMULATOR DRIVER
                              IT IS ENTERED BY THE COBOL
                              PROGRAM  DIRECTLY


                      SYMREF  ...IMS
                      SYMREF  .PSE.
                      SYMDEF  DEFERR
                      SYMDEF  ANLYZR
                      SYMDEF  CBLTDL
                      SYMDEF  EMULIO
                      SYMDEF  EMDBUG


              GNPCB   MACRO
                      LXL4    1,4
                      LDA     0,4
                      ANA     =0770000,DU
                      CMPA    =0550000,DU
                      TZE     #1
                      CMPA    =0500000,DU
                      TNZ     DEFERR
                      ENDM    GNPCB
              GNPRO   MACRO
                      LDX4    1,4
                      LDA     0,
                      ANA     =0770000,DU
                      CMPA    =0500000,DU
                      TZE     #1
                      CMPA    =0510000,DU
                      TNZ     DEFERR
                      ENDM    GNPRO


              FNDNAM  MACRO
                      GNPRO   #1
                      LDA     0,3
                      CMPA    .SGNAM,4
                      TNZ     *-9
                      LDA     1,3
                      ANA     =0777700,DU
                      ORA     =6H00
                      CMPA    .SGNAM+1,4
                      TNZ     *-14
                      ENDM    FNDNAM


              IOTALY  MACRO
                      LDQ     #1
                      DIV     6,DL
                      EAX7    0,QL
                      ADX7    #2
                      STA     .ICTAL,5
                      STX7    .ICTAL,5
                      LDA     .SGLEN,4
                      ANA     =0007777,DU
                      ARS     12
                      ORSA    .ICTAL,5
                      ARS     6
                      ASA     TOTCHR
                      ENDM    IOTALY





         000000       CBLTDL  NULL
         000000       ANLYZR  NULL
00000  000640 7530 00 010     SREG    HLDREG
```

```
                   000001   ONETIM NULL
000001  000535 7100 00  010          TRA    CHKSWT           GO CHECK SENSE SWITCHES
                   000002   NORMAL NULL
000002  000572 4500 00  010          STZ    CURLVL           INITIALIZE
000003  000632 4500 00  010          STZ    TOTCHR
000004  010030 4500 00  030          STZ    SSACNT
000005  000573 4500 00  010          STZ    OBJLVL
000006  010004 4500 00  030          STZ    QUALDX
000007  000570 4500 00  010          STZ    FRSTIM
000010  010013 4500 00  030          STZ    PRNTSW
000011  010020 4500 00  030          STZ    CCODEC
000012  000002 2350 31  000          LDA    2,1*             PICK UP FIRST ARG.
000013  777777 3750 07  000          ANA    =O777777,DL      USE ONLY LOWER HALF
000014  000024 1150 07  000          CMPA   20,DL            IS IT A COUNT OF OTHER ARGS
000015  000024 6040 00  010          TMI    ARGCNT           YES - GO TO ARG-COUNT
000016  000002 6220 11  000          EAX2   2,1              ADDRESS FIRST ARG.
000017  000000 2250 11  000          LDX5   0,1              PICK UP TRA ADDRESS
000020  000567 7420 00  010          STX2   NUMARG
000021  000567 1650 00  010          SBX5   NUMARG           ESTABLISH ARG COUNT
000022  000567 7450 00  010          STX5   NUMARG
END OF BINARY CARD ANLYZR04
000023  000027 7100 00  010          TRA    MOVARG
                   000024   ARGCNT NULL
000024  000000 6250 05  000          EAX5   0,AL             X5 = REAL ARG COUNT
000025  000567 7450 00  010          STX5   NUMARG
000026  000003 6220 11  000          EAX2   3,1              X2 = ADDRESS OF FIRST REAL ARGUMENT
                   000027   MOVARG NULL
000027  000000 2250 03  000          LDX5   0,DU
000030  000545 6230 00  010          EAX3   ARGLST
                   000031   ONEARG NULL
000031  000000 2350 12  000          LDA    0,2              PICK UP ONE ARGUMENT
000032  000000 7550 13  000          STA    0,3
000033  000001 0630 03  000          ADX3   1,DU             INCREMENT
000034  000001 0620 03  000          ADX2   1,DU               ADDRESSES
000035  000001 0650 03  000          ADX5   1,DU             INCREMENT ARGUMENT COUNT
000036  000023 1050 03  000          CMPX5  19,DU
000037  000466 6050 00  010          TPL    CODEAJ
000040  000567 1050 00  010          CMPX5  NUMARG           ARE WE DONE
000041  000043 6050 00  010          TPL    NUMSSA           YES - GO DETERMINE SSA COUNT
000042  000031 7100 00  010          TRA    ONEARG           NO  - GO TO MOVE NEXT ARG
                   000043   NUMSSA NULL
000043  000546 2350 00  010          LDA    PCBAD            SET UP USER PCB
000044  010012 7550 00  030          STA    PCBADR           ADDRESS IN IMS COMMON
000045  000567 2250 00  010          LDX5   NUMARG           MAKE SURE THERE ARE AT LEAST
END OF BINARY CARD ANLYZR05
000046  000003 1050 03  000          CMPX5  3,DU             THREE ARGUMENTS
000047  000456 6040 00  010          TMI    CODEAB           IF NOT - SET CODE AB
000050  000003 1650 03  000          SBX5   3,DU             DETERMINE SSA COUNT - THE
000051  010030 4450 00  030          SXL5   SSACNT           FIRST 3 ARGS ARE NOT SSA'S
000052  000547 2350 00  010          LDA    IOARAD           SET USER I-O-AREA ADDR
000053  010021 7550 00  030          STA    USERIO           IN THE IMS COMMON BLOCK
000054  000650 6350 00  010          EAA    EMULIO           SET EMULATOR I-O-AREA IN
000055  010007 7550 00  030          STA    IOAREA           THE IMS COMMON BLOCK
                   000056   PCBCHK NULL                      MAKE SURE PCB IS VALID
000056  000546 2220 00  010          LDX2   PCBAD            PICK UP PCB DEF
000057  000003 2230 12  000          LDX3   .PCBAD,2         POINTER FROM USER'S PCB AREA
000060  000600 7430 00  010          STX3   PCBPTR
000061  140000 2240 00  030          LDX4   .PSB.            LOCATE BEGINNING OF IMS TABLES
                   000062   PCBDEF NULL
                   000062            GNPCB  CODEAB           GET NEXT IN THE PCB-DEF CHAIN
                                                             ERROR "AB" IF PSB IS  ENCOUNTERED
END OF BINARY CARD ANLYZR06
000071  000600 1040 00  010          CMPX4  PCBPTR           DOES FIELD IN USER'S PCB =
000072  000062 6010 00  010          TNZ    PCBDEF           PCB DEFINITION ADDRESS
                                                             NO - GO GET NEXT  PCB
                                                             YES - DROP THRU
000073  000005 2220 14  000          LDX2   .SSTAB,4         PICK UP SSA-TABLE ADDR
000074  010001 7420 00  030          STX2   SSATAB           SAVE IT
000075  000005 7220 14  000          LXL2   .QLTAB,4         PICK UP QUALIFICATION TAB. ADDR
000076  010002 7420 00  030          STX2   QALTAB
000077  010003 7440 00  030          STX4   PCBDF*           SAVE ADDRESS  OF THE PCB DEF
000100  000000 7200 14  000          LXLO   .STAT,4          SAVE STATUS FROM
000101  010014 4400 00  030          SXLO   PRSTAT           PREVIOUS CALL
000102  000000 2200 03  000          LDXO   0,DU             ZERO OUT ERROR STATUS
000103  000000 4400 14  000          SXLO   .STAT,4
000104  000545 2350 51  010          LDA    FUNCAD,I         PICK UP REQUESTED FUNCTION
000105  000571 7550 00  010          STA    FUNCTN           AND SAVE IT
000106  000674 2350 00  010          LDA    EMDBUG           IS THIS DEBUG MODE
000107  000145 6000 00  010          TZE    NODBUG           NO - SKIP DEBUG CODE
000110  000546 2200 00  010          LDXO   PCBAD            SET UP ARGUMENTS TO DEBUG
000111  000134 7400 00  010          STXO   PREDBG+4         SUBROUTINE
000112  000550 2200 00  010          LDXO   SSA1AD
000113  000135 7400 00  010          STXO   PREDBG+5
END OF BINARY CARD ANLYZR07
000114  000551 2200 00  010          LDXO   SSA2AD
000115  000136 7400 00  010          STXO   PREDBG+6
000116  000552 2200 00  010          LDXO   SSA3AD
000117  000137 7400 00  010          STXO   PREDBG+7
000120  000553 2200 00  010          LDXO   SSA4AD
000121  000140 7400 00  010          STXO   PREDBG+8
000122  000554 2200 00  010          LDXO   SSA5AD
000123  000141 7400 00  010          STXO   PREDBG+9
000124  000555 2200 00  010          LDXO   SSA6AD
000125  000142 7400 00  010          STXO   PREDBG+10
000126  000556 2200 00  010          LDXO   SSA7AD
000127  000143 7400 00  010          STXO   PREDBG+11
```

```
                       000130        176 PREDBG NULL                                                                          00001800
000130   250000701000         030    179        CALL      PRETRC(FUNCTN,**,**,**,**,**,**,**,**,**,**,SSACNT)                  00001810
000131   000145710000         010
000132   001420000263         010
000133   000601000000         010
000134   000000000000         000
                                     181                                                                                      00001830
                                     182                                                                                      00001840
                                     183                                                                                      00001850
                       000145        184 NODBUG NULL                                                                          00001860
                                     185                                                                                      00001870
000145   160000701000         030    186        CALL      CHKFNC(FUNCTN,VALID,FUNCDE)  FUNCTION-CHECK ROUTINE                 00001880
000146   000153710000         010
000147   001420000272         010
000150   000571000000         010
000151   000576000000         010
000152   010015000000         030
                                     187                                                                                      00001890
000153   000576 2350 00       010    188        LDA       VALID              CHECK FOR SUCCESS                                00001900
000154   000462 6010 00       010    189        TNZ       CODEAD             SET STATUS TO AD ON ERROR                        00001910
                                     190                                                                                      00001920
                                     191                                                                                      00001930
                                     192                                                                                      00001940
                       000155        193 SSAS   NULL                         SSA HANDLING                                     00001950
                                     194                                                                                      00001960
000155   000571 4500 00       010    195        STZ       PRVLVL             PREVIOUS-LEVEL = 0                               00001970
000156   010000 7220 00       030    196        LXL2      SSACNT             SET LOOP INDEX                                   00001980
                       000157        197 DOSSA  NULL                                                                          00001990
000157   000320 6000 00       010    198        TZE       SSDONE             EXIT LOOP IF ZERO                                00002000
000160   000547 2230 12       010    199        LDX3      SSALST-1,2         X3 = ADDR OF ITH SSA                             00002010
000161   010005 7430 00       030    200        STX3      CURSSA             SAVE CURRENT SSA ADDRESS                         00002020
                                     201                                     FROM ARG LIST                                    00002030
OF BINARY CARD ANLYZR09
000162   010003 2240 00       030    202        LDX4      PCBDFN             START SEARCH AT PCB                              00002040
                       000163        203        FNDNAM    CODEAJ             FIND A SEG DEF GIVEN THE NAME                    00002050
                                     204                                     X3 = ADDR (NAME) ON INPUT                        00002060
                                     205                                                                                      00002070
000202   000011 2350 07       000    206        LDA       9,DL               SET CHAR-POS TO 9                                00002080
000203   000575 7550 00       010    207        STA       CHRPOS                                                              00002090
000204   000570 2350 00       010    208        LDA       FRSTIM             IF FIRST-TIME NOT = ZERO                         00002100
OF BINARY CARD ANLYZR10
000205   000211 6010 00       010    209        TNZ       *+4                SKIP OBJECT-LEVEL-SET                            00002110
000206   000570 0540 00       010    210        AOS       FRSTIM             RESET FIRST-TIME                                 00002120
000207   000005 2270 14       000    211        LDX7      .LEVEL,4           PICK UP LEVEL FROM SEG DEF                       00002130
000210   000573 4470 00       010    212        SXL7      OBJLVL             OBJECT-LEVEL = SEG DEF LEVEL                     00002140
000211   000005 2270 14       000    213        LDX7      .LEVEL,4                                                            00002150
000212   000572 4470 00       010    214        SXL7      CURLVL             CURRENT-LEVEL = LEVEL FROM SEG DEF               00002160
                                     215                                                                                      00002170
                                     216                  FIND ADDRESS IN SSA TABLE                                           00002180
                                     217                                                                                      00002190
000213   000572 2360 00       010    218        LDQ       CURLVL                                                              00002200
000214   000466 6000 00       010    219        TZE       CODEAJ              ABORT IF ZERO                                   00002210
000215   000001 1760 07       000    220        SBQ       1,DL               COMPUTE SSAADD =                                 00002220
000216   000012 4020 07       000    221        MPY       .SSSIZ,DL              SSATAB + (CURLVL - 1) * .SSSIZ               00002230
000217   000022 7360 00       000    222        QLS       18                 .SSSIZ = SSA-TABLE SIZ                           00002240
000220   010001 0760 00       030    223        ADQ       SSATAB                                                              00002250
000221   000574 7560 00       010    224        STQ       SSAADD                                                              00002260
                                     225                                                                                      00002270
000222   000574 2250 00       010    226        LDX5      SSAADD             X5 = SSA-TABLE ADDRESS                           00002280
000223   000000 7440 15       000    227        STX4      .SEGAD,5           MOVE SEG DEF ADDRESS INTO SSA-TABLE              00002290
000224   000000 2270 03       000    228        LDX7      0,DL               ZERO MEANS USER-SUPPLIED                         00002300
000225   000000 4470 15       000    229        SXL7      .SUPLY,5           SET FLAG SAYING SSA WAS USER-SUPPLIED            00002310
000226   000002 4500 15       000    230        STZ       .UNIQE,5           INITIALIZE THE UNIQUE SWITCH                     00002320
                                     231                                                                                      00002330
                                     232                                                                                      00002340
                                     233                                                                                      00002350
000227   000235 7430 00       010    234        STX3      CODCHK+3           X3 = ADDR(SSA(I))                                00002360
OF BINARY CARD ANLYZR11
000230   000236 7450 00       010    235        STX5      CODCHK+4           X5 = ADDR(SSA-TABLE(CURRENT-LEVEL))              00002370
000231   000240 7450 00       010    236        STX5      CODCHK+6           ADDRESS MUST ALSO BE A                           00002380
                                     237                                     RETURN ARGUMENT FOR COBOL                        00002390
                                     238                                                                                      00002400
                       000232        239 CODCHK NULL                                                                          00002410
000232   170000701000         030    240        CALL      ISCODE(**,**,**,CHRPOS,**,**,CHRPOS,VALID)                           00002420
000233   000243710000         010
000234   001420000360         010
000235   000000000000         000
000236   000000000000         000
000237   000575000000         010
000240   000000000000         000
000241   000575000000         010
000242   000576000000         010
                                     241                                                                                      00002430
                                     242                                     ISOLATE COMMAND CODES                            00002440
                                     243                                                                                      00002450
000243   000576 2350 00       010    244        LDA       VALID              GO SET CODE "AJ" ON ERROR                        00002460
000244   000466 6010 00       010    245        TNZ       CODEAJ                                                              00002470
                                     246                                                                                      00002480
000245   000252 7450 00       010    247        STX5      SENSIT+3           X5= ADDR(SSA-TABLE(CURRENT-LEVEL))               00002490
000246   000254 7100 00       010    248        TRA       SENSIT+5           (TEMPORARY) SKIP PERMIS                          00002500
                                     249                                     ROUTINE NOT YET IMPLEMENTED                      00002510
                       000247        250 SENSIT NULL                                                                          00002520
000247   230000701000         030    251        CALL      PERMIS(**,VALID)                                                    00002530
000250   000254710000         010
000251   001420000373         010
000252   000000000000         000
OF BINARY CARD ANLYZR12
000253   000576000000         010
                                     252                                                                                      00002540
                                     253                                     CHECK PERMISSIONS ON THE                         00002550
                                     254                                     CURRENT TABLE ENTRY                              00002560
                                     255                                                                                      00002570
000254   000576 2350 00       010    256        LDA       VALID              SET STATUS CODE "AM" ON ERROR                    00002580
000255   000472 6010 00       010    257        TNZ       CODEAM                                                              00002590
                                     258                                                                                      00002600
```

```
000256  000271 7430 00  010              STX3    FLDCHK+3       X3 = ADDR(SSA(I))                        0000261
000257  000272 7450 00  010              STX5    FLDCHK+4       X5 = ADDR(SSA-TABLE(CURRENT-LEVEL))      0000262
000260  000274 7450 00  010              STX5    FLDCHK+6       ALSO AS COBOL "GIVING" ARG.              0000263
000261  010004 2360 00  030              LDQ     QUALDX         SET UP QALTAB INDEX ADDR                 0000264
000262  000004 4020 07  000              MPY     .QALSZ,DL                                               0000265
000263  000000 6270 06  000              EAX7    0,QL                                                    0000266
000264  010002 0670 00  030              ADX7    QALTAB         X7 = ADDR (QUAL-TABLE (QUAL-INDX))       0000267
000265  000276 7470 00  010              STX7    FLDCHK+8                                                0000268
                                                                                                         0000269
                  000266          FLDCHK NULL                                                            0000270
000266  130000701000    030              CALL    ISFLD(**,**,CHRPOS,**,CHRPOS,**,VALID)                  0000271
000267  000300710000    010
000270  001420000415    010
000271  000000000000    000
000272  000000000000    000
000273  000575000000    010
000274  000000000000    000
000275  000575000000    010
END OF BINARY CARD ANLYZR13
000276  000000000000    000
000277  000576000000    010
                                                                                                         0000272
                                                        ISOLATE FIELD PARAMETERS                         0000273
                                                                                                         0000274
000300  000576 2350 00  010              LDA     VALID          EXIT ON ANY ERROR                        0000275
000301  000551 6010 00  010              TNZ     EREXIT         ERROR CODE WILL BE SET BY SUBROUTINE     0000276
                                                                                                         0000277
000302  000571 2350 00  010              LDA     PRVLVL         IS PREVIOUS LEVEL = ZERO                 0000278
000303  000314 6000 00  010              TZE     SETPRE         IF SO, SKIP THE CALL                     0000279
                                                                                                         0000280
000304  210000701000    030              CALL    MISSNG(CURLVL,PRVLVL,VALID)                             0000281
000305  000312710000    010
000306  001420000427    010
000307  000572000000    010
000310  000571000000    010
000311  000576000000    010
                                                                                                         0000282
                                                        FILL-IN-MISSING-SSAS                             0000283
                                                          (CURRENT-LEVEL,PREVIOUS-LEVEL)                 0000284
                                                                                                         0000285
000312  000576 2350 00  010              LDA     VALID          SET STATUS CODE "AC" ON ERROR            0000286
000313  000460 6010 00  010              TNZ     CODEAC                                                  0000287
                                                                                                         0000288
                  000314          SETPRE NULL                                                            0000289
000314  000572 2350 00  010              LDA     CURLVL         PREVIOUS-LEVEL                           0000290
000315  000571 7550 00  010              STA     PRVLVL              = CURRENT-LEVEL                     0000291
                                                                                                         0000292
000316  000001 1620 03  000              SBX2    1,DU           DECREMENT SSA-COUNT                      0000293
000317  000157 7100 00  010              TRA     DOSSA          GO BACK TO DO ANOTHER SSA                0000294
                  000320          SSDONE NULL                   SSA HAVE ALL BEEN PROCESSED              0000296
000320  000572 2350 00  010              LDA     CURLVL         FIRST-USER-SUPPLIED-LEVEL                0000297
END OF BINARY CARD ANLYZR14
000321  010006 7550 00  030              STA     FRSTLV              = CURRENT-LEVEL                     0000298
000322  000352 6000 00  010              TZE     FUNCAL         SKIP THE CALL IF NO SSAS WERE GIVEN      0000299
000323  000572 4500 00  010              STZ     CURLVL         CURRENT-LEVEL = 0                        0000300
                                                                                                         0000301
000324  210000701000    030              CALL    MISSNG(CURLVL,PRVLVL,VALID)                             0000302
000325  000332710000    010
000326  001420000454    010
000327  000572000000    010
000330  000571000000    010
000331  000576000000    010
                                                                                                         0000303
                                         CALL FILL-IN-MISSING-SSAS                                       0000304
                                              (CURRENT-LEVEL,PREVIOUS-LEVEL)                             0000305
                                                                                                         0000306
000332  000576 2350 00  010              LDA     VALID          SET STATUS CODE TO "AJ" ON ERROR         0000307
000333  000466 6010 00  010              TNZ     CODEAJ                                                  0000308
                                                                                                         0000309
                                                                                                         0000310
000334  010020 2350 00  030              LDA     CCCDEC         PICK UP COMMAND CODE "C" SWITCH          0000311
000335  000352 6000 00  010              TZE     FUNCAL                                                  0000312
                                                                                                         0000313
000336  000343 7430 00  010              STX3    CLPROC+4       PASS SSA ADDRESS                         0000314
                  000337          CLPROC NULL                                                            0000315
000337  260000701000    030              CALL    PROCCD(PRVLVL,**,CHRPOS,VALID)                          0000316
000340  000346710000    010
000341  001420000472    010
000342  000571000000    010
000343  000000000000    000
END OF BINARY CARD ANLYZR15
000344  000575000000    010
000345  000576000000    010
                                                        PROCESS COMMAND CODE "C"                         0000317
000346  000576 2350 00  010              LDA     VALID          SET STATUS CODE TO "AJ" ON ERROR         0000318
000347  000466 6010 00  010              TNZ     CODEAJ                                                  0000319
000350  000001 2350 07  000              LDA     1,DL           FIRST-LEVEL MUST BE 1                    0000320
000351  010006 7550 00  030              STA     FRSTLV         BECAUSE OF CONCATENATED KEY              0000321
                  000352          FUNCAL NULL                                                            0000323
000352  000573 2350 00  010              LDA     CHULVL         MAKE SSACNT BE THE COUNT                 0000324
000353  010000 7550 00  030              STA     SSACNT         OF ALL THE SSA'S NECESSARY               0000325
000354  010003 2270 00  030              LDX7    PCBDEN         PICK UP THE OLD SSA COUNT                0000326
000355  000006 2360 17  000              LDQ     .OLSSA,7       FOR THIS PCB                             0000327
000356  010016 7560 00  030              STQ     OLDSSA                                                  0000328
000357  000006 7550 17  000              STA     .OLSSA,7       SET UP NEW "OLD" SSA COUNT               0000329
000360  150000701000    030              CALL    BLDTAL         SET UP TALLIES IN SSA-TABLES             0000330
000361  000363710000    010
000362  001420000510    010
                                                        DEBUG DUMP                                       0000331
000363  010015 7260 00  030              LXL6    FUNCDE         PICK UP FUNCTION CODE                    0000332
000364  000466 6000 00  010              TZE     CODEAJ         MAKE SURE THAT                           0000333
000365  000012 1060 03  000              CMPX6   10,DU              0 < FUNCTION-CODE < 10               0000334
000366  000466 6050 00  010              TPL     CODEAJ                                                  0000335
END OF BINARY CARD ANLYZR16
```

```
000367  003367 7100 16  010   334          TRA    *+6                                                 00003360
000370  000401 7100 00  010   335          TRA    CLGU                                                00003370
000371  000406 7100 00  010   336          TRA    CLGHU                                               00003380
000372  000413 7100 00  010   337          TRA    CLGN                                                00003390
000373  000420 7100 00  010   338          TRA    CLGHN                                               00003400
000374  000425 7100 00  010   339          TRA    CLGNP                                               00003410
000375  000432 7100 00  010   340          TRA    CLGHNP                                              00003420
000376  000437 7100 00  010   341          TRA    CLISRT                                              00003430
000377  000444 7100 00  010   342          TRA    CLREPL                                              00003440
000400  000451 7100 00  010   343          TRA    CLDLET                                              00003450
                              345                                                                     00003470
                              346                 ACTUAL CALLS TO IMS PROCESSING ROUTINES             00003480
                              347                                                                     00003490
                  000401      348 CLGU     NULL                                                       00003500
000401  030000701000    030   349          CALL   GU(OBJLVL)       CALL GU (OBJECT-LEVEL)             00003510
000402  000405710000    010
000403  001420000535    010
000404  000573000000    010
000405  000504 7100 00  010   350          TRA    GETXIT                                              00003520
                              351                                                                     00003530
                              352                                                                     00003540
                  000406      353 CLGHU    NULL                                                       00003550
000406  050000701000    030   354          CALL   GHU(OBJLVL)      CALL GHU (OBJECT-LEVEL)            00003560
000407  000412710000    010
000410  001420000542    010
000411  000573000000    010
OF BINARY CARD ANLYZR17
000412  000504 7100 00  010   355          TRA    GETXIT                                              00003570
                              356                                                                     00003580
                              357                                                                     00003590
                  000413      358 CLGN     NULL                                                       00003600
000413  020000701000    030   359          CALL   GN(OBJLVL)       CALL GN (OBJECT-LEVEL)             00003610
000414  000417710000    010
000415  001420000547    010
000416  000573000000    010
000417  000504 7100 00  010   360          TRA    GETXIT                                              00003620
                              361                                                                     00003630
                              362                                                                     00003640
                  000420      363 CLGHN    NULL                                                       00003650
000420  040000701000    030   364          CALL   GHN(OBJLVL)      CALL GHN (OBJECT-LEVEL)            00003660
000421  000424710000    010
000422  001420000554    010
000423  000573000000    010
000424  000504 7100 00  010   365          TRA    GETXIT                                              00003670
                              366                                                                     00003680
                              367                                                                     00003690
                  000425      368 CLGNP    NULL                                                       00003700
000425  060000701000    030   369          CALL   GNP(OBJLVL)      CALL GNP (OBJECT-LEVEL)            00003710
000426  000431710000    010
000427  001420000561    010
000430  000573000000    010
000431  000504 7100 00  010   370          TRA    GETXIT                                              00003720
                              371                                                                     00003730
                              372                                                                     00003740
                  000432      373 CLGHNP   NULL                                                       00003750
000432  100000701000    030   374          CALL   GHNP(OBJLVL)     CALL GHNP (OBJECT-LEVEL)           00003760
000433  000436710000    010
000434  001420000566    010
OF BINARY CARD ANLYZR18
000435  000573000000    010
000436  000504 7100 00  010   375          TRA    GETXIT                                              00003770
                              376                                                                     00003780
                              377                                                                     00003790
                  000437      378 CLISRT   NULL                                                       00003800
000437  110000701000    030   379          CALL   ISRT(OBJLVL)     CALL ISRT (OBJECT-LEVEL)           00003810
000440  000443710000    010
000441  001420000573    010
000442  000573000000    010
000443  000514 7100 00  010   380          TRA    CMNXIT                                              00003820
                              381                                                                     00003830
                              382                                                                     00003840
                  000444      383 CLREPL   NULL                                                       00003850
000444  120000701000    030   384          CALL   REPL(OBJLVL)     CALL REPL (OBJECT-LEVEL)           00003860
000445  000450710000    010
000446  001420000600    010
000447  000573000000    010
000450  000514 7100 00  010   385          TRA    CMNXIT                                              00003870
                              386                                                                     00003880
                              387                                                                     00003890
                  000451      388 CLDLET   NULL                                                       00003900
000451  070000701000    030   389          CALL   DLET(OBJLVL)     CALL DLET (OBJECT-LEVEL)           00003910
000452  000455710000    010
000453  001420000605    010
000454  000573000000    010
000455  000514 7100 00  010   390          TRA    CMNXIT                                              00003920
                  000456      392 CODEAB   NULL                                                       00003940
000456  002122 2350 07  000   393          LDA    =3H0AB,DL        IMS CODE AB                        00003950
000457  000501 7100 00  010   394          TRA    SETERR                                              00003960
                  000460      395 CODEAC   NULL                                                       00003970
OF BINARY CARD ANLYZR19
000460  002123 2350 07  000   396          LDA    =3H0AC,DL        IMS CODE AC                        00003980
000461  000501 7100 00  010   397          TRA    SETERR                                              00003990
                              398                                                                     00004000
                  000462      399 CODEAD   NULL                                                       00004010
000462  002124 2350 07  000   400          LDA    =3H0AD,DL        IMS CODE AD                        00004020
000463  000501 7100 00  010   401          TRA    SETERR                                              00004030
                              402                                                                     00004040
                  000464      403 CODEAH   NULL                                                       00004050
000464  002130 2350 07  000   404          LDA    =3H0AH,DL        IMS CODE AH                        00004060
000465  000501 7100 00  010   405          TRA    SETERR                                              00004070
                              406                                                                     00004080
                  000466      407 CODEAJ   NULL                                                       00004090
000466  002141 2350 07  000   408          LDA    =3H0AJ,DL        IMS CODE AJ                        00004100
000467  000501 7100 00  010   409          TRA    SETERR                                              00004110
```

```
                                   410                                                                              000041
               000470              411 CODEAK NULL                                                                  000041
000470  002142 2350 07  000        412        LDA      =3HOAK,DL        IMS CODE AK                                 000041
000471  000501 7100 00  010        413        TRA      SETERR                                                       000041
                                   414                                                                              000041
               000472              415 CODEAM NULL                                                                  000041
000472  002144 2350 07  000        416        LDA      =3HOAM,DL                                                    000041
                                   417                                  IMS CODE AM                                 000041
000473  000501 7100 00  010        418        TRA      SETERR                                                       000042
                                   419                                                                              000042
                                   420                                                                              000042
                                   421                                                                              000042
               000474              422 DEFERR NULL                                                                  000042
               000474              423 CODEAZ NULL                                                                  000042
000474  000630 7530 00  010        424        SREG     DFBUGF           SAVE REGISTERS FOR DEBUG PURPOSES           000042
000475  002171 2350 07  000        425        LDA      =3HOAZ,DL        NEW IMS CODE AZ                             000042
                                   426                                  THIS CODE SIGNIFIES A FATAL ERROR           000042
                                   427                                  IN THE IMS STRUCTURE TABLE                  000042
000476  002544 2360 07  000        428        LDQ      =3HOEM,DL                                                    000043
000477  000010 0010 00  000        429        MME      GEBORT           ABORT IN CASE OF "AZ" ERROR                 000043
000500  000501 7100 00  010        430        TRA      SETERR                                                       000043
                                   431                                                                              000043
                                   432                                                                              000043
                                   433                                                                              000043
                                   434                                                                              000043
               000501              435 EREXIT NULL                                                                  000043
               000501              436 SETERR NULL                                                                  000043
000501  010003 2240 00  030        437        LDX4     PCBDFN           INSERT ERROR CODE                           000043
000502  000000 2550 14  000        438        ORSA     ,STAT,4          IN PCB DEFINITION                           000044
END OF BINARY CARD ANLYZR20
000503  000514 7100 00  010        439        TRA      CMNXIT           EXIT                                        000044
                                   441                                                                              000044
                                   442                                                                              000044
                                   443                                                                              000044
               000504              444 GETXIT NULL                                                                  000044
000504  270000701000       030     445        CALL     USRPCB(PCBAD)    FILL USER'S PCB AREA                        000044
000505  000510710000       010
000506  001420000675       010
000507  000546000000       010
000510  220000701000       030     446        CALL     MOVEIO           MOVE DATA TO USER'S I-O-AREA                000044
000511  000513710000       010
000512  001420000676       010
000513  000520 7100 00     010     447        TRA      EXIT                                                         000044
                                   448                                                                              000045
                                   449                                                                              000045
               000514              450 CMNXIT NULL                                                                  000045
                                   451                                  COMMON EXIT POINT FOR ALL CONDITIONS        000045
                                   452                                                                              000045
                                   453                                                                              000045
000514  270000701000       030     454        CALL     USRPCB(PCBAD)    FILL USER'S PCB AREA                        000045
000515  000520710000       010
000516  001420000706       010
000517  000546000000       010
                                   455                                                                              000045
               000520              456 EXIT   NULL                                                                  000045
                                   457                                                                              000045
000520  000604 2350 00  010        458        LDA      ENDBUG           IS THIS DEBUG MODE                          000046
000521  000533 6000 00  010        459        TZE      QUIT             NO - THEN JUST EXIT                         000046
000522  000546 2200 00  010        460        LDX0     PCBAD            SET UP ARGUMENTS TO POST-TRACE              000046
000523  000531 7400 00  010        461        STX0     POSDBG+3                                                     000046
000524  000547 2200 00  010        462        LDX0     IOARAD                                                       000046
000525  000532 7400 00  010        463        STX0     POSDBG+4                                                     000046
               000526              464 POSDBG NULL                                                                  000046
END OF BINARY CARD ANLYZR21
000526  240000701000       030     465        CALL     POSTRC(**,**)                                                000046
000527  000533710000       010
000530  001420000721       010
000531  000000000000       000
000532  000000000000       000
               000533              466 QUIT   NULL                                                                  0000468
000533  000640 0733 00  010        467        LREG     HLDREG           RESTORE REGISTERS                           0000469
000534  000000 7100 11  000        468        TRA      0,1              RETURN                                      0000470
                                   469                                                                              0000471
                                   470                                                                              0000472
                                   471                                                                              0000473
               000535              472 CHKSWT NULL                                                                  0000474
000535  000603 2350 00  010        473        LDA      NOPNOP           MAKE SURE TEST IS ONLY DONE ONCE            0000475
000536  000001 7550 00  010        474        STA      ONETIM                                                       0000476
000537  000000 2360 03  000        475        LDQ      0,DU             GET SENSE SWITCH SETTINGS                   0000477
000540  000015 0010 00  000        476        MME      GERETS           FROM GCOS                                   0000478
000541  000020 3760 07  000        477        ANQ      =020,DL          ISOLATE SWTCH 31 (DEBUG BIT)                0000479
000542  000004 7320 00  000        478        QRS      4                STORE RESULT IN                             0000480
000543  000604 7560 00  010        479        STQ      ENDBUG           DEBUG SWITCH                                0000481

000544  000002 7100 00  010        480        TRA      NORMAL           PROCESS NORMALLY                            0000482
               000545              482 ARGLST NULL                                                                  0000484
               000545              483 FUNCAD BSS      1                FUNCTION CODE ADDRESS                       0000485
               000546              484 PCBAD  BSS      1                PCB ADDRESS                                 0000486
               000547              485 IOARAD BSS      1                I-O-AREA ADDRESS                            0000487
               000550              486 SSALST NULL                                                                  0000488
000550  000605 000000      010     487 SSA1AD ZERO     BLANKS,0         SSA 1 ADDRESS                               0000489
000551  000605 000000      010     488 SSA2AD ZERO     BLANKS,0         ...                                         0000490
000552  000605 000000      010     489 SSA3AD ZERO     BLANKS,0         ...                                         0000491
END OF BINARY CARD ANLYZR22
000553  000605 000000      010     490 SSA4AD ZERO     BLANKS,0         ...                                         0000492
000554  000605 000000      010     491 SSA5AD ZERO     BLANKS,0         ...                                         0000493
000555  000605 000000      010     492 SSA6AD ZERO     BLANKS,0         ...                                         0000494
000556  000605 000000      010     493 SSA7AD ZERO     BLANKS,0         ...                                         0000495
000557  000605 000000      010     494 SSA8AD ZERO     BLANKS,0         ...                                         0000496
000560  000605 000000      010     495 SSA9AD ZERO     BLANKS,0         ...                                         0000497
000561  000605 000000      010     496 SS10AD ZERO     BLANKS,0         ...                                         0000498
000562  000605 000000      010     497 SS11AD ZERO     BLANKS,0         ...                                         0000499
000563  000605 000000      010     498 SS12AD ZERO     BLANKS,0         ...                                         0000500
```

```
000564  000605 000000   010   499 SS13AC ZERO    BLANKS,0           ...                                         00005010
000565  000605 000000   010   500 SS14AC ZERO    BLANKS,0           ...                                         00005020
000566  000605 000000   010   501 SS15AC ZERO    BLANKS,0           SSA 15 ADDRESS                              00005030
000567  000000000000    000   503 NUMARG DEC     0                  ARGUMENT COUNT                              00005050
000570  000000000000    000   504 FRSTIM DEC     0                  FIRST-TIME SWITCH                           00005060
000571  000000000000    000   505 PRVLVL DEC     0                  PREVIOUS-LEVEL                              00005070
000572  000000000000    000   506 CURLVL DEC     0                  CURRENT LEVEL                               00005080
                000573        507 OBJLVL BSS     1                  OBJECT LEVEL                                00005090
                000574        508 SSAADD BSS     1                  SSA ADDRESS                                 00005100
                000575        509 CHRPOS BSS     1                  CHARACTER POSITION IN SSA                   00005110
000576  000000000000    000   510 VALID  DEC     0                  VALIDITY SWITCH                             00005120
                000577        511 WORK1  BSS     1                  WORK CELL                                   00005130
                000600        512 PCBPTR BSS     1                  PCB DEF ADDRESS                             00005140
                000601        513 FUNCTN BSS     1                  FUNCTION CODE (ALPHANUMERIC STRING)         00005150
                000602        514 TOTCHR BSS     1                  TOTAL CHARACTER COUNT IN I-O-AREA           00005160
OF BINARY CARD ANLYZR23
000603  000000 0110 00  000   515 NOPNOP NOP                                                                    00005170
000604  000000000000    000   516 EMDBUG DEC     0                  EMULATOR DEBUG VARIABLE                     00005180
000605  202020202020    000   517 BLANKS BCI     6,                                                             00005190
000606  202020202020    000
000607  202020202020    000
000610  202020202020    000
000611  202020202020    000
000612  202020202020    000
000613  202020202020    000   518        BCI     6,                                                             00005200
000614  202020202020    000
000615  202020202020    000
000616  202020202020    000
000617  202020202020    000
000620  202020202020    000
                              519                                                                               00005210
                              520                                                                               00005220
                              521                                                                               00005230
                              522                                                                               00005240
                              523                                                                               00005250
000621  000007710004    000
                000630        524        EIGHT                                                                  00005260
                000630        525 DEBUGR BSS     8                  DEBUG REGISTER SAVE AREA                    00005270
                000640        526 HLDREG BSS     8                                                              00005280
                000650        527 EMULIO BSS     360                EMULATOR I-O-AREA                           00005290
                              529                                                                               00000010
                              530                                                                               00000020
                              531                LAY-OUT OF THE SSA TABLE                                       00000030
                              532                                                                               00000040
                              533                                                                               00000050
                000012        534 .SSSIZ SET     10                 TABLE SIZE                                  00000060
                000000        535 .SEGAD SET     0                  SEG DEFINITION ADDRESS                      00000070
                000000        536 .SUPLY SET     0                  FLAG FOR USER-SUPPLIED OR IMPLIED           00000080
                000001        537 .IOTAL SET     1                  I-O-AREA TALLY                              00000090
                000002        538 .UNIQF SET     2                  UNIQUENESS INDICATOR                        00000100
                000003        539 .EISWD SET     3                  EIS DESCRIPTOR WORD OF SEGMENT              00000110
                000004        540 .DCODE SET     4                  D COMMAND CODE (UPPER)                      00000120
                000004        541 .NCODE SET     4                  N COMMAND-CODE (LOWER)                      00000125
                000005        542 .FCODE SET     5                  F COMMAND CODE (UPPER)                      00000130
                000005        543 .LCODE SET     5                  L COMMAND CODE (LOWER)                      00000135
                000006        544 .UCODE SET     6                  U COMMAND CODE (UPPER)                      00000140
                000006        545 .VCODE SET     6                  V COMMAND CODE (LOWER)                      00000145
                000007        546 .PCODE SET     7                  P COMMAND CODE (UPPER)                      00000150
                000010        547 .QLCNT SET     8                  NUMBER OF QUALIFIERS                        00000160
                000011        548 .QLPTR SET     9                  INDEX OF FIRST ENTRY IN QUAL. TABLE         00000170
                              552                LAY-OUT OF THE QUALIFICATION TABLE                             00000030
                              553                                                                               00000040
                              554                                                                               00000050
                000004        555 .QALSZ SET     4                  TABLE SIZE                                  00000060
                000000        556 .BOOLE SET     0                  BOLLEAN CODE (0=AND,1=OR)                   00000070
                000001        557 .QLKEY SET     1                  ADDRESS OF THE KEY DEF                      00000080
                000002        558 .OPCOD SET     2                  COMPARISON OPERATOR CODE                    00000090
                000003        559 .SRCH  SET     3                  TALLY WORD OF THE SEARCH VALUE              00000100
                              563                LAY-OUT OF USER'S PCB AREA                                     00000030
                              564                                                                               00000040
                              565                                                                               00000050
                000010        566 .UPCSZ SET     8                  PCB AREA SIZE                               00000060
                000000        567 .DBDNM SET     0                  DBD-NAME                                    00000070
                000001        568 .SGLVL SET     1                  SEG. LEVEL OF SEGMENT LAST  PROCESSED       00000080
                000001        569 .USTAT SET     1                  IMS STATUS CODE                             00000090
                000002        570 .PROPT SET     2                  PROCESSING OPTIONS                          00000100
                000003        571 .PCBAD SET     3                  ADDRESS OF PCB DEF.                         00000110
                000004        572 .PNAME SET     4                  SEGMENT NAME OF SEGMENT LAST PROCESSED      00000120
                000006        573 .LNKEY SET     6                  LENGTH OF FEED-BACK KEY                     00000130
                000007        574 .SNSEG SET     7                  NUMBER OF SENSITIVE SEGMENTS                00000140
                000010        575 .FDBCK SET     8                  START OF FEED-BACK AREA                     00000150
                              579                LAY-OUT OF THE PCB DEFINITION TABLE ENTRY                      00000030
                              580                                                                               00000040
                              581                                                                               00000050
                000000        582 .POSIT SET     0                  MULTIPLE-POSITIONING FLAG                   00000060
                000000        583 .HOLD  SET     0                  IMS "HOLD" FLAG                             00000070
                000000        584 .STAT  SET     0                  IMS STATUS                                  00000080
                000002        585 .CRSEG SET     2                  SEG  ADDR OF SEGMENT LAST PROCESSED         00000090
                000002        586 .CRLVL SET     2                  LEVEL OF THE LAST SEGMENT PROCESSED         00000100
                000003        587 .CRPAR SET     3                  SEG ADDR OF PARENTAGE SEGMENT               00000110
                000003        588 .UNSAT SET     3                  "HIGHEST" UNSATISFIED SEGMENT               00000120
                000004        589 .CRIDS SET     4                  IDS REFERENCE CODE                          00000130
                000005        590 .SSTAB SET     5                  ADDRESS OF THE SSA  TABLE                   00000140
                000005        591 .QLTAB SET     5                  ADDRESS OF THE QUALIFICATION TABLE          00000150
                000006        592 .OLSSA SET     6                  OLD SSA COUNT FOR THIS PCB                  00000160
                000007        593 .PRSTA SET     7                  OLD STATUS FOR THIS PCB                     00000170
                              595                                                                               00000010
                              596                                                                               00000020
                              597                LAY-OUT OF THE IMS SEG DEFINITION TABLE ENTRY                  00000030
                              598                                                                               00000040
                              599                                                                               00000050
```

```
000000   600 .SGLEM SET    0     SEGMENT LENGTH (DATA ONLY)                  00000060
000000   601 .SOKEY SET    0     ADDRESS OF THE SEQUENCE-KEY                 00000070
000003   602 .LGCHL SET    3     POINTER TO FIRST LOGICAL COMPONENT          00000080
000004   603 .SGORD SET    4     LOCATION OF IDS ORD POINTER                 00000090
000005   604 .LEVEL SET    5     IMS LEVEL NUMBER                            00000100
000005   605 .RCNUM SET    5     IMS RECORD NUMBER                           00000110
000006   606 .SGREA SET    6     AREA FLAG WORD                              00000120
000006   607 .INDEX SET    6     INDEX ROUTINE ADDRESS                       00000130
000007   608 .PERM  SET    7     PERMISSION WORD (G+I+R+D+K+P)               00000140
000010   609 .RULE  SET    8     LOGICAL RULES  AND INSERT RULES             00000150
000011   610 .PCHLD SET    9     PC ADDR HOLD AREA                           00000160
000012   611 .CURNT SET    10    IDS CURRENCY FOR THIS SEGMENT               00000170
000013   612 .SGNAM SET    11    IMS SEGMENT NAME                            00000180


000000   614        BLOCK  C05                                               00000011
000000   615 SSACNT BSS    1     SSA COUNT IN CURRENT CALL                   00000021
000001   616 SSATAB BSS    1     ADDRESS OF THE CURRENT SSA TABLE            00000031
000002   617 QALTAB BSS    1     ADDRESS OF QUALIFICATION TABLE              00000041
000003   618 PCBDFN BSS    1     PCB DEFINITION ADDRESS                      00000051
000004   619 QUALDX BSS    1     QUALIFICATION TABLE INDEX                   00000061
000005   620 CURSSA BSS    1     ADDRESS OF CURRENT USER SSA                 00000071
000006   621 FRSTLV BSS    1     FIRST USER-SUPPLIED LEVEL                   00000081
000007   622 IOAREA BSS    1     ADDRESS OF USER'S I-O-AREA                  00000091
000010   623 LSTSEG BSS    1     ADDRESS OF LAST ACCESSED SEG                00000101
000011   624 CURREF BSS    1     REF. CODE OF LAST ACCESSED RECORD           00000111
000012   625 PCBADR BSS    1     ADDRESS OF USER'S PCB                       00000121
000013   626 PRNTSW BSS    1     SWITCH FOR IMS PARENT SETTING               00000131
000014   627 PRSTAT BSS    1     STATUS OF PREVIOUS CALL                     00000141
000015   628 FUNCDE BSS    1     IMS FUNCTION CODE                           00000151
000016   629 OLDSSA BSS    1     OLD SSA COUNT (PREVIOUS CALL)               00000161
000017   630 PRIRSW BSS    1     USE PRIOR DIRECTION SWITCH                  00000171
000020   631 CCODEC BSS    1     COMMAND CODE "C" SWITCH                     00000181
000021   632 USERIO BSS    1     ADDRESS OF USER'S I-O-AREA                  00000191
000022   633 MVETAL BSS    1     TALLY WORD BUILD BY MVESEG WHEN NO SSA'S    00000201
         634                                                                 00000211
         635                                                                 00000221
         636                                                                 00000231
         637                                                                 00000241
         638                                                                 00000251
001420   639        USE                                                      00000261
```

BUILD I-O-AREA TALLIES

```
                                 1        LBL    BLDTAL                                  00000040
                                 2        TTL    BUILD I-O-AREA TALLIES                  00000050
                                 3                                                       00000055
                                 4                                                       00000060
                                 5                                                       00000070
                                 6               THIS ROUTINE BUILDS TALLY WORDS FOR     00000080
                                 7               SEGMENTS WHICH WILL BE MOVEED INTO THE  00000090
                                 8               I-O-AREA BY THIS CALL                   00000100
                                 9                                                       00000110
                                10               THE TALLY WORD FOR AN INDIVIDUAL SEGMENT 00000120
                                11               IS PLACED IN THE TALLY SLOT IN THE CORRESPONDING 00000130
                                12               SSA-TABLE ELEMENT                       00000140
                                13                                                       00000150
                                14               A SEGMENT IS A CANDIDATE FOR MOVING IF  00000160
                                15               COMMAND CODE "D" WAS USED IN THE CORRESPONDING 00000170
                                16               SSA. OR IF THE SEGMENT IS THE LOWEST LEVEL 00000180
                                17               ONE IN THIS CALL (OBJECT LEVEL)         00000190
                                19                                                       00000210
                                20                                                       00000220
                                21        SYMDEF BLDTAL                                  00000230
                 000000         22 AR0    EQU    0                                       00000235
                                23                                                       00000240
                                24                                                       00000250
              000000            25 BLDTAL NULL                                           00000260
000000  000070 7530 00  010     26        SREG   BLDREG                                  00000270
000001  000057 4500 00  010     27        STZ    STRTCH         INITIALIZE               00000280
000002  000001 2350 07  000     28        LDA    1,DL                                    00000290
000003  000060 7550 00  010     29        STA    WRKSSA                                  00000300
000004  010001 2230 00  030     30        LDX3   SSATAB                                  00000310
              000005            31 CHKEND NULL                                           00000320
000005  000060 2360 00  010     32        LDQ    WRKSSA         CHECK FOR DONE           00000330
000006  010000 1160 00  030     33        CMPQ   SSACNT         SSA-WORK > SSA-COUNT     00000340
000007  000015 6000 00  010     34        TZE    SETALY                                  00000350
000010  000055 6050 00  010     35        TPL    EXIT           IF SO, EXIT              00000360
              000011            36 CMDCHK NULL                                           00000370
000011  000000 7220 13  000     37        LXL2   .SUPLY,3       WAS THIS SSA USER-SUPPLIED 00000380
000012  000052 6010 00  010     38        TNZ    NXTSSA         NO--GO LOOK AT NEXT SSA-TABLE 00000390
              000013            39 NXTCMD NULL                                           00000400
000013  000004 2270 13  000     40        LDX7   .DCODE,3       PICK D COMMAND CODE SWITCH 00000410
000014  000052 6000 00  010     41        TZE    NXTSSA         IF NOT ON, GO GET NEXT SSA 00000420
              000015            42 SETALY NULL                                           00000430
000015  000000 2240 13  000     43        LDX4   .SEGAD,3       X4 = SEG DEF ADDRESS     00000440
000016  000010 2350 14  000     44        LDA    .RULE,4        IS THIS A LOGICAL SEGMENT 00000450
000017  050001 3750 07  000     45        ANA    =O1,DL                                  00000460
000020  000023 6000 00  010     46        TZE    *+3                                     00000470
000021  010007 7604 00  030     47        LARO   IOAREA         YES - USE EMULATOR I-O-AREA 00000480
000022  000024 7100 00  010     48        TRA    *+2                                     00000490
END OF BINARY CARD BLDTAL02
000023  010021 7604 00  030     49        LARO   USERIO         NO - USE USER'S I-O-AREA 00000500
000024  000057 2360 00  010     50        LDQ    STRTCH         PICK UP CURRENT START CHAR 00000510
000025  000006 5060 07  000     51        DIV    6,DL           CONVERT TO WORD & CHAR   00000520
000026  000000 1150 07  000     52        CMPA   0,DL           MAKE SURE DESCRITOR IS WORD ALIGNED 00000530
000027  000031 6000 00  010     53        TZE    *+2                                     00000540
000030  000001 0760 07  000     54        ADQ    1,DL                                    00000550
000031  000000 5075 06  000     55        AWD    0,QL,AR0       ADD WORD OFFSET TO DESCRIPTOR 00000560
```

```
000032  000062 5404 00  010    56         ARAO   EISDSC       PUT WORD OFFSET IN DESCRIPTOR          00000570
000033  000000 2350 14  000    57         LDA    .SGLEN,4     PICK UP SEGMENT LENGTH                 00000580
000034  007777 3750 03  000    58         ANA    =O007777,DU                                         00000590
000035  000022 7310 00  000    59         ARS    18                                                  00000600
000036  000062 7510 03  010    60         STCA   EISDSC,03    PUT LENGTH IN DESCRIPTOR               00000610
000037  000057 0550 00  010    61         ASA    STRTCH       STRTCH = STRTCH + SEG-LENGTH           00000620
                               62                                                                    00000630
000040  000062 2350 00  010    63         LDA    EISDSC       PUT EIS DESCRIPTOR                     00000640
000041  000003 7550 13  000    64         STA    .EISWD,3     IN THE SSA TABLE                       00000650
000042  000061 7550 00  010    65         STA    TALLY                                               00000660
                               66                             CONVERT EIS DESCRIPTOR TO              00000670
                               67                             A TALLY WORD                           00000680
000043  000006 7350 00  000    68         ALS    6            JUSTIFY AND INSERT LENGTH              00000690
000044  000061 7510 06  010    69         STCA   TALLY,06                                            00000700
000045  000025 7310 00  000    70         ARS    21           JUSTIFY INITIAL CHAR                   00000710
OF BINARY CARD BLDTAL03
000046  000007 3750 07  000    71         ANA    =O7,DL                                              00000720
000047  000061 7510 01  010    72         STCA   TALLY,01     INSERT INITIAL CHAR                    00000730
000050  000061 2350 00  010    73         LDA    TALLY                                               00000740
000051  000001 7550 13  000    74         STA    .IOTAL,3     PUT TALLY WORD IN SSA TABLE            00000750
                               75                                                                    00000760
                               76                                                                    00000770
                               77                                                                    00000780
                               78                                                                    00000790
                               79                                                                    00000800
                000052         80 NXTSSA  NULL                                                       00000810
000052  000060 0540 00  010    81         AOS    WRKSSA       INCREMENT SSA COUNTER                  00000820
000053  000012 0630 03  000    82         ADX3   .SSSIZ,DU    ADJUST SSA-TABLE ADRESS                00000830
000054  000005 7100 00  010    83         TRA    CHKEND                                              00000840
                000055         85 EXIT    NULL                                                       00000860
000055  000070 0730 00  010    86         LREG   HLDREG                                              00000870
000056  000000 7100 11  000    87         TRA    0,I                                                 00000880
                               88                                                                    00000890
                               89                                                                    00000900
                               90                                                                    00000910
                000057         91 STRTCH  BSS    1                                                   00000920
                               92                                                                    00000930
                000060         93 WRKSSA  BSS    1                                                   00000940
                000061         94 TALLY   BSS    1                                                   00000950
000062  000000 0200 00  000    95 EISDSC  ADSC6                                                      00000960
                               96                                                                    00000970
                               97                                                                    00000980
                000010         98 REPLCD  SET    8            FUNCTION NUMBER FOR REPL               00000990
                               99                                                                    00001000
                              100                                                                    00001010
000063  000005710004      000
                000070        101         EIGHT                                                      00001020
                000070        102 HLDREG  BSS    8                                                   00001030

                              106                LAY-OUT OF THE SSA TABLE                            00000030
                              107                                                                    00000040
                              108                                                                    00000050
                000012        109 .SSSIZ  SET    10           TABLE SIZE                             00000060
                000000        110 .SEGAD  SET    0            SEG DEFINITION ADDRESS                 00000070
                000000        111 .SUPLY  SET    0            FLAG FOR USER-SUPPLIED OR IMPLIED      00000080
                000001        112 .IOTAL  SET    1            I-O-AREA TALLY                         00000090
                000002        113 .UNIQE  SET    2            UNIQUENESS INDICATOR                   00000100
                000003        114 .EISWD  SET    3            EIS DESCRIPTOR WORD OF SEGMENT         00000110
                000004        115 .DCODE  SET    4            D COMMAND CODE (UPPER)                 00000120
                000004        116 .NCODE  SET    4            N COMMAND-CODE (LOWER)                 00000125
                000005        117 .FCODE  SET    5            F COMMAND CODE (UPPER)                 00000130
                000005        118 .LCODE  SET    5            L COMMAND CODE (LOWER)                 00000135
                000006        119 .UCODE  SET    6            U COMMAND CODE (UPPER)                 00000140
                000006        120 .VCODE  SET    6            V COMMAND CODE (LOWER)                 00000145
                000007        121 .PCODE  SET    7            P COMMAND CODE (UPPER)                 00000150
                000010        122 .QLCNT  SET    8            NUMBER OF QUALIFIERS                   00000160
                000011        123 .QLPTR  SET    9            INDEX OF FIRST ENTRY IN QUAL. TABLE    00000170
                              125                                                                    00000010
                              126                                                                    00000020
                              127                LAY-OUT OF THE IMS SEG DEFINITION TABLE ENTRY       00000030
                              128                                                                    00000040
                              129                                                                    00000050
                000000        130 .SGLEN  SET    0            SEGMENT LENGTH (DATA ONLY)             00000060
                000000        131 .SQKEY  SET    0            ADDRESS OF THE SEQUENCE-KEY            00000070
                000003        132 .LGCHL  SET    3            POINTER TO FIRST LOGICAL COMPONENT     00000080
                000004        133 .SGDRD  SET    4            LOCATION OF IDS DRD POINTER            00000090
                000005        134 .LEVEL  SET    5            IMS LEVEL NUMBER                       00000100
                000005        135 .RCNUM  SET    5            IMS RECORD NUMBER                      00000110
                000006        136 .SGREA  SET    6            AREA FLAG WORD                         00000120
                000006        137 .INDEX  SET    6            INDEX ROUTINE ADDRESS                  00000130
                000007        138 .PERM   SET    7            PERMISSION WORD (G,I,R,D,K,P)          00000140
                000010        139 .RULE   SET    8            LOGICAL RULES  AND INSERT RULES        00000150
                000011        140 .PCHLD  SET    9            PC ADDR HOLD AREA                      00000160
                000012        141 .CURNT  SET    10           IDS CURRENCY FOR THIS SEGMENT          00000170
                000013        142 .SGNAM  SET    11           IMS SEGMENT NAME                       00000180
                000000        144         BLOCK  CDS                                                 00000010
                000000        145 SSACNT  BSS    1            SSA COUNT IN CURRENT CALL              00000020
                000001        146 SSATAB  BSS    1            ADDRESS OF THE CURRENT SSA TABLE       00000030
                OO0002        147 QLTAB   BSS    1            ADDRESS OF QUALIFICATION TABLE         00000040
                OO0003        148 PCBDFN  BSS    1            PCB DEFINITION ADDRESS                 00000050
                000004        149 QUALDX  BSS    1            QUALIFICATION TABLE INDEX              00000060
                000005        150 CURSSA  BSS    1            ADDRESS OF CURRENT USER SSA            00000070
                000006        151 FRSTLV  BSS    1            FIRST USER-SUPPLIED LEVEL              00000080
                000007        152 IOAREA  BSS    1            ADDRESS OF USER'S I-O-AREA             00000090
                000010        153 LSTSEG  BSS    1            ADDRESS OF LAST ACCESSED SEG           00000100
                000011        154 CURREF  BSS    1            REF. CODE OF LAST ACCESSED RECORD      00000110
                000012        155 PCBADR  BSS    1            ADDRESS OF USER'S PCB                  00000120
                000013        156 PRNTSW  BSS    1            SWITCH FOR IMS PARENT SETTING          00000130
                000014        157 PRSTAT  BSS    1            STATUS OF PREVIOUS CALL                00000140
                000015        158 FUNCDE  BSS    1            IMS FUNCTION CODE                      00000150
                000016        159 OLDSSA  BSS    1            OLD SSA COUNT (PREVIOUS CALL)          00000160
                000017        160 PRIRSW  BSS    1            USE PRIOR DIRECTION SWITCH             00000170
                000020        161 CCODEC  BSS    1            COMMAND CODE "C" SWITCH                00000180
```

```
000021          USERIO BSS      1                ADDRESS OF USER'S I-O-AREA                      000001
000022          MVETAL BSS      1                TALLY WORD BUILD BY MVESEG WHEN NO SSA'S        000002
                                                                                                 000002
                                                                                                 000002
                                                                                                 000002
                                                                                                 000002
                                                                                                 000002
                                                                                                 000002
000100                  USE                                                                      000002
```

PROCESS COMMAND CODES

```
                                LBL     CCODE                                                    000000..
                                TTL     PROCESS COMMAND CODES                                    000000..
                                                                                                 000000..
                                                                                                 000000..
                                                                                                 000000..
                                                                                                 000000..
                                                                                                 000000..
                                        THIS ROUTINE HANDLES THE COMMAND CODES                   000001..
                                        1. "D"                                                   000001..
                                        2. "P"                                                   000001..
                                        AFTER A LEVEL HAS BEEN SATISFIED IN                      000001..
                                        A GET CALL                                               000001..
                                                                                                 000001..
                                        FOR COMMAND CODE "D", MVESEG IS CALLED                   000001..
                                        TO MOVE THE SEGMENT TO THE USER'S I-O-AREA               000001..
                                                                                                 000001..
                                        FOR COMMAND CODE "P", THE PARENTAGE CELL                 000001..
                                        IN THE PCB IS SET TO SHOW THAT THE                       000001..
                                        CURRENT SEGMENT IS THE NEW PARENT                        000002..
                                                                                                 000002..
                                                                                                 000002..
                                SYMDEF  CCODE                                                    000002..
                                                                                                 000002..
                                                                                                 000002..
                                                                                                 000002..
                     000000     CCODE   NULL                                                     000002..
000000  000050 7530 00  010             SREG    HLDREG                                           000003..
                                                                                                 000003..
                                                                                                 000003..
000001  000002 2360 31  000             LDQ     2,1*             PICK UP ARGUMENT (IMS LEVEL NUMBER) 000003..
000002  000042 7560 00  010             STQ     MAXLVL                                           000003..
000003  000040 6000 00  010             TZE     EXIT             EXIT IF ZERO                    000003..
000004  010015 2350 00  030             LDA     FUNCDE           DON'T PROCESS CODES IF          000003..
000005  000044 1150 00  010             CMPA    ISRTCD           IS NOT A "GET" CALL             000003..
000006  000040 6050 00  010             TPL     EXIT                                             000003..
000007  010001 2230 00  030             LDX3    SSATAB           X3 = ADDR(SSA-TABLE(1))         000003..
000010  000001 2350 07  000             LDA     1,DL             I = 1                           000004..
000011  000043 7550 00  010             STA     WRKLVL                                           000004..
                     000012     PROSSA  NULL                     PROCESS AN SSA LEVEL            000004..
                                                                                                 000004..
                                                                                                 000004..
000012  000000 7200 13  000             LXLO    .SUPLY,3         GO TO NXTLVL IF THIS SSA WAS    000004..
000013  000033 6010 00  010             TNZ     NXTLVL           NOT USER-SUPPLIED               000004..
                                                                                                 000004..
000014  000000 2240 13  000             LDX4    .SEGAD,3         X4 = SEG DEF ADDR OF LAST SEG FOUND 000004..
000015  000012 2350 14  000             LDA     .CURNT,4         IF CURRENCY = 0, EXIT           000004..
000016  000040 6000 00  010             TZE     EXIT             IF CURRENCY = ZERO AT THIS LEVEL, THAT 000005..
                                                                 IMPLIES THAT IT MUST BE ZERO AT ALL 000005..
                                                                 SUBORDINATE LEVELS              000005..
                                                                                                 000005..
000017  000004 2200 13  000             LDX0    .DCODE,3         IS "D" COMMAND CODE ON          000005..
000020  000025 6000 00  010             TZE     CHKPAR           NO - GO CHECK "P" CODE          000005..
                                                                                                 000005..
000021  020000701000    030             CALL    MVESEG(WRKLVL)   YES - MOVE SEGMENT TO I-O-AREA  000005..
000022  000043710000    010
END OF BINARY CARD CCODE002
000023  000060000067    010
000024  000043000000    010
                                                                                                 000005..
                     000025     CHKPAR  NULL                                                     000005..
000025  000007 2200 13  000             LDX0    .PCODE,3         IS "P" COMMAND ON               000006..
000026  000033 6000 00  010             TZE     NXTLVL           NO  - GO TO NXTLVL              000006..
                                                                 YES - SET PARENTAGE             000006..
000027  010003 2270 00  030             LDX7    PCBDFN           X7 = PCB DEF ADDR               000006..
000030  000003 7440 17  000             STX4    .CRPAR,7         SET PARENTAGE IN PCB            000006..
000031  000001 2350 07  000             LDA     1,DL                                             000006..
000032  010013 7550 00  030             STA     PRNTSW           SET PARENT-SWITCH SO THAT       000006..
                                                                                                 000006..
                                                                                                 000006..
                     000033     NXTLVL  NULL                                                     000006..
000033  000012 0630 03  000             ADX3    .SSSIZ,DU        ADJUST SSA-TABLE ADDR           000007..
000034  000043 0540 00  010             AOS     WRKLVL           I = I + 1                       000007..
000035  000042 2350 00  010             LDA     MAXLVL           IF I <= MAXLVL                  000007..
000036  000043 1150 00  010             CMPA    WRKLVL                                           000007..
000037  000012 6050 00  010             TPL     PROSSA             GO TO PROCESS-AN-SSA          000007..
                     000040     EXIT    NULL                                                     000007..
000040  000050 0730 00  010             LREG    HLDREG                                           000007..
000041  000000 7100 11  000             TRA     0,1                                              000007..
                                                                                                 000007..
                                                                                                 000008..
                                                                                                 000008..
                     000042     MAXLVL  BSS     1                HIGHEST LEVEL SATISFIED IN THIS CALL 000008..
                     000043     WRKLVL  BSS     1                IMS LEVEL NUMBER (INPUT ARG)    000008..
000044  000000000007    000     ISRTCD  DEC     7                IMS INSERT CODE NUMBER          000008..
                                                                                                 000008..
                                                                                                 000008..
                                                                                                 000008..
                                                                                                 000008..
```

```
100045  000003710004     000
   000050          87         EIGHT                                                          00000890
   000050          88 HLDREG  BSS     8                                                      00000900
                   92                 LAY-OUT OF THE SSA TABLE                               00000010
                   93                                                                        00000040
                   94                                                                        00000050
   000012          95 .SSSIZ  SET     10                 TABLE SIZE                          00000060
   000000          96 .SEGAD  SET     0                  SEG DEFINITION ADDRESS              00000070
   000000          97 .SUPLY  SET     0                  FLAG FOR USER-SUPPLIED CR IMPLIED   00000080
   000001          98 .IOTAL  SET     1                  I-O-AREA TALLY                      00000090
   000002          99 .UNIQE  SET     2                  UNIQUENESS INDICATOR                00000100
   000003         100 .EISWD  SET     3                  EIS DESCRIPTOR WORD OF SEGMENT      00000110
   000004         101 .DCODE  SET     4                  D COMMAND CODE (UPPER)              00000120
   000004         102 .NCODE  SET     4                  N COMMAND-CODE (LOWER)              00000125
   000005         103 .FCODE  SET     5                  F COMMAND CODE (UPPER)              00000130
   000005         104 .LCODE  SET     5                  L COMMAND CODE (LOWER)              00000135
   000006         105 .UCODE  SET     6                  U COMMAND CODE (UPPER)              00000140
   000006         106 .VCODE  SET     6                  V COMMAND CODE (LOWER)              00000145
   000007         107 .PCODE  SET     7                  P COMMAND CODE (UPPER)              00000150
   000010         108 .QLCNT  SET     8                  NUMBER CF QUALIFIERS                00000160
   000011         109 .QLPTR  SET     9                  INDEX OF FIRST ENTRY IN QUAL. TABLE 00000170
                  113                 LAY-OUT OF THE PCB DEFINITION TABLE ENTRY              00000030
                  114                                                                        00000040
                  115                                                                        00000050
   000000         116 .POSIT  SET     0                  MULTIPLE-POSITIONING FLAG           00000060
   000000         117 .HOLD   SET     0                  IMS "HOLD" FLAG                     00000070
   000000         118 .STAT   SET     0.                 IMS STATUS                          00000080
   000002         119 .CRSEG  SET     2                  SEG  ADDR OF SEGMENT LAST PROCESSED 00000090
   000002         120 .CRLVL  SET     2                  LEVEL OF THE LAST SEGMENT PROCESSED 00000100
   000003         121 .CRPAR  SET     3                  SEG ADDR OF PARENTAGE SEGMENT       00000110
   000003         122 .UNSAT  SET     3                  "HIGHEST" UNSATISFIED SEGMENT       00000120
   000004         123 .CRIDS  SET     4                  IDS REFERENCE CODE                  00000130
   000005         124 .SSTAB  SET     5                  ADDRESS OF THE SSA  TABLE           00000140
   000005         125 .QLTAB  SET     5                  ADDRESS OF THE QUALIFICATION TABLE  00000150
   000006         126 .OLSSA  SET     6                  OLD SSA COUNT FOR THIS PCB          00000160
   000007         127 .PRSTA  SET     7                  OLD STATUS FOR THIS PCB             00000170
                  129                                                                        00000010
                  130                                                                        00000020
                  131                 LAY-OUT OF THE IMS SEG DEFINITION TABLE ENTRY          00000030
                  132                                                                        00000040
                  133                                                                        00000050
   000000         134 .SGLEN  SET     0                  SEGMENT LENGTH (DATA ONLY)          00000060
   000000         135 .SQKEY  SET     0                  ADDRESS OF THE SEQUENCE-KEY         00000070
   000003         136 .LGCHL  SET     3                  POINTER TO FIRST LOGICAL COMPONENT  00000080
   000004         137 .SGORD  SET     4                  LOCATION OF IDS ORD POINTER         00000090
   000005         138 .LEVEL  SET     5                  IMS LEVEL NUMBER                    00000100
   000005         139 .RCNUM  SET     5                  IMS RECORD NUMBER                   00000110
   000006         140 .SGREA  SET     6                  AREA FLAG WORD                      00000120
   000006         141 .INDEX  SET     6                  INDEX ROUTINE ADDRESS               00000130
   000007         142 .PERM   SET     7                  PERMISSION WORD (G+I+R+D+K+P)       00000140
   000010         143 .RULE   SET     8                  LOGICAL RULES  AND INSERT RULES     00000150
   000011         144 .PCHLD  SET     9                  PC ADDR HOLD AREA                   00000160
   000012         145 .CURNT  SET     10                 IDS CURRENCY FOR THIS SEGMENT       00000170
   000013         146 .SGNAM  SET     11                 IMS SEGMENT NAME                    00000180
   000000         148         BLOCK   C05
   000000         149 SSACNT  BSS     1                  SSA COUNT IN CURRENT CALL           00000010
   000001         150 SSATAB  BSS     1                  ADDRESS OF THE CURRENT SSA TABLE    00000020
   000002         151 QALTAB  BSS     1                  ADDRESS OF QUALIFICATION TABLE      00000030
   000003         152 PCBDFN  BSS     1                  PCB DEFINITION ADDRESS              00000040
   000004         153 QUALDX  BSS     1                  QUALIFICATION TABLE INDEX           00000050
   000005         154 CURSSA  BSS     1                  ADDRESS OF CURRENT USER SSA         00000060
   000006         155 FRSTLV  BSS     1                  FIRST USER-SUPPLIED LEVEL           00000070
   000007         156 IOAREA  BSS     1                  ADDRESS OF USER'S I-O-AREA          00000080
   000010         157 LSTSEG  BSS     1                  ADDRESS OF LAST ACCESSED SEG        00000090
   000011         158 CURREF  BSS     1                  REF. CODE OF LAST ACCESSED RECORD   00000100
   000012         159 PCBADR  BSS     1                  ADDRESS OF USER'S PCB               00000110
   000013         160 PRNTSW  BSS     1                  SWITCH FOR IMS PARENT SETTING       00000120
   000014         161 PRSTAT  BSS     1                  STATUS OF PREVIOUS CALL             00000130
   000015         162 FUNCDE  BSS     1                  IMS FUNCTION CODE                   00000140
   000016         163 OLDSSA  BSS     1                  OLD SSA COUNT (PREVIOUS CALL)       00000150
   000017         164 PRIRSW  BSS     1                  USE PRIOR DIRECTION SWITCH          00000160
   000020         165 CCODEC  BSS     1                  COMMAND CODE "C" SWITCH             00000170
   000021         166 USERIO  BSS     1                  ADDRESS OF USER'S I-O-AREA          00000180
   000022         167 MVETAL  BSS     1                  TALLY WORD BUILD BY MVESEG WHEN NO SSA'S 00000190
                  168                                                                        00000200
                  169                                                                        00000210
                  170                                                                        00000220
                  171                                                                        00000230
                  172                                                                        00000240
   000060         173         USE                                                            00000250
```

CHECK-FUNCTION SUBROUTINE

```
        1          LBL     CHKFNC                                                 00000040
        2          TTL     CHECK-FUNCTION SUBROUTINE                              00000050
        3                                                                         00000060
        4                                                                         00000070
        5                                                                         00000080
        6                  ARGS ARE                                               00000090
        7                  1. ALPHANUMERIC FUNCTION CODE                          00000100
        8                       (ONLY FIRST FOUR CHARACTERS ARE SIGNIFICANT)      00000110
        9                  2. VALIDITY CELL - RETURN ARGUMENT                     00000120
       10                       0  - MEANS FUNCTION O.K.                          00000130
       11                       1 - MEANS FUNCTION WAS NOT VALID                  00000140
       12                  3. NUMERIC FUNCTION CODE                               00000150
       13                       A NUMBER BETWEEN 1 AND 9                          00000160
       14                       REPRESENTING THIS FUNCTION                        00000170
       15                       ALSO IS A RETURN ARGUMENT                         00000180
       16                                                                         00000190
       17                                                                         00000200
       18          SYMDEF  CHKFNC                                                 00000210
```

```
                        000000     CHKFNC NULL                                                           0000022
000000  000040 7530 00   010              SREG    HLDREG                                                 0000023

000001  000004 4500 31   000              STZ     4,1*        SET NUMERIC FUNCTION CODE = 0             0000025
000002  000025 2350 00   010              LDA     SPACES      MAKE SURE THAT                            0000026
000003  000026 7550 00   010              STA     FUNC        FUNCTION CELL IS CLEARED                  0000027
000004  000002 2350 31   000              LDA     2,1*                                                  0000028
000005  000026 7510 74   010              STCA    FUNC,74     PICK UP USER-SUPPLIED FUNCTION CODE       0000029
                                                                                                        0000030
000006  000000 2220 03   000              LDX2    0,DU        INITIALIZE INDEX                          0000031
000007  000026 2350 00   010              LDA     FUNC        PUT FUNCTION IN XA                        0000032
                                                                                                        0000033
                        000010     SEARCH NULL                                                          0000034
000010  000027 1150 12   010              CMPA    TABLE,2     SEARCH                                    0000035
000011  000020 6000 00   010              TZE     FOUND          FUNCTION                               0000036
000012  000001 0620 03   000              ADX2    1,DU              TABLE                               0000037
000013  000011 1020 03   000              CMPX2   9,DU        TABLE SIZE IS 9                           0000038
000014  000010 6040 00   010              TMI     SEARCH      CONTINUE LOOKING                          0000039
                                                                                                        0000040
                                                              ERROR IF WE FALL THRU                     0000041
                        000015     NOTFND NULL                                                          0000042
000015  000001 2350 07   000              LDA     1,DL                                                  0000043
000016  000003 7550 31   000              STA     3,1*        SET VALIDITY CELL NON-ZERO                0000044
000017  000023 7100 00   010              TRA     EXIT                                                  0000045
                                                                                                        0000046
                                                                                                        0000047
                        000020     FOUND  NULL                                                          0000048
000020  000001 0620 03   000              ADX2    1,DU        X2 + 1 IS NUMERIC FUNCTION CODE           0000049
000021  000004 4420 31   000              SXL2    4,1*        RETURN FUNCTION CODE                      0000050
000022  000003 4500 31   000              STZ     3,1*        VALIDITY CELL = ZERO                      0000051
                                                                                                        0000052
                                                                                                        0000053
                        000023     EXIT   NULL                                                          0000054
END OF BINARY CARD CHKFNC02
000023  000040 0730 00   010              LREG    HLDREG      RESTORE REGISTERS                         0000055
000024  000000 7100 11   000              TRA     0,1         RETURN TO CALLER                          0000056
000025  202020202020     000       SPACES BCI     1,                                                    0000058
                        000026     FUNC   BSS     1                                                     0000059
                        000027     TABLE  NULL                FUNCTION TABLE                            0000060
000027  276420202020     000              BCI     1,GU                                                  0000061
000030  273064202020     000              BCI     1,GHU                                                 0000062
000031  274520202020     000              BCI     1,GN                                                  0000063
000032  273045202020     000              BCI     1,GHN                                                 0000064
000033  274547202020     000              BCI     1,GNP                                                 0000065
000034  273045472020     000              BCI     1,GHNP                                                0000066
000035  316251632020     000              BCI     1,ISRT                                                0000067
000036  512547432020     000              BCI     1,REPL                                                0000068
000037  244325632020     000              BCI     1,DLET                                                0000069
                                                                                                        0000070
                                                                                                        0000071
                                                                                                        0000072
                                                                                                        0000073
                        000040                EIGHT                                                     0000074
                        000040     HLDREG BSS     8                                                     0000075
                        000000            BLOCK   CDS                                                   0000001
                        000000     SSACNT BSS     1           SSA COUNT IN CURRENT CALL                 0000002
                        000001     SSATAB BSS     1           ADDRESS OF THE CURRENT SSA TABLE          0000003
                        000002     QALTAB BSS     1           ADDRESS OF QUALIFICATION TABLE            0000004
                        000003     PCBDFN BSS     1           PCB DEFINITION ADDRESS                    0000005
                        000004     QUALDX BSS     1           QUALIFICATION TABLE INDEX                 0000006
                        000005     CURSSA BSS     1           ADDRESS OF CURRENT USER SSA               0000007
                        000006     FRSTLV BSS     1           FIRST USER-SUPPLIED LEVEL                 0000008
                        000007     IOAREA BSS     1           ADDRESS OF USER'S I-O-AREA                0000009
                        000010     LSTSEG BSS     1           ADDRESS OF LAST ACCESSED SEG              0000010
                        000011     CURREF BSS     1           REF. CODE OF LAST ACCESSED RECORD         0000011
                        000012     PCBADR BSS     1           ADDRESS OF USER'S PCB                     0000012
                        000013     PRNTSW BSS     1           SWITCH FOR IMS PARENT SETTING             0000013
                        000014     PRSTAT BSS     1           STATUS OF PREVIOUS CALL                   0000014
                        000015     FUNCDE BSS     1           IMS FUNCTION CODE                         0000015
                        000016     OLDSSA BSS     1           OLD SSA COUNT (PREVIOUS CALL)             0000016
                        000017     PRINSW BSS     1           USE PRIOR DIRECTION SWITCH                0000017
                        000020     CCODEC BSS     1           COMMAND CODE "C" SWITCH                   0000018
                        000021     USERIO BSS     1           ADDRESS OF USER'S I-O-AREA                0000019
                        000022     MVETAL BSS     1           TALLY WORD BUILD BY MVESEG WHEN NO SSA'S  0000020
                                                                                                        0000021
                                                                                                        0000022
                                                                                                        0000023
                                                                                                        0000024
                                                                                                        0000025
                        000050                USE                                                       0000026

   ERROR LINKAGE

   000050  000000000000    000
   000051  233042264523    000
END OF BINARY CARD CHKFNC03
                                              END                                                       0000077
```

CHAIN PROCESSING SUBROUTINE

```
          LBL     CHNPRO                                              00000040
          TTL     CHAIN PROCESSING SUBROUTINE                         00000050
                                                                      00000055
                                                                      00000060
                                                                      00000070
                                                                      00000080
                                                                      00000090
                  THIS ROUTINE PERFORMS REQUESTED                     00000100
                  CHAIN PROCESSING - IT HAS TWO ARGUMENTS             00000110
                                                                      00000120
                  1. MD ADDRESS - THIS CAN BE THE ADDRESS OF          00000130
                     A NORMAL IDS MD, OR THE ADDRESS OF THE           00000140
                     MD FOR AN "AREA" CHAIN                           00000150
                                                                      00000160
```

```
                                  15                2. TYPE OF REQUEST - THERE ARE FOUR POSSIBLE              00000170
                                  16                   TYPES -                                                00000180
                                  17                                                                          00000190
                                  18                     A. 1 - NEXT                                          00000200
                                  19                     B. 2 - PRIOR                                         00000210
                                  20                     C. 3 - CURRENT                                       00000220
                                  21                     D. 4 - MASTER                                        00000230
                                  22                                                                          00000240
                                  23                IF THE CHAIN PROCESSING WAS SUCCESSFUL,                   00000250
                                  24                CHNPRO CALLS THE SUBROUTINE "UPDATE" TO                   00000260
                                  25                HANDLE ANY AREA CHAIN TABLES                              00000270
                                  27                                                                          00000290
                                  28                                                                          00000300
                                  29                                                                          00000310
                                  30         SYMDEF  CHNPRO                                                   00000320
                                  31                                                                          00000330
                                  32                                                                          00000340
                                  33                                                                          00000350
                                  34         SYMREF  AREAVR                                                   00000360
                                  35         SYMREF  CCB                                                      00000370
                                  36                                                                          00000380
                                  37                                                                          00000390
                                  38                                                                          00000400
                      000000      39 CHNPRO NULL                                                              00000410
000000  000070 7530 00  010       40         SREG    HLDREG                                                   00000420
                                  41                                                                          00000430
                                  42                                                                          00000440
000001  000002 2220 11  000       43         LDX2    2,1            X2 = MD ADDRESS                           00000450
                                  44                                                                          00000460
000002  000000 2350 12  000       45         LDA     0,2            IS IT A NORMAL IDS CHAIN                  00000470
000003  770000 3750 03  000       46         ANA     =0770000,DU    OR AN "AREA" CHAIN                        00000480
000004  020000 1150 03  000       47         CMPA    =0020000,DU                                              00000490
000005  000014 6000 00  010       48         TZE     IDSCHN         NORMAL IDS CHAIN IF CODE = 2              00000500
                                  49                                                                          00000510
000006  000003 2200 11  000       50         LDX0    3,1            X0 = REQUEST CODE                         00000520
000007  000007 7100 10  010       51         TRA     *,0                                                      00000530
000010  000033 7100 00  010       52         TRA     AREANX         1 = NEXT                                  00000540
000011  000037 7100 00  010       53         TRA     AREAPR         2 = PRIOR                                 00000550
000012  000043 7100 00  010       54         TRA     AREACR         3 = CURRENT                               00000560
000013  000045 7100 00  010       55         TRA     AREAMS         4 = MASTER                                00000570
                                  56                                                                          00000580
                                  57                                                                          00000590
                      000014      58 IDSCHN NULL                    NORMAL I-D-S CHAIN PROCESSING             00000600
000014  000030 7420 00  010       59         STX2    CLQCHN+3       SET UP MD                                 00000610
000015  000003 2350 11  000       60         LDA     3,1                                                      00000620
000016  000031 7550 00  010       61         STA     CLQCHN+4       SET UP CHAIN RETRIEVAL CODE               00000630
000017  000001 1150 03  000       62         CMPA    =01,DU         IS IT A GET NEXT CALL                     00000640
000020  000025 6010 00  010       63         TNZ     CLQCHN         NO CONTINUE NORMALLY                      00000650
000021  010017 2350 00  030       64         LDA     PRIRSW         IS THE PRIOR-SWITCH SET                   00000660
000022  000025 6000 00  010       65         TZE     CLQCHN         NO - CONTINUE NORMALLY                    00000670
OF BINARY CARD CHNPRO02
000023  000002 2350 03  000       66         LDA     2,DU           YES - SET UP A RETRIEVE PRIOR             00000680
000024  000031 7550 00  010       67         STA     CLQCHN+4                                                 00000690
                                  68                                                                          00000700
                      000025      69 CLQCHN NULL                                                              00000710
000025  030000701000        030   70         CALL    .QCHN(**,**)                                             00000720
000026  000032710000        010
000027  000100000106        010
000030  000000000000        000
000031  000000000000        000
000032  000052 7100 00  010       71         TRA     UPDTAB         GO UPDATE AREA CHAIN TABLES, IF ANY       00000730
                                  73                                                                          00000750
                                  74                                                                          00000760
                      000033      75 AREANX NULL                    AREA CHAIN NEXT                           00000770
000033  010017 2350 00  030       76         LDA     PRIRSW         IF THE PRIOR-SWITCH IS SET,               00000780
000034  000041 6010 00  010       77         TNZ     GETAPR         DOA RETRIEVE PRIOR INSTEAD                00000790
                      000035      78 GETANX NULL                                                              00000800
000035  000004 2360 12  000       79         LDQ     .NEXT,2                                                  00000810
000036  000046 7100 00  010       80         TRA     FETCH                                                    00000820
                                  81                                                                          00000830
                      000037      82 AREAPR NULL                    AREA CHAIN PRIOR                          00000840
000037  010017 2350 00  030       83         LDA     PRIRSW         IF THE PRIOR-SWITCH IS SET,               00000850
000040  000035 6010 00  010       84         TNZ     GETANX         FO A RETRIEVE NEXT INSTEAD                00000860
                      000041      85 GETAPR NULL                                                              00000870
000041  000006 2360 12  000       86         LDQ     .PRIOR,2                                                 00000880
000042  000046 7100 00  010       87         TRA     FETCH                                                    00000890
                                  88                                                                          00000900
                      000043      89 AREACR NULL                    AREA CHAIN CURRENT                        00000910
000043  000003 2360 12  000       90         LDQ     .CURR,2                                                  00000920
000044  000046 7100 00  010       91         TRA     FETCH                                                    00000930
                                  92                                                                          00000940
                      000045      93 AREAMS NULL                    AREA CHAIN MASTER                         00000950
000045  000005 2360 12  000       94         LDQ     .MASTR,2                                                 00000960
                                  95                                                                          00000970
                      000046      96 FETCH  NULL                                                              00000980
OF BINARY CARD CHNPRO03
000046  020000 7560 00  030       97         STQ     CCB+DIRREF     SET UP DIRECT-REFERENCE                   00000990
                      000047      98 DIRECT NULL                                                              00001070
000047  050000701000        030   99         CALL    .QGETD         RETRIEVE DIRECT                           00001080
000050  000052710000        010
000051  000100000143        010

                      000052     102 UPDTAB NULL                                                              00001110
000052  020005 2350 00  030      103         LDA     CCB+ERRREF     EXIT ON ERROR                             00001120
000053  000057 6010 00  010      104         TNZ     EXIT                                                     00001130
                                 105                                                                          00001140
000054  060000701000        030  106         CALL    UPDATE         UPDATE AREA CHAIN TABLES                  00001150
000055  000057710000        010
000056  000100000152        010
                                 107                                                                          00001160
                                 108                                                                          00001170
                                 109                                                                          00001180
                      000057     110 EXIT   NULL                                                              00001190
```

```
000057  000070 0730 00  010          LREG    HLDREG                                                   00001200
000060  000000 7100 11  000          TRA     0,1                                                      00001210
                                                                                                      00001220
                                                                                                      00001230
                                                                                                      00001240
                                                                                                      00001250
                000000        DIRREF SET     0                                                        00001260
                000005        ERRREF SET     5                                                        00001270
                                                                                                      00001280
                                                                                                      00001290
                                                                                                      00001300
000061  00000771C004     000
                000070               EIGHT                                                            00001310
                000070        HLDREG BSS     8                                                        00001320
                                                                                                      00000010
                                                                                                      00000020
                                             LAY-OUT OF THE AREA MD                                   00000030
                                                                                                      00000040
                                                                                                      00000050
                000000        .ACHNX SET     0                NEAT IN THE ACHN                        00000060
                000001        .PTRPO SET     1                WORD CONTAINS CHAIN PTR LOC IN REC      00000070
                000002        .RECRD SET     2                ADDRESS OF RECORD DEFINITION            00000080
                000002        .CHORD SET     2                CHAIN-ORDER CODE                        00000090
                000003        .CURR  SET     3                CURRENT REF-CODE IN CHAIN               00000100
                000004        .NEXT  SET     4                NEXT REF-CODE IN CHAIN                  00000110
                000005        .MASTR SET     5                MASTER REF-CODE IN CHAIN                00000120
                000006        .PRIOR SET     6                PRIOR REF-CODE IN CHAIN                 00000130

                000000               BLOCK   C05                                                      00000010
                000000        SSACNT BSS     1                SSA COUNT IN CURRENT CALL               00000020
                000001        SSATAB BSS     1                ADDRESS OF THE CURRENT SSA TABLE        00000030
                000002        QALTAB BSS     1                ADDRESS OF QUALIFICATION TABLE          00000040
                000003        PCBDFN BSS     1                PCB DEFINITION ADDRESS                  00000050
                000004        QUALDX BSS     1                QUALIFICATION TABLE INDEX               00000060
                000005        CURSSA BSS     1                ADDRESS OF CURRENT USER SSA             00000070
                000006        FRSTLV BSS     1                FIRST USER-SUPPLIED LEVEL               00000080
                000007        IOAREA BSS     1                ADDRESS OF USER'S I-O-AREA              00000090
                000010        LSTSEG BSS     1                ADDRESS OF LAST ACCESSED SEG            00000100
                000011        CURREF BSS     1                REF. CODE OF LAST ACCESSED RECORD       00000110
                000012        PCBADR BSS     1                ADDRESS OF USER'S PCB                   00000120
                000013        PRNTSW BSS     1                SWITCH FOR IMS PARENT SETTING           00000130
                000014        PRSTAT BSS     1                STATUS OF PREVIOUS CALL                 00000140
                000015        FUNCDE BSS     1                IMS FUNCTION CODE                       00000150
                000016        OLDSSA BSS     1                OLD SSA COUNT (PREVIOUS CALL)           00000160
                000017        PRIRSW BSS     1                USE PRIOR DIRECTION SWITCH              00000170
                000020        CCODEC BSS     1                COMMAND CODE "C" SWITCH                 00000180
                000021        USERIO BSS     1                ADDRESS OF USER'S I-O-AREA              00000190
                000022        MVETAL BSS     1                TALLY WORD BUILD BY MVESEG WHEN NO SSA'S 00000200
                                                                                                      00000210
                                                                                                      00000220
                                                                                                      00000230
                                                                                                      00000240
                                                                                                      00000250
                000100               USE                                                              00000260
```

CLEAR CURRENCY SUBROUTINE

```
                      LBL     CLEAR                                               00000040
                      TTL     CLEAR CURRENCY SUBROUTINE                           00000050
                                                                                  00000055
                                                                                  00000060
                                                                                  00000070
                              THIS ROUTINE CLEARS THE                             00000080
                              CURRENCY CELLS INTHE SEGDEFS FOR                    00000090
                              THE CURRENT PCB                                     00000100
                                                                                  00000110
                              THERE ARE TWO MAIN ENTRY POINTS                     00000120
                                                                                  00000130
                              1.  CLRBEG - THIS ENTRY CLEARS ALL                  00000140
                              CURRENCY EXCEPT THOSE ON THE DIRECT                 00000150
                              UPWARD PATH FROM THE INPUT ARGUMENT                 00000160
                                                                                  00000170
                              2.  CUREND - THIS ENTRY CLEARS CURRENCY             00000180
                              ONALL SEGMENTS BELOW THE INPUT ARGUMENT             00000190
                                                                                  00000200
                              CLRBEG CORRESPONDS TO A SINGLE-POSITION CLEAR       00000210
                                                                                  00000220
                              CLREND CORRESPONDS TO A MULTIPLE-POSITION CLEAR     00000230

                      SYMDEF  CLRBEG                                              00000250
                      SYMDEF  CLREND                                              00000260
                      SYMDEF  SINGLE                                              00000270
                      SYMDEF  MULTI                                               00000280
                      SYMDEF  CLRGM                                               00000290
                      SYMDEF  CLRUNQ                                              00000300
                                                                                  00000310
                                                                                  00000320
                      SYMREF  DEFERR                                              00000330
             GNPRO    MACRO                                                       00000350
                      LDX4    1,4                                                 00000360
                      LDA     0,4                                                 00000370
                      ANA     =0770000,DU                                         00000380
                      CMPA    =0500000,DU                                         00000390
                      TZE     #1                                                  00000400
                      CMPA    =0510000,DU                                         00000410
                      TNZ     DEFERR                                              00000420
                      ENDM    GNPRO                                               00000430
             GNCHLD   MACRO                                                       00000440
                      LDX4    2,4                                                 00000450
                      LDA     0,4                                                 00000460
                      ANA     =0770000,DU                                         00000470
                      CMPA    =0510000,DU                                         00000480
```

```
                                 TZE    *1                                                        00000490
                                 CMPA   =0540000,DU                                               00000500
                                 TNZ    DEFERR                                                    00000510
                                 ENDM   GNCHLD                                                    00000520
                          GMPRNT MACRO                                                            00000530
                                 LDA    0,4                                                       00000540
                                 ANA    =0770000,DU                                               00000550
                                 CMPA   =0510000,DU                                               00000560
                                 TZE    *+6                                                       00000570
                                 LXL4   1,4                                                       00000580
                                 LDA    0,4                                                       00000590
                                 ANA    =0770000,DU                                               00000600
                                 CMPA   =0510000,DU                                               00000610
                                 TNZ    DEFERR                                                    00000620
                                 ENDM   GMPRNT                                                    00000630
                          GNPRNT MACRO                                                            00000640
                                 LXL4   2,4                                                       00000650
                                 LDA    0,4                                                       00000660
                                 ANA    =0770000,DU                                               00000670
                                 CMPA   =0510000,DU                                               00000680
                                 TZE    *1                                                        00000690
                                 CMPA   =0540000,DU                                               00000700
                                 TNZ    DEFERR                                                    00000710
                                 ENDM   GNPRNT                                                    00000720
                          GMCHLD MACRO                                                            00000730
                                 LDA    0,4                                                       00000740
                                 ANA    =0770000,DU                                               00000750
                                 CMPA   =0510000,DU                                               00000760
                                 TZE    *+6                                                       00000770
                                 LDX4   1,4                                                       00000780
                                 LDA    0,4                                                       00000790
                                 ANA    =0770000,DU                                               00000800
                                 CMPA   =0510000,DU                                               00000810
                                 TNZ    DEFERR                                                    00000820
                                 ENDM   GMCHLD                                                    00000830
                                                                                                  00000840
                                                                                                  00000850
                          GNCOMP MACRO                                                            00000860
                                 LDX4   3,4                                                       00000870
                                 LDA    0,4                                                       00000880
                                 ANA    =0770000,DU                                               00000890
                                 CMPA   =0510000,DU                                               00000900
                                 TZE    *1                                                        00000910
                                 CMPA   =0560000,DU                                               00000920
                                 TNZ    DEFERR                                                    00000930
                                 ENDM   GNCOMP                                                    00000940
                 000000   SINGLE NULL                                                             00000960
                 000000   CLRBEG NULL                                                             00000970
000000 000440 7530 00 010        SREG   HLDREG                                                    00000980
000001 000002 2360 31 000        LDQ    2,1*                                                      00000990
000002 000362 7560 00 010        STQ    WRKLVL                                                    00001000
000003 000006 6010 00 010        TNZ    *+3                                                       00001010
                 000004   CLRALL NULL                                                             00001020
000004 010001 2230 00 030        LDX3   SSATAB           X3 = ADDR (SSA-TABLE)                    00001030
000005 000012 7100 00 010        TRA    SETUP            SKIP ADDRESS COMPUTATION                 00001040
000006 000001 1760 07 000        SBQ    1,DL                                                      00001050
000007 000012 4020 07 000        MPY    .SSSIZ,DL                                                 00001060
000010 000000 6230 06 000        EAX3   0,QL                                                      00001070
000011 010001 0630 00 030        ADX3   SSATAB           X3 = ADDR(SSA-TABLE(WRKLVL))             00001080
                                                                                                  00001090
                 000012   SETUP  NULL                                                             00001100
000012 000000 2240 13 000        LDX4   .SEGAD,3                                                  00001110
000013 000363 6220 00 010        EAX2   ARRAY                                                     00001120
                                                                                                  00001130
                 000014   BCKLVL NULL                                                             00001140
                 000014          GNCHLD CLRCUR                                                    00001150
                 000023          GMPRNT                                                           00001160
OF BINARY CARD CLEAR002
000034 000012 2350 14 000        LDA    .CURNT,4                                                  00001170
000035 000000 7550 12 000        STA    0,2                                                       00001180
000036 000001 0620 03 000        ADX2   1,DU                                                      00001190
                 000037   LGLSAV NULL                                                             00001200
                 000037          GNCOMP BCKLVL           SAVE CURRENCY                            00001210
OF BINARY CARD CLEAR003
000046 000004 2350 14 000        LDA    .LGCRN,4         FROM LSEG                                00001220
000047 000000 7550 12 000        STA    0,2              DEFINITIONS                              00001230
000050 000001 0620 03 000        ADX2   1,DU                                                      00001240
000051 000037 7100 00 010        TRA    LGLSAV                                                    00001250
                 000052   CLRCUR NULL                                                             00001260
000052 010003 2240 00 030        LDX4   PCBDFN           START AT THE PCB                         00001270
                 000053   NXTSGM NULL                                                             00001280
                 000053          GNPRO  RESET            GET THE NEXT SEGMENT DEFINITION          00001290
000062 000012 4500 14 000        STZ    .CURNT,4         CLEAR CURRENCY CELL                      00001300
                 000063   LGLCLR NULL                                                             00001310
                 000063          GNCOMP NXTSGM           REPEAT UNTIL ALL SEGMENTS ARE CLEARED    00001320
OF BINARY CARD CLEAR004
000072 000004 4500 14 000        STZ    .LGCRN,4         CLEAR CURRENCY                           00001330
000073 000063 7100 00 010        TRA    LGLCLR           IN LSEG DEFS                             00001340
                                                                                                  00001350
                                                                                                  00001360
                 000074   RESET  NULL                                                             00001370
000074 000000 2240 13 000        LDX4   .SEGAD,3         PICK UP STARTING SEGMENT                 00001380
000075 000363 6220 00 010        EAX2   ARRAY                                                     00001390
                 000076   CURBCK NULL                                                             00001400
                 000076          GNCHLD EXIT             GET THE SEG DEF                          00001410
                                                         OF THE                                   00001420
                 000105          GMPRNT                  PARNT SEGMENT                            00001430
000116 000000 2350 12 000        LDA    0,2              REPLACE ITS CURRENCY                     00001440
000117 000012 7550 14 000        STA    .CURNT,4         FROM THE CURRENCY TABLE                  00001450
000120 000001 0620 03 000        ADX2   1,DU                                                      00001460
                                                         CONTINUE UNTIL UPWARD                    00001470
                                                         HIERARCHY IS EXHAUSTED                   00001480
                 000121   LGLRST NULL                                                             00001490
                 000121          GNCOMP CURBCK           RESTORE CURRENCY                         00001500
```

```
000130 000000 2350 12 000      LDA     0,2          IN LSEG                               00001510
000131 000004 7550 14 000      STA     .LGCRN,4     DEFINITIONS                           00001520
000132 000001 0620 03 000      ADX2    1,DU                                               00001530
000133 000121 7100 00 010      TRA     LGLBST                                             00001540
                                                    HIERARCHY IS EXHAUSTED                00001550

              000134    MULTI  NULL                                                       00001570
              000134    CLREND NULL                                                       00001580
000134 000440 7530 00 010      SREG    HLDREG                                             00001590
000135 000002 2360 31 000      LDQ     2,1*         PICK UP  LEVEL NUMBER                 00001600
000136 000004 6000 00 010      TZE     CLRALL                                             00001610
END OF BINARY CARD CLEAR006
000137 000001 1760 07 000      SBQ     1,DL         COMPUTE SSA TABLE ADDRESS             00001620
000140 000012 4020 07 000      MPY     .SSSIZ,DL                                          00001630
000141 000000 6230 06 000      EAX3    0,QL                                               00001640
000142 010001 0630 00 030      ADX3    SSATAB       X3 = ADDR(SSA-TABLE(LEVEL-NUMBER))    00001650
                                                                                          00001660
000143 000000 2240 13 000      LDX4    .SEGAD,3     X4 = SEG DEF ADDRESS                  00001670
              000144    UNQMLT NULL                                                       00001680
000144 000000 2200 03 000      LDX0    0,DU                                               00001690
000145 000011 7400 14 000      STX0    .PCHLD,4     ZERO OUT P-C HOLD SLOT                00001700
              000146    DOWN   NULL                                                       00001710
              000146           GNPRNT  CHKEND       GET NEXT IN PARENT-OF CHAIN           00001720
000155 000361 7440 00 010      STX4    HOLDX4       SAVE P-C ADDR                         00001730
              000156           GNCHLD               GET MASTER CHILD-OF                   00001740
END OF BINARY CARD CLEAR007
000167 000361 2220 00 010      LDX2    HOLDX4                                             00001750
000170 000011 7420 14 000      STX2    .PCHLD,4     PUT P-C ADDR IN P-C HOLD SLOT         00001760
000171 000146 7100 00 010      TRA     DOWN         KEEP GOING DOWN THE STRUCTURE         00001770
                                                                                          00001780
                                                                                          00001790
              000172    CHKEND NULL                                                       00001800
000172 000011 2220 14 000      LDX2    .PCHLD,4     PICK UP P-C HOLD ADDR                 00001810
000173 000357 6000 00 010      TZE     EXIT         EXIT IF ZERO (BACK TO START)          00001820
000174 000011 7400 14 000      STX0    .PCHLD,4                                           00001830
000175 000012 4500 14 000      STZ     .CURNT,4     ZERO CURRENCY CELL                    00001840
              000176    CLBLGL NULL                                                       00001850
              000176           GNCOMP  PICKPC       CLEAR CURRENCY                        00001860
END OF BINARY CARD CLEAR008
000205 000004 4500 14 000      STZ     .LGCRN,4     IN LSEG DEFS                          00001870
000206 000176 7100 00 010      TRA     CLBLGL                                             00001880
              000207    PICKPC NULL                 USE SAVED PC HOLD ADDR                00001890
000207 000000 6240 12 000      EAX4    0,2          X4 = P-C ADDR FROM HOLD SLOT          00001900
000210 000146 7100 00 010      TRA     DOWN         GO DOWN NEW BRANCH OF STRUCTURE       00001910
              000211    CLRGN  NULL                                                       00001930
000211 000440 7530 00 010      SREG    HLDREG                                             00001940
000212 010003 2240 00 030      LDX4    PCBDFN       IF PCB SPECIFIES                      00001950
000213 000000 2350 14 000      LDA     .POSIT,4     MULTIPLE POSITIONING                  00001960
000214 000002 3750 03 000      ANA     =O2,DU                                             00001970
000215 000134 6010 00 010      TNZ     MULTI        CLEAR ONLY SUBORDINATE SEGS           00001980
000216 000002 2360 31 000      LDQ     2,1*         COMPUTE SSA TABLE ADDR                00001990
000217 000222 6000 00 010      TZE     *+3                                                00002000
000220 000001 1760 07 000      SBQ     1,DL                                               00002010
000221 000012 4020 07 000      MPY     .SSSIZ,DL                                          00002020
000222 000000 6230 06 000      EAX3    0,QL                                               00002030
000223 010001 0630 00 030      ADX3    SSATAB       X3 = ADDR(SSA TABLE INPUT ARG)        00002040
000224 000000 2240 13 000      LDX4    .SEGAD,3     X4 = SEG DEF ADDR                     00002050
              000225    UNQNTR NULL                 ENTRY POINT FOR UNQUALIFIED           00002060
                                                    RETRIEVAL CALL (IN THIS CASE,         00002070
                                                    THE CLEAR ROUTINE IS CALLED AFTER     00002080
                                                    RETRIEVAL IS COMPLETE)                00002090
000225 000361 7440 00 010      STX4    HOLDX4       SAVE X4 FOR LATER USE                 00002100
000226 000363 6220 00 010      EAX2    ARRAY        X2 = ADDR CURRENCY ARRAY              00002110
              000227    GNBACK NULL                                                       00002120
000227 000012 2350 14 000      LDA     .CURNT,4     SAVE CURRENCY FROM SEG                00002130
END OF BINARY CARD CLEAR009
000230 000000 7550 12 000      STA     0,2                                                00002140
000231 000001 0620 03 000      ADX2    1,DU                                               00002150
              000232    GNLGCR NULL                                                       00002160
              000232           GNCOMP  CLRPRN       SAVE CURRENCY                         00002170
000241 000004 2350 14 000      LDA     .LGCRN,4     FROM LSEG                             00002180
000242 000000 7550 12 000      STA     0,2          DEFINITIONS                           00002190
000243 000001 0620 03 000      ADX2    1,DU                                               00002200
000244 000232 7100 00 010      TRA     GNLGCR                                             00002210
              000245    CLRPRN NULL                                                       00002220
              000245           GNCHLD  WIPCUR       BACK UP IN THE                        00002230
END OF BINARY CARD CLEAR010
              000254           GNPRNT  IMS HIERARCHY                                      00002240
000265 000227 7100 00 010      TRA     GNBACK                                             00002250
                                                                                          00002260
              000266    WIPCUR NULL                 CLEAR CURRENCY                        00002270
000266 010003 2240 00 030      LDX4    PCBDFN                                             00002280
              000267    WIPNXT NULL                                                       00002290
              000267           GNPRO   PUTBCK       GET NEXT SEG DEF                      00002300
END OF BINARY CARD CLEAR011
000276 000012 4500 14 000      STZ     .CURNT,4     WIPE OUT CURRENCY                     00002310
              000277    CLRLGC NULL                                                       00002320
              000277           GNCOMP  WIPNXT       CLEAR CURRENCY IN ALL                 00002330
000306 000004 4500 14 000      STZ     .LGCRN,4     LSEG DEFINITIONS                      00002340
000307 000277 7100 00 010      TRA     CLRLGC                                             00002350
                                                                                          00002360
              000310    PUTBCK NULL                 RESTORE CURRENCY                      00002370
000310 000361 2240 00 010      LDX4    HOLDX4       X4 = ORIGINAL SEG DEF                 00002380
000311 000363 6220 00 010      EAX2    ARRAY        X2 = ADDR CURRENCY ARRAY              00002390
              000312    PUTCUR NULL                                                       00002400
000312 000000 2350 12 000      LDA     0,2                                                00002410
000313 000012 7550 14 000      STA     .CURNT,4     PUT CURRENCY BACK IN SEG              00002420
000314 000001 0620 03 000      ADX2    1,DU                                               00002430
              000315    PUTLGC NULL                                                       00002440
              000315           GNCOMP  PUTPRN       ALSO RETSORE                          00002450
END OF BINARY CARD CLEAR012
000324 000000 2350 12 000      LDA     0,2          CURRENCY IN ALL                       00002460
000325 000004 7550 14 000      STA     .LGCRN,4     LSEG DEFS FOR THIS SEG                00002470
```

```
000326  000001 0620 03  000    246          ADX2    1,DU                                                        00002480
000327  000315 7100 00  010    247          TRA     PUTLGC                                                      00002490
                000330         248 PUTPRN NULL                                                                  00002500
                000330         249          GNCHLD  EXIT             BACK UP IN THE                             00002510
                000337         250          GMPRNT  IMS HIERARCHY                                               00002520
OF BINARY CARD CLEAR013
000350  000312 7100 00  010    251          TRA     PUTCUR                                                      00002530
                000351         253 CLRUNQ NULL                                                                  00002550
                               254                                   ENTRY POINT FOR UNQUALIFIED CLEAR          00002560
                               255                                   X4 ON ENTRY IS POINTING TO THE             00002570
                               256                                   OBJECT SEGMENT DEFINITION                  00002580
000351  000440 7530 00  010    257          SREG    HLDREG                                                      00002590
000352  010003 2270 00  030    258          LDX7    PCBDFN           IS THIS SINGLE OR                          00002600
000353  000000 2350 17  000    259          LDA     .POSIT,7         MULTIPLE POSITIONING                       00002610
000354  000002 3750 03  000    260          ANA     =002,DU                                                     00002620
000355  000144 6010 00  010    261          TNZ     UNQMLT           MULTIPLE - HANDLE SEPARATELY               00002630
                               262                                   SINGLE -                                   00002640
000356  000225 7100 00  010    263          TRA     UNQNTR           GO TO THE UNQUALIFIED ENTRY POINT          00002650
                000357         265 EXIT   NULL                                                                  00002670
000357  000440 0730 00  010    266          LREG    HLDREG                                                      00002680
000360  000000 7100 11  000    267          TRA     0,1                                                         00002690
                               268                                                                              00002700
                               269                                                                              00002710
                               270                                                                              00002720
                000361         271 HOLDX4 BSS     1                  X4 SAVE AREA                               00002730
                000362         272 WRKLVL BSS     1                                                             00002740
                               273                                                                              00002750
                000363         274 ARRAY  BSS     45                                                            00002760
                               275                                                                              00002770
                               276                                                                              00002780
                000440         277          EIGHT                                                               00002790
                000440         278 HLDREG BSS     8                                                             00002800
                               280                                                                              00000010
                               281                                                                              00000020
                               282                  LAY-OUT OF THE IMS SEG DEFINITION TABLE ENTRY               00000030
                               283                                                                              00000040
                               284                                                                              00000050
                000000         285 .SGLEN SET     0                  SEGMENT LENGTH (DATA ONLY)                 00000060
                000000         286 .SQKEY SET     0                  ADDRESS OF THE SEQUENCE-KEY                00000070
                000003         287 .LGCHL SET     3                  POINTER TO FIRST LOGICAL COMPONENT         00000080
                000004         288 .SGQRD SET     4                  LOCATION OF IDS QRD POINTER                00000090
                000005         289 .LEVEL SET     5                  IMS LEVEL NUMBER                           00000100
                000005         290 .RCNUM SET     5                  IMS RECORD NUMBER                          00000110
                000006         291 .SGREA SET     6                  AREA FLAG WORD                             00000120
                000006         292 .INDEX SET     6                  INDEX ROUTINE ADDRESS                      00000130
                000007         293 .PERM  SET     7                  PERMISSION WORD (G,I,R,D,K,P)              00000140
                000010         294 .RULE  SET     8                  LOGICAL RULES  AND INSERT RULES            00000150
                000011         295 .PCHLD SET     9                  PC ADDR HOLD AREA                          00000160
                000012         296 .CURNT SET     10                 IDS CURRENCY FOR THIS SEGMENT              00000170
                000013         297 .SGNAM SET     11                 IMS SEGMENT NAME                           00000180
                               299                                                                              00000010
                               300                                                                              00000020
                               301                  LAY-OUT OF THE PCB DEFINITION TABLE ENTRY                   00000030
                               302                                                                              00000040
                               303                                                                              00000050
                000000         304 .POSIT SET     0                  MULTIPLE-POSITIONING FLAG                  00000060
                000000         305 .HOLD  SET     0                  IMS "HOLD" FLAG                            00000070
                000000         306 .STAT  SET     0                  IMS STATUS                                 00000080
                000002         307 .CRSEG SET     2                  SEG  ADDR OF SEGMENT LAST PROCESSED        00000090
                000002         308 .CRLVL SET     2                  LEVEL OF THE LAST SEGMENT PROCESSED        00000100
                000003         309 .CRPAR SET     3                  SEG ADDR OF PARENTAGE SEGMENT              00000110
                000003         310 .UNSAT SET     3                  "HIGHEST" UNSATISFIED SEGMENT              00000120
                000004         311 .CRIDS SET     4                  IDS REFERENCE CODE                         00000130
                000005         312 .SSTAB SET     5                  ADDRESS OF THE SSA  TABLE                  00000140
                000005         313 .QLTAB SET     5                  ADDRESS OF THE QUALIFICATION TABLE         00000150
                000006         314 .OLSSA SET     6                  OLD SSA COUNT FOR THIS PCB                 00000160
                000007         315 .PRSTA SET     7                  OLD STATUS FOR THIS PCB                    00000170
                               317                                                                              00000010
                               318                                                                              00000020
                               319                  LAY-OUT OF THE IMS LSEG DEFINITION TABLE ENTRY              00000030
                               320                                                                              00000040
                               321                                                                              00000050
                000000         322 .LSRTV SET     0                  RETRIEVAL-TYPE INDICATOR                   00000060
                000000         323 .LGCNT SET     0                  LOGICAL-CONTROL OWNER                      00000070
                000002         324 .LSTRT SET     2                  STARTING CHARACTER POSITION                00000080
                000004         325 .LGCRN SET     4                  CURRENCY FOR THIS COMPONENT                00000090
                               326                                   OF THE LOGICAL SEGMENT                     00000100
                               328                                                                              00000010
                               329                                                                              00000020
                               330                  LAY-OUT OF THE SSA TABLE                                    00000030
                               331                                                                              00000040
                               332                                                                              00000050
                000012         333 .SSSIZ SET     10                 TABLE SIZE                                 00000060
                000000         334 .SEGAD SET     0                  SEG DEFINITION ADDRESS                     00000070
                000000         335 .SUPLY SET     0                  FLAG FOR USER-SUPPLIED OR IMPLIED          00000080
                000001         336 .IOTAL SET     1                  I-O-AREA TALLY                             00000090
                000002         337 .UNIQE SET     2                  UNIQUENESS INDICATOR                       00000100
                000003         338 .EISWD SET     3                  EIS DESCRIPTOR WORD OF SEGMENT             00000110
                000004         339 .DCODE SET     4                  D COMMAND CODE (UPPER)                     00000120
                000004         340 .NCODE SET     4                  N COMMAND-CODE (LOWER)                     00000125
                000005         341 .FCODE SET     5                  F COMMAND CODE (UPPER)                     00000130
                000005         342 .LCODE SET     5                  L COMMAND CODE (LOWER)                     00000135
                000006         343 .UCODE SET     6                  U COMMAND CODE (UPPER)                     00000140
                000006         344 .VCODE SET     6                  V COMMAND CODE (LOWER)                     00000145
                000007         345 .PCODE SET     7                  P COMMAND CODE (UPPER)                     00000150
                000010         346 .QLCNT SET     8                  NUMBER OF QUALIFIERS                       00000160
                000011         347 .QLPTR SET     9                  INDEX OF FIRST ENTRY IN QUAL. TABLE        00000170
                000000         349          BLOCK   C05                                                         00000010
                000000         350 SSACNT BSS     1                  SSA COUNT IN CURRENT CALL                  00000020
                000001         351 SSATAB BSS     1                  ADDRESS OF THE CURRENT SSA TABLE           00000030
                000002         352 QALTAB BSS     1                  ADDRESS OF QUALIFICATION TABLE             00000040
```

```
000003        PCBDEN BSS   1          PCB DEFINITION ADDRESS                      000000
000004        QUALDX BSS   1          QUALIFICATION TABLE INDEX                   000000
000005        CURSSA BSS   1          ADDRESS OF CURRENT USER SSA                 000000
000006        FRSTLV BSS   1          FIRST USER-SUPPLIED LEVEL                   000000
000007        IOAREA BSS   1          ADDRESS OF USER'S I-O-AREA                  000000
000010        LSTSEG BSS   1          ADDRESS OF LAST ACCESSED SEG                000001
000011        CURREF BSS   1          REF. CODE OF LAST ACCESSED RECORD           000001
000012        PCBADR BSS   1          ADDRESS OF USER'S PCB                       000001
000013        PRNTSW BSS   1          SWITCH FOR IMS PARENT SETTING               000001
000014        PRSTAT BSS   1          STATUS OF PREVIOUS CALL                     000001
000015        FUNCDE BSS   1          IMS FUNCTION CODE                           000001
000016        OLDSSA BSS   1          OLD SSA COUNT (PREVIOUS CALL)               000001
000017        PRIRSW BSS   1          USE PRIOR DIRECTION SWITCH                  000001
000020        CCODEC BSS   1          COMMAND CODE "C" SWITCH                     000001
000021        USERIO BSS   1          ADDRESS OF USER'S I-O-AREA                  000001
000022        MVETAL BSS   1          TALLY WORD BUILD BY MVESEG WHEN NO SSA'S    000002
                                                                              0000021
                                                                              0000022
                                                                              0000023
                                                                              0000024
                                                                              0000025
000450               USE                                                      0000026

ERROR LINKAGE

 000450  000000000000    000
 000451  234351222527    000
END OF BINARY CARD CLEAR014
                     END                                                      0000287
```

FIX PCB STORAGE AREA

```
        LBL     FIXPCB                                   0000004
        TTL     FIX PCB STORAGE AREA                     0000005
                                                         0000005
                                                         0000006
                                                         0000007
                THIS ROUTINE MOVES VALUES TO             0000008
                THE PCB STORAGE AREA                     0000009
                                                         0000010
                AFTER FIXPCB EXECUTES, THE               0000011
                PCB DEFINITION CONTAINS ALL              0000012
                "CURRENT" INFORMATION INCLUDING*         0000013
                                                         0000014
                        1.  SEG DEF ADDRESS              0000015
                        2.  IMS LEVEL                    0000016
                        3.  I-D-S REF CODE               0000017
                                                         0000019
                                                         0000020
GNCHLD  MACRO                                            0000021
        LDX4    2,4                                      0000022
        LDA     0,4                                      0000023
        ANA     =0770000,DU                              0000024
        CMPA    =0510000,DU                              0000025
        TZE     #1                                       0000026
        CMPA    =0540000,DU                              0000027
        TNZ     DEFERR                                   0000028
        ENDM    GNCHLD                                   0000029
                                                         0000030
                                                         0000031
GMPRNT  MACRO                                            0000032
        LXL4    1,4                                      0000033
        LDA     0,4                                      0000034
        ANA     =0770000,DU                              0000035
        CMPA    =0510000,DU                              0000036
        TNZ     DEFERR                                   0000037
        ENDM    GMPRNT                                   0000038
                                                         0000039
                                                         0000040
GNCOMP  MACRO                                            0000041
        LDX4    3,4                                      0000042
        LDA     0,4                                      0000043
        ANA     =0770000,DU                              0000044
        CMPA    =0510000,DU                              0000045
        TZE     #1                                       0000046
        CMPA    =0560000,DU                              0000047
        TNZ     DEFERR                                   0000048
        ENDM    GNCOMP                                   0000049
                                                         0000050
                                                         0000051
GMMAKE  MACRO                                            0000052
        LXL4    1,4                                      0000053
        LDA     0,4                                      0000054
        ANA     =0770000,DU                              0000055
        CMPA    =0510000,DU                              0000056
        TNZ     DEFERR                                   0000057
        ENDM    GMMAKE                                   0000058
                                                         0000059
                                                         0000060
GHMAKE  MACRO                                            0000061
        LXL5    1,4                                      0000062
        LDA     0,4                                      0000063
        ANA     =0770000,DU                              0000064
        CMPA    =0510000,DU                              0000065
        TNZ     DEFERR                                   0000066
        ENDM    GHMAKE                                   0000067
        SYMDEF  FIXPCB                                   0000069
                                                         0000070
                                                         0000071
                                                         0000072
        SYMREF  .CCBUF                                   0000073
        SYMREF  .CCREC                                   0000074
```

```
                                    73          SYMREF  CCB                                                 00000750
                                    74          SYMREF  DEFERR                                              00000760
                                    75                                                                      00000770
                                    76                                                                      00000780
                                    77                                                                      00000790
                                    78                                                                      00000800
                        000000      79 FIXPCB   NULL                                                        00000810
000000  000220 7530 00  010         80          SREG    HLDREG                                              00000820
                                    81                                                                      00000830
000001  010003 2240 00  030         82          LDX4    PCBDFN                                              00000840
000002  010011 2350 00  030         83          LDA     CURREF                                              00000850
000003  000004 7550 14  000         84          STA     .CRIDS,4                                            00000860
000004  010010 2270 00  030         85          LDX7    LSTSEG                                              00000870
000005  000002 7470 14  000         86          STX7    .CRSEG,4                                            00000880
000006  000005 2200 17  000         87          LDX0    .LEVEL,7                                            00000890
000007  000002 4400 14  000         88          SXL0    .CRLVL,4                                            00000900
000010  000000 2200 03  000         89          LDX0    0,DL                                                00000910
000011  000000 4400 14  000         90          SXL0    .STAT,4                                             00000920
                                    91                                                                      00000930
                                    92                                                                      00000940
                                    93                                  MOVE KEY TO FEEDBACK AREA           00000950
                                    94                                                                      00000960
                                    95                                                                      00000970
000012  000000 7200 17  000         96          LXL0    .SQKEY,7        X0 = ADDR OF SEQ KEY DEF            00000980
000013  000046 6000 00  010         97          TZE     LGLFDB          CHECK LOGICAL IF NO SEQ KEY         00000990
000014  000002 2250 10  000         98          LDX5    .IDSFD,0        X5 = ADDR OF IDS FD                 00001000
000015  000000 2350 10  000         99          LDA     .FDLEN,0        XA = WORD CONTAINING KEY LENGTH     00001010
000016  000006 7350 00  000        100          ALS     6               JUSTIFY FOR TALLY USAGE             00001020
000017  000213 7510 06  010        101          STCA    FRMTAL,06       SET LENGTH OF MOVE                  00001030
000020  000214 7510 07  010        102          STCA    TOTALL,07                                           00001040
000021  000003 2360 10  000        103          LDQ     .FDPOS,0        QR = STARTING POS IN FEEDBACK       00001050
000022  007777 3760 03  000        104          ANQ     =O007777,DU     ISOLATE CHAR POS                    00001060
OF BINARY CARD FIXPCB02
000023  000022 7320 00  000        105          QRS     18                                                  00001070
000024  000006 5060 07  000        106          DIV     6,DL            CONVERT TO WORD AND CHAR            00001080
000025  000000 6260 06  000        107          EAX6    0,QL                                                00001090
000026  010012 0660 00  030        108          ADX6    PCBADR                                              00001100
000027  000010 6260 16  000        109          EAX6    .FDBCK,6        X6 = START ADDR OF FEEDBACK AREA    00001110
000030  000214 7460 00  010        110          STX6    TOTALL                                              00001120
000031  000214 7510 01  010        111          STCA    TOTALL,01       SET STARTING CHAR POS.              00001130
000032  000000 2360 15  000        112          LDQ     0,5             PICK UP CHAR POS IN RECORD          00001140
000033  007777 3760 07  000        113          ANQ     =O7777,DL       ISOLATE CHAR POS                    00001150
000034  050000 0760 00  030        114          ADQ     .QCREC          Q = CHAR POS OF FIELD IN BUFFER     00001160
000035  000006 5060 07  000        115          DIV     6,DL            BREAK UP INTO WORD AND CHAR         00001170
000036  000000 6260 06  000        116          EAX6    0,QL            X6 = WORD POS IN BUFFER             00001180
000037  040000 0660 00  030        117          ADX6    .QCBUF          X6 = WORD POS IN CORE               00001190
000040  000213 7460 00  010        118          STX6    FRMTAL          SET FROM TALLY WORD                 00001200
000041  000213 7510 01  010        119          STCA    FRMTAL,01       SET STARTING CHAR POS               00001210
                                   120                                                                      00001220
                                   121                                                                      00001230
000042  000213 2350 52  010        122          LDA     FRMTAL,SC       MOVE KEY FIELD                      00001240
000043  000214 7550 52  010        123          STA     TOTALL,SC       FROM DATABASE TO PCB                00001250
000044  000042 6070 00  010        124          TTF     *-2                                                 00001260
000045  000211 7100 00  010        125          TRA     EXIT                                                00001270
                                   127                                                                      00001290
                                   128                                                                      00001300
                                   129                                                                      00001310
                        000046     130 LGLFDB   NULL                    PROCESS FEED-BACK FOR LOGICAL SEGMENTS 00001320
OF BINARY CARD FIXPCB03
000046  000000 6240 17  000        131          EAX4    0,7             LET X4 = SEG DEF ADDR               00001330
000047  000010 2350 14  000        132          LDA     .RULE,4         EXIT IF TARGET                      00001340
000050  000007 3750 07  000        133          ANA     =O7,DL          SEGMENT IS PHYSICAL                 00001350
000051  000211 6000 00  010        134          TZE     EXIT                                                00001360
                                   135                                                                      00001370
000052  000215 4500 00  010        136          STZ     STRTLN          INITIALIZE START-LENGTH             00001380
000053  000216 7440 00  010        137          STX4    HOLDX4          SAVE X4                             00001390
                                   138                                                                      00001400
                        000054     139 BACKUP   NULL                    BACK UP IN THE STRUCTURE            00001410
                                   140                                  LOOKING FOR SEQ KEYS                00001420
                        000054     141          GNCHLD  PROCMP          IF SEG IS FOUND, GO PROCESS LGL CMPS 00001430
                        000063     142          GMPRNT                  X4 = ADDR PARENT SEG DEF            00001440
                                   143                                                                      00001450
000070  000000 7200 14  000        144          LXL0    .SQKEY,4        DOES THIS SEG HAVE A SEQUENCE KEY   00001460
OF BINARY CARD FIXPCB04
000071  000164 6000 00  010        145          TZE     PRNTLG          NO  - GO SEE IF IT IS LOGICAL       00001470
000072  000003 2350 10  000        146          LDA     .FDPOS,0        YES - PICK UP FEED-BACK POSITION    00001480
000073  000022 7310 00  000        147          ARS     18                                                  00001490
000074  000215 0550 00  010        148          ASA     STRTLN          STRT = STRT + FEED-BACK-POS         00001500
000075  000000 2350 10  000        149          LDA     .FDLEN,0        PICK UP KEY LENGTH                  00001503
000076  007777 3750 07  000        150          ANA     =O007777,DL                                         00001504
000077  000215 0550 00  010        151          ASA     STRTLN          STRT = STRT + FEED-BACK-LEN         00001505
                                   152                                                                      00001510
                        000100     153 PROCMP   NULL                    PROCESS LOGICAL COMPONENTS          00001520
000100  000216 2240 00  010        154          LDX4    HOLDX4          PICK UP ORIGINAL SEG DEF            00001530
                                   155                                                                      00001540
                        000101     156 GETCMP   NULL                    GET NEXT LOGICAL COMPONENT          00001550
                        000101     157          GNCOMP  EXIT            X4 = LSEG DEF ADDR                  00001555
000110  000000 6250 14  000        158          EAX5    0,4             SAVE X4 IN X5                       00001560
                        000111     159          GMMAKE                  X4 = SEG DEF ADDR OF LOGICAL COMPONENT 00001570
                                   161                                                                      00001590
                                   162                                                                      00001600
                                   163                                                                      00001610
000116  000000 7230 14  000        164          LXL3    .SQKEY,4        X3 = SEQ KEY ADDR                   00001620
000117  000161 6000 00  010        165          TZE     NXTCMP          IF NONE, GO CHECK NEXT COMPONENT    00001630
                                   166                                                                      00001640
000120  000004 2350 15  000        167          LDA     .LGCRN,5        PICK UP CURRENCY FFROM LSEG         00001650
000121  020000 1150 00  030        168          CMPA    CCB+DIRREF                                          00001660
000122  000127 6000 00  010        169          TZE     BLDTLY                                              00001670
000123  020000 7550 00  030        170          STA     CCB+DIRREF                                          00001680
000124  060000701000        030    171          CALL    .DGETD          RETRIEVE DIRECT                     00001690
000125  000127710000        010
000126  000230000253        010
                        000127     172 BLDTLY   NULL                                                        00001700
000127  000002 2220 13  000        173          LDX2    .IDSFD,3        X2 = IDS FIELD DEF ADDR             00001710
000130  000000 2350 13  000        174          LDA     .FDLEN,3        PICK UP KEY LENGTH                  00001720
```

```
000131  000006 7350 00  000   175          ALS      6              ALIGN FOR TALLY USE                      0000173
000132  000213 7510 06  010   176          STCA     FRMTAL,06      SET LENGTH OF MOVE                       0000174
000133  000214 7510 06  010   177          STCA     TOTALL,06      IN BOTH TALLIES                          0000175
                              178                                                                           0000176
000134  000215 2360 00  010   179          LDQ      STRTLN         PICK UP START CHAR IN KEY FEEDBACK AREA  0000177
000135  000006 5060 07  000   180          DIV      6,DL           CONVERT TO WORD & CHAR                   0000178
000136  000000 6260 06  000   181          EAX6     0,QL           X6 = WORD OFFSET                         0000179
END OF BINARY CARD FIXPCB06
000137  010012 0660 00  030   182          ADX6     PCBADR                                                  0000180
000140  000010 6260 16  000   183          EAX6     .FDBCK,6       X6 = WORD ADDR IN FEEDBACK AREA          0000181
000141  000214 7460 00  010   184          STX6     TOTALL                                                  0000182
000142  000214 7510 01  010   185          STCA     TOTALL,01      SET INITIAL CHAR POS                     0000183
                              186                                                                           0000184
000143  000000 2360 12  000   187          LDQ      0,2            PICK UP CHAR POS IN RECORD FOR SEQ FIELD 0000185
000144  007777 3760 07  000   188          ANQ      =07777,DL                                               0000186
000145  050000 0760 00  030   189          ADQ      .QCREC         QR = CHAR OFFSET IN BUFFER OF SEQ KEY    0000187
000146  000006 5060 07  000   190          DIV      6,DL           CONVERT TO WORD & CHAR                   0000188
000147  000000 6260 06  000   191          EAX6     0,QL           X6 = WORD OFFSET IN BUFFER               0000189
000150  040000 0660 00  030   192          ADX6     .QCBUF         X6 = WORD ADDR IN MEMROY                 0000190
000151  000213 7460 00  010   193          STX6     FRMTAL                                                  0000191
000152  000213 7510 01  010   194          STCA     FRMTAL,01      SET INITIAL CHAR POS                     0000192
                              195                                                                           0000193
000153  000000 2350 13  000   196          LDA      .FDLEN,3       ADJUST START LOCATION                    0000194
000154  007777 3750 07  000   197          ANA      =07777,DL      IN KEY FEEDBACK AREA                     0000195
000155  000215 0550 00  010   198          ASA      STRTLN                                                  0000196
                              199                                                                           0000197
000156  000213 2350 52  010   200          LDA      FRMTAL,SC      MOVE THE FIELD TO                        0000198
000157  000214 7550 52  010   201          STA      TOTALL,SC      THE FEED-BACK AREA                       0000199
000160  000156 6070 00  010   202          TTF      *-2                                                     0000200
                              203                                                                           0000201
                              204                                                                           0000202
                000161        205 NXTCMP   NULL                                                            0000203
000161  000000 6240 15  000   206          EAX4     0,5            RESET X4                                 0000204
OF BINARY CARD FIXPCB07
000162  000101 7100 00  010   207          TRA      GETCMP                                                  0000205
000163  000000 0000 00  000   209 AUTOX                                                                    0000207
                              210                                                                           0000208
                              211                                                                           0000209
                              212                                                                           0000210
                000164        213 PRNTLG   NULL                                                            0000211
000164  000010 2350 14  000   214          LDA      .RULE+4        IS THIS SEGMENT                          0000212
000165  000007 3750 07  000   215          ANA      =07,DL         LOGICAL                                  0000213
000166  000054 6000 00  010   216          TZE      BACKUP         NO - GO BACK UP IN THE STRUCTURE         0000214
                              217                                                                           0000215
                000167        218 GETSGS   NULL                    PICK UP LENGTHS FROM COMPONENTS          0000216
                000167        219          GNCOMP   BACKUP                                                  0000217
                000176        220          GNMAKE                  X5 = SEG DEF ADDR OF ONE COMPONENT       0000218
                              221                                                                           0000219
000203  000000 7200 15  000   222          LXLO     .SQKEY,5       DOES IT HAVE A SEQUENCE KEY              0000220
000204  000167 6000 00  010   223          TZE      GETSGS         NO  - GO TRY NEXT COMPONENT              0000221
                              224                                                                           0000222
END OF BINARY CARD FIXPCB08
000205  000000 2350 10  000   225          LDA      .FDLEN,0       PICK UP KEY LENGTH                       0000223
000206  007777 3750 07  000   226          ANA      =07777,DL                                               0000224
000207  000215 0550 00  010   227          ASA      STRTLN         ADD TO START CHAR IN FEED-BACK AREA      0000225
000210  000167 7100 00  010   228          TRA      GETSGS         GO TRY NEXT COMPONENT                    0000226
                000211        230 EXIT     NULL                                                            000022
000211  000220 0730 00  010   231          LREG     HLDREG                                                  000022
000212  000000 7100 11  000   232          TRA      0,1                                                     000023
                              233                                                                           000023
                              234                                                                           000023
                000213        235 FRMTAL   BSS      1              FROM TALLY WORD                          000023
                000214        236 TOTALL   BSS      1              TO TALLY WORD                            000023
                000215        237 STRTLN   BSS      1              START OF KEY FEED-BACK AREA              000023
                000216        238 HOLDX4   BSS      1              SAVE CELL FOR X4                         000023
                              239                                                                           000023
                              240                                                                           000023
                              241                                                                           000024
                000000        242 DIRREF   SET      0                                                       000024
                000005        243 ERRREF   SET      5                                                       000024
                              244                                                                           000024
                              245                                                                           000024
                              246
000217  000001710004    000
                000220        247          EIGHT                                                            000024
                000220        248 HLDREG   BSS      8                                                       000024
                              250                                                                           00000
                              251                                                                           00000
                              252          LAY-OUT OF THE PCB DEFINITION TABLE ENTRY                        00000
                              253                                                                           00000
                              254                                                                           00000
                000000        255 .POSIT   SET      0              MULTIPLE-POSITIONING FLAG                00000
                000000        256 .HOLD    SET      0              IMS "HOLD" FLAG                          00000
                000000        257 .STAT    SET      0              IMS STATUS                               00000
                000002        258 .CRSEG   SET      2              SEG  ADDR OF SEGMENT LAST PROCESSED      00000
                000002        259 .CRLVL   SET      2              LEVEL OF THE LAST SEGMENT PROCESSED      00000
                000003        260 .CRPAR   SET      3              SEG ADDR OF PARENTAGE SEGMENT            00000
                000003        261 .UNSAT   SET      3              "HIGHEST" UNSATISFIED SEGMENT            00000
                000004        262 .CRIDS   SET      4              IDS REFERENCE CODE                       00000
                000005        263 .SSTAB   SET      5              ADDRESS OF THE SSA  TABLE                00000
                000005        264 .QLTAB   SET      5              ADDRESS OF THE QUALIFICATION TABLE       00000
                000006        265 .OLSSA   SET      6              OLD SSA COUNT FOR THIS PCB               00000
                000007        266 .PRSTA   SET      7              OLD STATUS FOR THIS PCB                  00000
                              268                                                                           00000
                              269                                                                           00000
                              270          LAY-OUT OF USER'S PCB AREA                                       00000
                              271                                                                           00000
                              272                                                                           00000
                000010        273 .UPCSZ   SET      8              PCB AREA SIZE                            00000
                000000        274 .DBDNM   SET      0              DBD-NAME                                 00000
                000001        275 .SGLVL   SET      1              SEG.  LEVEL OF SEGMENT LAST  PROCESSED   00000
                000001        276 .USTAT   SET      1              IMS STATUS CODE                          00000
                000002        277 .PROPT   SET      2              PROCESSING OPTIONS                       00000
```

```
000003   278 .PCBAD SET    3          ADDRESS OF PCB DEF.                           00000110
000004   279 .PNAME SET    4          SEGMENT NAME OF SEGMENT LAST PROCESSED        00000120
000006   280 .LNKEY SET    6          LENGTH OF FEED-BACK KEY                       00000130
000007   281 .SNSEG SET    7          NUMBER OF SENSITIVE SEGMENTS                  00000140
000010   282 .FDBCK SET    8          START OF FEED-BACK AREA                       00000150
         284                                                                        00000010
         285                                                                        00000020
         286            LAY-OUT OF THE IMS SEG DEFINITION TABLE ENTRY               00000030
         287                                                                        00000040
         288                                                                        00000050
000000   289 .SGLEN SET    0          SEGMENT LENGTH (DATA ONLY)                    00000060
000000   290 .SOKEY SET    0          ADDRESS OF THE SEQUENCE-KEY                   00000070
000003   291 .LGCHL SET    3          POINTER TO FIRST LOGICAL COMPONENT            00000080
000004   292 .SGORD SET    4          LOCATION OF IDS ORD POINTER                   00000090
000005   293 .LEVEL SET    5          IMS LEVEL NUMBER                              00000100
000005   294 .RCNUM SET    5          IMS RECORD NUMBER                             00000110
000006   295 .SGREA SET    6          AREA FLAG WORD                                00000120
000006   296 .INDEX SET    6          INDEX ROUTINE ADDRESS                         00000130
000007   297 .PERM  SET    7          PERMISSION WORD (G,I,R,D,K,P)                 00000140
000010   298 .RULE  SET    8          LOGICAL RULES  AND INSERT RULES               00000150
000011   299 .PCHLD SET    9          PC ADDR HOLD AREA                             00000160
000012   300 .CURNT SET    10         IDS CURRENCY FOR THIS SEGMENT                 00000170
000013   301 .SGNAM SET    11         IMS SEGMENT NAME                              00000180
         303                                                                        00000010
         304                                                                        00000020
         305            LAY-OUT OF THE IMS LSEG DEFINITION TABLE ENTRY              00000030
         306                                                                        00000040
         307                                                                        00000050
000000   308 .LSRTV SET    0          RETRIEVAL-TYPE INDICATOR                      00000060
000000   309 .LGCNT SET    0          LOGICAL-CONTROL OWNER                         00000070
000002   310 .LSTRT SET    2          STARTING CHARACTER POSITION                   00000080
000004   311 .LGCRN SET    4          CURRENCY FOR THIS COMPONENT                   00000090
         312                          OF THE LOGICAL SEGMENT                        00000100
         314                                                                        00000010
         315                                                                        00000020
         316            LAY-OUT OF THE IMS KEY DEFINITION ENTRY                     00000030
         317                                                                        00000040
         318                                                                        00000050
000000   319 .FDTYP SET    0          CODED FIELD TYPE                              00000060
000000   320 .SEQCD SET    0          CODE SEQUENCE CODE                            00000070
000000   321 .FDLEN SET    0          FIELD LENGTH                                  00000080
000001   322 .FDSTR SET    1          STARTING CHARACTER                            00000090
000002   323 .IDSFD SET    2          ADDRESS OF THE IDS FIELD DEFINITION           00000100
000003   324 .FDPOS SET    3          STARTING POSITION IN FEEDBACK AREA            00000110
000004   325 .FDNAM SET    4          IMS FIELD NAME                                00000120
000000   327       BLOCK   C05                                                      00000010
000000   328 SSACNT BSS    1          SSA COUNT IN CURRENT CALL                     00000020
000001   329 SSATAB BSS    1          ADDRESS OF THE CURRENT SSA TABLE              00000030
000002   330 QALTAB BSS    1          ADDRESS OF QUALIFICATION TABLE                00000040
000003   331 PCBDFN BSS    1          PCB DEFINITION ADDRESS                        00000050
000004   332 QUALDX BSS    1          QUALIFICATION TABLE INDEX                     00000060
000005   333 CURSSA BSS    1          ADDRESS OF CURRENT USER SSA                   00000070
000006   334 FRSTLV BSS    1          FIRST USER-SUPPLIED LEVEL                     00000080
000007   335 IOAREA BSS    1          ADDRESS OF USER'S I-O-AREA                    00000090
000010   336 LSTSEG BSS    1          ADDRESS OF LAST ACCESSED SEG                  00000100
000011   337 CURREF BSS    1          REF. CODE OF LAST ACCESSED RECORD             00000110
000012   338 PCBADR BSS    1          ADDRESS OF USER'S PCB                         00000120
000013   339 PRNTSW BSS    1          SWITCH FOR IMS PARENT SETTING                 00000130
000014   340 PRSTAT BSS    1          STATUS OF PREVIOUS CALL                       00000140
000015   341 FUNCDE BSS    1          IMS FUNCTION CODE                             00000150
000016   342 OLDSSA BSS    1          OLD SSA COUNT (PREVIOUS CALL)                 00000160
000017   343 PRIRSW BSS    1          USE PRIOR DIRECTION SWITCH                    00000170
000020   344 CCODEC BSS    1          COMMAND CODE "C" SWITCH                       00000180
000021   345 USERIO BSS    1          ADDRESS OF USER'S I-O-AREA                    00000190
000022   346 MVETAL BSS    1          TALLY WORD BUILD BY MVESEG WHEN NO SSA'S      00000200
         347                                                                        00000210
         348                                                                        00000220
         349                                                                        00000230
         350                                                                        00000240
         351                                                                        00000250
000230   352       USE                                                              00000260
ERROR LINKAGE

 000230  000000000000     000
 000231  263167472322     000
 OF BINARY CARD FIXPCB09
         353       END                                                              00002540
```

FIND A ROOT RECORD QUALIFIED

```
 1      LBL     FNDRT                                                00000040
 2      TTL     FIND A ROOT RECORD QUALIFIED                         00000050
 3                                                                   00000060
 4                                                                   00000070
 5                                                                   00000080
 6                                                                   00000090
 7                                                                   00000100
 8              THIS ROUTINE FINDS A ROOT RECORD WHEN                00000110
 9              IT IS QUALIFIED, BUT NOT UNIQUELY                    00000120
10                                                                   00000130
11              (I.E. WHEN IT IS NOT "SEQUENCE-KEY EQUAL             00000140
12              VALUE" IN THE SSA)                                   00000150
13                                                                   00000160
14                                                                   00000170
15              ON INPUT, X3 WILL CONTAIN THE ADDRESS                00000180
16              OF THE SSA TABLE                                     00000190
17                                                                   00000200
18              FNDRT OPERATES BY -                                  00000210
19                                                                   00000220
```

```
                                     1.  CALLING ROOTNX TO FIND THE NEXT ROOT RECORD      00000230
                                     2.  THEN CALLING .QGCUR TO SEE IF THE SEARCH         00000240
                                        CRITERIA WERE SATISFIED                           00000250
                                                                                          00000260
                                     3.  REPEATING 1 AND 2 UNTIL A SEGMENT IS FOUND       00000270
                                        OR THE "END" OF THE DATABASE IS REACHED           00000280
                                                                                          00000300
                                                                                          00000310
                                                                                          00000320
                             SYMDEF  FNDRT                                                00000330
                                                                                          00000340
                                                                                          00000350
                             SYMREF  DEFERR                                               00000360
                             SYMREF  CCB                                                  00000370
                                                                                          00000380
                                                                                          00000390
                                                                                          00000400
              000000   FNDRT NULL                                                         00000410
000000  000030 7530 00  010  SREG    HLDREG                                               00000420
                                                                                          00000430
                                                                                          00000440
000001  000000 2240 13  000  LDX4    .SEGAD,3       X4 = SEG DEF ADDR OF ROOT             00000450
                                                                                          00000460
              000002  GETRUT NULL                                                         00000470
000002  040000701000    030  CALL    ROOTNX         GET THE "NEXT" ROOT                   00000480
000003  000005710000    010
000004  000040000055    010
                                                                                          00000490
000005  010005 2350 00  030  LDA     CCB+ERRREF     EXIT ON ERROR                         00000500
000006  000017 6010 00  010  TNZ     EXIT                                                 00000510
                                                                                          00000520
000007  010000 2350 00  030  LDA     CCB+DIRREF     PUT NEW REF-CODE IN                   00000530
000010  000012 7550 14  000  STA     .CURNT,4       CURRENCY SLOT IN SEG DEF              00000540
                                                                                          00000550
000011  030000701000    030  CALL    .QGCUR         CHECK CURRENT FOR SATISFACTION        00000560
000012  000014710000    010
000013  000040000065    010
                                                    OF SEARCH CRITERIA                    00000570
                                                                                          00000580
000014  010005 2350 00  030  LDA     CCB+ERRREF                                           00000590
000015  000017 6000 00  010  TZE     EXIT           EXIT IF OK                            00000600
000016  000002 7100 00  010  TRA     GETRUT         ELSE GO TRY NEXT ROOT                 00000610
                                                                                          00000620
                                                                                          00000630
                                                                                          00000640
              000017   EXIT  NULL                                                         00000650
000017  000030 0730 00  010  LREG    HLDREG                                               00000660
000020  000000 7100 11  000  TRA     0,1                                                  00000670
                                                                                          00000680
                                                                                          00000690
                                                                                          00000700
              000000  DIRREF SET     0                                                    00000710
              000005  ERRREF SET     5                                                    00000720
                                                                                          00000730
                                                                                          00000740
                                                                                          00000750
000021  000007710004    000
              000030         EIGHT                                                        00000760

              000030  HLDREG BSS     8                                                    00000770
```

FIND-UNIQUE

```
                             LBL     FNDUNQ                                               00000040
                             TTL     FIND-UNIQUE                                          00000050
                                                                                          00000055
                                                                                          00000060
                                                                                          00000070
                                     FIND-UNIQUE IS THE MAIN WORK                         00000080
                                     ROUTINE FOR A GU CALL                                00000090
                                                                                          00000100
                                     ARG -                                                00000110
                                                                                          00000120
                                       /. STARTING-LEVEL - LEVEL AT WHICH TO DO           00000130
                                                     FIRST RETRIEVAL                      00000140
                                                                                          00000150
                                                                                          00000160
                                     FIND-UNIQUE CALLS SATGU TO SATISFY AN INDIVIDUAL     00000170
                                     SSA LEVEL AND THEN GOES UP OR DOWN IN THE            00000180
                                     HIERARCHY DEPENDING UPON SUCCESS OR FAILURE IN       00000190
                                     SATGU                                                00000200
                                                                                          00000210
                                     IN ADDITION, FIND-UNIQUE WILL MAKE SURE THAT         00000220
                                     THE PCB AND I-O-AREA ARE "CURRENT"                   00000230
                                                                                          00000240
                                                                                          00000250
                             SYMDEF  FNDUNQ                                               00000260
              000000  FNDUNQ NULL                                                         00000280
000000  000120 7530 00  010  SREG    HLDREG                                               00000290
000001  010003 2270 00  030  LDX7    PCBDFN         X7 = PCB DEF ADDR                     00000300
000002  000002 2350 31  000  LDA     2,1*                                                 00000310
000003  000110 7550 00  010  STA     WRKLVL                                               00000320
000004  000111 7550 00  010  STA     ORGLVL         SET STARTING LEVEL                    00000330
000005  000003 2350 31  000  LDA     3,1*       SET OBJECT LEVEL                          00000340
000006  000114 7550 00  010  STA     OBJLVL                                               00000350
000007  040000701000    030  CALL    CLRBEG(ORGLVL) CLEAR CURRENCY                        00000360
000010  000013710000    010
000011  000130000042    010
000012  000111000000    010
```

```
                                                                                                  00000370
000013  000110 2360 00  010              LDQ     WRKLVL          COMPUTE SSA-TABLE ADDRESS        00000380
000014  000001 1760 07  000              SBQ     1,DL                                             00000390
000015  000012 4020 07  000              MPY     .SSSIZ,DL                                        00000400
000016  000000 6230 06  000              EAX3    0,QL                                             00000410
000017  010001 0630 00  030              ADX3    SSATAB          X3 = ADDR(SSA-TABLE(WRKLVL))     00000420
                                                                                                  00000430
000020  000112 4500 00  010              STZ     VALID                                            00000440
                  000021        CLSAT    NULL                                                     00000450
000021  000000 2240 13  000              LDX4    .SEGAD,3        X4 = DESIRED SEG DEF ADDR        00000460
000022  000003 4440 17  000              SXL4    .UNSAT,7        STORE IN HIGHEST "UNSATISFIED"   00000470
) OF BINARY CARD FNDUNQ02
000023  030000701000    030              CALL    SATGU(WRKLVL,VALID)                              00000480
000024  000030710000    010
000025  000130000056    010
000026  000110000000    010
000027  000112000000    010
                                                                 ATTEMPT TO SATISFY ITH SSA       00000490
000030  000112 2350 00  010              LDA     VALID           GO TO BACK-UP IF IT FAILED       00000500
000031  000044 6010 00  010              TNZ     BACKUP                                           00000510
                                                                                                  00000520
000032  050000701000    030              CALL    FIXPCB(WRKLVL)   FIX PCB AREA                    00000530
000033  000036710000    010
000034  000130000063    010
000035  000110000000    010
                                                                                                  00000540
                                                                                                  00000550
000036  000012 0630 03  000              ADX3    .SSSIZ,DU       X3 = ADDR(SSA-TABLE(WRKLVL+1))   00000560
000037  000110 0540 00  010              AOS     WRKLVL          INCREMENT SSA COUNT              00000570
000040  000114 2350 00  010              LDA     OBJLVL          IS IT GREATER THAN               00000580
000041  000110 1150 00  010              CMPA    WRKLVL          THE NUMBER OF SSA'S IN THE CALL  00000590
000042  000075 6040 00  010              TMI     SEGFND          YES - THEN WE HAVE A HIT, AND CAN EXIT 00000600
000043  000021 7100 00  010              TRA     CLSAT           NO  - THEN TRY TO SATISFY THE NEXT ONE 00000610
                                                                                                  00000620
                                                                                                  00000630
                  000044        BACKUP   NULL                                                     00000640
000044  000110 2360 00  010              LDQ     WRKLVL          DECREMENT SSA COUNT              00000650
000045  000001 1760 07  000              SBQ     1,DL            IF SSA-INDEX <= ZERO             00000660
) OF BINARY CARD FNDUNQ03
000046  000063 6000 00  010              TZE     NOTFND                                           00000670
000047  000063 6040 00  010              TMI     NOTFND          GO TO NOT-FOUND                  00000680
000050  000110 7560 00  010              STQ     WRKLVL          REPLACE WORK-LEVEL               00000690
                                                                                                  00000700
000051  000001 1760 07  000              SBQ     1,DL                                             00000710
000052  000012 4020 07  000              MPY     .SSSIZ,DL       PICK UP UNIQUENESS INDICATOR     00000720
000053  000000 6230 06  000              EAX3    0,QL            FOR THIS SSA -                   00000730
000054  010001 0630 00  030              ADX3    SSATAB                                           00000740
000055  000002 2350 13  000              LDA     .UNIQE,3        IF IT IS ON, THEN GO TO NOT-FOUND 00000750
000056  000063 6010 00  010              TNZ     NOTFND                                           00000760
000057  000012 0630 03  000              ADX3    .SSSIZ,DU       X3 = ADDR(PREVIOUS SSA TABLE)    00000770
000060  000000 2240 13  000              LDX4    .SEGAD,3        X4 = SEG DEF ADDR                00000780
000061  000012 4500 14  000              STZ     .CURNT,4        ZERO OUT CURRENCY IN PREVIOUS SEG 00000790
000062  000021 7100 00  010              TRA     CLSAT           ELSE GO BACK AND ATTEMPT TO      00000800
                                                                 SATISFY THIS SSA                 00000810
                  000063        NOTFND   NULL                                                     00000830
000063  020000701000    030              CALL    CCODE(WRKLVL)   PROCESS COMMAND CODES "D" & "P"  00000840
000064  000067710000    010
000065  000130000122    010
000066  000110000000    010
000067  070000701000    030              CALL    RETERR(GESTAT,WRKLVL) - ERROR - STATUS GE        00000850
000070  000074710000    010
) OF BINARY CARD FNDUNQ04
000071  000130000123    010
000072  000113000000    010
000073  000110000000    010
                                                                                                  00000860
000074  000106 7100 00  010              TRA     EXIT                                             00000870
                                                                                                  00000880
                                                                                                  00000890
                                                                                                  00000900
                                                                                                  00000910
                  000075        SEGFND   NULL                                                     00000920
000075  020000701000    030              CALL    CCODE(SSACNT)   PROCESS COMMAND CODES "D" & "P"  00000930
000076  000101710000    010
000077  000130000133    010
000100  010000000000    030
000101  060000701000    030              CALL    MVESEG(SSACNT)  MOVE SEGMENT TO I-O-AREA         00000940
000102  000105710000    010
000103  000130000134    010
000104  010000000000    030
                                                                                                  00000950
                                                                                                  00000960
                                                                                                  00000970
                                                                                                  00000980
                                                                                                  00000990
000105  000106 7100 00  010              TRA     EXIT                                             00001000
                                                                                                  00001010
                                                                                                  00001020
                                                                                                  00001030
                                                                                                  00001040
                  000106        EXIT     NULL                                                     00001050
000106  000120 0730 00  010              LREG    HLDREG                                           00001060
000107  000000 7100 11  000              TRA     0,1                                              00001070
                  000110        WRKLVL   BSS     1               SSA LEVEL VARIABLE               00001090
                  000111        ORGLVL   BSS     1               STARTING LEVEL                   00001100
000112  000000000000    000     VALID    OCT     0               VALIDITY SWITCH                  00001110
000113  272520202020    000     GESTAT   BCI     1,GE            ERROR SETTING FOR NOT FOUND      00001120
                  000114        OBJLVL   BSS     1               OBJECT LEVEL NUMBER              00001130
                                                                                                  00001140
                                                                                                  00001150
                                                                                                  00001160
) OF BINARY CARD FNDUNQ05
```

```
000115  000003710604    000
        000120          115         EIGHT
        000120          116 HLDREG BSS     8

                        118
                        119
                        120                LAY-OUT OF THE SSA TABLE
                        121
                        122
        000012          123 .SSSIZ SET     10           TABLE SIZE
        000000          124 .SEGAD SET     0            SEG DEFINITION ADDRESS
        000000          125 .SUPLY SET     0            FLAG FOR USER-SUPPLIED OR IMPLIED
        000001          126 .IOTAL SET     1            I-O-AREA TALLY
        000002          127 .UNIQE SET     2            UNIQUENESS INDICATOR
        000003          128 .EISWD SET     3            EIS DESCRIPTOR WORD OF SEGMENT
        000004          129 .DCODE SET     4            D COMMAND CODE (UPPER)
        000004          130 .NCODE SET     4            N COMMAND-CODE (LOWER)
        000005          131 .FCODE SET     5            F COMMAND CODE (UPPER)
        000005          132 .LCODE SET     5            L COMMAND CODE (LOWER)
        000006          133 .UCODE SET     6            U COMMAND CODE (UPPER)
        000006          134 .VCODE SET     6            V COMMAND CODE (LOWER)
        000007          135 .PCODE SET     7            P COMMAND CODE (UPPER)
        000010          136 .QLGNT SET     8            NUMBER OF QUALIFIERS
        000011          137 .QLPTR SET     9            INDEX OF FIRST ENTRY IN QUAL. TABLE

                        139
                        140
                        141                LAY-OUT OF THE PCB DEFINITION TABLE ENTRY
                        142
                        143
        000000          144 .POSIT SET     0            MULTIPLE-POSITIONING FLAG
        000000          145 .HOLD  SET     0            IMS "HOLD" FLAG
        000000          146 .STAT  SET     0            IMS STATUS
        000002          147 .CRSEG SET     2            SEG  ADDR OF SEGMENT LAST PROCESSED
        000002          148 .CRLVL SET     2            LEVEL OF THE LAST SEGMENT PROCESSED
        000003          149 .CRPAR SET     3            SEG ADDR OF PARENTAGE SEGMENT
        000003          150 .UNSAT SET     3            "HIGHEST" UNSATISFIED SEGMENT
        000004          151 .CRIDS SET     4            IDS REFERENCE CODE
        000005          152 .SSTAB SET     5            ADDRESS OF THE SSA  TABLE
        000005          153 .QLTAB SET     5            ADDRESS OF THE QUALIFICATION TABLE
        000006          154 .OLSSA SET     6            OLD SSA COUNT FOR THIS PCB
        000007          155 .PRSTA SET     7            OLD STATUS FOR THIS PCB
                        157
                        158
                        159                LAY-OUT OF THE IMS SEG DEFINITION TABLE ENTRY
                        160
                        161
        000000          162 .SGLEN SET     0            SEGMENT LENGTH (DATA ONLY)
        000000          163 .SQKEY SET     0            ADDRESS OF THE SEQUENCE-KEY
        000003          164 .LGCHL SET     3            POINTER TO FIRST LOGICAL COMPONENT
        000004          165 .SGORD SET     4            LOCATION OF IDS ORD POINTER
        000005          166 .LEVEL SET     5            IMS LEVEL NUMBER
        000005          167 .RCNUM SET     5            IMS RECORD NUMBER
        000006          168 .SGREA SET     6            AREA FLAG WORD
        000006          169 .INDEX SET     6            INDEX ROUTINE ADDRESS
        000007          170 .PERM  SET     7            PERMISSION WORD (G,I,R,D,K,P)
        000010          171 .RULE  SET     8            LOGICAL RULES  AND INSERT RULES
        000011          172 .PCHLD SET     9            PC ADDR HOLD AREA
        000012          173 .CURNT SET     10           IDS CURRENCY FOR THIS SEGMENT
        000013          174 .SGNAM SET     11           IMS SEGMENT NAME
        000000          176        BLOCK   C05
        000000          177 SSACNT BSS     1            SSA COUNT IN CURRENT CALL
        000001          178 SSATAB BSS     1            ADDRESS OF THE CURRENT SSA TABLE
        000002          179 QALTAB BSS     1            ADDRESS OF QUALIFICATION TABLE
        000003          180 PCBDFN BSS     1            PCB DEFINITION ADDRESS
        000004          181 QUALDX BSS     1            QUALIFICATION TABLE INDEX
        000005          182 CURSSA BSS     1            ADDRESS OF CURRENT USER SSA
        000006          183 FRSTLV BSS     1            FIRST USER-SUPPLIED LEVEL
        000007          184 IOAREA BSS     1            ADDRESS OF USER'S I-O-AREA
        000010          185 LSTSEG BSS     1            ADDRESS OF LAST ACCESSED SEG
        000011          186 CURREF BSS     1            REF. CODE OF LAST ACCESSED RECORD
        000012          187 PCBADR BSS     1            ADDRESS OF USER'S PCB
        000013          188 PRNTSW BSS     1            SWITCH FOR IMS PARENT SETTING
        000014          189 PRSTAT BSS     1            STATUS OF PREVIOUS CALL
        000015          190 FUNCDE BSS     1            IMS FUNCTION CODE
        000016          191 OLDSSA BSS     1            OLD SSA COUNT (PREVIOUS CALL)
        000017          192 PRIRSW BSS     1            USE PRIOR DIRECTION SWITCH
        000020          193 CCODEC BSS     1            COMMAND CODE "C" SWITCH
        000021          194 USERIO BSS     1            ADDRESS OF USER'S I-O-AREA
        000022          195 MVETAL BSS     1            TALLY WORD BUILD BY MVESEG WHEN NO SSA'S
                        196
                        197
                        198
                        199
                        200
        000130          201        USE

ERROR LINKAGE

  000130  000000000000    000
  000131  264524644550    000
END OF BINARY CARD FNDUN006
                        202        END


GET MASTER OF SEGMENT

                        1          LBL     GETMST
                        2          TTL     GET MASTER OF SEGMENT
                        3
                        4
                        5
```

```
                                                    THIS ROUTINE IS USED TO ESTABLISH                       00000080
                                                    THE PARENT SEGMENT OF THE ARGUMENT                      00000090
                                                    SEGMENT AS THE CURRNT I-D-S RECORD                      00000100
                                                                                                            00000110
                                                    NO ARGUMENTS, BUT                                       00000120
                                                                                                            00000130
                                                    ON ENTRY,                                               00000140
                                                    X4 = ADDRESS OF ARGUMENT SEG DEF                        00000150
                                                                                                            00000160
                                                    THE SUBROUTINE PICKS UP THE REFERENCE CODE              00000170
                                                    OF THE PARENT FROM EITHER THE SEG DEF OF THE            00000180
                                                    PARENT OR THE APPROPRIATE LSEG IF THE                   00000190
                                                    PARENT IS A LOGICAL SEGMENT                             00000200
                                     SYMDEF  GETMST                                                         00000220
                                                                                                            00000230
                                                                                                            00000240
                                     SYMREF  CCB                                                            00000250
                                     SYMREF  DEFERR                                                         00000260
                                                                                                            00000270
                                                                                                            00000280
                              GNCHLD MACRO                                                                  00000290
                                     LDX4    2,4                                                            00000300
                                     LDA     0,4                                                            00000310
                                     ANA     =0770000,DU                                                    00000320
                                     CMPA    =0510000,DU                                                    00000330
                                     TZE     #1                                                             00000340
                                     CMPA    =0540000,DU                                                    00000350
                                     TNZ     DEFERR                                                         00000360
                                     ENDM    GNCHLD                                                         00000370
                                                                                                            00000380
                                                                                                            00000390
                              GMPAR  MACRO                                                                  00000400
                                     LXL4    1,4                                                            00000410
                                     LDA     0,4                                                            00000420
                                     ANA     =0770000,DU                                                    00000430
                                     CMPA    =0510000,DU                                                    00000440
                                     TNZ     DEFERR                                                         00000450
                                     ENDM    GMPAR                                                          00000460
                                                                                                            00000470
                                                                                                            00000480
                              GMMAKE MACRO                                                                  00000490
                                     LXL4    1,4                                                            00000500
                                     LDA     0,4                                                            00000510
                                     ANA     =0770000,DU                                                    00000520
                                     CMPA    =0510000,DU                                                    00000530
                                     TNZ     DEFERR                                                         00000540
                                     ENDM    GMMAKE                                                         00000550
                 000000       GETMST NULL                                                                   00000570
000000  000130 7530 00  010          SREG    HLDREG                                                         00000580
000001  010005 4500 00  030          STZ     CCB+ERRREF                                                     00000590
000002  000012 2350 14  000          LDA     .CURNT,4          IF THERE IS A CURRENT,                       00000600
000003  000065 6040 00  010          TMI     USEPRI            IF HIGH-ORDER BIT IS ON,                     00000610
                                                               HANDLE SEPARATELY (INDICATES THAT THE        00000620
                                                               LAST REFERENCE TO THIS SEGMENT TYPE          00000630
                                                               WAS A DELETE)                                00000640
                                                                                                            00000650
000004  000042 6010 00  010          TNZ     DIRECT            USE IT AND DON'T FETCH MASTER                00000660
                 000005              GNCHLD  DEFERR            GET THE CHILD DEFINITION (P-C)               00000670
                                                               OF THE CURRENT SEGMENT                       00000680
000014  000003 2250 14  000          LDX5    .PCLSG,4          PICK UP LSEG ADDRESS, IF ANY                 00000690
000015  000030 6010 00  010          TNZ     PRNTLG            IF THE VALUE IS ZERO THE PARENT              00000700
                                                               IS PHYSICAL                                  00000710
                                                                                                            00000720
                 000016              GMPAR                     GET THE SEG DEF OF THE PARENT                00000730
                                                               SEGMENT                                      00000740
                                                               X5 = ADDR (SEG DEF)                          00000750
OF BINARY CARD GETMST02
000023  000012 2350 14  000          LDA     .CURNT,4          PICK UP CURRENCY FROM SEG DEF                00000760
000024  000042 6050 00  010          TPL     DIRECT            CONTINUE NORMALLY IFF HIGH-ORDER BIT OFF     00000770
000025  400000 6750 03  000          ERA     =0400000,DU       TURN OFF THE HIGH-ORDER BIT                  00000780
000026  000012 7550 14  000          STA     .CURNT,4          RESTORE CURRENCY                             00000790
000027  000042 7100 00  010          TRA     DIRECT                                                         00000800
                                                                                                            00000810
                                                                                                            00000820
                 000030       PRNTLG NULL                                                                   00000830
000030  000000 6240 15  000          EAX4    0,5                                                            00000840
                 000031              GMMAKE                    MAKE SURE X4 POINTS TO A SEG DEF             00000850
000036  000004 2350 15  000          LDA     .LGCRN,5          PICK UP CURRENCY FROM LSEG DEF               00000860
000037  000042 6050 00  010          TPL     DIRECT            CONTINUE NORMALLY IF HIGH-ORDER BIT OFF      00000870
000040  400000 6750 03  000          ERA     =0400000,DU       TURN OFF THE HIGH-ORDER BIT                  00000880
000041  000004 7550 14  000          STA     .LGCRN,4          RESTORE CURRENCY                             00000890
                                                                                                            00000900
                 000042       DIRECT NULL                                                                   00000910
000042  000121 6000 00  010          TZE     R99ERR            ERROR IF REF-CODE = ZERO                     00000920
000043  010000 1150 00  030          CMPA    CCB+DIRREF        DON'T BOTHER IF                              00000930
000044  000051 6000 00  010          TZE     UPDCHN            IT IS ALREADY CURRENT                        00000940
000045  010000 7550 00  030          STA     CCB+DIRREF                                                     00000950
OF BINARY CARD GETMST03
000046  040000701000    030          CALL    .QGETD            ESTABLISH I-D-S CURRENCY                     00000960
000047  000051710000    010
000050  000140000136    010
                 000051       UPDCHN NULL                      ALWAYS UPDATE AREA TABLES                    00000970
000051  050000701000    030          CALL    UPDATE            UPDATE AREA CHAIN TABLES                     00000980
000052  000054710000    010
000053  000140000140    010
                                                               RETRIEVE DIRECT                              00000990
000054  000123 7100 00  010          TRA     EXIT                                                           00001000
                 000055       USEPRI NULL                      MAKE THE PRIOR RECORD CURRRENT               00001020
000055  400000 6750 03  000          ERA     =0400000,DU       TURN OFF HIGH-ORDER BIT                      00001030
000056  000012 7550 14  000          STA     .CURNT,4          RESET CURRENCY                               00001040
000057  010000 1150 00  030          CMPA    CCB+DIRREF        IS CURRENT THE SAME AS DIRECT-REF            00001050
000060  000072 6000 00  010          TZE     GETPRI            YES - SKIP .QGETD CALL                       00001060
000061  010000 7550 00  030          STA     CCB+DIRREF                                                     00001070
```

```
   000062  040000701000    030   106          CALL     .OGETD          RETRIEVE CURRENT                     0000108
   000063  000065710000    010
   000064  000140000152    010
   000065  010005 2350 00  030   107          LDA      CCB+ERRREF      EXIT ON ERROR                        0000109
   000066  000123 6000 00  010   108          TZE      EXIT                                                 0000110
   000067  050000701000    030   109          CALL     UPDATE          UPDATE ALL CHAIN TABLES              0000111
   000070  000072710000    010
END OF BINARY CARD GETMST04
   000071  000140000155    010
                  000072         110 GETPRI NULL                                                          0000112
   000072  000000 6260 14  000   111          EAX6     0,4             X6 = X4                              0000113
                  000073         112          GNCHLD   DEFERR          X4 = P-C ADDR                        0000114
   000102  000000 7220 14  000   113          LXL2     .DEPND,4        X2 = MO ADDR                         0000115
                                 114                                                                      0000116
   000103  000107 7420 00  010   115          STX2     CLCHNP+3        SET UP PRIOR CALL                    0000117
                  000104         116 CLCHNP NULL                                                          0000118
   000104  020000701000    030   117          CALL     CHNPRO(**+2)    RETRIEVE PRIOR OF CHAIN              0000119
   000105  000111710000    010
   000106  000140000165    010
   000107  000000000000    000
   000110  000002000000    000
   000111  010005 2350 00  030   118          LDA      CCB+ERRREF      EXIT ON ERROR                        0000120
   000112  000123 6010 00  010   119          TNZ      EXIT                                                 0000121
   000113  010000 2350 00  030   120          LDA      CCB+DIRREF                                           0000122
END OF BINARY CARD GETMST05
   000114  000012 7550 16  000   121          STA      .CURNT,6        RESET CURRENCY IN SEG DEF            0000123
   000115  050000701000    030   122          CALL     UPDATE          UPDATE CHAIN TABLES                  0000124
   000116  000120710000    010
   000117  000140000172    010
   000120  000123 7100 00  010   123          TRA      EXIT                                                 0000125

                  000121         125 R99ERR NULL                                                          0000127
   000121  511111 2350 07  000   126          LDA      =3HR99,DL       SET-I-D-S ERROR                      0000128
   000122  010005 7550 00  030   127          STA      CCB+ERRREF      TO R99                               0000129
                                 128                                                                      0000130
                                 129                                                                      0000131
                                 130                                                                      0000132
                  000123         131 EXIT   NULL                                                          0000133
   000123  000130 0730 00  010   132          LREG     HLDREG          RESTORE REGISTERS                    0000134
   000124  000000 7100 11  000   133          TRA      0,1             RETURN                               0000135


                  000000         135 DIRREF SET      0                                                    0000137
                  000005         136 ERRREF SET      5                                                    0000138
                                 137                                                                      0000139
                                 138                                                                      0000140
   000125  000003710004    000
                  000130         139          EIGHT                                                       0000141
                  000130         140 HLDREG BSS      8                                                    0000142
                                 142                                                                      0000001
                                 143                                                                      0000002
                                 144                   LAY-OUT OF THE IMS SEG DEFINITION TABLE ENTRY      0000003
                                 145                                                                      0000004
                                 146                                                                      0000005
                  000000         147 .SGLEN SET      0               SEGMENT LENGTH (DATA ONLY)           0000006
                  000000         148 .SGKEY SET      0               ADDRESS OF THE SEQUENCE-KEY          0000007
                  000003         149 .LGCHL SET      3               POINTER TO FIRST LOGICAL COMPONENT   0000008
                  000004         150 .SGORD SET      4               LOCATION OF IDS ORD POINTER          0000009
                  000005         151 .LEVEL SET      5               IMS LEVEL NUMBER                     0000010
                  000005         152 .RCNUM SET      5               IMS RECORD NUMBER                    0000011
                  000006         153 .SGREA SET      6               AREA FLAG WORD                       0000012
                  000006         154 .INDEX SET      6               INDEX ROUTINE ADDRESS                0000013
                  000007         155 .PERM  SET      7               PERMISSION WORD (G+I+R+D+K+P)        0000014
                  000010         156 .RULE  SET      8               LOGICAL RULES  AND INSERT RULES      0000015
                  000011         157 .PCHLD SET      9               PC ADDR HOLD AREA                    0000016
                  000012         158 .CURNT SET      10              IDS CURRENCY FOR THIS SEGMENT        0000017
                  000013         159 .SGNAM SET      11              IMS SEGMENT NAME                     0000018

                                 161                                                                      0000001
                                 162                                                                      0000002
                                 163                  LAY-OUT OF THE P-C DEFINITION TABLE ENTRY           0000003
                                 164                                                                      0000004
                                 165                                                                      0000005
                  000000         166 .PCRTV SET      0               RETRIEVAL-TYPE INDICATOR             0000006
                  000000         167 .DEPND SET      0               DEPENDENCY OWNER                     0000007
                  000001         168 .PRMST SET      1               POINTER TO PARENT-OF MASTER (LOWER HALF) 0000008
                  000003         169 .PCLSG SET      3               LSEG ADDRESS                         0000009

                                 171                                                                      0000001
                                 172                                                                      0000002
                                 173                  LAY-OUT OF THE IMS LSEG DEFINITION TABLE ENTRY      0000003
                                 174                                                                      0000004
                                 175                                                                      0000005
                  000000         176 .LSRTV SET      0               RETRIEVAL-TYPE INDICATOR             0000006
                  000000         177 .LGCNT SET      0               LOGICAL-CONTROL OWNER                0000007
                  000002         178 .LSTRT SET      2               STARTING CHARACTER POSITION          0000008
                  000004         179 .LGCRN SET      4               CURRENCY FOR THIS COMPONENT          0000009
                                 180                                 OF THE LOGICAL SEGMENT               0000010

   000140  000000000000    000
   000141  272563446263    000
END OF BINARY CARD GETMST06
                                 182          END
GMAP VERSION/ASSEMBLY DATES   JMPA 740101/021274      JMPB 740704/070174      JMPC 740704/070174      0000147
 142 IS THE NEXT AVAILABLE LOCATION.
THERE WERE     NO  WARNING FLAGS IN THE ABOVE ASSEMBLY
```

```
GU,GET UNIQUE DRIVER

                                        LBL     GU                                                  00000040
                                        TTL     GU,GET UNIQUE DRIVER                                00000050
                                                                                                    00000055
                                        SYMDEF  GU                                                  00000060
                                                                                                    00000070
                                                                                                    00000080
                                                                                                    00000090
                                        SYMREF  CCB                                                 00000100
                                        SYMREF  DEFERR                                              00000110
                                                                                                    00000120
                                                                                                    00000130
                                                GU IS CALLED BY THE                                 00000140
                                                                                                    00000150
                                                                      CALL ANALYZER AND BY          00000160
                                                                      GHU                           00000170
                                                                                                    00000180
                                                IT DETERMINES THE STARTING LEVEL                    00000190
                                                AND INVOKES THE                                     00000200
                                                                                                    00000210
                                                RETRIEVAL PROCESSOR (FIND-UNIQUE)                   00000220
                                                                                                    00000230
                                                                                                    00000240
                                GNPRO   MACRO                                                       00000250
                                        LDX4    1,4                                                 00000260
                                        LDA     0,4                                                 00000270
                                        ANA     =O770000,DU                                         00000280
                                        CMPA    =O500000,DU                                         00000290
                                        TZE     #1                                                  00000300
                                        CMPA    =O510000,DU                                         00000310
                                        TNZ     DEFERR                                              00000320
                                        ENDM    GNPRO                                               00000330
                     000000
000000  000140 7530 00  010     GU      NULL                                                        00000350
                                        SREG    HLDREG                                              00000360
                                                                                                    00000380
000001  000002 2350 31  000             LDA     2,1*            SAVE OBJECT LEVEL                   00000390
000002  000133 7550 00  010             STA     OBJLVL                                              00000400
000003  000030 6000 00  010             TZE     UNQUAL                                              00000410
                                                                IF NO SSAS GO GET THE FIRST ROOT    00000420
                                                                                                    00000430
000004  010003 2240 00  030             LDX4    PCBDFN          TURN OFF THE                        00000440
000005  000152 2350 00  010             LDA     =O777776777777     "HOLD"  FLAG IN THE              00000450
000006  000000 3550 14  000             ANSA    .HOLD,4         CURRENT ACB                         00000460
                                                                                                    00000470
000007  000000 2230 03  000             LDX3    0,DU            WIPE OUT PARENTAGE CELL             00000480
000010  000003 7430 14  000             STX3    .CRPAR,4                                            00000490
000011  110000701000        030         CALL    PTCHGU(OBJLVL,CMNLVL)    CALL PATCH-SSA-TABLE-FOR-GU 00000500
000012  000016710000        010
000013  000150000060        010
000014  000133000000        010
000015  000132000000        010
                                                                (COMMON-LEVEL)                      00000510
                                                                COMMON-LEVEL ITS A RETURN VALUE     00000520
                                                                                                    00000530
000016  000132 2350 00  010             LDA     CMNLVL          IF COMMON-LEVEL >= OBJECT-LEVEL     00000540
000017  000133 1150 00  010             CMPA    OBJLVL          DON'T TRY TO CALL FNDUNQ            00000550
                                                                JUST MAKE SURE THE RIGHT RECORD IS CURRENT0000560
000020  000075 6050 00  010             TPL     MORETR                                              00000570
                                                                                                    00000580
000021  000132 0540 00  010             AOS     CMNLVL          COMMON-LEVEL = COMMON-LEVEL + 1     00000590
                                                                                                    00000600
000022  060000701000        030         CALL    FNDUNQ(CMNLVL,OBJLVL)      CALL FIND-UNIQUE         00000610
2 OF BINARY CARD GU000003
000023  000027710000        010
000024  000150000073        010
000025  000132000000        010
000026  000133000000        010
                                                                        (COMMON-LEVEL,OBJECT-LEVEL) 00000620
                                                                                                    00000630
                                                                FIND-UNIQUE WILL                    00000640
                                                                FIND THE CORRECT SEGMENT            00000650
                                                                AND TAKE CARE OF ALL AUXILLARY      00000660
                                                                TASKS (SETTING PCB-DEF  MOVING      00000670
                                                                TO I-O-AREA, ETC)                   00000680
                                                                                                    00000690
                                                                                                    00000700
000027  000130 7100 00  010             TRA     EXIT                                                00000710
                     000030     UNQUAL  NULL                                                        00000730
000030  010001 2230 00  030             LDX3    SSATAB          SET ALL SSA-TABLE ENTRIES           00000740
000031  000001 2200 03  000             LDX0    1,DU            TO INDICATE THAT                    00000750
000032  000000 2220 03  000             LDX2    0,DU            COUNTER = 0                         00000760
                     000033     SYSSUP  NULL                                                        00000770
000033  000000 4400 13  000             SXL0    .SUPLY,3        THEY ARE SYSTEM-SUPPLIED            00000780
000034  000012 0630 03  000             ADX3    .SSSIZ,DU       ADJUST SSA-TABLE ADDR               00000790
000035  000001 0620 03  000             ADX2    1,DU            COUNTER = COUNTER + 1               00000800
000036  000017 1020 03  000             CMPX2   15,DU           HAVE ALL ENTRIES BEEN PROCESSED     00000810
000037  000033 6040 00  010             TMI     SYSSUP          NO  - CONTINUE SETTING SYSTEM-SUPPLIED 00000820
                                                                                                    00000830
000040  010003 2240 00  030             LDX4    PCBDFN          X4 = PCB DEF ADDR                   00000840
                     000041             GNPRO   DEFERR          X4 = SEG DEF ADDR OF ROOT           00000850
D OF BINARY CARD GU000004
000050  000012 4500 14  000             STZ     .CURNT,4        WIPE OUT CURRENCY IN SEG DEF        00000860
                                                                                                    00000870
000051  130000701000        030         CALL    ROOTNX          GET THE FIRST ROOT                  00000880
000052  000054710000        010
000053  000150000126        010
000054  020005 2350 00  030             LDA     CCB+ERRREF      SET "GE" IF IT FAILED               00000890
000055  000122 6010 00  010             TNZ     GEERR                                               00000900
                                                                                                    00000902
000056  020000 2350 00  030             LDA     CCB+DIBREF      SET UP CURRENCY INDICATORS          00000903
000057  010011 7550 00  030             STA     CURREF          IN THE IMS COMMON REGION            00000904
```

```
000060  010010 7440 00   030          STX4   LSTSEG                                                  0000090
000061  000012 7550 14   000          STA    .CURNT,4          SET IDS REF CODE IN SEG               0000090
                                                                                                     0000090
000062  030000701000     030          CALL   CLRUNQ            CLEAR CURRENCY IN ALL OTHER SEGMENTS  0000091
000063  000065710000     010
000064  000150000137     010
000065  050000701000     030          CALL   FIXPCB            SET PCB AREA                          0000092
000066  000070710000     010
000067  000150000140     010
000070  100000701000     030          CALL   MVESEG(OBJLVL)    MOVE SEGMENT TO I-O-AREA              0000093
END OF BINARY CARD GU000005
000071  000074710000     010
000072  000150000141     010
000073  000133000000     010
000074  000130 7100 00   010          TRA    FXIT              FXIT                                  0000094
                                                                                                     0000096
                                                                                                     0000097
                 000075       NORETF  NULL                                                           0000098
000075  000132 2360 00   010          LDQ    CMNLVL            COMPUTE SSA TABLE ADDRESS             0000099
000076  000130 6000 00   010          TZE    EXIT              EXIT IF ZERO                          0000100
000077  000001 1760 07   000          SBQ    1,DL                                                    0000101
000100  000012 4020 07   000          MPY    .SSSIZ,DL                                               0000102
000101  000000 6230 06   000          EAX3   0,QL                                                    0000103
000102  010001 0630 00   030          ADX3   SSATAB            X3 = ADDR(SSA-TABLE(CMNLVL))          0000104
                                                                                                     0000105
000103  000000 2240 13   000          LDX4   .SEGAD,3          X4 = SEG DEF ADDR COMMON SEGMENT      0000106
000104  000012 2350 14   000          LDA    .CURNT,4          PICK UP CURRENT REF CODE              0000107
000105  000122 6000 00   010          TZE    GEERR             ERROR IF NO CURRENT                   0000108
000106  020000 1150 00   030          CMPA   CCB+DIRREF        SKIP RETRIEVAL IF IT                  0000109
000107  000130 6000 00   010          TZE    EXIT              IS ALREADY THE CURRENT OF PROGRAM     0000110
                                                                                                     0000111
000110  020000 7550 00   030          STA    CCB+DIRREF        ELSE LET DIRECT-REFERENCE = THIS RECORD 0000112
000111  270000701000     030          CALL   .QGETD            RETRIEVE DIRECT                       0000113
000112  000114710000     010
000113  000150000165     010
END OF BINARY CARD GU000006
000114  020005 2350 00   030          LDA    CCB+ERRREF        WAS IT OK                             0000114
000115  000122 6010 00   010          TNZ    GEERR             ERROR IF NOT                          0000115
000116  140000701000     030          CALL   UPDATE            UPDATE AREA CHAINS FOR THIS RECORD    0000116
000117  000121710000     010
000120  000150000170     010
000121  000130 7100 00   010          TRA    EXIT                                                    0000117
                                                                                                     0000119
                                                                                                     0000120
                                                                                                     0000121
                 000122       GEERR   NULL                                                           0000122
000122  120000701000     030          CALL   RETERR(GESTAT,OBJLVL)     SET IMS STATUS "GE"           0000123
000123  000127710000     010
000124  000150000177     010
000125  000134000000     010
000126  000133000000     010
000127  000130 7100 00   010          TRA    EXIT                                                    0000124
                                                                                                     0000125
                                                                                                     0000126
                                                                                                     0000127
                                                                                                     0000128
                 000130       EXIT    NULL                                                           0000129
000130  000140 0730 00   010          LREG   HLDREG            RESTORE REGISTERS                     0000130
000131  000000 7100 11   000          TRA    0,1               RETURN                                0000131
                 000132       CMNLVL  BSS    1                 COMMON-LEVEL                          0000133
                 000133       OBJLVL  BSS    1                 OBJECT-LEVEL (LOWEST-LEVEL SEGMENT)   0000134
000134  272520202020     000  GESTAT  BCI    1,GE                                                    0000135
                                                                                                     0000136
                                                                                                     0000137
                 000000       DIRREF  SET    0                                                       0000138
                 000005       ERRREF  SET    5                                                       0000139
                                                                                                     0000140
                                                                                                     0000141
000135  000003710004     000
                 000140               EIGHT                                                          0000142
                 000140       HLDREG  BSS    8                                                       0000143

                                                                                                     0000001
                                                                                                     0000002
                                             LAY-OUT OF THE SSA TABLE                                0000003
                                                                                                     0000004
                                                                                                     0000005
                 000012       .SSSIZ  SET    10                TABLE SIZE                            0000006
                 000000       .SEGAD  SET    0                 SEG DEFINITION ADDRESS                0000007
                 000000       .SUPLY  SET    0                 FLAG FOR USER-SUPPLIED OR IMPLIED     0000008
                 000001       .IOTAL  SET    1                 I-O-AREA TALLY                        0000009
                 000002       .UNIQE  SET    2                 UNIQUENESS INDICATOR                  0000010
                 000003       .EISKD  SET    3                 EIS DESCRIPTOR WORD OF SEGMENT        0000011
                 000004       .DCODE  SET    4                 D COMMAND CODE (UPPER)                0000012
                 000004       .NCODE  SET    4                 N COMMAND-CODE (LOWER)                0000012
                 000005       .FCODE  SET    5                 F COMMAND CODE (UPPER)                0000013
                 000005       .LCODE  SET    5                 L COMMAND CODE (LOWER)                0000013
                 000006       .UCODE  SET    6                 U COMMAND CODE (UPPER)                0000014
                 000006       .VCODE  SET    6                 V COMMAND CODE (LOWER)                0000014
                 000007       .PCODE  SET    7                 P COMMAND CODE (UPPER)                0000015
                 000010       .QLCNT  SET    8                 NUMBER OF QUALIFIERS                  0000016
                 000011       .QLPTR  SET    9                 INDEX OF FIRST ENTRY IN QUAL. TABLE   0000017
                                                                                                     0000001
                                                                                                     0000002
                                             LAY-OUT OF THE IMS SEG DEFINITION TABLE ENTRY           0000003
                                                                                                     0000004
                                                                                                     0000005
                 000000       .SGLEN  SET    0                 SEGMENT LENGTH (DATA ONLY)            0000006
                 000000       .SQKEY  SET    0                 ADDRESS OF THE SEQUENCE-KEY           0000007
                 000003       .LGCHL  SET    3                 POINTER TO FIRST LOGICAL COMPONENT    0000008
                 000004       .SGORD  SET    4                 LOCATION OF IDS ORD POINTER           0000009
                 000005       .LEVEL  SET    5                 IMS LEVEL NUMBER                      0000010
                 000005       .RCNUM  SET    5                 IMS RECORD NUMBER                     0000011
```

```
000006     .SGREA SET   6         AREA FLAG WORD                               00000120
000006     .INDEX SET   6         INDEX ROUTINE ADDRESS                        00000130
000007     .PERM  SET   7         PERMISSION WORD (G,I,R,D,K,P)                00000140
000010     .RULE  SET   8         LOGICAL RULES  AND INSERT RULES              00000150
000011     .PCHLD SET   9         PC ADDR HOLD AREA                            00000160
000012     .CURNT SET   10        IDS CURRENCY FOR THIS SEGMENT                00000170
000013     .SGNAM SET   11        IMS SEGMENT NAME                             00000180
                                                                               00000010
                                                                               00000020
                      LAY-OUT OF THE PCB DEFINITION TABLE ENTRY                00000030
                                                                               00000040
                                                                               00000050
000000     .POSIT SET   0         MULTIPLE-POSITIONING FLAG                    00000060
000000     .HOLD  SET   0         IMS "HOLD" FLAG                              00000070
000000     .STAT  SET   0         IMS STATUS                                   00000080
000002     .CRSEG SET   2         SEG  ADDR OF SEGMENT LAST PROCESSED          00000090
000002     .CRLVL SET   2         LEVEL OF THE LAST SEGMENT PROCESSED          00000100
000003     .CRPAR SET   3         SEG ADDR OF PARENTAGE SEGMENT                00000110
000003     .UNSAT SET   3         "HIGHEST" UNSATISFIED SEGMENT                00000120
000004     .CRIDS SET   4         IDS REFERENCE CODE                           00000130
000005     .SSTAB SET   5         ADDRESS OF THE SSA  TABLE                    00000140
000005     .QLTAB SET   5         ADDRESS OF THE QUALIFICATION TABLE           00000150
000006     .OLSSA SET   6         OLD SSA COUNT FOR THIS PCB                   00000160
000007     .PRSTA SET   7         OLD STATUS FOR THIS PCB                      00000170
000000            BLOCK C05                                                    00000010
000000     SSACNT BSS   1         SSA COUNT IN CURRENT CALL                    00000020
000001     SSATAB BSS   1         ADDRESS OF THE CURRENT SSA TABLE             00000030
000002     QALTAB BSS   1         ADDRESS OF QUALIFICATION TABLE               00000040
000003     PCBDFN BSS   1         PCB DEFINITION ADDRESS                       00000050
000004     QUALDX BSS   1         QUALIFICATION TABLE INDEX                    00000060
000005     CURSSA BSS   1         ADDRESS OF CURRENT USER SSA                  00000070
000006     FRSTLV BSS   1         FIRST USER-SUPPLIED LEVEL                    00000080
000007     IOAREA BSS   1         ADDRESS OF USER'S I-O-AREA                   00000090
000010     LSTSEG BSS   1         ADDRESS OF LAST ACCESSED SEG                 00000100
000011     CURREF BSS   1         REF. CODE OF LAST ACCESSED RECORD            00000110
000012     PCBADR BSS   1         ADDRESS OF USER'S PCB                        00000120
000013     PRNTSW BSS   1         SWITCH FOR IMS PARENT SETTING                00000130
000014     PRSTAT BSS   1         STATUS OF PREVIOUS CALL                      00000140
000015     FUNCDE BSS   1         IMS FUNCTION CODE                            00000150
000016     OLDSSA BSS   1         OLD SSA COUNT (PREVIOUS CALL)                00000160
000017     PRIRSW BSS   1         USE PRIOR DIRECTION SWITCH                   00000170
000020     CCODEC BSS   1         COMMAND CODE "C" SWITCH                      00000180
000021     USERIO BSS   1         ADDRESS OF USER'S I-O-AREA                   00000190
000022     MVETAL BSS   1         TALLY WORD BUILD BY MVESEG WHEN NO SSA'S     00000200
                                                                               00000210
                                                                               00000220
                                                                               00000230
                                                                               00000240
                                                                               00000250
000151            USE                                                          00000260

ERROR LINKAGE

 015   000000000000    000
OF BINARY CARD GU000007
000151  276420202020    000

  LITERALS

000152  777776777777    000
OF BINARY CARD GU000008
```

SET IDS AREA SUBROUTINE

```
         LBL     IDAREA                                                        00000040
         TTL     SET IDS AREA SUBROUTINE                                       00000050
                                                                               00000055
                                                                               00000060
                                                                               00000070
                                                                               00000080
                          THIS "USER-SUPPLIED" ROUTINE IS                      00000090
                          CALLED TO SET THE AREA ON MULTI-AREA                 00000100
                          SEGMENTS.  THE INPUT ARGUMENT IS THE                 00000110
                          IDS ORD ADDRESS.  THIS ROUTINE PROCEEDS              00000120
                          BY FINDING THE CALC FIELD DEFINITION,                00000130
                          PICKING UP THE TALLY WORD ALREADY PLACED THERE140
                          BY THE EMULATOR, ADJUSTING THE TALLY TO REFERENCE
                          JUST THE LAST CHARACTER, AND FINALLY DIVIDES THE
                          CHARACTER BY 2 TO DERIVE THE RELATIVE        00000170
                          AREA NUMBER AND ADDS 10 TO THIS TO PASS THE00000180
                          AREA NUMBER TO THE IDS SUBROUTINE .QSET      00000190
                                                                               00000210
                                                                               00000220
GNFLD    MACRO                                                                 00000230
         LDX4    2,4                                                           00000240
         LDA     0,4                                                           00000250
         ANA     =0770000,DU                                                   00000260
         CMPA    =0010000,DU                                                   00000270
         TZE     #1                                                            00000280
         CMPA    =0100000,DU                                                   00000290
         TNZ     DEFERR                                                        00000300
         ENDM    GNFLD                                                         00000310
                                                                               00000320
                                                                               00000330
                                                                               00000340
         SYMREF  DEFERR                                                        00000350
                                                                               00000360
                                                                               00000370
                                                                               00000380
         SYMDEF  IDAREA                                                        00000390
                                                                               00000400
                                                                               00000410
```

```
                          000000        IDAREA NULL                                                                0000042
   000000  000050 7530 00  010                 SREG    HLDREG                                                      0000043
                                                                                                                   0000044
   000001  000002 2240 11  000                 LDX4    2,1          X4 = ORD ADDR (INPUT ARGUMENT)                 0000045
   000002  000006 2260 14  000                 LDX6    6,4          X6 = AREA VARIABLE ADDRESS                     0000046
                                                                                                                   0000047
                          000003        NXTFLD NULL                                                                0000048
                          000003               GNFLD   EXIT         X4 = FIELD DEF ADDR                            0000049
   000012  000002 7250 14  000                 LXL5    .MODNX,4     I MOD CHN NEXT = X4,                           0000050
   000013  000042 7450 00  010                 STX5    CMPMOD       THEN THIS FIELD CANNOT                         0000051
   000014  000042 1040 00  010                 CMPX4   CMPMOD       BE THE CALC KEY (NO CONTROL DEFS)              0000052
   000015  000003 6000 00  010                 TZE     NXTFLD                                                      0000053
                                                                                                                   0000054
   000016  000001 2360 14  000                 LDQ     .IDSTL,4     PICK UP FIELD TALLY WORD                       0000055
   000017  000043 7560 00  010                 STQ     TALLY                                                       0000056
   000020  000077 3760 07  000                 ANQ     =077,DL      ISOLATE THE INITIAL CHAR.                      0000057
   000021  000010 0760 07  000                 ADQ     8,DL         ADD 8 TO POSITION TO RIGHTMOST                 0000058
   000022  000006 5060 07  000                 DIV     6,DL         CONVERT TO WORD & CHAR                         0000059
END OF BINARY CARD IDAREA02
   000023  000043 7510 01  010                 STCA    TALLY,01     SET INITIAL CHAR POS.                          0000060
   000024  000000 6200 06  000                 EAX0    0,QL         X0 = WORD INCREMENT                            0000061
   000025  000043 0400 00  010                 ASX0    TALLY        ADD WORD ADJUSTMENT                            0000062
   000026  000000 2360 07  000                 LDQ     0,DL                                                        0000063
   000027  000043 2360 52  010                 LDQ     TALLY,SC     QR = LAST CHAR OF KEY                          0000064
   000030  000001 7320 00  000                 QRS     1            DIVIDE LAST DIGIT BY 2                         0000065
   000031  000012 0760 07  000                 ADQ     10,DL        ADD 10 TO DETERMINE AREA                       0000066
   000032  000000 7560 16  000                 STQ     0,6          PUT VALUE IN AREA VARIABLE                     0000067
   000033  000037 7460 00  010                 STX6    CLSET+3      X6 = VARAIBLE ADDRESS                          0000068
                                                                                                                   0000069
                          000034        CLSET  NULL                                                                0000070
   000034  010000701000        030             CALL    .QSET(**)    SET THE AREA                                   0000071
   000035  000040710000        010
   000036  000060000105        010
   000037  000000000000        000
                          000040        EXIT   NULL                                                                0000072
   000040  000050 0730 00  010                 LREG    HLDREG                                                      0000073
   000041  000000 7100 11  000                 TRA     0,1                                                         0000074
                                                                                                                   0000075
                                                                                                                   0000076
                                                                                                                   0000077
                          000042        CMPMOD BSS     1            MOD CHN COMPARE CELL                           0000078
                          000043        TALLY  BSS     1            TALLY WORD FOR LAST CHAR OF CERT.              0000079
                                                                                                                   0000080
                                                                                                                   0000081
   000044  000004710004        000
                          000050               EIGHT                                                               0000082
                          000050        HLDREG BSS     8                                                           0000083

                                                                                                                   0000001
                                                                                                                   0000002
                                                            LAY-OUT OF THE IDS OFD DEFINITION                      0000003
                                                                                                                   0000004
                                                                                                                   0000005
                                                                                                                   0000006
                          000000        .RCPOS SET     0            FIELD POSITION IN RECORD                       0000007
                          000001        .IDSTL SET     1            TALLY WORD OF FIELD IN WS                      0000008
                          000002        .MODNX SET     2            MOD CHAIN NEXT                                 0000009

  ERROR LINKAGE

   000060  000000000000        000
END OF BINARY CARD IDAREA03
   000061  312421512521        000
END OF BINARY CARD IDAREA04
                                               END                                                                 0000086
```

IMS INDEXING SUBROUTINE

```
                LBL     INDEXI                                                    0000004
                TTL     IMS INDEXING SUBROUTINE                                   0000005
                                                                                  0000005
                                                                                  0000006
                                                                                  0000007
                                                                                  0000008
                        THIS ROUTINE SUPPORTS THE                                 0000009
                        IMS HIDAM INDEXING FEATURE                                0000010
                                                                                  0000011
                        IT IS CALLED BY RODTNX OR ISRTSG                          0000012
                        WHEN CALLED BY RODTNX, IT FINDS                           0000013
                        THE NEXT GROUP RECORD IN THE                              0000014
                        "RANGE MASTER" CHAIN                                      0000015
                                                                                  0000016
                        WHEN CALLED BY RODTNX, IT EXPECTS THE FOLLOWING           0000017
                        ARGUMENTS -                                               0000018
                          1.  REF CODE - THE CURRENT REF CODE, IF ANY             0000019
                          2.  X4 MUST BE POINTING TO THE ROOT SEG DEF             0000020
                                                                                  0000021
                                                                                  0000022
                        WHEN CALLED BY ISRTSG, IT EXPECTS                         0000023
                        THE FOLLOWING ARGUMENTS -                                 0000024
                                                                                  0000025
                          1.  FLAG - SUCCESS INDICATUR                            0000026
                          2.  X4 MUST BE POINTING TO THE ROOT SEG DEF             0000027
                                                                                  0000029
                                                                                  0000030
                                                                                  0000031
         GNDET  MACRO                                                             0000032
                LXL4    2,4                                                       0000033
                LDA     0,4                                                       0000034
                ANA     =0770000,DU                                               0000035
```

```
                                           CMPA    =0010000,DU
                                           TZE     *1
                                           CMPA    =0040000,DU
                                           TNZ     DEFERR
                                           ENDM    GNDET


                                   GMCHN   MACRO
                                           LDX4    2,4
                                           LDA     0,4
                                           ANA     =0770000,DU
                                           CMPA    =0020000,DU
                                           TNZ     DEFERR
                                           ENDM    GMCHN


                                   GMMST   MACRO
                                           LXL4    1,4
                                           LDA     0,4
                                           ANA     =0770000,DU
                                           CMPA    =0010000,DU
                                           TNZ     DEFERR
                                           ENDM    GMMST



                                   GNFLD   MACRO
                                           LDX4    2,4
                                           LDA     0,4
                                           ANA     =0770000,DU
                                           CMPA    =0010000,DU
                                           TZE     *1
                                           CMPA    =0100000,DU
                                           TNZ     DEFERR
                                           ENDM    GNFLD



                                           SYMREF  DEFERR
                                           SYMREF  CCB
                                           SYMREF  .QCUNT



                                           SYMDEF  INDEX1



                          000000   INDEX1  NULL
 000000   000320 7530 00  010              SREG    HLDREG


 000001   000002 2350 11  000              LDA     2,1                SAVE RG ADDRESS
 000002   000277 7550 00  010              STA     REFADD
 000003   000002 2350 31  000              LDA     2,1*               PICK UP ARGUMENT CONTENTS
 000004   000300 7550 00  010              STA     HLDREF


 000005   000311 2350 00  010              LDA     FRSTIM             IS THIS THE FIRST TIME THRU
 000006   000170 6010 00  010              TNZ     NORMAL             NO - SKIP FIRST-TIME CODE
 000007   000275 7440 00  010              STX4    HOLDX4             SAVE X4 (ROOT SEG ADDR)
 000010   000000 7200 14  000              LXL0    .SQKEY,4           PICK UP SEQ KEY ADDR, IF ANY
 000011   050000 6000 00  030              TZE     DEFERR             IF NONE, FATAL ERROR
 000012   000002 2200 10  000              LDX0    .IDSFD,0           X0 = IDS QFD ADDR
 000013   000303 7400 00  010              STX0    GRPFD              SAVE GROUP CALC FIELD ADDR
 000014   000004 2240 14  000              LDX4    .SGCRD,4           X4 = IDS QRD ADDR
 000015   000000 2350 14  000              LDA     0,4                PICK UP RECORD TYPE
 000016   001777 3750 03  000              ANA     =0001777,DU
 000017   000022 7310 00  000              ARS     18
 000020   000301 7550 00  010              STA     GRPTYP             SAVE FOR RETRIEVAL CHECKING
 000021   000302 7440 00  010              STX4    GRPRD              SAVE GROUP RD ADDR




                          000022   FNDRG3  NULL
                          000022           GNDET   DEFERR             X4 = DETAIL DEF ADDR
END OF BINARY CARD INDEX102
 000031   000000 2350 14  000              LDA     0,4                IF THIS IS THE CALC
 000032   000010 3750 07  000              ANA     =010,DL            CHAIN DEFINITION, IGNORE IT
 000033   000022 6010 00  010              TNZ     FNDRG3             IT IS - GO GET NEXT DETAIL DEF

                          000034           GMCHN                      X4 NOW = RNG-3 MD ADDR
 000041   000204 7440 00  010              STX4    NXRNG3+3           SET UP RNG-3 MD FOR .QCHN

                          000042           GMMST                      X4 NOW = QRD ADDR RNG-2 RECORD
END OF BINARY CARD INDEX103
 000047   000000 2350 14  000              LDA     0,4                ISOLATE RECORD TYPE
 000050   001777 3750 03  000              ANA     =0001777,DU        OF THE RANGE-2 RECORD
 000051   000022 7310 00  000              ARS     18
 000052   000304 7550 00  010              STA     RG2TYP             SAVE FOR RETRIEVAL CHECKING

 000053   000000 6250 14  000              EAX5    0,4                X5 = X4
                          000054           GNFLD   DEFERR
                                                                      FIND THE FIRST FIELD DEF
                                                                      BY DEFINITION THIS MUST BE
                                                                      THE MATCH-KEY FIELD
                                                                      (I. E. IT CONTROLS STORAGE)
 000063   000305 7440 00  010              STX4    RNG2FD             SAVE FOR USE IN STORING
 000064   000000 6240 15  000              EAX4    0,5                RESET X4

                          000065           GNDET   DEFERR
END OF BINARY CARD INDEX104
```

```
                 000074          GMCHN                       X4 NOW = RNG-2 MD ADDR
000101   000216 7440 00   010      STX4     NXRNG2+3          SET UP RNG-2 MD FOR .QCHN

                 000102          GMMST                       X4 NOW = RANGE-1 RD ADDR
000107   000000 2350 14   000      LDA      0,4               ISOLATE RECORD TYPE
000110   001777 3750 03   000      ANA      =O001777,DU       OF THE RANGE-1 RECORD
000111   000022 7310 00   000      ARS      18
000112   000306 7550 00   010      STA      RG1TYP            SAVE FOR RETRIEVAL CHECKING

000113   000000 6250 14   000      EAX5     0,4               X5 = X4
                 000114          GNFLD    DEFERR             FIND THE FIRST FIELD DEF
END OF BINARY CARD INDEX105
000123   000307 7440 00   010      STX4     RNG1FD            SAVE FOR USE IN STORING
000124   000000 6240 15   000      EAX4     0,5               RESET X4

                 000125          GNDET    DEFERR
                 000134          GMCHN                       X4 = RNG-1 MD ADDR
END OF BINARY CARD INDEX106
000141   000230 7440 00   010      STX4     NXRNG1+3          SET UP RNG-1 MD FOR .QCHN
                 000142          GMMST                       X4 NOW = SUPER-CHIEF RD ADDR
000147   000264 7440 00   010      STX4     FNDSUP+3          SAVE FOR USE BY STORE
000150   000247 7440 00   010      STX4     SETUP+3           SAVE FOR INITIAL GET
000151   000000 2350 14   000      LDA      0,4               ISOLATE RECORD TYPE OF THE
000152   001777 3750 03   000      ANA      =O001777,DU       SUPER-CHIEF
000153   000022 7310 00   000      ARS      18
000154   000310 7550 00   010      STA      SUPTYP            SAVE FOR RETRIEVAL CHECKING

                 000155          GNFLD    DEFERR             X4 = SUPER-CHIEF
END OF BINARY CARD INDEX107
                                                             CALC FIELD FD ADDR
000164   000312 2350 00   010      LDA      CHFTLY            PUT TALLY WORD OF
000165   000001 7550 14   000      STA      .IDSTL,4          SUPER-CHIEF VALUE IN
                                                             THE IDS QFO

000166   000311 0540 00   010      AOS      FRSTIM            SET FIRST-TIME SWITCH
000167   000275 2240 00   010      LDX4     HOLDX4            LET X4 = ROOT SEG DEF



                 000170   NORMAL NULL
000170   010015 2350 00   030      LDA      FUNCDE            WAS THIS AN INSERT CALL
000171   000276 1150 00   010      CMPA     ISRTCD
000172   000253 6000 00   010      TZE      INSERT            YES - HANDLE SEPARATELY
                                                             NO  - GET NEXT GROUP

000173   000300 2350 00   010      LDA      HLDREF            PICK UP INPUT REFERENCE-CODE
000174   000244 6000 00   010      TZE      SETUP             IF IT IS ZERO, GO SET UP

000175   020000 7550 00   030      STA      CCB+DIRREF        SET UP DIRECT-REFERENCE
000176   070000701000      030      CALL     .QGETD            RETRIEVE DIRECT
000177   000201710000      010
000200   000330000267      010

                 000201   NXRNG3 NULL
000201   030000701000      030      CALL     .QCHN(**+1)       GET NEXT OF GRP-RNG-1 CHAIN
000202   000206710000      010
000203   000330000272      010
000204   000000000000      000
END OF BINARY CARD INDEX108
000205   000001000000      000
000206   020005 2350 00   030      LDA      CCB+ERRREF        EXIT ON IDS ERROR
000207   000237 6010 00   010      TNZ      IDSERR
000210   060000 2350 00   030      LDA      .QCURT            WAS A GROUP RECORD FOUND
000211   000301 1150 00   010      CMPA     GRPTYP
000212   000241 6000 00   010      TZE      FOUND             YES - EXIT
                                                             NO
                 000213   NXRNG2 NULL
000213   030000701000      030      CALL     .QCHN(**+1)       GET NEXT OF GRP-RNG-2 CHAIN
000214   000220710000      010
000215   000330000302      010
000216   000000000000      000
000217   000001000000      000
000220   020005 2350 00   030      LDA      CCB+ERRREF        EXIT ON IDS ERROR
000221   000237 6010 00   010      TNZ      IDSERR
000222   060000 2350 00   030      LDA      .QCURT            WAS A RANGE-2 RECORD FOUND
000223   000304 1150 00   010      CMPA     RG2TYP
000224   000201 6000 00   010      TZE      NXRNG3            YES - GO TRY TO FIND A GROUP
                                                             NO
                 000225   NXRNG1 NULL
000225   030000701000      030      CALL     .QCHN(**+1)       GET NEXT OF GRP-RNG-1 CHAIN
000226   000232710000      010
000227   000330000312      010
END OF BINARY CARD INDEX109
000230   000000000000      000
000231   000001000000      000
000232   020005 2350 00   030      LDA      CCB+ERRREF        EXIT ON IDS ERROR
000233   000237 6010 00   010      TNZ      IDSERR
000234   060000 2350 00   030      LDA      .QCURT            WAS A RANGE-1 RECORD FOUND

000235   000306 1150 00   010      CMPA     RG1TYP
000236   000213 6000 00   010      TZE      NXRNG2            YES - GO TRY TO FIND A RANGE-2
                                                             NO  - EXIT NOT FOUND



                 000237   IDSERR NULL
                 000237   NOTFND NULL
000237   000277 4500 51   010      STZ      REFADD+1          SET INPUT-REFERENCE TO ZERO
000240   000273 7100 00   010      TRA      EXIT


                 000241   FOUND  NULL
000241   020000 2350 00   030      LDA      CCB+DIRREF
```

```
000242  000277 7550 51  010            STA    REFADD,I        SET INPUT-REFERENCE TO          00002230
                                                              DIRECT-REFERENCE                00002240
000243  000273 7100 00  010            TRA    EXIT                                            00002250
                                                                                              00002260
                                                                                              00002270
                                                                                              00002280
              000244                SETUP  NULL                                               00002290
000244  040000701000    030            CALL   .QGET(**)       FIND THE SUPER-CHIEF            00002300
000245  000250710000    010
000246  000330000344    010
000247  000000000000    000
000250  020005 2350 00  030            LDA    CCB+ERRREF      EXIT ON ERROR                   00002310
000251  000237 6010 00  010            TNZ    NOTFND                                          00002320
000252  000225 7100 00  010            TRA    NXRNG1          GO FIND NEXT RANGE-1            00002330
                                                                                              00002340
                                                                                              00002350
              000253                INSERT NULL                                               00002360
OF BINARY CARD INDEX110
000253  000303 2270 00  010            LDX0   GRPFD           PICK UP IDS OFD FOR             00002370
                                                              GROUP CALC FIELD                00002380
000254  000001 2350 10  000            LDA    .IDSTL,0        PICK UP IDS TALLY WORD          00002390
000255  000305 2220 00  010            LDX2   RNG2FD          X2 = OFD ADDR RANGE-2 FIELD     00002400
000256  000001 7550 12  000            STA    .IDSTL,2        SET TALLY WORD                  00002410
000257  000307 2220 00  010            LDX2   RNG1FD          X2 = OFD ADDR RANGE-1 FIELD     00002420
000260  000001 7550 10  000            STA    .IDSTL,0        SET TALLY WORD                  00002430
              000261                FNDSUP NULL                                               00002440
000261  040000701000    030            CALL   .QGET(**)       FIND THE SUPER-CHIEF            00002450
000262  000265710000    010
000263  000330000363    010
000264  000000000000    000
000265  020005 2350 00  030            LDA    CCB+ERRREF      EXIT IF NOT FOUND               00002460
000266  000271 6010 00  010            TNZ    NOSUPR                                          00002470
                                                                                              00002480
000267  000277 4500 51  010            STZ    REFADD,I        SET FLAG INDICATING SUCCESS     00002490
000270  000273 7100 00  010            TRA    EXIT                                            00002500
                                                                                              00002510
              000271                NOSUPR NULL                                               00002520
000271  000001 2350 07  000            LDA    1,DL            SET FLAG INDICATING FAILURE     00002530
000272  000277 7550 51  010            STA    REFADD,I                                        00002540
                                                                                              00002550
              000273                EXIT   NULL                                               00002560

000273  000320 0730 00  010            LREG   HLDREG                                          00002570
000274  000000 7100 11  000            TRA    0,1                                             00002580
                                                                                              00002600
                                                                                              00002610
                                                                                              00002620
              000275                HOLDX4 BSS    1               X4 STORAGE CELL                 00002630
OF BINARY CARD INDEX111
000276  000000000007    000         ISRTCD DEC    7               IMS INSERT FUNCTION CODE        00002640
              000277                REFADD BSS    1               ADDRESS OF INPUT ARG            00002650
              000300                HLDREF BSS    1               INPUT REFERENCE CODE            00002660
              000301                GRPTYP BSS    1               RECORD TYPE OF GROUP            00002670
              000302                GRPRD  BSS    1               RD ADDRESS - GROUP RECORD       00002680
              000303                GRPFD  BSS    1               FD ADDRESS - GROUP CALC FIELD   00002690
              000304                RG2TYP BSS    1               RECORD TYPE - RANGE-2 RECORD    00002700
              000305                RNG2FD BSS    1               FD ADDRESS - RNG-2 FLD          00002710
              000306                RG1TYP BSS    1               RECORD TYPE - RANGE- 1 RECORD   00002720
              000307                RNG1FD BSS    1               FD ADDRESS - RNG-1 FLD          00002730
              000310                SUPTYP BSS    1               RECORD TYPE - SUPER-CHIEF       00002740
000311  000000000000    000         FRSTIM DEC    0               FIRST-TIME SWITCH               00002750
000312  000313 0001 00  010         CHFTLY TALLY  CCCCCC,1,0                                      00002760
000313  232020202020    000         CCCCCC BCI    1,C                                             00002770
                                                                                              00002780
                                                                                              00002790
                                                                                              00002800
              000000                DIRREF SET    0                                               00002810
              000005                ERRREF SET    5                                               00002820
                                                                                              00002830
                                                                                              00002840
000314  000004710004    000
              000320                       EIGHT                                              00002850
              000320                HLDREG BSS    8                                               00002860
                                                                                              00000010
                                                                                              00000020
                                           LAY-OUT OF THE IMS SEG DEFINITION TABLE ENTRY      00000030
                                                                                              00000040
                                                                                              00000050
              000000                .SGLEN SET    0               SEGMENT LENGTH (DATA ONLY)      00000060
              000000                .SGKEY SET    0               ADDRESS OF THE SEQUENCE-KEY     00000070
              000003                .LGCHL SET    3               POINTER TO FIRST LOGICAL COMPONENT 00000080
              000004                .SGORD SET    4               LOCATION OF IDS ORD POINTER     00000090
              000005                .LEVEL SET    5               IMS LEVEL NUMBER                00000100
              000005                .RCNUM SET    5               IMS RECORD NUMBER               00000110
              000006                .SGREA SET    6               AREA FLAG WORD                  00000120
              000006                .INDEX SET    6               INDEX ROUTINE ADDRESS           00000130
              000007                .PERM  SET    7               PERMISSION WORD (G,I,R,D,K,P)   00000140
              000010                .RULE  SET    8               LOGICAL RULES  AND INSERT RULES 00000150
              000011                .PCHLD SET    9               PC ADDR HOLD AREA               00000160
              000012                .CURNT SET    10              IDS CURRENCY FOR THIS SEGMENT   00000170
              000013                .SGNAM SET    11              IMS SEGMENT NAME                00000180
                                                                                              00000010
                                                                                              00000020
                                           LAY-OUT OF THE IMS KEY DEFINITION ENTRY            00000030
                                                                                              00000040
                                                                                              00000050
              000000                .FDTYP SET    0               CODED FIELD TYPE                00000060
              000000                .SEQCD SET    0               CODE SEQUENCE CODE              00000070
              000000                .FDLEN SET    0               FIELD LENGTH                    00000080
              000001                .FDSTR SET    1               STARTING CHARACTER              00000090
              000002                .IDSFD SET    2               ADDRESS OF THE IDS FIELD DEFINITION 00000100
              000003                .FDPOS SET    3               STARTING POSITION IN FEEDBACK AREA 00000110
              000004                .FDNAM SET    4               IMS FIELD NAME                  00000120
```

```
                                        LAY-OUT OF THE IOS OFC DEFINITION

000000   .RCPOS SET    0                FIELD POSITION IN RECORD
000001   .IDSTL SET    1                TALLY WORD OF FIELD IN WS
000002   .MODNX SET .  2                MOD CHAIN NEXT

000000          BLOCK  C05
000000   SSACNT BSS    1                SSA COUNT IN CURRENT CALL
000001   SSATAB BSS    1                ADDRESS OF THE CURRENT SSA TABLE
000002   QALTAB BSS    1                ADDRESS OF QUALIFICATION TABLE
000003   PCBDFN BSS    1                PCB DEFINITION ADDRESS
000004   QUALDX BSS    1                QUALIFICATION TABLE INDEX
000005   CURSSA BSS    1                ADDRESS OF CURRENT USER SSA
000006   FRSTLV BSS    1                FIRST USER-SUPPLIED LEVEL
000007   IOAREA BSS    1                ADDRESS OF USER'S I-O-AREA
000010   LSTSEG BSS    1                ADDRESS OF LAST ACCESSED SEG
000011   CURREF BSS    1                REF. CODE OF LAST ACCESSED RECORD
000012   PCBADR BSS    1                ADDRESS OF USER'S PCB
000013   PRNTSW BSS    1                SWITCH FOR IMS PARENT SETTING
000014   PRSTAT BSS    1                STATUS OF PREVIOUS CALL
000015   FUNCDE BSS    1                IMS FUNCTION CODE
000016   OLDSSA BSS    1                OLD SSA COUNT (PREVIOUS CALL)
000017   PRIRSW BSS    1                USE PRIOR DIRECTION SWITCH
000020   CCODEC BSS    1                COMMAND CODE "C" SWITCH
000021   USERIO BSS    1                ADDRESS OF USER'S I-O-AREA
000022   MVETAL BSS    1                TALLY WORD BUILD BY MVESEG WHEN NO SSA'S

000330          USE
```

```
ERROR LINKAGE

 000330  000000000003      000
 000331  314524256731      000
END OF BINARY CARD INDEX112
```

```
COBOL       S O U R C E   L I S T I N G                              REF    C O M P I L E R   C O M M E N T S
ALT #                                                                LINE #

00001   IDENTIFICATION DIVISION.                                      00001
00002   PROGRAM-ID. EMULAT.                                           00002
00003   AUTHOR. H E FEATHER.                                          00003
00004   *                                                             00004
00005   *                                                             00005
00006   *                                                             00006
00007   ENVIRONMENT DIVISION.                                         00007
00008   CONFIGURATION SECTION.                                        00008
00009   SOURCE-COMPUTER. 6000.                                        00009
00010   OBJECT-COMPUTER. 6000.                                        00010
00011   SPECIAL-NAMES.                                                00011
00012        BLOCK 05 IS IMS-COMMON.                                  00012
00013   DATA DIVISION.                                                00013
00014   FILE SECTION.                                                 00014
00015   *EJECT                                                        00015

00016   WORKING-STORAGE SECTION.                                      00016
00017   77  END-SSA-CHAR                      PIC X                   00017
00018                                         VALUE ")".              00018 REF BY  00414
00019   77  CHAR-POS                          PIC 9(8) COMP-1.        00019 REF BY  00235, 00248, 00250, 002
                                                                                    00255, 00258, 00263, 002
                                                                                    00272, 00275, 00278, 002
                                                                                    00284, 00287, 00292, 003
                                                                                    00357, 00359, 00360, 003
                                                                                    00376, 00378, 00379, 003
                                                                                    00406, 00410, 00412, 004
                                                                                    00417, 00499, 00503
00020   77  SAVE-CHR-POS                      PIC 9(8) COMP-1.        00020 REF BY  00141, 00364
00021   77  COMMAND-CODE-SENTINEL             PIC X                   00021
00022                                         VALUE "*".              00022 REF BY  00248
00023   77  QUALIFIER-SENTINEL                PIC X                   00023
00024                                         VALUE "(".              00024 REF BY  00251, 00359
00025   77  LOGIC-CODE                        PIC 9(8) COMP-1.        00025 REF BY  00348, 00401, 00410, 004
00026   77  FIELD-DEF                         PIC 9(8) COMP-1.        00026 REF BY  00140, 00402
00027   77  FIELD-LENGTH                      PIC 9(8) COMP-1.        00027 REF BY  00139, 00406
00028   77  OP-CODE                           PIC 9(8) COMP-1.        00028 REF BY  00403, 00471, 00474, 004
                                                                                    00480, 00483, 00486
00029   77  FIELD-TALLY                       PIC 9(8) COMP-1.        00029 REF BY  00136, 00404
00030   77  QUAL-COUNT                        PIC 9(8) COMP-1.        00030 REF BY  00344, 00398, 00399, 004
                                                                                    00402, 00403, 00404
00031   77  QUAL-MAX                          PIC 9(8) COMP-1         00031
00032                                         VALUE 10.               00032 REF BY  00399
00033   77  I                                 PIC 9(8) COMP-1.        00033 REF BY  00365, 00369, 00377, 004
00034   77  OR-CHAR                           PIC X                   00034
00035                                         VALUE "+".              00035 REF BY  00412
00036   77  OR-CODE                           PIC 9(8) COMP-1         00036
00037                                         VALUE 1.                00037 REF BY  00412
00038   77  AND-CHAR                          PIC X                   00038
00039                                         VALUE "*".              00039 REF BY  00410
00040   77  AND-CODE                          PIC 9(8) COMP-1         00040
00041                                         VALUE ZERO.             00041 REF BY  00410
00042   77  HOLD-D-CODE                       PIC 999.                00042 REF BY  00241, 00304
00043   77  REPLACE-CODE                      PIC 9(8) COMP-1         00043
00044                                         VALUE 8.                00044 REF BY  00241, 00304
00045   77  NUMBER-OF-COMMAND-CODES           PIC 9(8) COMP-1.        00045 REF BY  00243, 00291, 00293
00046   *EJECT                                                        00046
```

```
00047   01  SSA-TABLE-ENTRY.
00048       03  SEG-DEF-ADDR                      PIC XXX.
00049       03  USER-SUPPLIED                     PIC XXX.
00050       03  I-O-AREA-TALLY                    PIC 9(8) COMP-1.
00051       03  UNIQUENESS                        PIC 9(8) COMP-1.
00052       03  IO-AREA-EIS-WORD                  PIC 9(8) COMP-1.
00053       03  COMMAND-CODE-GROUP.
00054           05  D-CODE                        PIC 999.
00055           05  N-CODE                        PIC 999.
00056           05  F-CODE                        PIC 999.
00057           05  L-CODE                        PIC 999.
00058           05  U-CODE                        PIC 999.
00059           05  V-CODE                        PIC 999.
00060           05  P-CODE                        PIC 999.
00061           05  FILLER                        PIC 999.
00062       03  NUMBER-OF-QUALIFIERS              PIC 9(8) COMP-1.
00063       03  QUAL-TABLE-INDEX                  PIC 9(8) COMP-1.
00064   *
00065   01  SSA.
00066       03  SSA-CHAR                          PIC X
00067                                             OCCURS 600 TIMES.
00068   *
00069   01  VALIDITY-SWITCH                       PIC 9(8) COMP-1.
00070   01  VALIDITY-CHAR REDEFINES VALIDITY-SWITCH.
00071       03  FILLER                            PIC X(4).
00072       03  VALIDITY-CODE                     PIC XX.
00073   *
00074   01  IMS-COMMON.
00075       03  SSA-COUNT                         PIC 9(8) COMP-1.
00076       03  SSA-TAB-ADDR                      PIC 9(8) COMP-1.
00077       03  QUAL-TAB-ADDR                     PIC 9(8) COMP-1.
00078       03  PCB-DEF-ADDR                      PIC 9(8) COMP-1.
00079       03  QUALIFICATION-INDEX               PIC 9(8) COMP-1.
00080       03  CURRENT-SSA-ADDR                  PIC 9(8) COMP-1.
00081       03  FIRST-USER-SUPPLIED-LEVEL         PIC 9(8) COMP-1.
00082       03  IOAREA-ADDRESS                    PIC 9(8) COMP-1.
00083       03  LAST-SEGMENT-ACCESSED             PIC 9(8) COMP-1.
00084       03  CURRENT-REF-CODE                  PIC 9(8) COMP-1.
00085       03  USERS-PCB-ADDR                    PIC 9(8) COMP-1.
00086       03  PARENT-SWITCH                     PIC 9(8) COMP-1.
00087       03  PRIOR-STATUS                      PIC 9(8) COMP-1.
00088       03  FUNCTION-CODE                     PIC 9(8) COMP-1.
00089       03  OLD-SSA-COUNT                     PIC 9(8) COMP-1.
00090       03  PRIOR-SWITCH                      PIC 9(8) COMP-1.
00091       03  CONCATENATE-CODE                  PIC 9(8) COMP-1.
00092   *
00093   *
00094   01  FIELD-NAME                            PIC X(12).
00095   01  FIELD-NAME-CHAR REDEFINES FIELD-NAME.
00096       03  FNCH                              PIC X
00097                                             OCCURS 12 TIMES.
00098   *
00099   *
00100   01  QUALIFICATION-TABLE.
00101       03  QUAL-ARRAY                        OCCURS 10 TIMES.
00102           05  BOOLEAN-CODE                  PIC 9(8) COMP-1.
00103           05  KEY-DEF-ADDR                  PIC 9(8) COMP-1.
00104           05  COMPARISON-OPERATOR           PIC 9(8) COMP-1.
00105           05  SEARCH-TALLY                  PIC 9(8) COMP-1.
00106   *
00107   *
00108   01  OPERATOR                              PIC X(6)
00109                                             VALUE SPACES.
00110       88  EQUAL-OP                          VALUES ARE
00111                                             "= ", " =".
00112       88  GREATER-OP                        VALUES ARE
00113                                             "> ", " >".
00114       88  GREATER-EQUAL-OP                  VALUES ARE
00115                                             ">=", "=>".
00116       88  UNEQUAL-OP                        VALUES ARE
00117                                             "<>", "><".
00118       88  LESS-OP                           VALUES ARE
00119                                             "< ", " <".
00120       88  LESS-EQUAL-OP                     VALUES ARE
00121                                             "<=", "=<".
00122   *
```

```
00047 REF BY  00137,  00235,  00337
00048    STARTS IN WORD W00047 +    0  CHAR 0
00049    STARTS IN WORD W00047 +    0  CHAR 3
00050    STARTS IN WORD W00047 +    1  CHAR 0
00051    STARTS IN WORD W00047 +    2  CHAR 0
00052    STARTS IN WORD W00047 +    3  CHAR 0
00053 REF BY  00242
00054    STARTS IN WORD W00047 +    4  CHAR 0
      REF BY  00241,  00269,  00304
00055    STARTS IN WORD W00047 +    4  CHAR 3
      REF BY  00287
00056    STARTS IN WORD W00047 +    5  CHAR 0
      REF BY  00272
00057    STARTS IN WORD W00047 +    5  CHAR 3
      REF BY  00284
00058    STARTS IN WORD W00047 +    6  CHAR 0
      REF BY  00278
00059    STARTS IN WORD W00047 +    6  CHAR 3
      REF BY  00281
00060    STARTS IN WORD W00047 +    7  CHAR 0
      REF BY  00275
00061    STARTS IN WORD W00047 +    7  CHAR 3
00062    STARTS IN WORD W00047 +    8  CHAR 0
      REF BY  00347,  00390
00063    STARTS IN WORD W00047 +    9  CHAR 0
      REF BY  00349,  00394
00064
00065 REF BY  00235,  00337
00066
00067    STARTS IN WORD W00065 +    0  CHAR 0
      REF BY  00248,  00250,  00251,  00258
              00263,  00269,  00272,  00275
              00278,  00281,  00284,  00287
              00357,  00359,  00376,  00379
              00410,  00412,  00414,  00499
00068
00069 REF BY  00235,  00296,  00300,  00337
              00346,  00372,  00388,  00490
00070
00071    STARTS IN WORD W00069 +    0  CHAR 0
00072    STARTS IN WORD W00069 +    0  CHAR 4
      REF BY  00423,  00464
00073
00074
00075    STARTS IN WORD W00074 +    0  CHAR 0
00076    STARTS IN WORD W00074 +    1  CHAR 0
00077    STARTS IN WORD W00074 +    2  CHAR 0
00078    STARTS IN WORD W00074 +    3  CHAR 0
00079    STARTS IN WORD W00074 +    4  CHAR 0
      REF BY  00391,  00394
00080    STARTS IN WORD W00074 +    5  CHAR 0
      REF BY  00142
00081    STARTS IN WORD W00074 +    6  CHAR 0
00082    STARTS IN WORD W00074 +    7  CHAR 0
00083    STARTS IN WORD W00074 +    8  CHAR 0
00084    STARTS IN WORD W00074 +    9  CHAR 0
00085    STARTS IN WORD W00074 +   10  CHAR 0
00086    STARTS IN WORD W00074 +   11  CHAR 0
00087    STARTS IN WORD W00074 +   12  CHAR 0
00088    STARTS IN WORD W00074 +   13  CHAR 0
      REF BY  00241,  00304
00089    STARTS IN WORD W00074 +   14  CHAR 0
00090    STARTS IN WORD W00074 +   15  CHAR 0
00091    STARTS IN WORD W00074 +   16  CHAR 0
      REF BY  00244,  00263,  00265,  00351
00092
00093
00094 REF BY  00135,  00363
00095
00096
00097    STARTS IN WORD W00094 +    0  CHAR 0
      REF BY  00499
00098
00099
00100 REF BY  00337,  00345
00101
00102    STARTS IN WORD W00100 +    0  CHAR 0
      REF BY  00401
00103    STARTS IN WORD W00100 +    1  CHAR 0
      REF BY  00402
00104    STARTS IN WORD W00100 +    2  CHAR 0
      REF BY  00403
00105    STARTS IN WORD W00100 +    3  CHAR 0
      REF BY  00404
00106
00107
00108
00109 REF BY  00471,  00474,  00477,  00480
              00483,  00486
00110
00111
00112
00113
00114
00115
00116
00117
00118
00119
00120
00121
00122
```

```
*
 01  OPERATOR-CHAR REDEFINES OPERATOR.
     03  OP                                PIC X
                                           OCCURS 2 TIMES.      STARTS IN WORD W00108 +    0  CHAR 0
                                                             REF BY  00376,  00379
     03  FILLER                            PIC X(4).            STARTS IN WORD W00108 +    0  CHAR 2
*EJECT

 PROCEDURE DIVISION.
 STARTING SECTION.
 P1.
                                                             REF BY  00132
     GO TO P1.                                               REF TO  00131
     ENTER DEFINITIONS.
         SYMBOL FLDNAM = FIELD-NAME
         SYMBOL FLDTAL = FIELD-TALLY                         REF TO  00094
         SYMBOL SEGDEF = SSA-TABLE-ENTRY                     REF TO  00029
         SYMBOL CODEAK = PROCEDURE CODE-AK                   REF TO  00047
         SYMBOL FLDLEN = FIELD-LENGTH
         SYMBOL FLDDEF = FIELD-DEF                           REF TO  00027
         SYMBOL SAVCHR = SAVE-CHR-POS                        REF TO  00026
         SYMBOL VFN999 = PROCEDURE VFN999                    REF TO  00020
         SYMBOL CURSSA = CURRENT-SSA-ADDR.                   REF TO  00080
     ENTER COBOL.
*EJECT
 GMAP-CODE SECTION.
 GC1.
     ENTER GMAP.
         SYMREF  DEFERR
FNDKEY MACRO
         LXL4    1,4
         LDA     0,4
         ANA     =0770000,DU
         CMPA    =0510000,DU
         TZE     #1
         CMPA    =0530000,DU
         TNZ     DEFERR
         LDA     4,4
         CMPA    0,3
         TNZ     *-9
         LDA     5,4
         CMPA    1,3
         TNZ     *-12
         ENDM    FNDKEY
*
*
QSETAL MACRO
         LDQ     #2
         TZE     DEFERR
         SBQ     1,DL
         DIV     6,DL
         EAX3    0,QL
         ADX3    CURSSA
         STX3    #4
         STCA    #4,01
         LDA     #3
         ALS     6
         STCA    #4,06
         ENDM    QSETAL
*
*
GNCOMP MACRO
         LDX4    3,4
         LDA     0,4
         ANA     =0770000,DU
         CMPA    =0510000,DU
         TZE     #1
         CMPA    =0560000,DU
         TNZ     DEFERR
         ENDM    GNCOMP
*
*
GMMAKE MACRO
         LXL4    1,4
         LDA     0,4
         ANA     =0770000,DU
         CMPA    =0510000,DU
         TNZ     DEFERR
         ENDM    GMMAKE
*
*
.KEYLN SET       0
.RULE  SET       8
*
*
     ENTER COBOL.
 GC999.
     EXIT.
*EJECT

 ISCODE SECTION.
 ISC1.
*
*
*              ISCODE IS AN ENTRY CALLED BY THE
*              CALL ANALYZER
*              ITS FUNCTION IS TO PULL THE COMMAND
*              CODES (IF ANY) FROM THE CURRENT SSA
*              AND PLACE THEM IN THE SSA-TABLE FOR
*              LATER USE.
*
*              ARGUMENT TO ISCODE ARE
*
```

```
00222  *              1.  THE CURRENT SSA                          00222
00223  *              2.  SSA TABLE                                00223
00224  *              3.  CURRENT CHARACTER POSITION IN THE SSA    00224
00225  *                                                           00225
00226  *          RETURN VALUES (GIVING) ARE                       00226
00227  *                                                           00227
00228  *              1.  SSA-TABLE                                00228
00229  *              2.  NEW CHARACTER POSITION                   00229
00230  *              3.  VALIDITY VALUE - ZERO INDICATES SUCCESS. 00230
00231  *                      ANY OTHER VALUE DENOTES FAILURE      00231
00232  *EJECT                                                      00232
00233      ENTER LINKAGE MODE.                                     00233
00234          ENTRY POINT IS ISCODE                               00234
00235              USING SSA, SSA-TABLE-ENTRY, CHAR-POS            00235 REF TO  00019,  00047,  00065,  00069
00236              GIVING SSA-TABLE-ENTRY, CHAR-POS, VALIDITY-SWITCH.00236
00237      ENTER COBOL.                                            00237
00238  *                                                           00238
00239  *                                                           00239
00240      IF FUNCTION-CODE = REPLACE-CODE                         00240
00241          MOVE D-CODE TO HOLD-D-CODE.                         00241 REF TO  00042,  00044,  00054,  00088
00242      MOVE ZERO TO COMMAND-CODE-GROUP.                        00242 REF TO  00053
00243      MOVE ZERO TO NUMBER-OF-COMMAND-CODES.                   00243 REF TO  00045
00244      MOVE ZERO TO CONCATENATE-CODE.                          00244 REF TO  00091
00245  *                                                           00245
00246  1   DISPLAY "SSA-CHAR = " SSA-CHAR (CHAR-POS).              00246
00247      IF SSA-CHAR (CHAR-POS) = COMMAND-CODE-SENTINEL          00247
00248              GO TO PROCESS-CODES.                            00248 REF TO  00019,  00022,  00067,  00254
00249  *                                                           00249
00250      IF SSA-CHAR (CHAR-POS) = SPACE OR QUALIFIER-SENTINEL    00250 REF TO  00019,  00067
00251              GO TO NORMAL-CODE-EXIT.                         00251 REF TO  00019,  00024,  00067,  00295
00252      GO TO ERROR-CODE-EXIT.                                  00252 REF TO  00299
00253  *EJECT                                                      00253
00254   PROCESS-CODES.                                            P00254
                                                                         REF BY  00248,  00258
00255      ADD 1 TO CHAR-POS.                                      00255 REF TO  00019
00256   CHECK-FOR-CODE.                                           P00256
                                                                         REF BY  00293
00257      IF SSA-CHAR (CHAR-POS) = "-"                            00257
00258              GO TO PROCESS-CODES.                            00258 REF TO  00019,  00067,  00254
00259  *                                                           00259
00260  *           IGNORE THE DASH COMMAND                         00260
00261  *                                                           00261
00262      IF SSA-CHAR (CHAR-POS) = "C"                            00262
00263              ADD 1 TO CONCATENATE-CODE                       00263 REF TO  00019,  00067,  00091
00264              IF CONCATENATE-CODE > 1                         00264
00265                  GO TO ERROR-CODE-EXIT'                      00265 REF TO  00091,  00299
00266                  ELSE GO TO GET-NEXT-CODE.                   00266 REF TO  00290
00267  *                                                           00267
00268      IF SSA-CHAR (CHAR-POS) = "D"                            00268
00269              MOVE 1 TO D-CODE                                00269 REF TO  00019,  00054,  00067
00270              GO TO GET-NEXT-CODE.                            00270 REF TO  00290
00271      IF SSA-CHAR (CHAR-POS) = "F"                            00271
00272              MOVE 1 TO F-CODE                                00272 REF TO  00019,  00056,  00067
00273              GO TO GET-NEXT-CODE.                            00273 REF TO  00290
00274      IF SSA-CHAR (CHAR-POS) = "P"                            00274
00275              MOVE 1 TO P-CODE                                00275 REF TO  00019,  00060,  00067
00276              GO TO GET-NEXT-CODE.                            00276 REF TO  00290
00277      IF SSA-CHAR (CHAR-POS) = "U"                            00277
00278              MOVE 1 TO U-CODE                                00278 REF TO  00019,  00058,  00067
00279              GO TO GET-NEXT-CODE.                            00279 REF TO  00290
00280      IF SSA-CHAR (CHAR-POS) = "V"                            00280
00281              MOVE 1 TO V-CODE                                00281 REF TO  00019,  00059,  00067
00282              GO TO GET-NEXT-CODE.                            00282 REF TO  00290
00283      IF SSA-CHAR (CHAR-POS) = "L"                            00283
00284              MOVE 1 TO L-CODE                                00284 REF TO  00019,  00057,  00067
00285              GO TO GET-NEXT-CODE.                            00285 REF TO  00290
00286      IF SSA-CHAR (CHAR-POS) = "N"                            00286
00287              MOVE 1 TO N-CODE                                00287 REF TO  00019,  00055,  00067
00288              GO TO GET-NEXT-CODE.                            00288 REF TO  00290
00289      GO TO NORMAL-CODE-EXIT.                                 00289 REF TO  00295
00290   GET-NEXT-CODE.                                            P00290
                                                                         REF BY  00266,  00270,  00273,  00276
                                                                                 00279,  00282,  00285,  00288
00291      ADD 1 TO NUMBER-OF-COMMAND-CODES.                       00291 REF TO  00045
00292      ADD 1 TO CHAR-POS.                                      00292 REF TO  00019
00293      IF NUMBER-OF-COMMAND-CODES < 4 GO TO CHECK-FOR-CODE.    00293 REF TO  00045,  00256
00294  *EJECT                                                      00294
00295   NORMAL-CODE-EXIT.                                         P00295
                                                                         REF BY  00251,  00289
00296      MOVE ZERO TO VALIDITY-SWITCH.                           00296 REF TO  00069
00297      GO TO EXIT-COMMAND-CODES.                               00297 REF TO  00302
00298  *                                                           00298
00299   ERROR-CODE-EXIT.                                          P00299
                                                                         REF BY  00252,  00265
00300      MOVE 1 TO VALIDITY-SWITCH.                              00300 REF TO  00069
00301  *                                                           00301
00302   EXIT-COMMAND-CODES.                                       P00302
                                                                         REF BY  00297
00303      IF FUNCTION-CODE = REPLACE-CODE                         00303
00304      MOVE HOLD-D-CODE TO D-CODE.                             00304 REF TO  00042,  00044,  00054,  00088
00305   EXIT-ISOCDE-ENTRY.                                        P00305
00306      EXIT ISCODE.                                            00306
00307  *EJECT                                                      00307
00308   ISFLD SECTION.                                            S00308
00309   ISF1.                                                     P00309
00310  *                                                           00310
00311  *                                                           00311
00312  *           ISFLD IS AN ENTRY CALLED BY THE                 00312
00313  *           CALL ANALYZER                                   00313
00314  *           ITS FUNCTION IS TO "PARSE" THE CURRENT          00314
00315  *           SSA, SEPARATING FIELD-NAMES.                    00315
```

```
*                 COMPARISON OPERATORS,                          00316
*                 VALUES, AND                                    00317
*                 BOOLEAN CODES.                                 00318
*                                                                00319
*           ARGUMENTS ARE -                                      00320
*                                                                00321
*             1. THE CURRENT SSA                                 00322
*             2. THE SSA TABLE ENTRY                             00323
*             3.  CURRENT CHARACTER POSITION IN THE SSA          00324
*                                                                00325
*           RETURN VALUES (GIVING) ARE -                         00326
*                                                                00327
*             1.  SSA-TABLE                                      00328
*             2. NEW CHARACTER POSITION                          00329
*             3.  QUALIFICATION TABLE                            00330
*             4.  VALIDITY VALUE - ZERO INDICATES SUCCESS,       00331
*                     UPON FAILURE, THE VALIDITY CELL WILL       00332
*                     CONTAIN THE CORRECT IMS STATUS CODE        00333
*EJECT                                                           00334
     ENTER LINKAGE MODE.                                         00335
         ENTRY POINT IS ISFLD                                    00336
             USING SSA, SSA-TABLE-ENTRY, CHAR-POS                00337 REF TO  00019,  00047,  00065,  00069
                                                                               00100
             GIVING SSA-TABLE-ENTRY, CHAR-POS,                   00338
                         QUALIFICATION-TABLE, VALIDITY-SWITCH.   00339
     ENTER COBOL.                                                00340
*                                                                00341
*                                                                00342
*                                                                00343
     MOVE ZERO TO QUAL-COUNT.                                    00344 REF TO  00030
     MOVE ZERO TO QUALIFICATION-TABLE.                           00345 REF TO  00100
     MOVE ZERO TO VALIDITY-SWITCH.                               00346 REF TO  00069
     MOVE ZERO TO NUMBER-OF-QUALIFIERS.                          00347 REF TO  00062
     MOVE ZERO TO LOGIC-CODE.                                    00348 REF TO  00025
     MOVE ZERO TO QUAL-TABLE-INDEX.                              00349 REF TO  00063
     IF CONCATENATE-CODE NOT = ZERO                              00350
             GO TO NORMAL-FIELD-EXIT.                            00351 REF TO  00091,  00427
*                                                                00352
1    DISPLAY "SSA-TABLE = " SSA-TABLE-ENTRY.                     00353
1    DISPLAY "  ".                                               00354
1    DISPLAY "SSA-CHAR = " SSA-CHAR (CHAR-POS).                  00355
     IF SSA-CHAR (CHAR-POS) = SPACE                              00356
             GO TO NORMAL-FIELD-EXIT.                            00357 REF TO  00019,  00067,  00427
     IF SSA-CHAR (CHAR-POS) NOT = QUALIFIER-SENTINEL             00358
             GO TO ERROR-FIELD-EXIT.                             00359 REF TO  00019,  00024,  00067,  00421
     ADD 1 TO CHAR-POS.                                          00360 REF TO  00019
*                                                                00361
PICK-UP-FIELD-NAME.                                              00362
                                                                       REF BY  00418
     MOVE SPACES TO FIELD-NAME.                                  00363 REF TO  00094
     COMPUTE SAVE-CHR-POS = CHAR-POS + 10.                       00364 REF TO  00019,  00020
     PERFORM MOVE-FIELD-CHAR VARYING I                           00365 REF TO  00033,  00497,  00501
                         FROM 1 BY 1 UNTIL I > 8.                00366
*                                                                00367
1    DISPLAY "FIELD NAME = " FIELD-NAME.                         00368
     PERFORM VERIFY-FIELD-NAME.                                  00369 REF TO  00033,  00430,  00464
*                                                                00370
     IF VALIDITY-SWITCH NOT = ZERO                               00371
             GO TO ERROR-ALREADY-SET.                            00372 REF TO  00069,  00425
*                                                                00373
*            MOVE COMPARISON OPERATOR                            00374
*                                                                00375
     MOVE SSA-CHAR (CHAR-POS) TO OP (1).                         00376 REF TO  00019,  00067,  00126
     ADD 1 TO I.                                                 00377 REF TO  00033
     ADD 1 TO CHAR-POS.                                          00378 REF TO  00019
     MOVE SSA-CHAR (CHAR-POS) TO OP (2).                         00379 REF TO  00019,  00067,  00126
     ADD 1 TO CHAR-POS.                                          00380 REF TO  00019
*                                                                00381
1    DISPLAY "OPERATOR = " OPERATOR.                             00382
     PERFORM OPERATOR-VERIFY.                                    00383 REF TO  00468,  00493
*                                                                00384
*            CHECKS OPERATOR VALIDITY, AND                       00385
*            SETS NUMERIC CODE                                   00386
*                                                                00387
     IF VALIDITY-SWITCH NOT = ZERO GO TO CODE-AJ.                00388 REF TO  00069,  00420
*                                                                00389
     ADD 1 TO NUMBER-OF-QUALIFIERS.                              00390 REF TO  00062
     ADD 1 TO QUALIFICATION-INDEX.                               00391 REF TO  00079
*                                                                00392
     IF QUAL-TABLE-INDEX = ZERO                                  00393
             MOVE QUALIFICATION-INDEX TO QUAL-TABLE-INDEX.       00394 REF TO  00063,  00079
*                                                                00395
*            FILL QUALIFICATION TABLE                            00396
*                                                                00397
     ADD 1 TO QUAL-COUNT.                                        00398 REF TO  00030
     IF QUAL-COUNT > QUAL-MAX GO TO CODE-AJ.                     00399 REF TO  00030,  00032,  00420
*                                                                00400
     MOVE LOGIC-CODE TO BOOLEAN-CODE (QUAL-COUNT).               00401 REF TO  00025,  00030,  00102
     MOVE FIELD-DEF TO KEY-DEF-ADDR (QUAL-COUNT).                00402 REF TO  00026,  00030,  00103
     MOVE OP-CODE TO COMPARISON-OPERATOR (QUAL-COUNT).           00403 REF TO  00028,  00030,  00104
     MOVE FIELD-TALLY TO SEARCH-TALLY (QUAL-COUNT).              00404 REF TO  00029,  00030,  00105
*                                                                00405
     ADD FIELD-LENGTH TO CHAR-POS.                               00406 REF TO  00019,  00027
*                                                                00407
1    DISPLAY "NEW-SSA-CHAR = " SSA-CHAR (CHAR-POS).              00408
     IF SSA-CHAR (CHAR-POS) = AND-CHAR                           00409
             MOVE AND-CODE TO LOGIC-CODE                         00410 REF TO  00019,  00025,  00039,  00041
                                                                               00067
          ELSE IF SSA-CHAR (CHAR-POS) = OR-CHAR                  00411
              MOVE OR-CODE TO LOGIC-CODE                         00412 REF TO  00019,  00025,  00035,  00037
                                                                               00067
                  ELSE IF SSA-CHAR (CHAR-POS) = END-SSA-CHAR     00413
                      GO TO NORMAL-FIELD-EXIT                    00414 REF TO  00018,  00019,  00067,  00427
                      ELSE GO TO CODE-AJ.                        00415 REF TO  00420
```

```
*                                                           00416
     ADD 1 TO CHAR-POS.                                     00417 REF TC  00019
     GO TO PICK-UP-FIELD-NAME.                              00418 REF TC  00362

 CODE-AJ.                                                  P00420
                                                                  REF BY  00388,  00399,  00415
 ERROR-FIELD-EXIT.                                         P00421
                                                                  REF BY  00359
*                                                           00422
     MOVE "AJ" TO VALIDITY-CODE.                            00423 REF TO  00072
*                                                           00424
 ERROR-ALREADY-SET.                                        P00425
                                                                  REF BY  00372
*                                                           00426
 NORMAL-FIELD-EXIT.                                        P00427
                                                                  REF BY  00391,  00397,  00414
     EXIT ISFLD.                                            00428
*EJECT                                                      00429
 VERIFY-FIELD-NAME SECTION.                                S00430
                                                                  REF BY  00369
 VFN1.                                                     P00431
*                                                           00432
*                                                           00433
     ENTER GMAP.                                            00434
        LDX4     SEGDEF     ESTABLISH SEG DEF ADDR          00435
        LXL3     .RULE.4    ISOLATE LOGICAL-PHYSICAL BIT    00436
        ANX3     =01.DU                                     00437
        TNZ      LGLSEG     IF LOGICAL GO TO LOGICAL-PROC   00438
        EAX3     FLDNAM     ADDRESS THE NAME                00439
        FNDKEY   CODEAK     FIND THE KEY DEFINITION         00440
FLDFND  NULL                                                00441
        STX4     FLDDEF     SAVE FIELD DEF ADDR             00442
        STZ      FLDLEN                                     00443
        LXL2     .KEYLN.4      PICK UP KEY LENGTH           00444
        SXL2     FLDLEN           SAVE IN LENGTH VARIABLE   00445
        QSETAL   CURSSA.SAVCHR.FLDLEN.FLDTAL                00446
        TRA      VFN999     EXIT                            00447
LGLSEG  NULL                                                00448
        GNCOMP   CODEAK     FIND THE COMPONENT SEG DEFS     00449
        STX4     HLDSEG     SAVE LSEG ADDR                  00450
        GMMAKE              X4 = ADDR OF SEG DEF            00451
        EAX3     FLDNAM                                     00452
        FNDKEY   NXTLGL     SEARCH FOR THE KEY DEF          00453
        TRA      FLDFND     IF FOUND PROCESS NORMALLY       00454
NXTLGL  NULL                IF NOT FOUND.GET THE NEXT COMPONENT 00455
        LDX4     HLDSEG     RESTORE X4                      00456
        TRA      LGLSEG                                     00457
HLDSEG  BSS      1                                          00458
     ENTER COBOL.                                           00459
*                                                           00460
     GO TO VFN999.                                          00461 REF TO  00465
*                                                           00462
 CODE-AK.                                                  P00463
     MOVE "AK" TO VALIDITY-CODE.                            00464 REF BY  00369
                                                                  REF TO  00072
 VFN999.                                                   P00465
                                                                  REF BY  00461
     EXIT.                                                  00466
*EJECT                                                      00467
 OPERATOR-VERIFY SECTION.                                  S00468
                                                                  REF BY  00383
 OV1.                                                      P00469
     IF EQUAL-OP                                            00470
            MOVE ZERO TO OP-CODE                            00471 REF TC  00028,  00109
            GO TO OPERATOR-VALID.                           00472 REF TC  00493
     IF GREATER-OP                                          00473
            MOVE 1 TO OP-CODE                               00474 REF TC  00028,  00109
            GO TO OPERATOR-VALID.                           00475 REF TC  00493
     IF GREATER-EQUAL-OP                                    00476
            MOVE 2 TO OP-CODE                               00477 REF TC  00028,  C0109
            GO TO OPERATOR-VALID.                           00478 REF TC  00493
     IF UNEQUAL-OP                                          00479
            MOVE 3 TO OP-CODE                               00480 REF TC  00028,  00109
            GO TO OPERATOR-VALID.                           00481 REF TC  00493
     IF LESS-OP                                             00482
            MOVE 4 TO OP-CODE                               00483 REF TC  00028,  00109
            GO TO OPERATOR-VALID.                           00484 REF TC  00493
     IF LESS-EQUAL-OP                                       00485
            MOVE 5 TO OP-CODE                               00486 REF TC  00028,  00109
            GO TO OPERATOR-VALID.                           00487 REF TC  00493
*                                                           00488
 OPERATOR-INVALID.                                         P00489
     MOVE 1 TO VALIDITY-SWITCH.                             00490 REF TC  00069
     GO TO OV999.                                           00491 REF TC  00494
*                                                           00492
 OPERATOR-VALID.                                           P00493
                                                                  REF BY  00383,  00472,  00475,  00478
                                                                          C0481,  00484,  00487
 OV999.                                                    P00494
                                                                  REF BY  00491
     EXIT.                                                  00495
*EJECT                                                      00496
 MOVE-FIELD-CHAR SECTION.                                  S00497
                                                                  REF BY  00365
 MFC1.                                                     P00498
     MOVE SSA-CHAR (CHAR-POS) TO FNCH (I).                  00499 REF TC  00019,  00033,  00067,  00097
     ADD 1 TO CHAR-POS.                                     00500 REF TC  00019
*                                                           00501 REF BY  00365
 MFC999.                                                   P00502
     EXIT.                                                  00503
 END PROGRAM.                                               00504
***** THE ABOVE LISTING CONTAINS 000 ERROR MESSAGE *****   * THE ABOVE LISTING CONTAINS 000 EFFICIENCY MESSAGE *
 *** THE ABOVE LISTING CONTAINS 000 WARNING MESSAGE ***
```

FILL-IN-MISSING-SSAS ROUTINE

```
                                       1          LBL      MISSNG                                                 00000040
                                       2          TTL      FILL-IN-MISSING-SSAS ROUTINE                           00000050
                                       3                                                                          00000055
                                       4                                                                          00000060
                                       5                                                                          00000070
                                       6                   THIS ROUTINE IS USED TO INSERT SKELETON                00000080
                                       7                   ENTRIES IN THE SSA TABLE FOR MISSING(HIERARCHICALLY    00000090
                                       8                   SPEAKING) SEGMENTS                                     00000100
                                       9                                                                          00000110
                                      10                   ARGS ARE                                               00000120
                                      11                                                                          00000130
                                      12                   1. CURRENT-LEVEL                                       00000140
                                      13                   2. PREVIOUS-LEVEL (MUST BE > CURRENT-LEVEL)            00000150
                                      14                   3. VALIDITY SWITCH                                     00000160
                                      15                                                                          00000170
                                      16                                                                          00000180
                                      17          SYMREF   DEFERR                                                 00000190
                                      18          SYMDEF   MISSNG                                                 00000200
                                      19                                                                          00000210
                                      20 GETPAR   MACRO                                                           00000220
                                      21          LDX4     2,4                                                    00000230
                                      22          LDA      0,4                                                    00000240
                                      23          ANA      =0770000,DU                                            00000250
                                      24          CMPA     =0510000,DU                                            00000260
                                      25          TZE      #1                                                     00000270
                                      26          CMPA     =0540000,DU                                            00000280
                                      27          TNZ      DEFERR                                                 00000290
                                      28          LXL4     1,4                                                    00000300
                                      29          LDA      0,4                                                    00000310
                                      30          ANA      =0770000,DU                                            00000320
                                      31          CMPA     =0510000,DU                                            00000330
                                      32          TNZ      DEFERR                                                 00000340
                                      33          ENDM     GETPAR                                                 00000350
                                      34                                                                          00000360
                                      35                                                                          00000370
                         000000       36 MISSNG   NULL                                                            00000380
000000  000140 7530 00  010           37          SREG     HLDREG       SAVE REGISTERS                            00000390
000001  010015 2350 00  030           39          LDA      FUNCDE       IGNORE CALL IF IMS                        00000410
000002  000010 1150 07  000           40          CMPA     REPLCD,DL    CALL WAS AN "REPL"                        00000420
000003  000122 6050 00  010           41          TPL      OKEXIT       OR "DLET"                                 00000430
000004  000002 2350 31  000           42          LDA      2,1*         PICK UP CURRENT LEVEL                     00000440
000005  000131 7550 00  010           43          STA      CURLVL                                                 00000450
000006  000003 2350 31  000           44          LDA      3,1*         PICK UP PREVIOUS LEVEL                    00000460
000007  000133 7550 00  010           45          STA      PRELVL                                                 00000470
                                      46                                XA STILL CONTAINS PREVIOUS-LEVEL          00000480
                                      47                                                                          00000490
000010  000131 1150 00  010           48          CMPA     CURLVL       IF CURRENT-LEVEL >=                       00000500
000011  000124 6040 00  010           49          TMI      ERROR        PREVIOUS-LEVEL GO TO ERROR                00000510
000012  000001 1750 07  000           50          SBA      1,DL         WORK-LEVEL = PREVIOUS-LEVEL - 1           00000520
000013  000132 7550 00  010           51          STA      WRKLVL                                                 00000530
                                      52                                                                          00000540
000014  000133 2360 00  010           53          LDQ      PRELVL       COMPUTE SSA TABLE LOCATION                00000550
000015  000001 1760 07  000           54          SBQ      1,DL            FOR THIS LEVEL (PREVIOUS-LEVEL)        00000560
000016  000012 4020 07  000           55          MPY      .SSSIZ,DL                                              00000570
000017  000022 7360 00  000           56          QLS      18                                                     00000580
000020  010001 0760 00  030           57          ADQ      SSATAB                                                 00000590
000021  000000 6220 02  000           58          EAX2     0,QU         X2 = ADDR(SSA-TABLE(PREVIOUS-LEVEL))      00000600
000022  000000 2240 12  000           59          LDX4     .SEGAD,2     X4 = SEG DEF ADDR FROM SSA TABLE ENTRY    00000610
                                      60                                                                          00000620
                                      61                                                                          00000630
                         000023       62 TSTDON   NULL                                                            00000640
END OF BINARY CARD MISSNG02
000023  000132 2350 00  010           63          LDA      WRKLVL       IF CURRENT-LEVEL =                        00000650
000024  000131 1150 00  010           64          CMPA     CURLVL         WORK-LEVEL GO TO GOT-CURRENT            00000660
000025  000072 6000 00  010           65          TZE      GOTCUR                                                 00000670
                                      66                                                                          00000680
                         000026       67          GETPAR   ERROR        FIND PARENT - ERRO , IF NONE              00000690
                                      68                                                                          00000700
000042  000005 2360 14  000           69          LDQ      .LEVEL,4     PICK UP LEVEL FROM SEG DEF                00000710
000043  000022 7320 00  000           70          QRS      18           RIGHT-JUSTIFY IT                          00000720
000044  000132 1160 00  010           71          CMPQ     WRKLVL       IF WORK-LEVEL NOT =                       00000730
000045  000124 6010 00  010           72          TNZ      ERROR           LEVEL FROM SEG DEF GO TO ERROR         00000740
                                      73                                                                          00000750
                                      74                                                                          00000760
END OF BINARY CARD MISSNG03
000046  000001 1760 07  000           75          SBQ      1,DL         COMPUTE ADDRESS OF SSA TABLE ENTRY        0000077
000047  000012 4020 07  000           76          MPY      .SSSIZ,DL                                              0000078
000050  000022 7360 00  000           77          QLS      18                                                     0000079
000051  010001 0760 00  030           78          ADQ      SSATAB                                                 0000080
000052  000000 6220 02  000           79          EAX2     0,QU         X2 = ADDR(SSA-TABLE(WORK-LEVEL))          0000081
                                      80                                                                          0000082
000053  000001 4500 12  000           81          STZ      .IOTAL,2     ZERO I-O-AREA TALLY                       0000083
000054  000002 4500 12  000           82          STZ      .UNIQE,2     ZERO UNIQUENESS INDICATOR                 0000084
000055  000003 4500 12  000           83          STZ      .EISWD,2     ZERO THE EIS DESCRIPTOR                   0000085
000056  000004 4500 12  000           84          STZ      .DCODE,2     WIPE OUT ANY PREVIOUSLY                   0000085
000057  000005 4500 12  000           85          STZ      .FCODE,2     SET COMMAND                               0000085
000060  000006 4500 12  000           86          STZ      .UCODE,2     CODES                                     0000085
000061  000007 4500 12  000           87          STZ      .PCODE,2                                               0000085
000062  000010 4500 12  000           88          STZ      .QLCNT,2     ZERO QUALIFIER COUNT                      0000086
000063  000000 7440 12  000           89          STX4     .SEGAD,2     PUT SEG DEF ADDR IN SSA-TABLE             0000087
000064  000001 2270 03  000           90          LDX7     1,DU         1 INDICATES AN IMPLIED LEVEL              0000088
000065  000000 4470 12  000           91          SXL7     .SUPLY,2     SET IMPLIED LEVEL                         0000089
                                      92                                                                          0000090
000066  000132 2350 00  010           93          LDA      WRKLVL       DECREMENT WORK-LEVEL                      0000091
000067  000001 1750 07  000           94          SBA      1,DL                                                   0000092
000070  000132 7550 00  010           95          STA      WRKLVL                                                 0000093
                                      96                                                                          0000094
END OF BINARY CARD MISSNG04
000071  000023 7100 00  010           97          TRA      TSTDON       GO SEE IF WE ARE DONE                     0000095
```

```
            000072        GOTCUR NULL
            000072               GETPAR  TOPCHK        FIND PARENT - GO TO TOP-CHECK IF NONE   00000970
                                                                                               00000980
000106 000131 2360 00  010       LDQ     CURLVL        PICK UP CURRENT LEVEL                   00000990
000107 000124 6000 00  010       TZE     ERROR         ERROR IF ZERO AND THIS POINT REACHED    00001000
000110 000001 1760 07  000       SBQ     1,DL          COMPUTE THE ADDRESS                     00001010
000111 000012 4020 07  000       MPY     .SSSIZ,DL     OF THE SSA TABLE ENTRY                  00001020
000112 000022 7360 00  000       QLS     18                                                    00001030
000113 010001 0760 00  030       ADQ     SSATAB                                                00001040
OF BINARY CARD MISSNG05                                                                        00001050
000114 000000 6220 02  000       EAX2    0,QU          X2 = ADDR(SSA-TABLE(WORK-LEVEL))        00001060

000115 000000 1040 12  000       CMPX4   .SEGAD,2      DOES SEF DEF = SEG DEF ADDR IN SSA-TAB  00001070
000116 000124 6010 00  010       TNZ     ERROR         NO  - ERROR                             00001080
000117 000122 7100 00  010       TRA     OKEXIT        YES - EXIT NORMALLY                     00001090
                                                                                               00001100
                                                                                               00001110
            000120        TOPCHK NULL                                                          00001120
000120 000131 2350 00  010       LDA     CURLVL        IF THIS  POINT IS REACHED, AND          00001130
000121 000124 6010 00  010       TNZ     ERROR         CURRENT-LEVEL IS NOT ZERO, THAT IS      00001140
                                                       AN ERROR                                00001150
                                                                                               00001160
            000122        OKEXIT NULL                                                          00001170
000122 000004 4500 31  000       STZ     4,1*          SET VALIDITY CHECK CELL TO ZERO (OK)    00001180
000123 000127 7100 00  010       TRA     EXIT                                                  00001190
                                                                                               00001200
            000124        ERROR  NULL                                                          00001210
000124 000001 2350 07  000       LDA     1,DL          SET VALIDITY CHECK CELL                 00001220
000125 000004 7550 31  000       STA     4,1*          TO 1 (ERROR)                            00001230
000126 000127 7100 00  010       TRA     EXIT                                                  00001240
                                                                                               00001250
            000127        EXIT   NULL                                                          00001270
000127 000140 0730 00  010       LREG    HLDREG        RESTORE REGISTERS                       00001280
000130 000000 7100 11  000       TRA     0,1                                                   00001290
                                                                                               00001300
                                                                                               00001310
                                                                                               00001320
                                                                                               00001330
                                                                                               00001340
                                                                                               00001350
            000131        CURLVL BSS     1             CURRENT LEVEL                           00001360
            000132        WRKLVL BSS     1             WORK LEVEL                              00001370
            000133        PRELVL BSS     1             PREVIOUS LEVEL                          00001380
                                                                                               00001390
                                                                                               00001400
            000010        REPLCD SET     8             FUNCTION NUMBER FOR REPL                00001410
                                                                                               00001420
                                                                                               00001430
000134 000004710004    000
            000140               EIGHT                                                         00001440
            000140        HLDREG BSS     8                                                     00001450
                                                                                               00000010
                                         LAY-OUT OF THE SSA TABLE                              00000020
                                                                                               00000030
                                                                                               00000040
            000012        .SSSIZ SET     10            TABLE SIZE                              00000050
            000000        .SEGAD SET     0             SEG DEFINITION ADDRESS                  00000060
            000000        .SUPLY SET     0             FLAG FOR USER-SUPPLIED OR IMPLIED       00000070
            000001        .IOTAL SET     1             I-O-AREA TALLY                          00000080
            000002        .UNIQE SET     2             UNIQUENESS INDICATOR                    00000090
            000003        .EISWD SET     3             EIS DESCRIPTOR WORD OF SEGMENT          00000100
            000004        .DCODE SET     4             D COMMAND CODE (UPPER)                  00000110
            000004        .NCODE SET     4             N COMMAND-CODE (LOWER)                  00000120
            000005        .FCODE SET     5             F COMMAND CODE (UPPER)                  00000125
            000005        .LCODE SET     5             L COMMAND CODE (LOWER)                  00000130
            000006        .UCODE SET     6             U COMMAND CODE (UPPER)                  00000135
            000006        .VCODE SET     6             V COMMAND CODE (LOWER)                  00000140
            000007        .PCODE SET     7             P COMMAND CODE (UPPER)                  00000145
            000010        .QLCNT SET     8             NUMBER OF QUALIFIERS                    00000150
            000011        .QLPTR SET     9             INDEX OF FIRST ENTRY IN QUAL. TABLE     00000160
                                                                                               00000170

                                                                                               00000010
                                                                                               00000020
                                         LAY-OUT OF THE IMS SEG DEFINITION TABLE ENTRY         00000030
                                                                                               00000040
                                                                                               00000050
            000000        .SGLEN SET     0             SEGMENT LENGTH (DATA ONLY)              00000060
            000000        .SQKEY SET     0             ADDRESS OF THE SEQUENCE-KEY             00000070
            000003        .LGCHL SET     3             POINTER TO FIRST LOGICAL COMPONENT      00000080
            000004        .SGORD SET     4             LOCATION OF IDS ORD POINTER             00000090
            000005        .LEVEL SET     5             IMS LEVEL NUMBER                        00000100
            000005        .RCNUM SET     5             IMS RECORD NUMBER                       00000110
            000006        .SGREA SET     6             AREA FLAG WORD                          00000120
            000006        .INDEX SET     6             INDEX ROUTINE ADDRESS                   00000130
            000007        .PERM  SET     7             PERMISSION WORD (G,I,R,D,K,P)           00000140
            000010        .RULE  SET     8             LOGICAL RULES  AND INSERT RULES         00000150
            000011        .PCHLD SET     9             PC ADDR HOLD AREA                       00000160
            000012        .CURNT SET     10            IDS CURRENCY FOR THIS SEGMENT           00000170
            000013        .SGNAM SET     11            IMS SEGMENT NAME                        00000180
            000000               BLOCK   C05                                                   00000010
            000000        SSACNT BSS     1             SSA COUNT IN CURRENT CALL               00000020
            000001        SSATAB BSS     1             ADDRESS OF THE CURRENT SSA TABLE        00000030
            000002        QALTAB BSS     1             ADDRESS OF QUALIFICATION TABLE          00000040
            000003        PCBDFN BSS     1             PCB DEFINITION ADDRESS                  00000050
            000004        QUALDX BSS     1             QUALIFICATION TABLE INDEX               00000060
            000005        CURSSA BSS     1             ADDRESS OF CURRENT USER SSA             00000070
            000006        FRSTLV BSS     1             FIRST USER-SUPPLIED LEVEL               00000080
            000007        IOAREA BSS     1             ADDRESS OF USER'S I-O-AREA              00000090
            000010        LSTSEG BSS     1             ADDRESS OF LAST ACCESSED SEG            00000100
            000011        CURREF BSS     1             REF. CODE OF LAST ACCESSED RECORD       00000110
            000012        PCBADR BSS     1             ADDRESS OF USER'S PCB                   00000120
            000013        PRNTSW BSS     1             SWITCH FOR IMS PARENT SETTING           00000130
```

```
000014    PRSTAT BSS   1          STATUS OF PREVIOUS CALL                   00000140
000015    FUNCDE BSS   1          IMS FUNCTION CODE                         00000150
000016    OLDSSA BSS   1          OLD SSA COUNT (PREVIOUS CALL)             00000160
000017    PRIRSW BSS   1          USE PRIOR DIRECTION SWITCH                00000170
000020    CCODEC BSS   1          COMMAND CODE "C" SWITCH                   00000180
000021    USERIO BSS   1          ADDRESS OF USER'S I-O-AREA                00000190
000022    MVETAL BSS   1          TALLY WORD BUILD BY MVESEG WHEN NO SSA'S  00000200
                                                                            00000210
                                                                            00000220
                                                                            00000230
                                                                            00000240
                                                                            00000250
000150           USE                                                        00000260
                                                                            00001500
                                                                            00001510

ERROR LINKAGE

  000150  000000000000   000
  000151  443162624527   000
END OF BINARY CARD MISSNG06
                 END                                                        00001520
```

MOVE I-O-AREAS

```
         LBL    MOVEIO                                                00000040
         TTL    MOVE I-O-AREAS                                        00000050
                                                                      00000055
                                                                      00000060
                                                                      00000070
                                                                      00000080
                THIS ROUTINE MOVE I-O-AREAS ACCORDING                 00000090
                TO THE FUNCTION INVOLVED                              00000100
                                                                      00000110
                  1. FOR "GET" FUNCTIONS, IT MOVES THE IMS I-O-AREA   00000120
                     TO THE USER AREA                                 00000130
                  2. FOR "UPDATE" FUNCTIONS, IT MOVES THE             00000140
                     OTHER DIRECTION                                  00000150
                                                                      00000160
                THE REASON FOR THIS MOVE IS THE SUPPORT OF            00000170
                THE IMS "KEY-FLIPPING" FEATURE IN LOGICAL             00000180
                SEGMENTS                                              00000190
                                                                      00000200
                BRIEFLY, WHEN IMS PLACES A LOGICAL SEGMENT IN         00000210
                THE I-O-AREA, IT REVERSES THE POSITIONS OF THE        00000220
                LOGICAL KEYS (I.E. THE KEY FOR THE PARENT PRECEDES    00000230
                THE DATA FOR THE CHILD, AND THE KEY FOR THE           00000240
                CHILD PRECEDES THE DATA FOR THE PARENT)               00000250
                                                                      00000270
                                                                      00000280
                                                                      00000290
GNCHLD   MACRO                                                        00000300
         LDX4   2,4                                                   00000310
         LDA    0,4                                                   00000320
         ANA    =0770000,DU                                           00000330
         CMPA   =0510000,DU                                           00000340
         TZE    #1                                                    00000350
         CMPA   =0540000,DU                                           00000360
         TNZ    DEFERR                                                00000370
         ENDM   GNCHLD                                                00000380
                                                                      00000390
                                                                      00000400
GMPRNT   MACRO                                                        00000410
         LXL4   1,4                                                   00000420
         LDA    0,4                                                   00000430
         ANA    =0770000,DU                                           00000440
         CMPA   =0510000,DU                                           00000450
         TNZ    DEFERR                                                00000460
         ENDM   GMPRNT                                                00000470
                                                                      00000480
                                                                      00000490
GNCOMP   MACRO                                                        00000500
         LDX4   3,4                                                   00000510
         LDA    0,4                                                   00000520
         ANA    =0770000,DU                                           00000530
         CMPA   =0510000,DU                                           00000540
         TZE    #1                                                    00000550
         CMPA   =0560000,DU                                           00000560
         TNZ    DEFERR                                                00000570
         ENDM   GNCOMP                                                00000580
                                                                      00000590
                                                                      00000600
GMMAKE   MACRO                                                        00000610
         LXL4   1,4                                                   00000620
         LDA    0,4                                                   00000630
         ANA    =0770000,DU                                           00000640
         CMPA   =0510000,DU                                           00000650
         TNZ    DEFERR                                                00000660
         ENDM   GMMAKE                                                00000670
                                                                      00000680
                                                                      00000690
GHMAKE   MACRO                                                        00000700
         LXL5   1,4                                                   00000710
         LDA    0,5                                                   00000720
         ANA    =0770000,DU                                           00000730
         CMPA   =0510000,DU                                           00000740
         TNZ    DEFERR                                                00000750
         ENDM   GHMAKE                                                00000760
                                                                      00000780
                                                                      00000790
                                                                      00000800
```

```
                                        SYMDEF  MOVEIO

                                        SYMREF  DEFERR

                            000000   MOVEIO NULL
000000  000460 7530 00  010                 SREG    HLDREG

000001  010001 2230 00  030                 LDX3    SSATAB       X3 = ADDR(SSA-TABLE(1))
000002  000426 4500 00  010                 STZ     UPDTSW       RESET UPDATE SWITCH
000003  010003 2270 00  030                 LDX7    PCBDFN       X7 = PCB DEF ADDR

000004  000002 7200 17  000                 LXL0    .CRLVL,7
000005  000430 4400 00  010                 SXL0    CURLVL       CURRENT LEVEL = LEVEL FROM PCB
000006  000424 6000 00  010                 TZE     EXIT
                                                                 EXIT IF NO CURRENT
000007  010015 2350 00  030                 LDA     FUNCDE       WAS THIS A "GET" FUNCTION
000010  000431 1150 00  010                 CMPA    ISRTCD
000011  000013 6040 00  010                 TMI     *+2
000012  000426 0540 00  010                 AOS     UPDTSW       NO - SET THE UPDATE SWITCH
000013  010000 2350 00  030                 LDA     SSACNT       WERE THERE ANY SSA'S
000014  000070 6000 00  010                 TZE     NOSSAS       NO - HANDLE SEPARATELY

000015  000001 2350 07  000                 LDA     1,DL         WRKLVL = 1
000016  000427 7550 00  010                 STA     WRKLVL

                            000017   ENDCHK NULL
000017  000430 1150 00  010                 CMPA    CURLVL       IF WRKLVL > CURRENT-LEVEL THEN EXIT
000020  000022 6000 00  010                 TZE     *+2
000021  000424 6050 00  010                 TPL     EXIT

000022  010000 1150 00  030                 CMPA    SSACNT       IF WRKLVL = SSACNT
) OF BINARY CARD MOVEI002
000023  000030 6000 00  010                 TZE     MOVE         THEN DO THE MOVE

000024  000000 7200 13  000                 LXL0    .SUPLY,3     WAS THIS SSA USER-SUPPLIED
000025  000064 6010 00  010                 TNZ     NXTLVL       NO - GO TRY NEXT LEVEL

000026  000004 2200 13  000                 LDX0    .DCODE,3     WAS COMMAND CODE "D" SUPPLIED
000027  000064 6000 00  010                 TZE     NXTLVL       NO -SKIP THIS LEVEL
                            000030   MOVE   NULL
000030  000000 2240 13  000                 LDX4    .SEGAD,3     X4 = SEG DEF ADDR
000031  000010 2350 14  000                 LDA     .RULE,4      IS THIS A LOGICAL SEGMENT
000032  000001 3750 07  000                 ANA     =O1,DL
000033  000064 6000 00  010                 TZE     NXTLVL       NO - THEN IGNORE IT
000034  000001 2350 13  000                 LDA     .IOTAL,3     PICK UP EMULATOR I-O-AREA TALLY
000035  000432 7550 00  010                 STA     BASTAL       SET UP BASE TALLY

                            000036   SETUP  NULL
000036  000432 2350 00  010                 LDA     BASTAL
000037  000433 7550 00  010                 STA     FROMTL       PRIME TO AND FROM TALLIES
000040  000434 7550 00  010                 STA     TOTALY

000041  000433 2200 00  010                 LDX0    FROMTL       COMPUTE WORD OFFSET FROM
000042  010007 1600 00  030                 SBX0    IOAREA       BEGGINING OF I-O-AREA
000043  010021 0600 00  030                 ADX0    USERIO
000044  000434 7400 00  010                 STX0    TOTALY       BUILD TALLY FOR SEGMENT IN USER'S IOAREA
000045  000434 2350 00  010                 LDA     TOTALY
) OF BINARY CARD MOVEI003
000046  000435 7550 00  010                 STA     USRBAS       SAVE USER'S I-O-AREA BASE TALLY

000047  000010 2350 14  000                 LDA     .RULE,4      IS THIS SEGMENT "LOGICAL"
000050  000007 3750 07  000                 ANA     =O7,DL
000051  000101 6010 00  010                 TNZ     MOVLGL       YES - HANDLE SEPARATELY

                            000052   NORMAL NULL
000052  000426 2340 00  010                 SZN     UPDTSW       IS THIS A GET OR UPDATE CALL
000053  000060 6010 00  010                 TNZ     NRMUPD

000054  000433 2350 52  010                 LDA     FROMTL,SC    GET - MOVE SEGMENT INTO
000055  000434 7550 52  010                 STA     TOTALY,SC    USER'S I-O-AREA
000056  000054 6070 00  010                 TTF     *-2
000057  000064 7100 00  010                 TRA     NXTLVL

                            000060   NRMUPD NULL
000060  000434 2350 52  010                 LDA     TOTALY,SC    MOVE SEGMENT FROM USER'S I-O-AREA
000061  000433 7550 52  010                 STA     FROMTL,SC    TO EMULATOR'S
000062  000060 6070 00  010                 TTF     *-2
000063  000064 7100 00  010                 TRA     NXTLVL

                            000064   NXTLVL NULL
000064  000012 0630 03  000                 ADX3    .SSSIZ,DU    X3 = ADDR(SSA-TABLE(WRKLVL+1))
000065  000427 0540 00  010                 AOS     WRKLVL
                                                                 WRKLVL = WRKLVL + 1
000066  000427 2350 00  010                 LDA     WRKLVL
000067  000017 7100 00  010                 TRA     ENDCHK

                            000070   NOSSAS NULL
000070  000002 2240 17  000                 LDX4    .CRSEG,7     X4 = SEG DEF ADDR CURRENT SEG
) OF BINARY CARD MOVEI004
000071  000010 2350 14  000                 LDA     .RULE,4      IF THIS IS NOT A
000072  000001 3750 07  000                 ANA     =O1,DL       LOGICAL SEGMENT
000073  000424 6000 00  010                 TZE     EXIT         THEN SIMPLY IGNORE IT
```

```
000074  000430 2350 00  010         LDA     CURLVL        WRKLVL = CURRENT-LEVEL                     0000182
000075  000427 7550 00  010         STA     WRKLVL                                                   0000183
000076  010022 2350 00  030         LDA     MVETAL        PICK UP TALLY FROM MVESEG                  0000184
000077  000432 7550 00  010         STA     BASTAL        USE IT AS BASE TALLY                       0000185
000100  000336 7100 00  010         TRA     SETUP                                                    0000186
                                                                                                     0000188
                                                                                                     0000189
                                                                                                     0000190
               000101      MOVLGL   NULL                                                             0000191
000101  000436 4500 00  010         STZ     KLEN1         KEY LENGTH = 0                             0000192
000102  000440 7440 00  010         STX4    HOLDX4        SAVE X4                                    0000193
                                                          COMPUTE LENGTH OF SECOND LOGICAL           0000194
                                                          KEY BY ADDING THE LENGTHS OF ALL           0000195
                                                          THE PARENTS ON THE LOGICAL SIDE            0000196
                                                          OF THE LOGICAL CHILD                       0000197
                                                                                                     0000198
               000103      KEYLN1   NULL                                                             0000199
               000103               GNCHLD  BLDKY1        X4 = PC ADDR                               0000200
               000112               GMPRNT                X4 = ADDR PARENT SEG DEF                   0000201
END OF BINARY CARD MOVEI005
000117  000000 7200 14  000         LXLO    .SQKEY,4      X0 = SEQ KEY ADDR                          0000202
000120  000103 6000 00  010         TZE     KEYLN1        IF ZERO, BACK UP ONE LEVEL                 0000203
000121  000000 2350 10  000         LDA     .FDLEN,0      PICK UP KEY-LENGTH FOR THIS SEGMENT        0000204
000122  007777 3750 07  000         ANA     =O7777,DL     ISOLATE JUST THE LENGTH                    0000205
000123  000436 0550 00  010         ASA     KLEN1         INCREMENT THE COMBINED LENGTH              0000206
000124  000103 7100 00  010         TRA     KEYLN1                                                   0000207
                                                                                                     0000208
               000125      BLDKY1   NULL                                                             0000209
000125  000432 2350 00  010         LDA     BASTAL        BUILD TALLY FOR LOGICAL KEY                0000210
000126  000441 7550 00  010         STA     KEY1          IN THE LOGICAL-CHILD COMPONENT             0000211
000127  000436 2350 00  010         LDA     KLEN1                                                    0000212
000130  000006 7350 00  000         ALS     6                                                        0000213
000131  000441 7510 06  010         STCA    KEY1,06       INSERT LENGTH IN KEY TALLY WORD            0000214
                                                                                                     0000215
000132  000432 2350 00  010         LDA     BASTAL        BUILD TALLY FOR THE DATA PORTION           0000216
000133  000442 7550 00  010         STA     DATA1         OF THIS LOGICAL COMPONENT                  0000217
                                                                                                     0000218
000134  000436 2360 00  010         LDQ     KLEN1         ADJUST TALLY TO ACCOUNT                    0000219
000135  000006 5060 07  000         DIV     6,DL          FOR LOGICAL-KEY BEING HANDLED BY ITSELF    0000220
000136  000000 6200 06  000         EAX0    0,QL          X0 = WORD ADJUSTMENT                       0000221
END OF BINARY CARD MOVEI006
000137  000442 0400 00  010         ASX0    DATA1         INCREMENT WORD POSITION                    0000222
000140  000442 7510 01  010         STCA    DATA1,01      SET INITIAL CHARACTER                      0000223
                                                                                                     0000224
000141  000440 2240 00  010         LDX4    HOLDX4        SET X4 TO ORIGINAL SEG DEF                 0000225
               000142               GNCOMP  DEFERR                                                   0000226
               000151               GHMAKE                X5 = SEG DEF ADDR LOGICAL CHILD            0000227
000156  000000 2350 15  000         LDA     .SGLEN,5      PICK UP SEGMENT LENGTH                     0000228
000157  000022 7310 00  000         ARS     18            ISOLATE JUST THE LENGTH BITS               0000229
000160  007777 3750 07  000         ANA     =O7777,DL                                                0000230
000161  000436 1750 00  010         SBA     KLEN1         SUBTRACT LOGICAL-KEY LENGTH                0000231
END OF BINARY CARD MOVEI007
000162  000006 7350 00  000         ALS     6             TO YIELD DATA PROTION                      0000232
000163  000442 7510 06  010         STCA    DATA1,06      INSERT THIS LENGTH IN TALLY                0000233
                                                                                                     0000234
000164  000437 4500 00  010         STZ     KLEN2         INITIALIZE SECOND LOGICAL-KEY LENGTH       0000235
000165  000440 7440 00  010         STX4    HOLDX4        SAVE X4                                    0000236
               000166               GNCOMP  DEFERR        X4 = LSEG DEF PARENT COMPONENT             0000237
               000175               GMMAKE  X4 = SEG DEF PARENT COMPONENT                            0000238
                                                                                                     0000239
               000202      KEYLN2   NULL                                                             0000240
000202  000000 7200 14  000         LXLO    .SQKEY,4      X0 = SEQ KEY DEF ADDR                      0000241
000203  000207 6000 00  010         TZE     BCKEY2        IF NO SEQ KEY, BACK UP ONE LEVEL           0000242
000204  000000 2350 10  000         LDA     .FDLEN,0      PICK UP KEY LENGTH                         0000243
END OF BINARY CARD MOVEI008
000205  007777 3750 07  000         ANA     =O7777,DL                                                0000244
000206  000437 0550 00  010         ASA     KLEN2         INCREMENT LOGICAL-EKY LENGTH               0000245
               000207      BCKEY2   NULL                                                             0000246
               000207               GNCHLD  BLDKY2        BACK UP IN THE HIERARCHY                   0000247
               000216               GMPRNT  X4 = SEG DEF ADDR                                        0000248
000223  000202 7100 00  010         TRA     KEYLN2                                                   0000249
                                                                                                     0000250
               000224      BLDKY2   NULL                                                             0000251
000224  000440 2240 00  010         LDX4    HOLDX4        X4 = ADDR FIRST LSEG                       0000252
                                                                                                     0000253
               000225               GNCOMP  DEFERR        X4 = ADDR LSEG FOR PARENT                  0000254
END OF BINARY CARD MOVEI009
000234  000002 2360 14  000         LDQ     .LSTRT,4      PICK UP START CHARACTER FOR                0000255
000235  000022 7320 00  000         QRS     18            THIS COMPONENT                             0000256
000236  000006 5060 07  000         DIV     6,DL          CONVERT TO WORD & CHAR                     0000257
000237  000000 6200 06  000         EAX0    0,QL          X0 = WORD INCREMENT                        0000258
000240  000432 2350 00  010         LDA     BASTAL        WORK FROM BASE TALLY                       0000259
000241  000446 7550 00  010         STA     SEGTAL                                                   0000260
000242  000446 0400 00  010         ASX0    SEGTAL        ADJUST WORD ADDRESS                        0000261
                                                                                                     0000262
000243  000437 2350 00  010         LDA     KLEN2         PICK UP LOGICAL KEY LENGTH                 0000263
000244  000006 7350 00  000         ALS     6                                                        0000264
000245  000446 7510 06  010         STCA    SEGTAL,06     SET TALLY LENGTH FOR LOGICAL KEY           0000265
000246  000446 2350 00  010         LDA     SEGTAL        COPY TALLY WORD                            0000266
000247  000443 7550 00  010         STA     KEY2                                                     0000267
000250  000444 7550 00  010         STA     DATA2                                                    0000268
                                                                                                     0000269
000251  000437 2360 00  010         LDQ     KLEN2         ADJUST DATA TALLY TO ACCOUNT               0000270
000252  000006 5060 07  000         DIV     6,DL          FOR LOGICAL KEY BEING HANDLED              0000271
END OF BINARY CARD MOVEI010
000253  000000 6200 06  000         EAX0    0,QL          BY ITSELF (X0 = WORD ADJUSTMENT)           0000272
000254  000444 0400 00  010         ASX0    DATA2         INCREMENT WORD POSITION                    0000273
000255  000444 7510 01  010         STCA    DATA2,01      SET NEW INITIAL CHARACTER                  0000274
                                                                                                     0000275
               000256               GHMAKE                X5 = SEG DEF ADDR OF PARENT                0000276
000263  000000 2350 15  000         LDA     .SGLEN,5      PICK UP SEGMENT LENGTH                     0000277
000264  000022 7310 00  000         ARS     18            ISOLATE JUST THE LENGTH BITS               0000278
000265  007777 3750 07  000         ANA     =O7777,DL                                                0000279
000266  000437 1750 00  010         SBA     KLEN2         SUBTRACT LOGICAL KEY LENGTH                0000280
```

```
                                                 TO YIELD DATA PORTION                  00002810
000267  000006 7350 00  000     ALS    6         ALIGN FOR TALLY USE                    00002820
000270  000444 7510 06  010     STCA   DATA2,06  INSERT LENGTH IN TALLY                 00002830
                                                                                        00002850
                                                                                        00002860
                                                                                        00002870
000271  000445 4500 00  010     STZ    LENGTH    LENGTH = 0                             00002880
000272  000435 2350 00  010     LDA    USRBAS                                           00002890
000273  000447 7550 00  010     STA    UKEY1     SET UP TALLY FOR KEY-1                 00002900
000274  000443 2350 00  010     LDA    KEY2      USE KEY2 FO FLIP-FLOP LOGICAL KEYS     00002910
000275  000447 7510 06  010     STCA   UKEY1,06  INSERT LENGTH                          00002920
                                                                                        00002930
) OF BINARY CARD MOVEI011
000276  000006 7310 00  000     ARS    6                                                00002940
000277  007777 3750 07  000     ANA    =O7777,DL ISOLATE KEY2 LENGTH                    00002950
000300  000445 0550 00  010     ASA    LENGTH    LENGTH = LENGTH + KEY-LENGTH           00002960
                                                                                        00002970
000301  000442 2350 00  010     LDA    DATA1     SET UP TALLY FOR DATA-1 MOVE           00002980
000302  000450 7550 00  010     STA    UDATA1                                           00002990
000303  000445 2360 00  010     LDQ    LENGTH    USE ACCUMULATED LENGTH TO ADJUST       00003000
000304  000006 5060 07  000     DIV    6,DL      TALLY POSITION                         00003010
000305  000000 6200 06  000     EAX0   0,QL                                             00003020
000306  000435 0600 00  010     ADX0   USRBAS    X0 = WORD ADDRESS                      00003030
000307  000450 7400 00  010     STX0   UDATA1    INSERT IN TALLY                        00003040
000310  000450 7510 01  010     STCA   UDATA1,01 INSERT INITIAL CHAR POS                00003050
                                                                                        00003060
000311  000450 2350 00  010     LDA    UDATA1    ISOLATE LENGTH OF MOVE                 00003070
000312  000006 7310 00  000     ARS    6                                                00003080
000313  007777 3750 07  000     ANA    =O7777,DL                                        00003090
000314  000445 0550 00  010     ASA    LENGTH    ACCUMULATE TOTALS IN LENGTH            00003100
                                                                                        00003110
000315  000441 2350 00  010     LDA    KEY1      USE KEY-1 TO FLIP-FLOP LOGICAL KEYS    00003120
000316  000451 7550 00  010     STA    UKEY2     SET UP TALLY                           00003130
000317  000445 2360 00  010     LDQ    LENGTH    USE ACCUMULATED LENGTH TO              00003140
000320  000006 5060 07  000     DIV    6,DL      ADJUST TALLY POSITION                  00003150
 OF BINARY CARD MOVEI012
000321  000000 6200 06  000     EAX0   0,QL                                             00003160
000322  000435 0600 00  010     ADX0   USRBAS    X0 = WORD ADDRESS                      00003170
000323  000451 7400 00  010     STX0   UKEY2     INSERT IN TALLY                        00003180
000324  000451 7510 01  010     STCA   UKEY2,01  INSERT INITIAL CHAR POS                00003190
                                                                                        00003200
000325  000451 2350 00  010     LDA    UKEY2     ISOLATE LENGTH OF MOVE                 00003210
000326  000006 7310 00  000     ARS    6                                                00003220
000327  007777 3750 07  000     ANA    =O7777,DL                                        00003230
000330  000445 0550 00  010     ASA    LENGTH    ACCUMULATE TOTAL LENGTH                00003240
                                                                                        00003250
000331  000444 2350 00  010     LDA    DATA2     SET UP TALLY                           00003260
000332  000452 7550 00  010     STA    UDATA2                                           00003270
000333  000445 2360 00  010     LDQ    LENGTH    USE ACCUMULATED LENGTH                 00003280
000334  000006 5060 07  000     DIV    6,DL      TO ADJUST TALLY POSITION               00003290
000335  000000 6200 06  000     EAX0   0,QL                                             00003300
000336  000435 0600 00  010     ADX0   USRBAS    X0 = WORD ADDRESS                      00003310
000337  000452 7400 00  010     STX0   UDATA2    INSERT IN TALLY                        00003320
000340  000452 7510 01  010     STCA   UDATA2,01 INSERT INITIAL CHAR POS.               00003330
                                                                                        00003340
                                                                                        00003360
                                                                                        00003370
                                                                                        00003380
                 000341         LGCMOV NULL                                             00003390
000341  000426 2340 00  010     SZN    UPDTSW    IS THIS AN UPDATE OR GET               00003400
000342  000374 6010 00  010     TNZ    LGLUPD    UPDATE                                 00003410
                                                                                        00003420
                 000343         LGLGET NULL                                             00003430
000343  000443 7200 00  010     LXL0   KEY2      PICK UP TALLY WORD OF FIRST            00003440
OF BINARY CARD MOVEI013
000344  777700 3600 03  000     ANX0   =O777700,DU  KEY TO BE FLIP-FLOPPED              00003450
000345  000351 6000 00  010     TZE    LGDAT1    DON'T MOVE IF LENGTH IS ZERO           00003460
000346  000443 2350 52  010     LDA    KEY2,SC   MOVE PARENT-KEY TO                     00003470
000347  000447 7550 52  010     STA    UKEY1,SC  FRONT OF USER I-O-AREA                 00003480
000350  000346 6070 00  010     TTF    *-2                                              00003490
                                                                                        00003500
                 000351         LGDAT1 NULL                                             00003510
000351  000442 7200 00  010     LXL0   DATA1     PICK UP TALLY WORD OF DATA PORTION     00003520
000352  777700 3600 03  000     ANX0   =O777700,DU  OF LOGICAL CHILD                    00003530
000353  000357 6000 00  010     TZE    LGKEY2    DON'T MOVE IF LENGTH = ZERO            00003540
000354  000442 2350 52  010     LDA    DATA1,SC  MOVE DATA PORTION                      00003550
000355  000450 7550 52  010     STA    UDATA1,SC OF LOGICAL CHILD                       00003560
000356  000354 6070 00  010     TTF    *-2                                              00003570
                                                                                        00003580
                 000357         LGKEY2 NULL                                             00003590
000357  000441 7200 00  010     LXL0   KEY1      PICK UP TALLY WORD OF SECOND           00003600
000360  777700 3600 03  000     ANX0   =O777700,DU  KEY TO BE FLIP-FLOPPED              00003610
000361  000365 6000 00  010     TZE    LGDAT2    DON'T MOVE IF LENGTH = ZERO            00003620
000362  000441 2350 52  010     LDA    KEY1,SC   MOVE KEY OF CHILD TO                   00003630
000363  000451 7550 52  010     STA    UKEY2,SC  FRONT OF PARENT DATA                   00003640
000364  000362 6070 00  010     TTF    *-2                                              00003650
                                                                                        00003660
                 000365         LGDAT2 NULL                                             00003670
000365  000444 7200 00  010     LXL0   DATA2     PICK UP TALLY WORD FOR DATA            00003680
000366  777700 3600 03  000     ANX0   =O777700,DU  PORTION OF PARENT COMPONENT         00003690
OF BINARY CARD MOVEI014
000367  000064 6000 00  010     TZE    NXTLVL    DON'T MOVE IF LENGTH = ZERO            00003700
000370  000444 2350 52  010     LDA    DATA2,SC  MOVE DATA PORTION OF                   00003710
000371  000452 7550 52  010     STA    UDATA2,SC PARENT COMPONENT                       00003720
000372  000370 6070 00  010     TTF    *-2                                              00003730
000373  000064 7100 00  010     TRA    NXTLVL    GO TRY NEXT LEVEL                      00003740
                                                                                        00003760
                                                                                        00003770
                                                                                        00003780
                 000374         LGLUPD NULL                                             00003790
000374  000443 7200 00  010     LXL0   KEY2      PICK UP TALLY WORD OF                  00003800
000375  777700 3600 03  000     ANX0   =O777700,DU  FIRST KEY TO BE FLIP-FLOPPED        00003810
000376  000402 6000 00  010     TZE    LUDAT1    DON'T MOVE IF LENGTH = ZERO            00003820
```

```
000377  000447 2350 52  010    381          LDA      UKEY1,SC        MOVE FROM I-O-AREA TO PARENT-KEY          0000381
000400  000443 7550 52  010    382          STA      KEY2,SC                                                   0000384
000401  000377 6070 00  010    383          TTF      *-2                                                       0000385
                               384                                                                             0000386
                    000402     385 LUDAT1 NULL                                                                 0000387
000402  000442 7200 00  010    386          LXL0     DATA1           PICK UP TALLY WORD OF DATA                0000388
000403  777700 3600 03  000    387          ANX0     =0777700,DU     PORTION OF LOGICAL CHILD                  0000389
000404  000410 6000 00  010    388          TZE      LUKEY2          DON'T MOVE IF LENGTH = ZERO               0000390
000405  000450 2350 52  010    389          LDA      UDATA1,SC       MOVE DATA PORTION OF LOGICAL              0000391
000406  000442 7550 52  010    390          STA      DATA1,SC        CHILD TO EMULATOR I-O-AREA                0000392
000407  000405 6070 00  010    391          TTF      *-2                                                       0000393
                               392                                                                             0000394
                    000410     393 LUKEY2 NULL                                                                 0000395
000410  000441 7200 00  010    394          LXL0     KEY1            PICK UP TALLY WORD OF SECOND              0000396
000411  777700 3600 03  000    395          ANX0     =0777700,DU     KEY TO BE FLIP-FLOPPED                    0000397
END OF BINARY CARD MOVE1015
000412  000415 6000 00  010    396          TZE      LUDAT2          DON'T MOVE IF LENGTH = ZERO               0000398
000413  000451 2350 52  010    397          LDA      UKEY2,SC        MOVE LOGICAL KEY FOR CHILD TO             0000399
000414  000441 7550 52  010    398          STA      KEY1,SC         POSITION IN EMULATOR I-O-AREA             0000400
                               399                                                                             0000401
                    000415     400 LUDAT2 NULL                                                                 0000402
000415  000444 7200 00  010    401          LXL0     DATA2           PICK UP TALLY WORD FOR DATA               0000403
000416  777700 3600 03  000    402          ANX0     =0777700,DU     PORTION OF PARENT COMPONENT               0000404
000417  000064 6000 00  010    403          TZE      NXTLVL          DON'T MOVE IF LENGTH = ZERO               0000405
000420  000452 2350 52  010    404          LDA      UDATA2,SC       MOVE DATA PORTION OF PARENT COMPONENT     0000406
000421  000444 7550 52  010    405          STA      DATA2,SC        TO PLACE IN EMULATOR I-O-AREA             0000407
000422  000420 6070 00  010    406          TTF      *-2                                                       0000408
000423  000064 7100 00  010    407          TRA      NXTLVL          GO TRY NEXT LEVEL                         0000409
                               409                                                                             0000411
                               410                                                                             0000412
                               411                                                                             0000413
                    000424     412 EXIT   NULL                                                                 0000414
000424  000460 0730 00  010    413          LREG     HLDREG                                                    0000415
000425  000000 7100 11  000    414          TRA      0,1                                                       0000416
                               415                                                                             0000417
                               416                                                                             0000418
                               417                                                                             0000419
000426  000000000000    000    418 UPDTSW OCT      0               UPDATE SWITCH                             0000420
                    000427     419 WRKLVL BSS      1               WORK LEVEL NUMBER                         0000421
000430  000000000000    000    420 CURLVL OCT      0               CURRENT SEGMENT LEVEL                     0000422
000431  000000000007    000    421 ISRTCD DEC      7               INSERT CODE NUMBER                        0000423
                    000432     422 BASTAL BSS      1               BASE I-O-AREA TALLY                       0000424
                    000433     423 FROMTL BSS      1               TALLY OF SEG IN EMULATOR                  0000425
                    000434     424 TOTALY BSS      1               TALLY OF SEG IN USER'S I-O-AREA           0000426
                    000435     425 USRBAS BSS      1               BASE TALLY IN USER'S I-O-AREA             0000427
                    000436     426 KLEN1  BSS      1               LENGTH OF LOGICAL-CHILD KEY               0000428
                    000437     427 KLEN2  BSS      1               LENGTH OF PARENT KEY                      0000429
                    000440     428 HOLDX4 BSS      1               X4 SAVE AREA                              0000430
                    000441     429 KEY1   BSS      1               TALLY FOR LOGICAL-CHILD KEY (EMULATOR)    0000431
                    000442     430 DATA1  BSS      1               TALLY FOR CHILD DATA (EMULATOR)           0000432
                    000443     431 KEY2   BSS      1               TALLY FOR PARENT KEY (EMULATOR)           0000433
                    000444     432 DATA2  BSS      1               TALLY FOR PARENT DATA (EMULATOR)          0000434
                    000445     433 LENGTH BSS      1               ACCUMULATE MOVE LENGTH (WORK CELL)        0000435
                    000446     434 SEGTAL BSS      1               TALLY WORD CELL                           0000436
                    000447     435 UKEY1  BSS      1               TALLY FOR PARENT KEY (USER)               0000437
                    000450     436 UDATA1 BSS      1               TALLY FOR CHILD DATA (USER)               0000438
                    000451     437 UKEY2  BSS      1               TALLY FOR CHILD KEY (USER)                0000439
                    000452     438 UDATA2 BSS      1               TALLY FOR PARENT DATA (USER)              0000440
                               439                                                                             0000441
                               440                                                                             0000442
000453  000005710004    000
                    000460     441          EIGHT                                                              0000443
                    000460     442 HLDREG BSS      8                                                           0000444

                               444                                                                             0000001
                               445                                                                             0000002
                               446                  LAY-OUT OF THE PCB DEFINITION TABLE ENTRY                  0000003
                               447                                                                             0000004
                               448                                                                             0000005
                    000000     449 .POSIT SET      0               MULTIPLE-POSITIONING FLAG                 0000006
                    000000     450 .HOLD  SET      0               IMS "HOLD" FLAG                           0000007
                    000000     451 .STAT  SET      0               IMS STATUS                                0000008
                    000002     452 .CRSEG SET      2               SEG ADDR OF SEGMENT LAST PROCESSED        0000009
                    000002     453 .CHLVL SET      2               LEVEL OF THE LAST SEGMENT PROCESSED       0000010
                    000003     454 .PRPAR SET      3               SEG ADDR OF PARENTAGE SEGMENT             0000011
                    000003     455 .UNSAT SET      3               "HIGHEST" UNSATISFIED SEGMENT             0000012
                    000004     456 .CRIDS SET      4               IDS REFERENCE CODE                        0000013
                    000005     457 .SSTAB SET      5               ADDRESS OF THE SSA TABLE                  0000014
                    000005     458 .QLTAB SET      5               ADDRESS OF THE QUALIFICATION TABLE        0000015
                    000006     459 .OLSSA SET      6               OLD SSA COUNT FOR THIS PCB                0000016
                    000007     460 .PRSTA SET      7               OLD STATUS FOR THIS PCB                   0000017
                               462                                                                             0000001
                               463                                                                             0000002
                               464                  LAY-OUT OF THE SSA TABLE                                   0000003
                               465                                                                             0000004
                               466                                                                             0000005
                    000012     467 .SSSIZ SET      10              TABLE SIZE                                0000006
                    000000     468 .SEGAD SET      0               SEG DEFINITION ADDRESS                    0000007
                    000000     469 .SUPLY SET      0               FLAG FOR USER-SUPPLIED OR IMPLIED         0000008
                    000001     470 .IOTAL SET      1               I-O-AREA TALLY                            0000009
                    000002     471 .UNIQF SET      2               UNIQUENESS INDICATOR                      0000010
                    000003     472 .EISWD SET      3               EIS DESCRIPTOR WORD OF SEGMENT            0000011
                    000004     473 .OCODE SET      4               O COMMAND CODE (UPPER)                    0000012
                    000004     474 .NCODE SET      4               N COMMAND-CODE (LOWER)                    0000012
                    000005     475 .FCODE SET      5               F COMMAND CODE (UPPER)                    0000013
                    000005     476 .LCODE SET      5               L COMMAND CODE (LOWER)                    0000013
                    000006     477 .UCODE SET      6               U COMMAND CODE (UPPER)                    0000014
                    000006     478 .VCODE SET      6               V COMMAND CODE (LOWER)                    0000014
                    000007     479 .PCODE SET      7               P COMMAND CODE (UPPER)                    0000015
                    000010     480 .QLCNT SET      8               NUMBER OF QUALIFIERS                      0000016
                    000011     481 .QLPTR SET      9               INDEX OF FIRST ENTRY IN QUAL. TABLE       0000017
                               483                                                                             0000001
                               484                                                                             0000002
```

```
           485              LAY-OUT OF THE IMS SEG DEFINITION TABLE ENTRY                          00000030
           486                                                                                     00000040
           487                                                                                     00000050
000000     488 .SGLEN SET   0              SEGMENT LENGTH (DATA ONLY)                              00000060
000000     489 .SQKEY SET   0              ADDRESS OF THE SEQUENCE-KEY                             00000070
000003     490 .LGCHL SET   3              POINTER TO FIRST LOGICAL COMPONENT                      00000080
000004     491 .SGORD SET   4              LOCATION OF IDS ORD POINTER                             00000090
000005     492 .LEVEL SET   5              IMS LEVEL NUMBER                                        00000100
000005     493 .RCNUM SET   5              IMS RECORD NUMBER                                       00000110
000006     494 .SGREA SET   6              AREA FLAG WORD                                          00000120
000006     495 .INDEX SET   6              INDEX ROUTINE ADDRESS                                   00000130
000007     496 .PERM  SET   7              PERMISSION WORD (G,I,R,D,K,P)                           00000140
000010     497 .RULE  SET   8              LOGICAL RULES  AND INSERT RULES                         00000150
000011     498 .PCHLD SET   9              PC ADDR HOLD AREA                                       00000160
000012     499 .CURNT SET   10             IDS CURRENCY FOR THIS SEGMENT                           00000170
000013     500 .SGNAM SET   11             IMS SEGMENT NAME                                        00000180
           502                                                                                     00000010
           503                                                                                     00000020
           504              LAY-OUT OF THE IMS KEY DEFINITION ENTRY                                00000030
           505                                                                                     00000040
           506                                                                                     00000050
000000     507 .FDTYP SET   0              CODED FIELD TYPE                                        00000060
000000     508 .SEQCD SET   0              CODE SEQUENCE CODE                                      00000070
000000     509 .FDLEN SET   0              FIELD LENGTH                                            00000080
000001     510 .FDSTR SET   1              STARTING CHARACTER                                      00000090
000002     511 .IDSFD SET   2              ADDRESS OF THE IDS FIELD DEFINITION                     00000100
000003     512 .FDPOS SET   3              STARTING POSITION IN FEEDBACK AREA                      00000110
000004     513 .FDNAM SET   4              IMS FIELD NAME                                          00000120
      MOVE I-O-AREAS
           515                                                                                     00000010
           516                                                                                     00000020
           517              LAY-OUT OF THE IMS LSEG DEFINITION TABLE ENTRY                         00000030
           518                                                                                     00000040
           519                                                                                     00000050
000000     520 .LSRTV SET   0              RETRIEVAL-TYPE INDICATOR                                00000060
000000     521 .LGCNT SET   0              LOGICAL-CONTROL OWNER                                   00000070
000002     522 .LSTRT SET   2              STARTING CHARACTER POSITION                             00000080
000004     523 .LGCRN SET   4              CURRENCY FOR THIS COMPONENT                             00000090
           524                             OF THE LOGICAL SEGMENT                                  00000100

000000     526        BLOCK C05                                                                    00000010
000000     527 SSACNT BSS   1              SSA COUNT IN CURRENT CALL                               00000020
000001     528 SSATAB BSS   1              ADDRESS OF THE CURRENT SSA TABLE                        00000030
000002     529 QALTAB BSS   1              ADDRESS OF QUALIFICATION TABLE                          00000040
000003     530 PCBDFN BSS   1              PCB DEFINITION ADDRESS                                  00000050
000004     531 QUALDX BSS   1              QUALIFICATION TABLE INDEX                               00000060
000005     532 CURSSA BSS   1              ADDRESS OF CURRENT USER SSA                             00000070
000006     533 FRSTLV BSS   1              FIRST USER-SUPPLIED LEVEL                               00000080
000007     534 IOAREA BSS   1              ADDRESS OF USER'S I-O-AREA                              00000090
000010     535 LSTSEG BSS   1              ADDRESS OF LAST ACCESSED SEG                            00000100
000011     536 CURREF BSS   1              REF. CODE OF LAST ACCESSED RECORD                       00000110
000012     537 PCBADR BSS   1              ADDRESS OF USER'S PCB                                   00000120
000013     538 PRNTSW BSS   1              SWITCH FOR IMS PARENT SETTING                           00000130
000014     539 PRSTAT BSS   1              STATUS OF PREVIOUS CALL                                 00000140
000015     540 FUNCDE BSS   1              IMS FUNCTION CODE                                       00000150
000016     541 OLDSSA BSS   1              OLD SSA COUNT (PREVIOUS CALL)                           00000160
000017     542 PRIRSW BSS   1              USE PRIOR DIRECTION SWITCH                              00000170
000020     543 CCODEC BSS   1              COMMAND CODE "C" SWITCH                                 00000180
000021     544 USERIO BSS   1              ADDRESS OF USER'S I-O-AREA                              00000190
000022     545 MVETAL BSS   1              TALLY WORD BUILD BY MVESEG WHEN NO SSA'S                00000200
           546                                                                                     00000210
           547                                                                                     00000220
           548                                                                                     00000230
           549                                                                                     00000240
           550                                                                                     00000250
000470     551        USE                                                                          00000260

ERROR LINKAGE

) OF BINARY CARD MOVEIO16
 000470  000000000000     000
 000471  444665253146     000
) OF BINARY CARD MOVEIO17
                                                                                                   00004520
           MOVE SEGMENT TO I-O-AREA

              1         LBL     MVESEG                                                             00000040
              2         TTL     MOVE SEGMENT TO I-O-AREA                                           00000050
              3                                                                                    00000055
              4                                                                                    00000060
              5                                                                                    00000070
              6                 THIS ROUTINE MOVES THE MOST RECENTLY                               00000080
              7                 ACCESSED SEGMENT TO THE USER'S I-O-AREA                            00000090
              8                                                                                    00000100
              9                 THERE ARE NO ARGUMENTS                                             00000110
             10                                                                                    00000120
             11                 MVESEG USES THE IMS COMMON REGION TO                               00000130
             12                 DETERMINE THE "LAST ACCESSED" SEGMENT                              00000140
             13                 THEN FINDS THE APPROPRIATE SSA-TABLE ENTRY                         00000150
             14                 TO GET THE I-O-AREA TALLY WORD                                     00000160
             15                                                                                    00000170
             16                 IT IS CONSIDERED A FATAL ERROR IF THE                              00000180
             17                 CURRENT I-D-S RCORD IS THE WRONG TYPE                              00000190

             19 GNCOMP  MACRO                                                                      00000210
             20         LDX4    3,4                                                                00000220
             21         LDA     0,4                                                                00000230
             22         ANA     =0770000,DU                                                        00000240
             23         CMPA    =0510000,DU                                                        00000250
             24         TZE     #1                                                                 00000260
             25         CMPA    =0560000,DU                                                        00000270
             26         TNZ     DEFERR                                                             00000280
```

```
                                      ENDM    GNCOMP


                              GHMAKE  MACRO
                                      LXL5    1,4
                                      LDA     0,5
                                      ANA     =O770000,DU
                                      CMPA    =O510000,DU
                                      TNZ     DEFERR
                                      ENDM    GHMAKE


                                      SYMDEF  MVESEG


                                      SYMREF  DEFERR
                                      SYMREF  .QCBUF
                                      SYMREF  .QCREC
                                      SYMREF  .QCURD
                  000000      ARO     EQU     0
                                      SYMREF  CCB



                  000000      MVESEG  NULL
000000  000200 7530 00  010           SREG    HLDREG

                       MOVE SEGMENT TO I-O-AREA

000001  010015 2350 00  030           LDA     FUNCDE        DON'T MOVE UNLESS
000002  000170 1150 00  010           CMPA    ISRTCD        THIS WAS A "GET" CALL
000003  000050 6050 00  010           TPL     EXIT
000004  010010 2240 00  030           LDX4    LSTSEG        X4 = ADDR(CURRENT SEG DEF)
000005  000002 2360 31  000           LDQ     2,1*          CHECK FOR NO SSAS
000006  000052 6000 00  010           TZE     MVUNQL

000007  000001 1760 07  000           SBQ     1,DL          COMPUTE THE ADDRESS OF
000010  000012 4020 07  000           MPY     .SSSIZ,DL     THE APPROPRIATE  SSA-TABLE ENTRY
000011  000000 6230 06  000           EAX3    0,QL
000012  010001 0630 00  030           ADX3    SSATAB        X3 = ADDR(SSA-TABLE)
000013  000001 2350 13  000           LDA     .IOTAL,3      PICK UP I-O AREA TALLY WORD
000014  000164 7550 00  010           STA     TOTALY
000015  000165 7550 00  010           STA     FROMTL
000016  000003 2350 13  000           LDA     .EISWD,3      PICK UP EIS DESCRIPTOR
000017  000047 7550 00  010           STA     TODESC
000020  000046 7550 00  010           STA     FRMDSC
000021  000000 2240 13  000           LDX4    .SEGAD,3      X4 = SEG DEF ADDR INPUT ARG
000022  000012 2350 14  000           LDA     .CURNT,4      PICK UP CURRENT REF-CODE
END OF BINARY CARD MVESEG02
000023  020000 1150 00  030           CMPA    CCB+DIRREF    IS THE SAME AS IDS DIRECT-REF
000024  000031 6000 00  010           TZE     FILFRM        YES - DON'T BOTHER RETRIEVING
000025  020000 7550 00  030           STA     CCB+DIRREF    NO  - ESTABLISH CURRENCY
000026  070000701000    030           CALL    .QGETD        RETRIEVE DIRRECT
000027  000031710000    010
000030  000210000115    010
                  000031      FILFRM  NULL
000031  060000 2200 00  030           LDX0    .QCURD
000032  020004 1000 14  000           CMPX0   .SGORD,4
000033  000075 6010 00  010           TNZ     CHKLGL        CHECK FOR LOGICAL SEGMENT
000034  050000 2360 00  030           LDQ     .QCREC        BUILD THE TALLY WORD
000035  000005 0760 07  000           ADQ     5,DL          FOR
000036  000005 2200 14  000           LDX0    .LEVEL,4      THE
000037  000001 1000 03  000           CMPX0   1,DU          I-D-S RECORD
000040  000042 6010 00  010           TNZ     *+2           ADD EITHER 5 OR 9 TO .QCREC
000041  000004 0760 07  000           ADQ     4,DL          DEPENDING UPON WHETHER OR NOT
                                                            THE SEGMENT IN QUESTION IS A
000042  040000 7604 00  030           LARO    .QCBUF        EIS 0 = WORD ADDRESS OF BUFFER
000043  000000 5015 06  000           A6BD    0,QL,ARO      ADD IN CHARACTER OFFSET
000044  000046 5404 00  010           ARAO    FRMDSC
000045  020000 1004 00  000           MLR     ,,20
END OF BINARY CARD MVESEG03
000046  000000 0200 00  000   FRMDSC  ADSC6
000047  000000 0200 00  000   TODESC  ADSC6

                  000050      EXIT    NULL
000050  000200 0730 00  010           LREG    HLDREG
000051  000000 7100 11  000           TRA     0,1

                       MOVE SEGMENT TO I-O-AREA

                  000052      MVUNQL  NULL
000052  000010 2350 14  000           LDA     .RULE,4       IS THIS A LOGICAL SEGMENT
000053  000001 3750 07  000           ANA     =O1,DL
000054  000064 6010 00  010           TNZ     UNQLGL        YES HANDLE SEPARATLY

000055  010021 7604 00  030           LARO    USERIO        NO - BUILD DESCRIPTOR
000056  000047 5404 00  010           ARAO    TODESC        FOR THE CURRENT SEGMENT
000057  000000 2350 14  000           LDA     .SGLEN,4      ISOLATE SEGMENT LENGTH
000060  000022 7310 00  000           ARS     18
000061  000047 7510 03  010           STCA    TODESC,03     INSERT IT IN BOTH DESCRIPTORS
000062  000046 7510 03  010           STCA    FRMDSC,03
000063  000031 7100 00  010           TRA     FILFRM        GO MOVE THE SEGMENT

                  000064      UNQLGL  NULL                  SEGMENT IS LOGICAL -
000064  010007 2350 00  030           LDA     IOAREA        BUILD TALLY WORDS FOR MOVE
000065  000164 7550 00  010           STA     TOTALY        SET MOVE TO EMULATOR I-O-AREA
000066  000000 2350 14  000           LDA     .SGLEN,4      ISOLATE SEGMENT LENGTH
000067  000014 7310 00  000           ARS     12
000070  000165 7510 06  010           STCA    FROMTL,06     PUT IT IN BOTH TALLY WORDS
END OF BINARY CARD MVESEG04
000071  000164 7510 06  010           STCA    TOTALY,06
000072  000164 2350 00  010           LDA     TOTALY        SAVE THE "TO" TALLY FOR
000073  010022 7550 00  030           STA     MVETAL        LATER USE BY MOVEIO
000074  000100 7100 00  010           TRA     NXTCMP
```

MOVE SEGMENT TO I-O-AREA

```
                  000075         124 CHKLGL NULL                                                              00001260
000075  000010 2350 14  000      125        LDA     .RULE,4                                                  00001270
000076  000001 3750 07  000      126        ANA     =01,DL         MAKE SURE IT IS LOGICAL                   00001280
000077  030000 6000 00  030      127        TZE     DEFERR         IT IS AN ERROR OTHERWISE                  00001290
                  000100         128 NXTCMP NULL                                                              00001300
                                 129                               INSERT TEST FOR KEY-ONLY                  00001310
                                 130                               COMPONENT OF LOGICAL SEGMENT              00001320
                  000100         131        GNCOMP  EXIT           GET NEXT LSEG                             00001330
000107  000004 2350 14  000      132        LDA     .LGCRN,4       PICK UP CURRENCY                          00001340
000110  020000 7550 00  030      133        STA     CCB+DIRREF                                               00001350
000111  0700007C1000        030  134        CALL    .QGETQ         ESTABLISH COMPONENT AS CURRENT            00001360
000112  000114710000        010
000113  000210000206        010
D OF BINARY CARD MVESEG05
000114  020005 2350 00  030      135        LDA     CCB+ERRREF                                               00001370
000115  030000 6010 00  030      136        TNZ     DEFERR                                                   00001380
                                 137                                                                         00001390
000116  000002 2360 14  000      138        LDQ     .LSTRT,4       QR = STRT CHAR OF COMPONENT               00001400
000117  000022 7320 00  000      139        QRS     18                                                       00001410
000120  000167 7560 00  010      140        STQ     STRCHR         SAVE START CHAR                           00001420
000121  000132 6000 00  010      141        TZE     TOLENG         SKIP TALLY BUILD IF ZERO                  00001430
000122  000166 2360 00  010      142        LDQ     HLDTAL         PICK UP PREVIOUS TALLY                    00001440
000123  000164 7560 00  010      143        STQ     TOTALY         REFRESH USABLE TALLY                      00001450
000124  000007 3760 07  000      144        ANQ     =07,DL         ISOLATE OLD CHAR POS                      00001460
000125  000167 0760 00  010      145        ADQ     STRCHR         ADD CHAR OFFSET                           00001470
000126  000006 5060 07  000      146        DIV     6,DL           CONVERT TO WORD AND CHAR                  00001480
000127  000164 7510 01  010      147        STCA    TOTALY,01                                                00001490
000130  000000 6270 06  000      148        EAX7    0,QL                                                     00001500
000131  000164 0470 00  010      149        ASX7    TOTALY         REBUILD RECEIVING TALLY                   00001510
                  000132         150 TOLENG NULL                                                              00001520
                  000132         151        GHMAKE                 X5 = ADDR(SEG DEF OF COMPONENT)           00001530
D OF BINARY CARD MVESEG06
000137  000000 2350 15  000      152        LDA     .SGLEN,5                                                 00001540
000140  000014 7310 00  000      153        ARS     12             ISOLATE SEGMENT LENGTH                    00001550
000141  000164 7510 06  010      154        STCA    TOTALY,06      SET UP LENGTH                             00001560
000142  000165 7510 06  010      155        STCA    FROMTL,06                                                00001570
000143  000164 2350 00  010      156        LDA     TOTALY                                                   00001580
000144  000166 7550 00  010      157        STA     HLDTAL         SAVE RECEIVING TALLY                      00001590
000145  050000 2360 00  030      158        LDQ     .QCREC         BUILD TALLY FOR IDS RECORD                00001600
000146  000005 0760 07  000      159        ADQ     5,DL           (DATA PORTION ONLY)                       00001610
000147  000005 2200 15  000      160        LDX0    .LEVEL,5       DETERMINE WHETHER                         00001620
000150  000001 1000 03  000      161        CMPX0   1,DU           COMPONENT IS A CALC RECORD                00001630
000151  000153 6010 00  010      162        TNZ     *+2            IF NOT SKIP AROUND                        00001640
000152  000004 0760 07  000      163        ADQ     4,DL           CODE TO ADD 4 FOR CALC POINTER            00001650
000153  000006 5060 07  000      164        DIV     6,DL           CONVERT TO WORD AND CHAR                  00001660
000154  000165 7510 01  010      165        STCA    FROMTL,01                                                00001670
000155  000000 6270 06  000      166        EAX7    0,QL                                                     00001680
000156  040000 0670 00  030      167        ADX7    .QCBUF         X7 = WORD ADDR OF DATA PORTION            00001690
000157  000165 7470 00  010      168        STX7    FROMTL                                                   00001700
                  000160         169 MVELGL NULL                                                              00001710
000160  000165 2350 52  010      170        LDA     FROMTL,SC      MOVE DATA                                 00001720
000161  000164 7550 52  010      171        STA     TOTALY,SC                                                00001730
ID OF BINARY CARD MVESEG07
000162  000160 6070 00  010      172        TTF     *-2                                                      00001740
000163  000100 7100 00  010      173        TRA     NXTCMP         GO GET NEXT LSEG                          00001750
```

MOVE SEGMENT TO I-O-AREA

```
                  000164         175 TOTALY BSS     1              RECEIVING TALLY                           00001770
                  000165         176 FROMTL BSS     1              SENDING TALLY                             00001780
                  000166         177 HLDTAL BSS     1              TALLY SAVE WORD                           00001790
                  000167         178 STRCHR BSS     1              STARTING CHARACTER OF LSEG COMP.          00001800
000170  000000000007        000  179 ISRTCD DEC     7              IMS INSERT CODE NUMBER                    00001810
                                 180                                                                         00001820
                                 181                                                                         00001830
                  000000         182 DIRREF SET     0                                                        00001840
                  000005         183 ERRREF SET     5                                                        00001850
                                 184                                                                         00001860
                                 185                                                                         00001870
000171  000007710004        000
                  000200         186        EIGHT                                                            00001880
                  000200         187 HLDREG BSS     8                                                        00001890
                                 189
                                 190                                                                         00000010
                                 191               LAY-OUT OF THE SSA TABLE                                  00000020
                                 192                                                                         00000030
                                 193                                                                         00000040
                  000012         194 .SSSIZ SET     10             TABLE SIZE                                00000050
                  000000         195 .SEGAD SET     0              SEG DEFINITION ADDRESS                    00000060
                  000000         196 .SUPLY SET     0              FLAG FOR USER-SUPPLIED OR IMPLIED         00000070
                  000001         197 .IOTAL SET     1              I-O-AREA TALLY                            00000080
                  000002         198 .UNIQE SET     2              UNIQUENESS INDICATOR                      00000090
                  000003         199 .EISWD SET     3              EIS DESCRIPTOR WORD OF SEGMENT            00000100
                  000004         200 .DCODE SET     4              D COMMAND CODE (UPPER)                    00000110
                  000004         201 .NCODE SET     4              N COMMAND-CODE (LOWER)                    00000120
                  000005         202 .FCODE SET     5              F COMMAND CODE (UPPER)                    00000125
                  000005         203 .LCODE SET     5              L COMMAND CODE (LOWER)                    00000130
                  000006         204 .UCODE SET     6              U COMMAND CODE (UPPER)                    00000135
                  000006         205 .VCODE SET     6              V COMMAND CODE (LOWER)                    00000140
                  000007         206 .PCODE SET     7              P COMMAND CODE (UPPER)                    00000145
                  000010         207 .QLCNT SET     8              NUMBER OF QUALIFIERS                      00000150
                  000011         208 .QLPTR SET     9              INDEX OF FIRST ENTRY IN QUAL. TABLE       00000160
                                 210                                                                         00000170
                                 211                                                                         00000010
                                 212               LAY-OUT OF THE IMS SEG DEFINITION TABLE ENTRY             00000020
                                 213                                                                         00000030
                                 214                                                                         00000040
                  000000         215 .SGLEN SET     0              SEGMENT LENGTH (DATA ONLY)                00000050
                  000000         216 .SQKEY SET     0              ADDRESS OF THE SEQUENCE-KEY               00000060
                  000003         217 .LGCHL SET     3              POINTER TO FIRST LOGICAL COMPONENT        00000070
                                                                                                             00000080
```

```
000004      218 .SGQRD SET     4               LOCATION OF IDS ORD POINTER             00000091
000005      219 .LEVEL SET     5               IMS LEVEL NUMBER                        00000101
000005      220 .RCNUM SET     5               IMS RECORD NUMBER                       00000111
000006      221 .SGREA SET     6               AREA FLAG WORD                          00000121
000006      222 .INDEX SET     6               INDEX ROUTINE ADDRESS                   00000131
000007      223 .PERM  SET     7               PERMISSION WORD (G,I,R,D,K,P)           00000141
000010      224 .RULE  SET     8               LOGICAL RULES  AND INSERT RULES         00000151
000011      225 .PCHLD SET     9               PC ADDR HOLD AREA                       00000161
000012      226 .CURNT SET     10              IDS CURRENCY FOR THIS SEGMENT           00000171
000013      227 .SGNAM SET     11              IMS SEGMENT NAME                        00000181

            MOVE SEGMENT TO I-O-AREA

            229                                                                        0000001
            230                                                                        0000002
            231              LAY-OUT OF THE IMS LSEG DEFINITION TABLE ENTRY            0000003
            232                                                                        0000004
            233                                                                        0000005
000000      234 .LSRTV SET     0               RETRIEVAL-TYPE INDICATOR                0000006
000000      235 .LGCNT SET     0               LOGICAL-CONTROL OWNER                   0000007
000002      236 .LSTRT SET     2               STARTING CHARACTER POSITION             0000008
000004      237 .LGCRN SET     4               CURRENCY FOR THIS COMPONENT             0000009
            238                                OF THE LOGICAL SEGMENT                  0000010

000000      240        BLOCK   C05                                                     00000011
000000      241 SSACNT BSS     1               SSA COUNT IN CURRENT CALL               00000021
000001      242 SSATAB BSS     1               ADDRESS OF THE CURRENT SSA TABLE        00000031
000002      243 QALTAB BSS     1               ADDRESS OF QUALIFICATION TABLE          00000041
000003      244 PCBDFN BSS     1               PCB DEFINITION ADDRESS                  00000051
000004      245 QUALDX BSS     1               QUALIFICATION TABLE INDEX               00000061
000005      246 CURSSA BSS     1               ADDRESS OF CURRENT USER SSA             00000071
000006      247 FRSTLV BSS     1               FIRST USER-SUPPLIED LEVEL               00000081
000007      248 IOAREA BSS     1               ADDRESS OF USER'S I-O-AREA              00000091
000010      249 LSTSEG BSS     1               ADDRESS OF LAST ACCESSED SEG            00000101
000011      250 CURREF BSS     1               REF. CODE OF LAST ACCESSED RECORD       00000111
000012      251 PCBADR BSS     1               ADDRESS OF USER'S PCB                   00000121
000013      252 PRNTSW BSS     1               SWITCH FOR IMS PARENT SETTING           00000131
000014      253 PRSTAT BSS     1               STATUS OF PREVIOUS CALL                 00000141
000015      254 FUNCDE BSS     1               IMS FUNCTION CODE                       00000151
000016      255 OLDSSA BSS     1               OLD SSA COUNT (PREVIOUS CALL)           00000161
000017      256 PRIRSW BSS     1               USE PRIOR DIRECTION SWITCH              00000171
000020      257 CCODEC BSS     1               COMMAND CODE "C" SWITCH                 00000181
000021      258 USERIO BSS     1               ADDRESS OF USER'S I-O-AREA              00000191
000022      259 MVETAL BSS     1               TALLY WORD BUILD BY MVESEG WHEN NO SSA'S 00000201
            260                                                                        00000211
            261                                                                        00000221
            262                                                                        00000231
            263                                                                        00000241
            264                                                                        00000251
000023      265        USE                                                             00000261

ERROR LINKAGE

   000210  000000000000   000
   C00211  446525622527   000
END OF BINARY CARD MVESEG08
                                                                                       0000195
            FIND NEXT OF A SEGMENT TYPE

              1        LBL     NXTSEG                                                  0000004
              2        TTL     FIND NEXT OF A SEGMENT TYPE                             0000005
              3                                                                        0000005
              4                                                                        0000006
              5                                                                        0000007
              6                THIS ROUTINE FINDS THE NEXT OF A                        0000008
              7                PARTICULAR SEGMENT TYPE                                 0000009
              8                                                                        0000010
              9                NO ACTUAL ARGUMENTS                                     0000011
             10                                                                        0000012
             11                ON INPUT, HOWEVER,                                      0000013
             12                                                                        0000014
             13                X4 = ADDRESS OF DESIRED SEGMENT                         0000015
             14                                                                        0000016
             15                THE ROUTINE FINDS THE CORRECT P-C DEF                   0000017
             16                AND DEPENDING UPON THE TYPE OF RETRIEVAL                0000018
             17                SPECIFIED WILL                                          0000019
             18                                                                        0000020
             19                 1. GO NEXT IN AN I-D-S CHAIN                           0000021
             20                 2. MOVE A FIELD AND USE IT AS A REF-CODE               0000022
             21                            AND RETRIEVE DIRECT                         0000023
             22                 3. MOVE A FIELD ANDUSE IT AS A KEY FOR                 0000024
             23                            A RETRIEVE RECORD-NAME (OGET) CALL          0000025
            FIND NEXT OF A SEGMENT TYPE

             25 GNCHLD MACRO                                                           0000027
             26        LDX4    2,4                                                     0000028
             27        LDA     0,4                                                     0000029
             28        ANA     =O770000,DU                                             0000030
             29        CMPA    =O510000,DU                                             0000031
             30        TZE     #1                                                      0000032
             31        CMPA    =O540000,DU                                             0000033
             32        TNZ     DEFERR                                                  0000034
             33        ENDM    GNCHLD                                                  0000035
             34 QSETAL MACRO                                                           0000036
             35        LDQ     0,5                                                     0000037
             36        ANQ     =O7777,DL                                               0000038
             37        ADQ     .QCREC                                                  0000039
             38        DIV     6,DL                                                    0000040
             39        EAX3    0,QL                                                    0000041
             40        ADX3    .QCBUF                                                  0000042
             41        STX3    #2                                                      0000043
             42        STCA    #2,01                                                   0000044
             43        LDA     1,5                                                     0000045
```

```
              STCA    #2,06                                                00000460
              STCA    #3,06                                                00000470
              EAX3    #3                                                   00000480
              STX3    #1                                                   00000490
              ENDM    OSETAL                                               00000500
                                                                           00000510
                                                                           00000520
       CHRMOV MACRO                                                        00000530
              LDA     #1,SC                                                00000540
              STA     #1,SC                                                00000550
              TTF     *-2                                                  00000560
              ENDM    CHRMOV                                               00000570
                                                                           00000580
                                                                           00000590
       GNFLD  MACRO                                                        00000600
              LDX4    2,4                                                  00000610
              LDA     0,4                                                  00000620
              ANA     =0770000,DU                                          00000630
              CMPA    =0010000,DU                                          00000640
              TZE     #1                                                   00000650
              CMPA    =0100000,DU                                          00000660
              TNZ     DEFERR                                               00000670
              ENDM    GNFLD                                                00000680
       GHCHN  MACRO                                                        00000690
              EAX5    0,2                                                  00000700
              LDA     0,5                                                  00000710
              ANA     =0770000,DU                                          00000720
              CMPA    =0020000,DU                                          00000730
              TZE     *+5                                                  00000740
              LDX5    2,5                                                  00000750
              LDA     0,5                                                  00000760
              CANA    =0020000,DU                                          00000770
              TZE     DEFERR                                               00000780
FIND NEXT OF A SEGMENT TYPE

              ENDM    GHCHN                                                00000790
                                                                           00000800
                                                                           00000810
       GNCOMP MACRO                                                        00000820
              LDX4    3,4                                                  00000830
              LDA     0,4                                                  00000840
              ANA     =0770000,DU                                          00000850
              CMPA    =0510000,DU                                          00000860
              TZE     #1                                                   00000870
              CMPA    =0560000,DU                                          00000880
              TNZ     DEFERR                                               00000890
              ENDM    GNCOMP                                               00000900
                                                                           00000910
                                                                           00000920
       NXTFLD MACRO                                                        00000930
              LDX2    2,2                                                  00000940
              LDA     0,2                                                  00000950
              ANA     =0770000,DU                                          00000960
              CMPA    =0010000,DU                                          00000970
              TZE     #1                                                   00000980
              CMPA    =0100000,DU                                          00000990
              TNZ     DEFERR                                               00001000
              ENDM    NXTFLD                                               00001010
                                                                           00001020
                                                                           00001030
       GHMAKE MACRO                                                        00001040
              LXL5    1,4                                                  00001050
              LDA     0,5                                                  00001060
              ANA     =0770000,DU                                          00001070
              CMPA    =0510000,DU                                          00001080
              TNZ     DEFERR                                               00001090
              ENDM    GHMAKE                                               00001100
                                                                           00001110
                                                                           00001120
       GMMAKE MACRO                                                        00001130
              LXL4    1,4                                                  00001140
              LDA     0,4                                                  00001150
              ANA     =0770000,DU                                          00001160
              CMPA    =0510000,DU                                          00001170
              TNZ     DEFERR                                               00001180
              ENDM    GMMAKE                                               00001190
FIND NEXT OF A SEGMENT TYPE

              SYMDEF  NXTSEG                                               00001210
                                                                           00001220
              SYMREF  DEFERR                                               00001230
              SYMREF  .QCBUF                                               00001240
              SYMREF  .QCREC                                               00001250
              SYMREF  .QCURD                                               00001260
              SYMREF  CCB                                                  00001270
              SYMREF  .QCURT                                               00001280
                                                                           00001290
                                                                           00001300
                                                                           00001310
                         000000       NXTSEG NULL                          00001320
000000  000760 7530 00  010                  SREG    HLDREG                00001330
000001  000000 6260 14  000                  EAX6    0,4     X5 = X4       00001340
000002  000005 2200 14  000                  LDX0    .LEVEL,4   CHECK FOR  00001350
000003  000001 1000 03  000                  CMPX0   1,DU    NEXT ROOT SEGMENT FETCH  00001360
000004  000034 6000 00  010                  TZE     NEXTRT                00001370
000005  000010 2350 14  000                  LDA     .RULE,4  PICK UP RULE WORD  00001380
000006  000001 3750 07  000                  ANA     =1,DL   ISOLATE PHYSICAL-LOGICAL BIT  00001390
000007  000067 6010 00  010                  TNZ     SEGLGL  NON-ZERO INDICATES LOGICAL  00001400
                                                                           00001410
                         000010       SEGPHY NULL                          00001420
000010  000012 2350 14  000                  LDA     .CURNT,4  PICK UP CURRENT  00001430
000011  000040 6040 00  010                  TMI     USECUR  HANDLE SEPARATELY IF HIGH-ORDER  00001440
```

```
                                                                  BIT IS ON. THIS MEANS THAT THE LAST       0000145
                                                                  REFERENCE TO THIS SEGMENT WAS A DELETE    0000146
                                                                                                            0000147
 000012  050000701000    030          CALL     GETMST             ESTABLISH CURRENCY                        0000148
 000013  000015710000    010
 000014  000770000222    010
                                                                                                            0000149
                 000015       CHKRTV NULL                                                                   0000150
 000015  010005 2350 07  030          LDA      CCB+ERRREF         EXIT ON ERROR                             0000151
 000016  000352 6010 00  010          TNZ      EXIT                                                         0000152
                                                                                                            0000153
                 000017       GETCHL NULL                                                                   0000154
                 000017               GNCHLD   DEFERR             X4 = ADDR P-C DEFINITION                  0000155
END OF BINARY CARD NXTSEG03
                                                                                                            0000156
 000026  000004 2220 14  000          LDX2     .SGORD,6           X2 = ADDR OF THE IDS ORD                  0000157
 000027  000000 2350 12  000          LDA      0,2                                                          0000158
 000030  001777 3750 03  000          ANA      =O001777,DU        ISOLATE THE RECORD TYPE                   0000159
 000031  000355 7550 00  010          STA      RDWANT             SAVE IT FOR LATER USE                     0000160
                                                                                                            0000161
 000032  000205 7010 00  010          TSX1     NEXT               GET THE "NEXT" SEGMENT                    0000162
 000033  000352 7100 00  010          TRA      EXIT                                                         0000163
                                                                                                            0000164
                                                                                                            0000165
                 000034       NEXTRT NULL                                                                   0000166
 000034  130000701000    030          CALL     ROOTNX             CALL SUBROUTINE TO GET NEXT ROOT          0000167
 000035  000037710000    010
 000036  000770000245    010

 000037  000352 7100 00  010          TRA      EXIT               EXIT                                      0000168

                        FIND NEXT OF A SEGMENT TYPE

                 000040       USECUR NULL                                                                   0000170
                                                                  USE THE CURRENT REF-CODE:                 0000171
                                                                  DO NOT GO GET THE NEXT ONE                0000172
 000040  400000 6750 03  000          ERA      =O400000,DU        TURN OFF THE HIGH ORDER BIT               0000173
 000041  000012 7550 14  000          STA      .CURNT,4           RESET THE CURRENCY IN SEG DEF             0000174
 000042  010000 1150 00  030          CMPA     CCB+DIRREF         IS IT THE SAME AS DIRECT-REF              0000175
 000043  000052 6000 00  010          TZE      CURTYP             YES - CHECK TYPE                          0000176
 000044  010000 7550 00  030          STA      CCB+DIRREF                                                   0000177
                                                                                                            0000178
 000045  120000701000    030          CALL     .DGETD             NO - RETRIEVE DIRECT                      0000179
END OF BINARY CARD NXTSEG04
 000046  000050710000    010
 000047  000770000261    010
 000050  010005 2350 00  030          LDA      CCB+ERRREF         EXIT ON ERROR                             0000180
 000051  000352 6010 00  010          TNZ      EXIT                                                         0000181
                                                                                                            0000182
                 000052       CURTYP NULL                                                                   0000183
 000052  000004 2220 14  000          LDX2     .SGORD,4           X2 = ORD ADDRESS                          0000184
 000053  000000 2350 12  000          LDA      0,2                                                          0000185
 000054  001777 3750 03  000          ANA      =O1777,DU          ISOLATE RECORD TYPE                       0000186
 000055  000022 7310 00  000          ARS      18                 ALIGN FOR COMPARISON                      0000187
 000056  110000 1150 00  030          CMPA     .GCURT             IS IT THE TYPE JUST FOUND                 0000188
 000057  000064 6010 00  010          TNZ      SETR04             NO - SET R04 ERROR                        0000189
 000060  140000701000    030          CALL     UPDATE             YES - UPDATE CHAIN TABLES                 0000190
 000061  000063710000    010
 000062  000770000274    010
 000063  000352 7100 00  010          TRA      EXIT                                                         0000191
                                                                  NO - SET R04 ERROR                        0000192
                 000064       SETR04 NULL                                                                   0000193
 000064  510004 2350 07  000          LDA      =3HR04,DL                                                    0000194
 000065  010005 7550 00  030          STA      CCB+ERRREF                                                   0000195
 000066  000352 7100 00  010          TRA      EXIT                                                         0000196

                        FIND NEXT OF A SEGMENT TYPE

                 000067       SEGLGL NULL                         SEGMENT DESIRED IS LOGICAL                0000198
                 000067               GNCOMP   DEFERR             GET NEXT COMPOSED OF                      0000199
END OF BINARY CARD NXTSEG05
 000076  000004 2350 14  000          LDA      .LGCRN,4           PICK UP CURRENCY FOR THIS COMPONENT       0000200
 000077  000153 6040 00  010          TMI      LGLCUR             HANDLE SEPARATELY IF HIGH-ORDER BIT IS ON0000201
                                                                  THIS MEANS THAT THE LAST REFERENCE TO     0000202
                                                                  THE LOGICAL SEGMENT WAS A DELETE          0000203
                                                                                                            0000204
 000100  000121 6000 00  010          TZE      FTCHMS             IF NO CURRENT GO FETCH THE MASTER         0000205
                                                                                                            0000206
 000101  010000 1150 00  030          CMPA     CCB+DIRREF         IF THE CURRENT = DIRECT-REFERENCE         0000207
 000102  000151 6000 00  010          TZE      SKIPRT             DON'T BOTHER RETRIEVING IT                0000208
 000103  010000 7550 00  030          STA      CCB+DIRREF         ELSE SET DIRECT-REF AND RETRIEVE          0000209
                 000104               GMMAKE                      X4 = SEG DEF ADDR OF THIS COMPONENT       0000210
 000111  120000701000    030          CALL     .DGETD             RETRIEVE DIRECT                           0000211
 000112  000114710000    010
 000113  000770000321    010
END OF BINARY CARD NXTSEG06
 000114  140000701000    030          CALL     UPDATE             UPDATE AREA CHAIN TABLES                  0000212
 000115  000117710000    010
 000116  000770000322    010
 000117  000000 6240 16  000          EAX4     0,6                X4 = ORIGINAL SEG DEF                     0000213
 000120  000125 7100 00  010          TRA      CHKFTC             GO CHECK SUCCESS OF THE RETRIEVE          0000214
                                                                                                            0000215
                 000121       FTCHMS NULL                                                                   0000216
 000121  000000 6240 16  000          EAX4     0,6                REESTABLISH SEG DEF ADDR                  0000217
                                                                                                            0000218
 000122  050000701000    030          CALL     GETMST             ESTABLISH THE MASTER AS CURRENT           0000219
 000123  000125710000    010
 000124  000770000331    010
                 000125       CHKFTC NULL                         CHECK SUCCESS OF RETRIEVE                 0000220
 000125  010005 2350 00  030          LDA      CCB+ERRREF                                                   0000221
 000126  000352 6010 00  010          TNZ      EXIT                                                         0000222
                                                                                                            0000223
                 000127       COMPCS NULL                         PROCESS EACH COMPONENT OF THE             0000224
                                                                  LOGICAL SEGMENT                           0000225
```

```
                    000127    224         GNCOMP  EXIT          GET THE NEXT COMPONENT DEFINITION           00002260
                              225                                                                         00002270
000136  000000 7260 14  000   226         LXL6    1,4           X6 = ADDR OF SEG DEF WHICH MAKES UP         00002280
                              227                               THIS COMPONENT                              00002290
OF BINARY CARD NXTSEG07
000137  000004 2220 16  000   228         LDX2    .SGORD,6      X2 = ADDR OF IDS ORD                        00002300
000140  000000 2350 12  000   229         LDA     0,2                                                       00002310
000141  001777 3750 03  000   230         ANA     =O001777,DU   ISOLATE THE RECORD TYPE                     00002320
000142  000355 7550 00  010   231         STA     RDWANT        SAVE IT FOR LATER USE                       00002330
                              232                                                                         00002340
000143  000205 7010 00  010   233         TSX1    NEXT          GET THE NEXT COMPONENT SEGMENT              00002350
                              234                               OF THE LOGICAL SEGMENT                      00002360
000144  010005 2350 00  030   235         LDA     CCB+ERRREF                                                00002370
000145  000352 6010 00  010   236         TNZ     EXIT          EXIT ON ERROR                               00002380
                              237                                                                         00002390
000146  010000 2350 00  030   238         LDA     CCB+DIRREF                                                00002400

                 FIND NEXT OF A SEGMENT TYPE

000147  000004 7550 14  000   239         STA     .LGCRN,4      SAVE CURRENCY IN THE LSEG DEF               00002410
000150  000127 7100 00  010   240         TRA     COMPOS        GO GET NEXT COMPONENT                       00002420
                              241                                                                         00002422
                    000151    242 SKIPRT  NULL                                                            00002423
000151  000000 6240 16  000   243         EAX4    0,6           X4 = ORIGINAL SEG DEF                       00002424
000152  000127 7100 00  010   244         TRA     COMPOS                                                    00002425

                              246                                                                         00002440
                              247                                                                         00002450
                              248                                                                         00002460
                    000153    249 LGLCUR  NULL                  USE THE CURRENT FOR THIS COMPONENT          00002470
000153  400000 6750 03  000   250         ERA     =O400000,DU   TURN OFF THE HIGH-ORDER BIT                 00002480
000154  000004 7550 14  000   251         STA     .LGCRN,4      RESET CURRENCY                              00002490
000155  010000 1150 00  030   252         CMPA    CCB+DIRREF    IS IT = DIRECT-REFERENCE                    00002500
000156  000165 6000 00  010   253         TZE     LGLTYP        YES - SKIP .QGETD CALL                      00002510
000157  010000 7550 00  030   254         STA     CCB+DIRREF    NO -                                        00002520
000160  120000701000          030   255   CALL    .QGETD        RETRIEVE DIRECT                             00002530
000161  000163710000          010
OF BINARY CARD NXTSEG08
000162  000770000377          010
000163  010005 2350 00  030   256         LDA     CCB+ERRREF    EXIT ON ERROR                               00002540
000164  000352 6010 00  010   257         TNZ     EXIT                                                      00002550
                              258                                                                         00002560
                    000165    259 LGLTYP  NULL                                                            00002570
                    000165    260         GHMAKE                X5 = ADDR OF SEG DEF OF COMPONENT           00002580
000172  000004 2220 15  000   261         LDX2    .SGORD,5      X2 = RD ADDR FOR THIS COMPONENT             00002590
000173  000000 2350 12  000   262         LDA     0,2                                                       00002600
000174  001777 3750 03  000   263         ANA     =O1777,DU     ISOLATE RECORD TYPE                         00002610
000175  000022 7310 00  000   264         ARS     18            IS IT THE TYPE JUST FOUND                   00002620
000176  110000 1150 00  030   265         CMPA    .OCURT                                                    00002630
000177  000064 6010 00  010   266         TNZ     SETR04        NO  - ERROR "R04"                           00002640
000200  000000 6260 15  000   267         EAX6    0,5           X6 = SEG DEF ADDR FOR THIS COMPONENT        00002650
000201  140000701000          030   268   CALL    UPDATE        UPDATE ALL AREA CHAINS                      00002660
000202  000204710000          010
000203  000770000414          010
000204  000127 7100 00  010   269         TRA     COMPOS        GO START WITH NEXT COMPONENT                00002670

                 FIND NEXT OF A SEGMENT TYPE

                    000205    271 NEXT    NULL                                                            00002690
OF BINARY CARD NXTSEG09
000205  000235 7410 00  010   272         STX1    NXTXIT        THIS SUBROUTINE GETS THE                    00002700
                              273                               NEXT SEGMENT                                00002710
                              274                               IT ASSUMES THAT THE PARENT                  00002720
                              275                               HAS ALREADY BEEN ESTABLISHED                00002730
                              276                                                                         00002740
                              277                               ALSO ON ENTRY X4                            00002750
                              278                               MUST POINT TO EITHER THE                    00002760
                              279                               P-C OR LSEG DEFINITION, AND                 00002770
                              280                               X6 POINTS TO THE DESIRED SEG DEF            00002780
000206  000000 2350 14  000   281         LDA     .PCRTV,4      ISOLATE THE RETRIEVAL CODE                  00002790
000207  000007 3750 03  000   282         ANA     =O7,DU                                                    00002800
000210  000236 6010 00  010   283         TNZ     NOTNXT        ZERO INDICATES NEXT                         00002810
                              284                                                                         00002820
000211  000000 7220 14  000   285         LXL2    .DEPND,4      ISOLATE M D ADDRESS                         00002830
000212  000221 7420 00  010   286         STX2    CHNNXT+3      SET UP CHAIN PROCESSING                     00002840
000213  000000 2350 12  000   287         LDA     0,2           GET MASTER TYPE                             00002850
000214  001777 3750 03  000   288         ANA     =O001777,DU                                               00002860
000215  000356 7550 00  010   289         STA     MDTYPE                                                    00002870
                    000216    290 CHNNXT  NULL                                                            00002880
000216  030000701000          030   291   CALL    CHNPRO(**,1)  GET NEXT IN CHAIN                           00002890
000217  000223710000          010
000220  000770000443          010
000221  000000000000          000
000222  000001000000          000
000223  010005 2350 00  030   292         LDA     CCB+ERRREF    EXIT ON I-D-S ERROR                         00002900
000224  000235 6010 00  010   293         TNZ     NXTXIT                                                    00002910
                              294                                                                         00002920
000225  110000 2350 00  030   295         LDA     .OCURT        PICK UP RECORD TYPE                         00002930
000226  000022 7350 00  000   296         ALS     18            ALIGN FOR COMPARISON                        00002940
000227  000355 1150 00  010   297         CMPA    RDWANT        WAS TYPE FOUND = TYPE REQUESTED             00002950
OF BINARY CARD NXTSEG10
000230  000235 6000 00  010   298         TZE     NXTXIT        EXIT IF SO                                  00002960
                    000231    299 WRNGRC  NULL                                                            00002970
000231  000356 1150 00  010   300         CMPA    MDTYPE        WAS THE MASTER RETRIEVED                    00002980
000232  000216 6010 00  010   301         TNZ     CHNNXT        NO - GO GET NEXT OC CHAIN                   00002990
                              302                                                                         00003000
                              303                                                                         00003010
                              304                                                                         00003020
                    000233    305 NOTFND  NULL                  NOT-FOUND EXIT                              00003030
000233  510004 2350 07  000   306         LDA     =3HR04,DL     SET I-D-S ERROR                             00003040
000234  010005 7550 00  030   307         STA     CCB+ERRREF    TO "R04"                                    00003050
000235  000000 7100 00  000   308 NXTXIT  TRA     **            EXIT                                        00003060
```

FIND NEXT OF A SEGMENT TYPE

```
                   000236        NOTNXT NULL                        WAS NOT A RETRIEVE NEXT              0000308
                                                                                                          0000309
000236  000003 1150 03  000             CMPA    =03,DU              WAS IT A RETRIEVE MASTER             0000310
000237  000250 6010 00  010             TNZ     FLDRTV              NO - GO CHECK FIELD RETRIEVE         0000311
000240  000000 7220 14  000             LXL2    .DEPND,4            YES - ISOLATE ADDR                   0000312
000241  000245 7420 00  010             STX2    CLMST+3             SET UP .CCMN CALL                    0000313
                                                                                                          0000314
                   000242        CLMST  NULL                                                             0000315
000242  030000701000       030          CALL    CHNPRO(**,4)        RETRIEVE MASTER                      0000316
000243  000247710000       010
000244  000770000476       010
000245  000000000000       000
000246  000004000000       000
000247  000235 7100 00  010             TRA     NXTXIT              EXIT                                 0000317

                   000250        FLDRTV NULL                                                             0000319
000250  000001 1150 03  000             CMPA    1,DU                IF RETRIEVE CODE IS 1                0000320
000251  000320 6000 00  010             TZE     FLDDIR              SET UP RETRIEVE DIRECT               0000321
                                                                                                          0000322
000252  000002 1150 03  000             CMPA    2,DU                IF CODE IS NOT 2                     0000323
END OF BINARY CARD NXTSEG11
000253  040000 6010 00  030             TNZ     DEFERR              DEFINITION TABLES ARE INVALID        0000324
                                                                                                          0000325
                   000254        FLDKEY NULL                                                             0000326
000254  000000 7250 14  000             LXL5    .DEPND,4            X2 = KEY DEF ADDR                    0000327
                                                                    X5 = IDS FD ADDR                     0000328
                   000255               GSETAL  FDWORK,IDSTAL,FDWS     SET UP TALLYS FOR WS MOVE         0000329
                   000272               CHRMOV  IDSTAL,FDWORK  MOVE FIELD FROM RECORD TO WS              0000330
                                                                                                          0000331
                   000275        SETGET NULL                        X6 = SEG ADDR OF REQUIRED SEGMENT    0000332
000275  000004 2220 16  000             LDX2    .SGORD,6            PICK UP IDS ORD ADDR                 0000333
END OF BINARY CARD NXTSEG12
000276  000316 7420 00  010             STX2    CLCGET+3                                                 0000334
                   000277        FLDDEF NULL                        SEARCH FOR THE RETRIEVAL FIELD       0000335
                   000277               NXTFLD  DEFERR                                                   0000336
000306  000000 2350 12  000             LDA     0,2                                                      0000337
000307  040000 3150 07  000             CANA    =040000,DL          ISOLATE THE UNIQUE BIT               0000338
000310  000277 6000 00  010             TZE     FLDDEF              IF NON-UNIQUE GO GET NEXT FLD-DEF    0000339
                                                                                                          0000340
000311  000361 6200 00  010             EAX0    FDWS                IF IT IS ON, SET  THE TALLY WORD     0000341
000312  000001 7400 12  000             STX0    1,2                 IN THE FD TO RETRIEVE WS             0000342
                                                                                                          0000343
                   000313        CLDGET NULL                                                             0000344
000313  020000701000       030          CALL    .GGET(**)           RETRIEVE RECORD-NAME RECORD          0000345
000314  000317710000       010
000315  000770000533       010
000316  000000000000       000
000317  000235 7100 00  010             TRA     NXTXIT              EXIT                                 0000346
```

FIND NEXT OF A SEGMENT TYPE

```
                   000320        FLDDIR NULL                                                             0000348
000320  000000 7250 14  000             LXL5    .DEPND,4            X5 = ADDR IDS FD                     0000349
                                                                                                          0000350
                   000321               GSETAL  FDWORK,IDSTAL,CCB+DIRREF                                 0000351
END OF BINARY CARD NXTSEG13
                                                                                                          0000352
                   000336               CHRMOV  IDSTAL,FDWORK       MOVE FIELD TO DIRECT-REFERENCE       0000353
                                                                                                          0000354
000341  120000701000       030          CALL    .GGETD              RETRIEVE DIRECT                      0000355
000342  000344710000       010
000343  000770000545       010
END OF BINARY CARD NXTSEG14
000344  010005 2350 00  030             LDA     CCB+ERRREF                                               0000356
000345  000352 6010 00  010             TNZ     EXIT                EXIT IF UNSUCCESSFUL                 0000357
                                                                                                          0000358
000346  000004 2220 16  000             LDX2    .SGORD,6            DOES TYPE FOUND                      0000359
000347  100000 1020 00  030             CMPX2   .GCURD              EQUAL TYPE REQUESTED                 0000360
000350  000233 6010 00  010             TNZ     NOTFND              NO - SET ERROR CODE                  0000361
000351  000235 7100 00  010             TRA     NXTXIT              YES - EXIT                           0000362

                   000352        EXIT,  NULL                                                             0000365
000352  000760 0730 00  010             LREG    HLDREC                                                   0000366
000353  000000 7100 11  000             TRA     0,1                                                      0000367
                                                                                                          0000368
                                                                                                          0000369
                                                                                                          0000370
                                                                                                          000037
                                                                                                          000037
                   000354        HOLDX4 BSS     1                   HOLD SELL FOR X4                     000037
                   000355        RDWANT BSS     1                   CONTAINS REQUESTED ORD TYPE          000037
                   000356        MCTYPE BSS     1                   RECORD TYPE OF MASTER RECORD         000037
000357  000000000000       000   FDWORK OCT     0                   TALLY WORD FOR "TO" AREA             000037
000360  000000000004       000   IDSTAL OCT     4                   TALLY WORD FOR "FROM" AREA           000037
                                                                                                          000037
                   000361        FDWS   BSS     255                                                      000037
                   000760               EIGHT                                                            000038
                   000760        HLDREC BSS     8                                                        000038
                                                                                                          000038
                   000001        DIRREF SET                                                              000038
                   000005        ERRREF SET     5                                                        000038
```

FIND NEXT OF A SEGMENT TYPE

```
                                                                                                          000000
                                                                                                          000000
                                                        LAY-OUT OF THE IMS SEG DEFINITION TABLE ENTRY    000000
                                                                                                          000000
                                                                                                          000000
                   000000        .SGLEN SET     0                   SEGMENT LENGTH (DATA ONLY)           000000
                   000000        .SQKEY SET     0                   ADDRESS OF THE SEQUENCE-KEY          000000
```

```
000003        .LGCHL SET    3          POINTER TO FIRST LOGICAL COMPONENT        00000080
000004        .SGORD SET    4          LOCATION OF IDS ORD POINTER               00000090
000005        .LEVEL SET    5          IMS LEVEL NUMBER                          00000100
000005        .RCNUM SET    5          IMS RECORD NUMBER                         00000110
000006        .SGREA SET    6          AREA FLAG WORD                            00000120
000006        .INDEX SET    6          INDEX ROUTINE ADDRESS                     00000130
000007        .PERM  SET    7          PERMISSION WORD (G,I,R,D,K,P)             00000140
000010        .RULE  SET    8          LOGICAL RULES  AND INSERT RULES           00000150
000011        .PCHLD SET    9          PC ADDR HOLD AREA                         00000160
000012        .CURNT SET    10         IDS CURRENCY FOR THIS SEGMENT             00000170
000013        .SGNAM SET    11         IMS SEGMENT NAME                          00000180
                                                                                 00000010
                                                                                 00000020
                     LAY-OUT OF THE IMS KEY DEFINITION ENTRY                     00000030
                                                                                 00000040
                                                                                 00000050
000000        .FDTYP SET    0          CODED FIELD TYPE                          00000060
000000        .SEQCD SET    0          CODE SEQUENCE CODE                        00000070
000000        .FDLEN SET    0          FIELD LENGTH                              00000080
000001        .FDSTR SET    1          STARTING CHARACTER                        00000090
000002        .IDSFD SET    2          ADDRESS OF THE IDS FIELD DEFINITION       00000100
000003        .FDPOS SET    3          STARTING POSITION IN FEEDBACK AREA        00000110
000004        .FDNAM SET    4          IMS FIELD NAME                            00000120
                                                                                 00000010
                                                                                 00000020
                     LAY-OUT OF THE P-C DEFINITION TABLE ENTRY                   00000030
                                                                                 00000040
                                                                                 00000050
000000        .PCRTV SET    0          RETRIEVAL-TYPE INDICATOR                  00000060
000000        .DEPND SET    0          DEPENDENCY OWNER                          00000070
000001        .PRMST SET    1          POINTER TO PARENT-OF MASTER (LOWER HALF)  00000080
000003        .PCLSG SET    3          LSEG ADDRESS                              00000090
                                                                                 00000010
                                                                                 00000020
                     LAY-OUT OF THE IMS LSEG DEFINITION TABLE ENTRY              00000030
                                                                                 00000040
                                                                                 00000050
000000        .LSRTV SET    0          RETRIEVAL-TYPE INDICATOR                  00000060
000000        .LGCNT SET    0          LOGICAL-CONTROL OWNER                     00000070
000002        .LSTRT SET    2          STARTING CHARACTER POSITION               00000080
000004        .LGCRN SET    4          CURRENCY FOR THIS COMPONENT               00000090
                                       OF THE LOGICAL SEGMENT                    00000100

    000770  000000000000   000
    000771  456763622527   000
END OF BINARY CARD NXTSEG15
                                                                                 00003890
              PERMISSION CHECKING ROUTINE

                    LBL     PERMIS                                               00000040
                    TTL     PERMISSION CHECKING ROUTINE                          00000050
                                                                                 00000055
                                                                                 00000060
                                                                                 00000070
                                                                                 00000080
                    THIS ROUTINE IS CALLED BY THE ANALYZER                       00000090
                    TO VERIFY THE PERMISSIONS REQUESTED BY                       00000100
                    THIS SSA AND FUNCTION AGAINST THE PCB                        00000110
                    USED IN THIS IMS CALL                                        00000120
                                                                                 00000130
                    IF EVERYTHING IS O.K., THE CALLER'S VALIDITY                 00000140
                    SWITCH IS SET TO ZERO                                        00000150
                    IF PERMISSIONS ARE DENIED, THE USER'S                        00000160
                    VALIDITY SWITCH IS SET TO 1                                  00000170
                                                                                 00000180
                    ON INPUT, PERMIS EXPECTS THE FOLLOWING ARGUMENTS -           00000190
                                                                                 00000200
                       1.  SSA TABLE ADDRESS                                     00000210
                       2.  VALIDITY SWITCH ADDRESS                               00000220

                    SYMDEF  PERMIS                                               00000260
                                                                                 00000270
                                                                                 00000280
                                                                                 00000290
                                                                                 00000300
                  000000     PERMIS NULL                                         00000310
000000  000060 7530 00 010      SREG    HLDREG                                   00000320
                                                                                 00000330
000001  000002 2230 11 000      LDX3    2,1        X3 = ADDRESS OF SSA TABLE     00000340
000002  000003 2350 11 000      LDA     3,1        PICK UP VALIDITY SWITCH ADDRESS 00000350
000003  000052 7550 00 010      STA     VALID                                    00000360
                                                                                 00000370
000004  010015 2350 00 030      LDA     FUNCDE     WAS THIS A GET FUNCTION       00000380
000005  000053 1150 00 010      CMPA    ISRTCD     (CODE VALUE < INSERT CODE)    00000390
000006  000017 6040 00 010      TMI     GET        YES                           00000400
000007  000047 6000 00 010      TZE     OKEXIT     NO - WAS AN INSERT - CAN JUST EXIT 00000410
                                                                                 00000420
000010  000054 1150 00 010      CMPA    DLETCD     WAS IT "DELETE"               00000430
000011  000047 6010 00 010      TNZ     OKEXIT     NO - SIMPLY EXIT              00000440
                                                                                 00000450
                                                                                 00000460
                  000012     DLET   NULL           FUNCTION IS DELETE            00000470
000012  000000 2240 13 000      LDX4    .SEGAD,3   X4 = SEG DEF ADDR             00000480
000013  000007 2350 14 000      LDA     .PERM,4    DO WE HAVE "D" PERMISSION     00000490
000014  770000 3750 07 000      ANA     =O770000,DL                              00000500
000015  000044 6010 00 010      TNZ     NOGOOD     NO - EXIT INVALID             00000510
000016  000047 7100 00 010      TRA     OKEXIT                                   00000520
              PERMISSION CHECKING ROUTINE

                                                                                 00000540
                                                                                 00000550
```

```
                                         54                                                                               0000056
                         000017          55 GET      NULL                                                                 0000057
000017  000000 2240 13  000              56          LDX4     .SEGAD,3          X4 = SEG DEF ADDRESS                      0000058
                                         57                                                                               0000059
000020  000005 2350 14  000              58          LDA      .LEVEL,4          IS THIS SSA FOR THE OBJECT LEVEL          0000060
000021  000022 7310 00  000              59          ARS      16                                                          0000061
000022  000000 1150 00  000              60          CMPA     OBJLVL                                                      0000062
END OF BINARY CARD PERMIS02
000023  000031 6000 00  010              61          TZE      GPERM             YES - CHECK FOR "G" PERMISSION            0000063
                                         62                                     NO                                        0000064
000024  000004 2200 13  000              63          LDX0     .DCODE,3          WAS COMMAND CODE "D" SPECIFIED            0000065
000025  000035 6000 00  010              64          TZE      GORK              NO - THEN CHECK FOR "G" OR "K" PERM       0000066
                                         65                                     YES                                       0000067
000026  000007 2350 14  000              66          LDA      .PERM,4           PICK UP PERMISSIONS WORD                  0000068
000027  000077 3750 07  000              67          ANA      =077,DL           ISOLATE "P" (PATH CALL) PERMISSION        0000069
000030  000044 6000 00  010              68          TZE      NOGOOD            ERROR IF NOT GRANTED                      0000070
                                         69                                                                               0000071
                         000031          70 GPERM    NULL                       CHECK FOR GET ("G") PERMISSION            0000072
000031  000007 2350 14  000              71          LDA      .PERM,4           ISOLATE PERMISSION WORD                   0000073
000032  770000 3750 03  000              72          ANA      =0770000,DU       WAS "G" GRANTED                           0000074
000033  000044 6000 00  010              73          TZE      NOGOOD            NO - ERROR                                0000075
000034  000047 7100 00  010              74          TRA      OKEXIT            YES - EXIT O.K.                           0000076
                                         75                                                                               0000077
                                         76                                                                               0000078
                         000035          77 GORK     NULL                       ACCEPT CALL IF "G" OR "K" WAS GRANTED     0000079
000035  000007 2350 14  000              78          LDA      .PERM,4           ISOLATE PERMISSIONS WORD                  0000080
000036  770000 3750 03  000              79          ANA      =0770000,DU                                                 0000081
000037  000047 6010 00  010              80          TNZ      OKEXIT            YES - EXIT O.K.                           0000082
                                         81                                                                               0000083
                                         82                                                                               0000084
000040  000007 2350 14  000              83          LDA      .PERM,4           PICK UP PERMISSIONS WORD                  0000085
000041  007700 3750 07  000              84          ANA      =0007700,DL       ISOLATE "K" BITS - WAS K GRANTED          0000086
000042  000044 6000 00  010              85          TZE      NOGOOD            NO -ERROR                                 0000087
000043  000047 7100 00  010              86          TRA      OKEXIT            YES - OK                                  0000088
                                   PERMISSION CHECKING ROUTINE

                                         88                                                                               0000090
                                         89                                                                               0000091
                                         90                                                                               0000092
                         000044          91 NOGOOD   NULL                                                                 0000093
000044  000001 2350 07  000              92          LDA      1,DL              SET SWITCH INDICATING FAILURE             0000094
000045  000052 7550 51  010              93          STA      VALID,I                                                     0000095
END OF BINARY CARD PERMIS03
000046  000050 7100 00  010              94          TRA      EXIT                                                        0000096
                                         95                                                                               0000097
                                         96                                                                               0000098
                         000047          97 OKEXIT   NULL                                                                 0000099
000047  000052 4500 51  010              98          STZ      VALID,I           SET SWITCH INDICATING SUCCESS             0000100
                                         99                                                                               0000101
                         000050         100 EXIT     NULL                                                                 0000102
000050  000060 0730 00  010             101          LREG     HLDREG                                                      0000103
000051  000000 7100 11  000             102          TRA      0,1                                                         0000104
                                        103                                                                               0000105
                                        104                                                                               0000106
                                        105                                                                               0000107
                                        106                                                                               0000108
                         000052         107 VALID    BSS      1                 ADDRESS OF CALLER'S VALIDITY SWITCH       0000109
000053  000000000007    000             108 ISRTCD   DEC      7                 INSERT CODE NUMBER                        0000110
000054  000000000011    000             109 DLETCD   DEC      9                 DELETE CODE NUMBER                        0000111
                                        110                                                                               0000112
                                        111                                                                               0000113
                                        112                                                                               0000114
000055  000003710004    000
                         000060         113          EIGHT                                                                0000115
                         000060         114 HLDREG   BSS      8                                                           0000116
                                        118                   LAY-OUT OF THE SSA TABLE                                    0000003
                                        119                                                                               0000004
                                        120                                                                               0000005
                         000012         121 .SSSIZ   SET      10                TABLE SIZE                                0000006
                         000000         122 .SEGAD   SET      0                 SEG DEFINITION ADDRESS                    0000007
                         000000         123 .SUPLT   SET      0                 FLAG FOR USER-SUPPLIED OR IMPLIED         0000008
                         000001         124 .IOTAL   SET      1                 I-O-AREA TALLY                            0000009
                         000002         125 .UNIQE   SET      2                 UNIQUENESS INDICATOR                      0000010
                         000003         126 .EISWD   SET      3                 EIS DESCRIPTOR WORD OF SEGMENT            0000011
                         000004         127 .DCODE   SET      4                 D COMMAND CODE (UPPER)                    0000012
                         000004         128 .NCODE   SET      4                 N COMMAND-CODE (LOWER)                    0000012
                         000005         129 .FCODE   SET      5                 F COMMAND CODE (UPPER)                    0000013
                         000005         130 .LCODE   SET      5                 L COMMAND CODE (LOWER)                    0000013
                         000006         131 .UCODE   SET      6                 U COMMAND CODE (UPPER)                    0000014
                         000006         132 .VCODE   SET      6                 V COMMAND CODE (LOWER)                    0000014
                         000007         133 .PCODE   SET      7                 P COMMAND CODE (UPPER)                    0000015
                         000010         134 .QLCNT   SET      8                 NUMBER OF QUALIFIERS                      0000016
                         000011         135 .QLPTR   SET      9                 INDEX OF FIRST ENTRY IN QUAL. TABLE       0000017
                                   PERMISSION CHECKING ROUTINE

                                        137                                                                               0000001
                                        138                                                                               0000002
                                        139                   LAY-OUT OF THE IMS SEG DEFINITION TABLE ENTRY               0000003
                                        140                                                                               0000004
                                        141                                                                               0000005
                         000000         142 .SGLEN   SET      0                 SEGMENT LENGTH (DATA ONLY)                0000006
                         000000         143 .SQKEY   SET      0                 ADDRESS OF THE SEQUENCE-KEY               0000007
                         000003         144 .LGCHL   SET      3                 POINTER TO FIRST LOGICAL COMPONENT        0000008
                         000004         145 .SGORD   SET      4                 LOCATION OF IDS ORD POINTER               0000009
                         000005         146 .LEVEL   SET      5                 IMS LEVEL NUMBER                          0000010
                         000005         147 .RCNUM   SET      5                 IMS RECORD NUMBER                         0000011
                         000006         148 .SGREA   SET      6                 AREA FLAG WORD                            0000012
                         000006         149 .INDEX   SET      6                 INDEX ROUTINE ADDRESS                     0000013
                         000007         150 .PERM    SET      7                 PERMISSION WORD (G,I,R,D,K,P)             0000014
                         000010         151 .RULE    SET      8                 LOGICAL RULES  AND INSERT RULES           0000015
                         000011         152 .PCHLD   SET      9                 PC ADDR HOLD AREA                         0000016
```

```
000012    .CURNT SET     10          IDS CURRENCY FOR THIS SEGMENT                 00000170
000013    .SGNAM SET     11          IMS SEGMENT NAME                              00000180

000000           BLOCK   C05                                                       00000010
000000    SSACNT BSS     1           SSA COUNT IN CURRENT CALL                     00000020
000001    SSATAB BSS     1           ADDRESS OF THE CURRENT SSA TABLE              00000030
000002    QALTAB BSS     1           ADDRESS OF QUALIFICATION TABLE                00000040
000003    PCBDFN BSS     1           PCB DEFINITION ADDRESS                        00000050
000004    QUALDX BSS     1           QUALIFICATION TABLE INDEX                     00000060
000005    CURSSA BSS     1           ADDRESS OF CURRENT USER SSA                   00000070
000006    FRSTLV BSS     1           FIRST USER-SUPPLIED LEVEL                     00000080
000007    IOAREA BSS     1           ADDRESS OF USER'S I-O-AREA                    00000090
000010    LSTSEG BSS     1           ADDRESS OF LAST ACCESSED SEG                  00000100
000011    CURREF BSS     1           REF. CODE OF LAST ACCESSED RECORD             00000110
000012    PCBADR BSS     1           ADDRESS OF USER'S PCB                         00000120
000013    PRNTSW BSS     1           SWITCH FOR IMS PARENT SETTING                 00000130
000014    PRSTAT BSS     1           STATUS OF PREVIOUS CALL                       00000140
000015    FUNCDE BSS     1           IMS FUNCTION CODE                             00000150
000016    OLDSSA BSS     1           OLD SSA COUNT (PREVIOUS CALL)                 00000160
000017    PRIRSW BSS     1           USE PRIOR DIRECTION SWITCH                    00000170
000020    CCODES BSS     1           COMMAND CODE "C" SWITCH                       00000180
000021    USERIO BSS     1           ADDRESS OF USER'S I-O-AREA                    00000190
000022    MVESAC BSS     1           TALLY WORD BUILD BY MVESEG WHEN NO SSA'S      00000200
                                                                                   00000210
                                                                                   00000220
                                                                                   00000230
                                                                                   00000240
                                                                                   00000250
000070           USE                                                               00000260

PROCESS COMMAND CODE "C"

                 LBL     PROCCD                                                    00000040
                 TTL     PROCESS COMMAND CODE "C"                                  00000050
                                                                                   00000055
                                                                                   00000060
                                                                                   00000070
                                                                                   00000080
                                                                                   00000090
                         THIS ROUTINE IS CALLED BY THE ANALYZER                    00000100
                         TO PROCESS THE "C" COMMAND CODE                           00000110
                                                                                   00000120
                         "C" IS USED IN AN IMS PROGRAM TO SUPPLY                   00000130
                         THE CONCATENATED KEY AT LEVEL N TO FORCE                  00000140
                         RETRIEVAL OF ALL SEGMENTS ABOVE THAT LEVEL                00000150
                                                                                   00000160
                         PROCCD WORKS BY BUILDING QUALIFICATION TABLE              00000170
                         ENTRIES (SEQUENCE-KEY = VALUE) FOR ALL LEVELS             00000180
                         LESS THAN OR EQUAL TO N                                   00000190
                                                                                   00000200
                         LOGICAL SEGMENTS ARE HANDLED BY DOING EACH                00000210
                         COMPONENT INDIVIDUALLY WHILE BUILDING AS MANY             00000220
                         QUALIFICATION TABLES AS NECESSARY FOR THAT LEVEL          00000230
                                                                                   00000240
                         IF COMMAND CODE "D" IS GIVEN ALONG WITH "C",              00000250
                         THE "D" IS PROPAGATED "UPWARD" THROUGH                    00000260
                         THE HIERARCHY                                             00000270

PROCESS COMMAND CODE "C"

                                                                                   00000290
                                                                                   00000300
          GNCHLD MACRO                                                             00000310
                 LDX4    2,4                                                       00000320
                 LDA     0,4                                                       00000330
                 ANA     =0770000,DU                                               00000340
                 CMPA    =0510000,DU                                               00000350
                 TZE     *1                                                        00000360
                 CMPA    =0540000,DU                                               00000370
                 TNZ     DEFERR                                                    00000380
                 ENDM    GNCHLD                                                    00000390
                                                                                   00000400
                                                                                   00000410
          GNPRNT MACRO                                                             00000420
                 LXL4    1,4                                                       00000430
                 LDA     0,4                                                       00000440
                 ANA     =0770000,DU                                               00000450
                 CMPA    =0510000,DU                                               00000460
                 TNZ     DEFERR                                                    00000470
                 ENDM    GNPRNT                                                    00000480
                                                                                   00000490
                                                                                   00000500
          GNCOMP MACRO                                                             00000510
                 LDX4    3,4                                                       00000520
                 LDA     0,4                                                       00000530
                 ANA     =0770000,DU                                               00000540
                 CMPA    =0510000,DU                                               00000550
                 TZE     *1                                                        00000560
                 CMPA    =0540000,DU                                               00000570
                 TNZ     DEFERR                                                    00000580
                 ENDM    GNCOMP                                                    00000590
                                                                                   00000600
                                                                                   00000610
          GNMAKE MACRO                                                             00000620
                 LXL4    ,4                                                        00000630
                 LDA     0,4                                                       00000640
                 ANA     =0770000,DU                                               00000650
                 CMPA    =0510000,DU                                               00000660
                 TNZ     DEFERR                                                    00000670
                 ENDM    GNMAKE                                                    00000680
                                                                                   00000690
                                                                                   00000700
          GNMAKE MACRO                                                             00000710
```

```
                                                     CALS    1,5                                                  000007
                                                     LDA     0,5                                                  000007
                                                     ANA     =0770000,DU                                          000007
                                                     CMPA    =0510000,DU                                          000007
                                                     TNZ     DEFERR                                               000007
                                                     ENDM    GHMAKE                                               000007
                         PROCESS COMMAND CODE "C"

                                                                                                                  000007
                                                                                                                  000008
                                                                                                                  000008
                                                     SYMDEF  PROCCD                                               000008
                                                                                                                  000008
                                                                                                                  000008
                                                     SYMREF  DEFERR                                               000008
                                                                                                                  000008
                                                                                                                  000008
                              000000        PROCCD   NULL                                                         000008
 [illegible]  000343 7530 00  017                    SREG    HLDREG                                               000008
                                                                                                                  000009
 [illegible]  000302 2350 31  [illegible]            LDA     2,1*           PICK UP CURRENT LEVEL                000009
 000002       000314 7550 00  010                    STA     CURLVL                                               000009
 000003       000003 2350 11  000                    LDA     3,1            PICK UP SSA ADDRESS                  000009
 [illegible]  000315 7550 00  010                    STA     SSADDR                                               000009
 [illegible]  000004 2350 31  [illegible]            LDA     4,1*           PICK UP CURRENT CHARACTER POSITION   000009
 [illegible]  000316 7550 00  010                    STA     CHRPOS                                               000009
 [illegible]  000005 2350 11  [illegible]            LDA     5,1            PICK UP VALIDITY SWITCH ADDRESS      000009
 [illegible]  [illegible] 7550 [illegible]           STA     VALID                                                000009
                                                                                                                  000009
                                                                                                                  000010
                                                                                                                  000010
 [illegible]  000314 2360 [illegible]                LDQ     CURLVL         COMPUTE SSA TABLE ADDRESS            000010
 [illegible]  [illegible] 6000 [illegible]           TZE     ERR                                                  000010
 [illegible]  000001 1760 07  [illegible]            SBQ     1,DL                                                 000010
 [illegible]  000012 4020 07  000                    MPY     .SSSIZ,DL                                            000010
 [illegible]  000000 6230 06  [illegible]            EAX3    0,QL                                                 000010
 [illegible]  [illegible]                            ADX3    SSATAB         X3 = ADDRESSA-TABLE(CURLVL))         000010
                                                                                                                  000010
 [illegible]  000003 2240 13  [illegible]            LDX4    .SEGAD,3       X4 = SEG DEF ADDR                    000010
 [illegible]  000320 7440 00  010                    STX4    HOLDX4         SAVE X4                              000011
 [illegible]  000321 4500 [illegible]                STZ     LGCLEN         LOGICAL-LENGTH = 0                   000011
                                                                                                                  000011
                              000022        LGCTST   NULL                                                         000011
 [illegible]  000010 2350 14  [illegible]            LDA     .RULE,4        PICK UP RULE WORD                    000011
 END OF BINARY CARD PROCC002
 [illegible]  000007 3750 07  [illegible]            ANA     =07,DL         ISOLATE PHYSICAL-LOGICAL FLAG        000011
 [illegible]  [illegible] 6010 [illegible]           TNZ     SEGLGL         HANDLE LOGICAL SEPARATELY            000011
                                                                                                                  000011
 [illegible]  [illegible] 7200 14  [illegible]       LXL0    .SQKEY,4       X0 = SEQUENCE KEY ADDR               000011
 [illegible]  [illegible]                            TZE     BACKUP         BACK UP IN THE STRUCTURE IF NO KEY   000011
                                                                                                                  000012
 [illegible]  [illegible] 2350 10 [illegible]        LDA     .FDLEN,0       PICK UP FIELD LENGTH                 000012
 [illegible]  077777 3750 07  [illegible]            ANA     =07777,DL      TOTAL-LEN =                          000012
 [illegible]  000321 0750 [illegible]                ADA     LGCLEN           LGCLEN + START-POS-IN-KEY-FEEDBACK 000012
 [illegible]  000322 7550 [illegible]                STA     TOTLEN                                               000012
 [illegible]  [illegible] 2350 10 [illegible]        LDA     .FDPOS,0                                             000012
 [illegible]  [illegible] 7310 [illegible]           ARS     18             ISOLATE START POS IN FEEDBACK AREA   000012
 [illegible]  [illegible]                            ASA     TOTLEN                                               000012
                                                                                                                  000012
                              [illegible]   CMPEND   NULL                   COMPUTE END-CHAR                     000012
                         PROCESS COMMAND CODE "C"

 [illegible]  000316 2350 00  010                    LDA     CHRPOS                                               000013
 [illegible]  000322 0750 00  010                    ADA     TOTLEN                                               000013
 [illegible]  000001 0750 07  [illegible]            ADA     1,DL           END-POS = CHAR-POS +                 000013
 [illegible]  000323 7550 [illegible]                STA     ENDPOS             TOTAL-LEN + 1                    000013
                                                                                                                  000013
 000042       000320 2240 00  010                    LDX4    HOLDX4         SET X4 TO ORIGINAL SEG DEF ADDR      000013
 [illegible]  000100 7100 00  [illegible]            TRA     BLDTLY         GO TO BUILD TALLIES FOR KEY VALUES   000013
                                                                                                                  000013
                                                                                                                  000013
                              000044        BACKUP   NULL                   BACK UP ONE LEVEL IN THE STRUCTURE   000013
                              000044                 GNCHLD  SETOTL         IF THIS IS NOT POSSIBLE, USE THE     000014
 END OF BINARY CARD PROCC003
                              000053                 GMPRNT                 ACCUMULATED LOGICAL LENGTH AS THE TOTAL 000014
                                                                            X4 = ADDR PARENT SEG DEF             000014
 000053       000022 7100 00  [illegible]            TRA     LGCTST         GO CHECK THIS SEGMENT                000014
                                                                                                                  000014
                                                                                                                  000014
                              000061        SETOTL   NULL                                                         000014
 000061       000321 2350 [illegible]                LDA     LGCLEN                                               000014
 [illegible]  000322 7550 [illegible]                STA     TOTLEN         TOTAL-LEN = LGCLEN                   000014
 [illegible]  000046 7100 [illegible]                TRA     CMPEND         GO TO COMPUTE-END-CHAR               000014
                                                                                                                  
                              000064        SEGLGL   NULL                   GET NEXT LSEG DEF                    0000154
                              000064                 GNCOMP  BACKUP         BACK UP IN THE STRUCTURE WHEN        0000155
 END OF BINARY CARD PROCC004
                                                                            ALL LSEGS HAVE BEEN PROCESSED        0000156
                                                                                                                 0000157
                              000071                 GHMAKE                 X5 = SEG DEF ADDR OF ONE COMPONENT   0000158
                                                                                                                 0000159
 000133       000000 7200 15  000                    LXL0    .SQKEY,5       X0 = SEQ KEY ADDR                    0000160
 [illegible]  000064 6000 00  [illegible]            TZE     SEGLGL         IF NONE, GO TRY NEXT COMPONENT       0000161
                                                                                                                 0000162
 [illegible]  000000 2350 10  [illegible]            LDA     .FDLEN,0       PICK UP KEY LENGTH                   0000163
 [illegible]  077777 3750 07  [illegible]            ANA     =07777,DL      LGCLEN = LGCLEN + KEY-LENGTH         0000164
 [illegible]  000321 0550 00  [illegible]            ASA     LGCLEN                                               0000165
 [illegible]  [illegible] 7100 [illegible]           TRA     SEGLGL         GO TRY NEXT COMPONENT                0000166
```

PROCESS COMMAND CODE "C"

```
                    000106      BLDTLY NULL                          BUILD A TALLY WORD
000106  000316 2360 00 010             LDQ    CHRPOS        FOR THE LEFT PARENTHESIS
000107  000001 1760 07 000             SBQ    1,DL          POSITION
000110  000006 5060 07 000             DIV    6,DL          CHRPOS SHOULD BE
000111  000000 6260 06 000             EAX6   0,QL          THE CORRECT CHARACTER OFFSET
000112  000315 0660 00 010             ADX6   SSADDR        (RELATIVE TO 1)
000113  000324 7460 00 010             STX6   PRNTAL
 OF BINARY CARD PROCCDDS
000114  000324 7510 01 010             STCA   PRNTAL,01
000115  000100 2350 07 000             LDA    =0C100,DL
000116  000324 7510 06 010             STCA   PRNTAL,06

000117  000000 2350 03 000             LDA    0,DU
000120  000324 2350 52 010             LDA    PRNTAL,SC     IS THE CHARACTER A
000121  000035 1150 07 000             CMPA   =3H00(,DL     LEFT PARENTHESIS
000122  000306 6010 00 010             TNZ    SYNERR        NO - SYNTAX ERROR

[illegible] 000324 2360 00 010         LDQ    ENDPOS        BUILD A TALLY WORD
[illegible] 000001 1760 07 000         SBQ    1,DL          FOR THE RIGHT PARENTHESIS
[illegible] 000006 5060 07 000         DIV    6,DL
[illegible] 000000 6260 06 000         EAX6   0,QL          ENDPOS SHOULD BE THE
[illegible] 000315 0660 00 010         ADX6   SSADDR        CORRECT CHARACTER OFFSET
[illegible] 000324 7460 00 010         STX6   PRNTAL        RELATIVE TO 1
[illegible] 000324 7510 01 010         STCA   PRNTAL,01
[illegible]                            LDA    =0C100,DL
[illegible]                            STCA   PRNTAL,06

[illegible]        2350 03             LDA    0,DU
[illegible] 000324 2350 52             LDA    PRNTAL,SC     IS THE CHARACTER A
[illegible] 000035 1150 07             CMPA   =3H00),DL     RIGHT PARENTHESIS
 OF BINARY CARD PROCCDDS
[illegible]        6010                TNZ    SYNERR        NO - SYNTAX ERROR

[illegible] 000316 2350                LDA    CHRPOS
[illegible] 000325 7550                STA    TOTCHR        TOTCHR = CHRPOS
000142  [illegible]                    LDX3   SSATBE        X3 = ADDR(SSA-TABLE(I))
000143  000001 2350 07 000             LDA    1,DL
000144  000326 7550 00 010             STA    WRKLVL        I = 1
```

PROCESS COMMAND CODE "C"

```
                    000145      PROFLD NULL                          PROCESS A FIELD
000145  000000 2240 13 000             LDX4   .SEGAD,3      X4 = SEG DEF ADDR
000146  000010 2350 14 000             LDA    .RULE,4       PICK UP RULE WORD
000147  000007 3750 07 000             ANA    =07,DL        ISOLATE LOGICAL-PHYSICAL FLAG
000150  000235 6010 00 010             TNZ    LGLFLD        LOGICALS MUST BE HANDLED SEPARATELY

000151  000010 7200 14 000             LXL0   .SQKEY,4      X0 = SEQ KEY ADDR
000152  000204 6000 00 010             TZE    SETFLG        GO SET FLAGS IF NO KEY

000153  000325 2360 00 010             LDQ    TOTCHR        BUILD A TALLY WORD FOR
000154  000006 5060 07 000             DIV    6,DL          THIS KEY FIELD VALUE
000155  000000 6260 06 000             EAX6   0,QL
000156  000315 0660 00 010             ADX6   SSADDR
000157  000327 7460 00 010             STX6   FLDTAL        X6 = WORD ADDRESS
000160  000327 7510 01 010             STCA   FLDTAL,01     INSERT INITIAL CHARACTER POS

[illegible] 000000 2350 10             LDA    .FDLEN,0      PICK UP KEY LENGTH
 OF BINARY CARD PROCCDDS
[illegible] 007777 375                 ANA    =07777,DL
[illegible] 000325 0550 00 010         ASA    TOTCHR        INCREMENT TOTAL CHARACTERS USED
000164  000006 7350                    ALS    6             ALIGN FOR TALLY USE
[illegible] 000327 751                 STCA   FLDTAL,06     SET KEY LENGTH IN TALLY

                                                            GET SET TO BUILD
                                                            THE QUALIFICATION TABLE ENTRY

[illegible]        236                 LDQ    QUALDX
[illegible] 000014 2540                ADQ    QUALDX        QUAL-INDEX = QUAL-INDEX + 1
[illegible] 000014 4020 07             MPY    GQLSZ,DL      COMPUTE QUAL-TABLE ADDRESS
[illegible]        6220 06             EAX2   0,QL
[illegible]                            ADX2   QALTAB        X2 = ADDR(QALTAB(QUAL-INDEX))

[illegible]        4500 12             STZ    .BOOLE,2      BOOLEAN CODE = "AND"
[illegible] 000002 4500 12             STZ    .CMPOP,2      COMPARISON OPERATOR = "="
[illegible] 000327 2350                LDA    FLDTAL
[illegible]        755    12           STA    .SRCH,2       SET UP SEARCH VALUE TALLY WORD
[illegible]        7400 12             STX0   .QLKEY,2      MOVE IN KEY DEF ADDR

[illegible] 000001 2350 07             LDA    1,DL
[illegible] 000013 7550 1[illegible]   STA    .QLCNT,3      QUALIFIER-COUNT = I
[illegible] 000014 2350                LDA    QUALDX
[illegible]        11 7550 13          STA    .QLPTR,3      SET UP QUALIFIER INDEX IN SSA-TABLE

                    000204      SETFLG NULL
[illegible] 000001 2350 07             LDA    1,DL          SET UNIQUE BIT
 OF BINARY CARD PROCCDDS
[illegible]        7550 13             STA    .UNIQE,3      FOR THIS SSA
```

PROCESS COMMAND CODE "C"

```
000216 000000 2200 03 000         LDXO   0,DU          SET SSA-TABLE TO SAY THAT
000217 000000 4400 13 000         SXLO   .SUPLY,3      THE SSA WAS USER-SUPPLIED

[illegible] 000012 0630 03 [illegible] ADX3 .SSSIZ,DU   X3 = ADDR(SSA-TABLE(I+1))
[illegible] 000326 0540 00 [illegible] AOS  WRKLVL      I = I + 1
000212 000314 2350 00 010         LDA    CURLVL
[illegible] 000326 1150 [illegible] CMPA WRKLVL        IF I <= CURRENT-LEVEL
[illegible] 000145 6050 [illegible] 010 TPL PROFLD         GO TO PROCESS-FIELD


          000215           CHKDCD NULL                 CHECK "D" CODE
[illegible] 000012 1630 [illegible] 000 SBX3 .SSSIZ,DU
[illegible] 000000 2200 13 000    LDXO   .DCODE,3      IS COMMAND CODE "D" SET IN CURRENT LEVEL
[illegible] 000311 6000 00 010    TZE    EXIT          NO - EXIT

[illegible] 000001 2230 [illegible] 03 LDX3 SSATAB      X3 = ADDR(SSA-TABLE(I))
[illegible] 000001 2350 [illegible] LDA  1,DL
[illegible] 000326 7550 [illegible] STA  WRKLVL         I = 1
[illegible] 000001 2200 [illegible] LDXO 1,DU


                                                       PROPAGATE THE "D" COMMAND CODE
          [illegible]      SETDCD NULL
[illegible] 7400 [illegible]      STXO   .DCODE,3      SET "D" CODE
[illegible] 0540 [illegible]      AOS    WRKLVL        I = I + 1
[illegible] 0630 [illegible]      ADX3   .SSSIZ,DU     ADJUST SSA-TABLE ADDRESS
[illegible] 000314 2350 [illegible] LDA CURLVL          IF I <= CURRENT-LEVEL
END OF BINARY CARD PROCC[illegible]
[illegible] 1150 [illegible]      CMPA   WRKLVL            GO TO SET-D-CODE
[illegible] 6050 [illegible]      TPL    SETDCD
[illegible] 7100 [illegible]      TRA    EXIT          ELSE EXIT
```

PROCESS COMMAND CODE "C"

```



          [illegible]      LGLFLD NULL
[illegible] 4500 [illegible]      STZ    SWITCH        SW = 0

          000234           NXTLFD NULL
          000234                  GNCOMP SETFLG        GET NEXT LSEG DEF
                                                       GO TO SET-SSA-TABLE-FLAGS WHEN DONE
          000243                  GPMAKE               X5 = SEG DEF ADDR OF THIS COMPONENT
000250 000000 7200 15 [illegible] LXLO .SGKEY,5        XO = SEG KEY ADDR
[illegible] 000234 6000 [illegible] TZE NXTLFD         IF NONE, GO TO NEXT-LOGICAL-FIELD


000252 000325 2360 00 010         LDQ    TOTCHR        BUILD A TALLY WORD FOR
END OF BINARY CARD PROCC010
[illegible] 5060 07 [illegible]   DIV    6,DL          THIS FIELD VALUE
[illegible] 000000 6260 04 [illegible] EAX6 0,QL
000255 000315 0660 [illegible] 010 ADX6 SSAPTR          X6 = WORD ADDRESS
[illegible] 000327 7460 [illegible] STX6 FLDTAL
[illegible] 000327 7510 [illegible] STCA FLDTAL,02     INSERT INITIAL CHAR POS

[illegible] 2350 [illegible]      LDA    .FDLEN,0      PICK UP KEY LENGTH
[illegible] 777777 3750 [illegible] ANA =0777777,DL
[illegible] 000325 0550 [illegible] ASA TOTCHR         INCREMENT CUMULATIVE TOTAL
[illegible] 7350 [illegible]      ALS    6             ALIGN FOR TALLY USE
[illegible] 000327 7510 [illegible] STCA FLDTAL,05     INSERT LENGTH INTO TALLY WORD

[illegible] 2360 [illegible]      LDQ    QUALDX
[illegible] 0540 [illegible]      AOS    QUALDX        QUAL-INDEX = QUAL-INDEX + 1
[illegible] 4020 07 [illegible]   MPY    .QALSZ,DL     COMPUTE QUALIFICATION TABLE ADDR
[illegible] 6220 06 [illegible]   EAX2   0,QL
[illegible] 0620 [illegible]      ADX2   QALTAB        X2 = ADDR(QUAL-TAB(QUALDX))

                                                       SET SET TO BUILD A
                                                       QUALIFICATION RULE ENTRY

[illegible] 4500 12 [illegible]   STZ    .BCODE,2      BOOLEAN CODE = "AND"
[illegible] 4500 12 [illegible]   STZ    .OPCOD,2      COMPARISON OPERATOR = "="
[illegible] 000327 2350 00 010    LDA    FLDTAL
000275 [illegible] 7550 12 000    STA    .SRCH,2       SET UP SEARCH VALUE TALLY WORD
END OF BINARY CARD PROCC011
[illegible] 7400 12 [illegible]   STXO   .KEY,2        MOVE IN KEY DEF ADDR

[illegible] 0540 13 [illegible]   AOS    .QLCNT,3      INCREMENT QUALIFIER COUNT
300 [illegible] 2350 [illegible]  LDA    SWITCH        IF THIS IS NOT THE FIRST TIME THRU
[illegible] 000234 6010 [illegible] TNZ NXTLFD          FOR THIS SSA GO TRY NEXT COMPONENT
[illegible] 0540 [illegible]      AOS    SWITCH        ELSE - SET FIRST TIME SWITCH TO 1
[illegible] 2350 [illegible]      LDA    QUALDX
304 [illegible] 7550 13 [illegible] STA .QLPTR,3        SET QUALIFICATION POINTER IN SSA-TABLE
000305 [illegible] 7100 [illegible] TRA NXTLFD          GO TRY NEXT COMPONENT
```

PROCESS COMMAND CODE "C"

```



          000306           SYNERR NULL
[illegible] 000001 2350 07 000    LDA    1,DL          SET SWITCH INDICATING FAILURE
[illegible] 000317 7550 51 010    STA    VALID,I
[illegible] 000312 7100 00 010    TRA    QUIT


          000311           EXIT   NULL
000311 000317 4500 51 010         STZ    VALID,I       SET SWITCH INDICATING SUCCESS

          000312           QUIT   NULL
```

```
000312   000340 0730 00  010   353          LREG    HLDREG                                              00003520
000313   000000 7100 11  000   354          TRA     0,1               RETURN TO CALLER                  00003530
                               355
         000314                356 CURLVL BSS  1                      CURRENT LEVEL (INPUT ARG)                 00003580
         000315                357 SSADDR BSS  1                      USER'S SSA ADDRESS (INPUT ARG)            00003590
         000316                358 CHRPOS BSS  1                      CURRENT CHARACTER POSITION (INPUT ARG)    00003600
         000317                359 VALID  BSS  1                      VALIDITY SWITCH ADDRESS (INPUT ARG)       00003610
                               360                                                                              00003620
         000320                361 HOLDX4 BSS  1                      X4 STORAGE CELL                           00003630
         000321                362 LGCLEN BSS  1                      CUMULATIVE LSEG KEY LENGTH                00003640
         000322                363 TOTLEN BSS  1                      TOTAL KEY LENGTH                          00003650
         000323                364 ENDPOS BSS  1                      END CHARACTER POSITION OF SSA             00003660
         000324                365 PRNTAL BSS  1                      TALLY WORD FOR LEFT & RIGHT PARENTHESIS   00003670
         000325                366 TOTCHR BSS  1                      CUMULATIVE CHR TOTAL FOR TALLY BUILDING   00003680
         000326                367 WRKLVL BSS  1                      WORK CELL FOR LEVEL NUMBERS               00003690
         000327                368 FLDTAL BSS  1                      TALLY FOR FIELD VALUE IN SSA              00003700
         000330                369 SWITCH BSS  1                      FIRST-TIME SWITCH FOR LSEG TALLIES        00003710
                               370                                                                              00003720
                               371                                                                              00003730
                               372                                                                              00003740
   000   000007100024   000
         000340                373         EIGHT                                                                00003750
         000340                374 HLDREG BSS  8                                                                00003760

                               378                 LAY-OUT OF THE SSA TABLE                                     00000030
                               379                                                                              00000040
                               380                                                                              00000050
         000012                381 .SSSIZ SET  10                     TABLE SIZE                                00000060
         000000                382 .SEGAD SET  0                      SEG DEFINITION ADDRESS                    00000070
         000000                383 .SUPLY SET  0                      FLAG FOR USER-SUPPLIED OR IMPLIED         00000080
         000001                384 .TOTAL SET  1                      I-O-AREA TALLY                            00000090
         000002                385 .UNIQE SET  2                      UNIQUENESS INDICATOR                      00000100
         000003                386 .EISWD SET  3                      EIS DESCRIPTOR WORD OF SEGMENT            00000110
         000004                387 .DCODE SET  4                      D COMMAND CODE (UPPER)                    00000120
         000004                388 .NCODE SET  4                      N COMMAND-CODE (LOWER)                    00000125
         000005                389 .PCODE SET  5                      P COMMAND CODE (UPPER)                    00000130
         000005                390 .LCODE SET  5                      L COMMAND CODE (LOWER)                    00000135
         000006                391 .UCODE SET  5                      U COMMAND CODE (UPPER)                    00000140
         000006                392 .VCODE SET  6                      V COMMAND CODE (LOWER)                    00000145
         000007                393 .FCODE SET  7                      F COMMAND CODE (UPPER)                    00000150
         000010                394 .QLCNT SET  8                      NUMBER OF QUALIFIERS                      00000160
         000011                395 .QLPTR SET  9                      INDEX OF FIRST ENTRY IN QUAL. TABLE       00000170

                      PROCESS COMMAND CODE "C"

                               397                                                                              00000010
                               398                                                                              00000020
                               399                 LAY-OUT OF THE QUALIFICATION TABLE                           00000030
                               400                                                                              00000040
                               401                                                                              00000050
         000004                402 .QALSZ SET  4                      TABLE SIZE                                00000060
         000000                403 .BOOLE SET  0                      BOOLEAN CODE (0=AND,1=OR)                 00000070
         000001                404 .QLKEY SET  1                      ADDRESS OF THE KEY DEF                    00000080
         000002                405 .OPCOD SET  2                      COMPARISON OPERATOR CODE                  00000090
         000003                406 .SRCH  SET  3                      TALLY WORD OF THE SEARCH VALUE            00000100


                               410                 LAY-OUT OF THE IMS SEG DEFINITION TABLE ENTRY                00000030
                               411                                                                              00000040
                               412                                                                              00000050
         000000                413 .SGLEN SET  0                      SEGMENT LENGTH (DATA ONLY)                00000060
         000000                414 .SQKEY SET  0                      ADDRESS OF THE SEQUENCE-KEY               00000070
         000003                415 .LGCHL SET  3                      POINTER TO FIRST LOGICAL COMPONENT        00000080
         000004                416 .SGQRD SET  4                      LOCATION OF IDS QRD POINTER               00000090
         000005                417 .LEVEL SET  5                      IMS LEVEL NUMBER                          00000100
         000005                418 .RCNUM SET  5                      IMS RECORD NUMBER                         00000110
         000006                419 .SGREA SET  6                      AREA FLAG WORD                            00000120
         000006                420 .INDEX SET  5                      INDEX ROUTINE ADDRESS                     00000130
         000007                421 .PERM  SET  7                      PERMISSION WORD (G+I+R+D+K+P)             00000140
         000010                422 .RULE  SET  8                      LOGICAL RULES AND INSERT RULES            00000150
         000011                423 .PCHLD SET  9                      PC ADDR HOLD AREA                         00000160
         000012                424 .CURNT SET  10                     IDS CURRENCY FOR THIS SEGMENT             00000170
         000013                425 .SGNAM SET  11                     IMS SEGMENT NAME                          00000180

                               429                 LAY-OUT OF THE IMS KEY DEFINITION ENTRY                      00000030
                               430                                                                              00000040
                               431                                                                              00000050
         000000                432 .FDTYP SET  0                      CODED FIELD TYPE                          00000060
         000000                433 .SEQCD SET  0                      CODE SEQUENCE CODE                        00000070
         000000                434 .FDLEN SET  0                      FIELD LENGTH                              00000080
         000001                435 .FDSTR SET  1                      STARTING CHARACTER                        00000090
         000002                436 .IDSFD SET  2                      ADDRESS OF THE IDS FIELD DEFINITION       00000100
         000003                437 .FDPOS SET  3                      STARTING POSITION IN FEEDBACK AREA        00000110
         000004                438 .FDNAM SET  4                      IMS FIELD NAME                            00000120

                      PROCESS COMMAND CODE "C"

                               440                                                                              00000010
                               441                                                                              00000020
                               442                 LAY-OUT OF THE IMS LSEG DEFINITION TABLE ENTRY               00000030
                               443                                                                              00000040
                               444                                                                              00000050
         000000                445 .LSRTV SET  0                      RETRIEVAL-TYPE INDICATOR                  00000060
         000000                446 .LGCNT SET  0                      LOGICAL-CONTROL OWNER                     00000070
         000002                447 .LSTRT SET  2                      STARTING CHARACTER POSITION               00000080
         000004                448 .LGCRN SET  4                      CURRENCY FOR THIS COMPONENT               00000090
                               449                                    OF THE LOGICAL SEGMENT                    00000100

         000000                451        BLOCK  COS
         000000                452 SSACNT BSS  1                      SSA COUNT IN CURRENT CALL                 00000020
         000001                453 SSATAB BSS  1                      ADDRESS OF THE CURRENT SSA TABLE          00000030
```

```
            000002          QUALTAB BSS    1                ADDRESS OF QUALIFICATION TABLE                00000040
            000003          PCBDFN BSS     1                PCB DEFINITION ADDRESS                        00000050
            000004          QUALDX BSS     1                QUALIFICATION TABLE INDEX                     00000060
            000005          CURSSA BSS     1                ADDRESS OF CURRENT USER SSA                   00000070
            000006          FRSTLV BSS     1                FIRST USER-SUPPLIED LEVEL                     00000080
            000007          IOAREA BSS     1                ADDRESS OF USER'S I-O-AREA                    00000090
            000010          LSTSEG BSS     1                ADDRESS OF LAST ACCESSED SEG                  00000100
            000011          CURREF BSS     1                REF. CODE OF LAST ACCESSED RECORD             00000110
            000012          PCBADR BSS     1                ADDRESS OF USER'S PCB                         00000120
            000013          PRNTSW BSS     1                SWITCH FOR IMS PARENT SETTING                 00000130
            000014          PRSTAT BSS     1                STATUS OF PREVIOUS CALL                       00000140
            000015          FUNCDE BSS     1                IMS FUNCTION CODE                             00000150
            000016          OLDSSA BSS     1                OLD SSA COUNT (PREVIOUS CALL)                 00000160
            000017          PRIRSW BSS     1                USE PRIOR DIRECTION SWITCH                    00000170
            000020          CCODEC BSS     1                COMMAND CODE "C" SWITCH                       00000180
            000021          USERIO BSS     1                ADDRESS OF USER'S I-O-AREA                    00000190
            000022          MVETAL BSS     1                TALLY WORD BUILD BY MVESEG WHEN NO SSA'S      00000200
                                                                                                          00000210
                                                                                                          00000220
                                                                                                          00000230
                                                                                                          00000240
                                                                                                          00000250
            000350                 USE                                                                    00000260
```

PATCH SSA TABLE FOR GU

```
                                   LBL    PTCHGU                                                          00000040
                                   TTL    PATCH SSA TABLE FOR GU                                          00000050
                                                                                                          00000055
                                                                                                          00000060
                                                                                                          00000070
                                          THIS SUBROUTINE IS USED TO DETERMINE                            00000080
                                          UNIQUENESS AT ALL LEVELS OF AN IMS GU CALL                      00000090
                                                                                                          00000100
                                          ARGS ARE                                                        00000110
                                                                                                          00000120
                                                      OBJLVL - LOWEST LEVEL SEGMENT REFERENCED            00000130
                                                      THIS CALL                                           00000140
                                          2.  CMNLVL - COMMON LEVEL - RETURN ARGUMENT -                   00000150
                                                      CONTAINS THE LEVEL AT WHICH FURTHER                 00000160
                                                      RETRIEVAL SHOULD BEGIN (THE IMS GU RULE             00000170
                                                      STATES THAT COMMON LEVELS CANNOT BE                 00000180
                                                      CHANGED DURING A GU                                 00000190
                                          PTCHGU TRIES TO FIND THE LOWEST COMMON SEGMENT                  00000200
                                          BETWEEN THIS CALL AND THE CURRENT RECORD SEGMENT)               00000210
                                                                                                          00000220
                                          AFTER DOING THIS PTCHGU DOLL EXAMINE THE QUALIFICATION          00000230
                                          TABLE TO FIND "UNIQUE" RETRIEVAL SPECIFICATIONS                 00000240
                                            (I.E.. UNIQUE KEYS WITH AN EQUAL OPERATOR)                    00000250
                                                                                                          00000260
                                                                                                          00000270
                                                                                                          00000280
                                                                                                          00000290
                                   SYMDEF PTCHGU                                                          00000300
                                   SYMREF DEFERR                                                          00000310
                                                                                                          00000320
                                                                                                          00000330
                            GETPAR MACRO                                                                  00000340
                                   LDX4   2,4                                                             00000350
                                   LDA    0,4                                                             00000360
                                   ANA    =0770000,DU                                                     00000370
                                   CMPA   =0510000,DU                                                     00000380
                                   TZE    #1                                                              00000390
                                   CMPA   =0540000,DU                                                     00000400
                                   TNZ    DEFERR                                                          00000410
                                   LXL4   1,4                                                             00000420
                                   LDA    0,4                                                             00000430
                                   ANA    =0770000,DU                                                     00000440
                                   CMPA   =C510000,DU                                                     00000450
                                   TNZ    DEFERR                                                          00000460
                                   ENDM   GETPAR                                                          00000470
                                                                                                          00000480
                                                                                                          00000490
                 000000     PTCHGU NULL                                                                   00000500
000000  000200 7530 00  010        SREG   HLDREG            SAVE REGISTERS                                00000510
000001  000002 2350 31  000        LDA    2,1*                                                            00000520
000002  000022 7350 00  000        ALS    18                JUSTIFY FOR REGISTER USE                      00000525
000003  000172 7550 00  010        STA    OBJLVL            PICK UP OBJECT LEVEL                          00000530

000004  000003 2350 11  000        LDA    3,1                                                             00000540
000005  000171 7550 00  010        STA    CMNLVL            PICK UP ADDRESS OF COMMON-LEVEL               00000550
```

PATCH SSA TABLE FOR GU

```
000006  010006 2350 00  030        LDA    FRSTLV            IF FIRST LEVEL IS                             00000570
000007  000002 1150 07  000        CMPA   2,DL              LESS THAN 2 GO SET                            00000580
000010  000112 6020 00  010        TNC    CMNZER            COMMON LEVEL TO ZERO                          00000590
                                                                                                          00000600
000011  000001 1750 07  000        SBA    1,DL                                                            00000610
                                                            START-LEVEL = FIRST-LEVEL - 1                 00000620
000012  000174 7550 00  010        STA    STRTLV                                                          00000630
                                                                                                          00000640
000013  010003 2240 00  030        LDX4   PCBDFN                                                          00000650
000014  000002 2230 14  000        LDX3   .CRSEG,4          PICK UP "CURRENT" SEG ADDR                    00000660
000015  000112 6000 00  010        TZE    CMNZER            IF THERE IS NO CURRENT.                       00000670
000016  000173 7430 00  010        STX3   CURSEG            SAVE CURRENT SEG DEF                          00000680
                                                            GO SET COMMON LEVEL TO ZERO                   00000690
                                                                                                          00000700
000017  000000 6240 13  000        EAX4   0,3               X4 = SEG ADDR OF "CURRENT" SEG                00000710
000020  000005 2350 14  000        LDA    .LEVEL,4          PICK UP LEVEL NUMBER                          00000720
000021  000022 7310 00  000        ARS    18                                                              00000730
                                                            FROM SEG DEF                                  00000740
                                                                                                          00000750
```

```
000022  000174 1150 00  010     75          CMPA     STRTLV          IF LEVEL-NUMBER < START-LEVEL              00000760
OF BINARY CARD PTCHGU02
000023  000030 6050 00  010     76          TPL      LEVSEQ          START-LEVEL = LEVEL-NUMBER                 00000770
000024  000174 7550 00  010     77          STA      STRTLV                                                     00000780
000025  000047 7100 00  010     78          TRA      ADRSSA          GO TO PICK-UP-SSA-TABLE-ENTRY              00000790
                 000026         79 CHKEQL   NULL                                                            00000800
000026  000005 2350 14  000     80          LDA      .LEVEL,4        IF LEVEL-NUMBER =                          00000810
000027  000022 7310 00  000     81          ARS      16              START-LEVEL                                00000820
                 000030         82 LEVSEQ   NULL                                                            00000830
000030  000174 1150 00  010     83          CMPA     STRTLV                                                     00000840
000031  000047 6000 00  010     84          TZE      ADRSSA          GO TO PICK-UP-SSA-TABLE-ENTRY              00000850
                                85                                   IF NOT                                     00000860
                 000032         86          GETPAR   CMNZER          FIND PARENT SEGMENT                        00000870
                                87                                   IF NO PARENT CAN BE FOUND                  00000880
                                88                                   GO SET COMMON-LEVEL TO ZERO                00000890
                                89                                                                              00000900
OF BINARY CARD PTCHGU03
000046  000026 7100 00  010     90          TRA      CHKEQL          GO BACK AND CHECK NEW LEVEL                00000910
                                91                                                                              00000920
                 000047         92 ADRSSA   NULL                                                            00000930
000047  000174 2360 00  010     93          LDQ      STRTLV          COMPUTE ADDRESS OF                         00000940
000050  000112 6000 00  010     94          TZE      CMNZER                                                     00000950
000051  000001 1760 07  000     95          SBQ      1,DL            CORRECT SSA-TABLE-ENTRY                    00000960
000052  000012 4020 07  000     96          MPY      .SSSIZ,DL                                                  00000970
000053  000000 6230 06  000     97          EAX3     0,QL                                                       00000980
000054  010001 0630 00  030     98          ADX3     SSATAB          X3 = ADDR (SSA-TABLE-ENTRY (START-LEVEL))00000990
                                99                                                                              00001000
000055  000000 1040 13  000    100          CMPX4    .SEGAD,3        DOES SEG DEF FROM TABLE                    00001010
                               101                                   EQUAL CURRENT SEG DEF                      00001020
000056  000100 6000 00  010    102          TZE      SETCMN          IF SO, GO SET COMMON LEVEL                 00001030
                               103                                                                              00001040
                 000057        104          GETPAR   CMNZER          FI NOT FIND THE PARENT                     00001050
OF BINARY CARD PTCHGU04

                          PATCH SSA TABLE FOR GU

                               105                                   SEGMENT - IF NO PARENT, SET                00001060
                               106                                   COMMON-LEVEL TP ZERO                       00001070
                               107                                                                              00001080
000073  000174 2350 00  010    108          LDA      STRTLV          START-LEVEL=                               00001090
000074  000001 1750 07  000    109          SBA      1,DL            START-LEVEL-1                              00001100
000075  000174 7550 00  010    110          STA      STRTLV                                                     00001110
000076  000112 6000 00  010    111          TZE      CMNZER          IF START-LEVEL = 0 THEN                    00001120
000077  000047 7100 00  010    112          TRA      ADRSSA               GO SET COMMON-LEVEL TO ZERO           00001130
                               113                                        ELSE GO PICK UP SSA-TABLE-ENTRY       00001140

                                                                                                                00001160
                 000100        115 SETCMN   NULL                                                            00001170
000100  000174 2350 00  010    116          LDA      STRTLV          COMMON-LEVEL-NUMBER =                      00001180
000101  000171 7550 51  010    117          STA      CMNLVL,I        START-LEVEL                                00001190
                               118                                                                              00001200
                 000102        119 UNIQUE   NULL                                                            00001210
000102  000001 2350 07  000    120          LDA      1,DL                                                       00001220
                 000103        121 SETUNQ   NULL                                                            
000103  000002 7550 13  000    122          STA      .UNIQE,3        SET UNIQUE INDICATOR IN SSA-TABLE          00001230
000104  000174 2360 00  010    123          LDQ      STRTLV          START-LEVEL =                              00001240
000105  000001 1760 07  000    124          SBQ      1,DL            START-LEVEL - 1                            00001250
000106  000114 6000 00  010    125          TZE      OTHERS          IF ZERO , GO CHECK REMAINING SSA S         00001260
000107  000174 7560 00  010    126          STQ      STRTLV            FOR UNIQUENESS                           00001270
000110  000012 1630 03  000    127          SBX3     .SSSIZ,DU       X3 = ADDR (SSA-TABLW-ENTRY (START-LEVEL))00001280
000111  000103 7100 00  010    128          TRA      SETUNQ          GO TO SET UNIQUE FLAG                      00001290
                               129                                                                              00001300
                               130                                                                              00001310
                               131                                                                              00001320
                 000112        132 CMNZER   NULL                                                            00001330
000112  000171 4500 51  010    133          STZ      CMNLVL,I        COMMON-LEVEL = 0                           00001340
000113  000114 7100 00  010    134          TRA      OTHERS          GO CHECK OTHER SSA S FOR UNIQUENESS        00001350

                          PATCH SSA TABLE FOR GU

                 000114        136 OTHERS   NULL                                                            00001370
OF BINARY CARD PTCHGU05
000114  010001 2230 00  030    137          LDX3     SSATAB          X3 = ADDR (SSA-TABLE(1))                   00001380
000115  000001 2270 03  000    138          LDX7     1,DU            X7 (I) = 1                                 00001390
                 000116        139 CHKDON   NULL                                                            00001400
000116  000172 1070 00  010    140          CMPX7    OBJLVL          IF I > OBJECT LEVEL                        00001410
000117  000121 6000 00  010    141          TZE      *+2                THEN EXIT                               00001420
000120  000167 6030 00  010    142          TRC      PTEXIT                                                     00001430
                               143                                                                              00001440
000121  000010 7260 13  000    144          LXL6     .QLCNT,3        X6 = QUALIFIER COUNT                       00001450
000122  000155 6000 00  010    145          TZE      NXTSSA          IF NOT QUALIFIED, PICK UP THE NEXT SSA     00001460
                               146                                                                              00001470
000123  000175 7460 00  010    147          STX6     LOOPCT          LOOP-COUNT = QUALIFIER-COUNT               00001480
000124  000176 4500 00  010    148          STZ      SWITCH          SWITCH = 0                                 00001490
                               149                                                                              00001500
000125  000011 6250 13  000    150          EAX5     .QLPTR,3        X5 = ADDRESS OF FIRST QUAL TABLE INDEX     00001510
000126  000000 2200 03  000    151          LDX0     0,DU                                                       00001520
                 000127        152 GETQAL   NULL                                                            00001530
000127  000000 2360 15  000    153          LDQ      0,5             PICK UP QUALIFIER INDEX                    00001540
000130  000150 6000 00  010    154          TZE      NXTQAL                                                     00001550
000131  000001 1760 07  000    155          SBQ      1,DL            COMPUTE ADDRESS OF CORRECT                 00001560
000132  000004 4020 07  000    156          MPY      .QALSZ,DL       QUALIFIER TABLE                            00001570
000133  000000 6220 06  000    157          EAX2     0,QL                                                       00001580
000134  010002 0620 00  030    158          ADX2     QALTAB          X2 = ADDR (QALTAB ( QUAL-INDEX (J)))       00001590
                               159                                                                              00001600
                 000135        160 CHKQAL   NULL                                                            00001605
000135  000000 2350 12  000    161          LDA      .BCOLE,2        IF BOOLEAN CODE                            00001610
000136  000177 1150 00  010    162          CMPA     ORCODE            = "OR"                                   00001620
OF BINARY CARD PTCHGU06
000137  000160 6000 00  010    163          TZE      NOTUNQ           GO TO NOT-UNIQUE                          00001630
                               164                                                                              00001640
000140  000002 2350 12  000    165          LDA      .OPCOD,2        IF OP-CODE NOT EQUAL                       00001650
```

```
000141  000150 6010 00  010   166          TNZ     NXTQAL        "EQUAL" GO TO NEXT-QUALIFIER
                              167
000142  000001 2210 12  000   168          LDX1    .QLKEY,2      X1 = ADDRESS OF THE KEY DEFINITION
000143  000000 2350 11  000   169          LDA     0,1
000144  000003 3750 03  000   170          ANA     =03,DU        ISOLATE SEQUENCE CODE
000145  000150 6000 00  010   171          TZE     NXTQAL        GO TO NEXT-QUALIFIER IF NOT A SEQUENCE
                              172                                   KEY
000146  000001 2350 07  000   173          LDA     1,DL          SWITCH = 1 (FIELD IS A SEQUENCE KEY)
000147  000176 7550 00  010   174          STA     SWITCH
                              175
               000150         176 NXTQAL   NULL
000150  000001 0600 03  000   177          ADX0    1,DU          INCREMENT QUALIFIER COUNT
000151  000175 1000 00  010   178          CMPX0   LOOPCT        DONE -
000152  000161 6000 00  010   179          TZE     SETSW         IF SO, GO TO SET SWITCH
000153  000004 0620 03  000   180          ADX2    .QALSZ,DU     INCREMENT QAL TABLE INDEX ADDRESS
000154  000135 7100 00  010   181          TRA     CHKQAL        GO PICK UP QUALIFIER TABLE
                              182
                              183
               000155         184 NXTSSA   NULL
000155  000001 0670 03  000   185          ADX7    1,DU          GO TO NEXT SSA IN TABLE

000156  000012 0630 03  000   186          ADX3    .SSSIZ,DU     INCREMENT SSA TABLE ADDRESS
000157  000116 7100 00  010   187          TRA     CHKDON
                     PATCH SSA TABLE FOR GU
               000160         189 NOTUNQ   NULL
000160  000176 4500 00  010   190          STZ     SWITCH        SWITCH = 0
               000161         191 SETSW    NULL
000161  000176 2350 00  010   192          LDA     SWITCH        MOVE SWITCH TO
END OF BINARY CARD PTCHGU07
000162  000002 7550 13  000   193          STA     .UNIQE,3      UNIQUENESS INDICATOR IN SSA-TABLE
000163  000167 6000 00  010   194          TZE     PTEXIT        IF NON-UNIQUE THERE IS NO USE CONTINUING
                              195
                              196
000164  000001 0670 03  000   197          ADX7    1,DU          INCREMENT SSA-INDEX
000165  000012 0630 03  000   198          ADX3    .SSSIZ,DU     X3 = ADDR OF NEXT SSA-TABLE
000166  000116 7100 00  010   199          TRA     CHKDON        CHECK FOR DONE
                              200
                              201
                              202
                              203                                PATCH-SSA-TABLE-FOR-GU EXIT
               000167         204 PTEXIT   NULL
000167  000200 0730 00  010   205          LREG    HLDREG        RESTORE REGISTERS
000170  000000 7100 11  000   206          TRA     0,1           RETURN

               000171         208 CMNLVL   BSS     1             ADDRESS OF COMMON-LEVEL
               000172         209 OBJLVL   BSS     1             OBJECT LEVEL
                              210
                              211
               000173         212 CURSEG   BSS     1             "CURRENT" SEG DEF ADDRESS
               000174         213 STRTLV   BSS     1             STARTING LEVEL
000175  000000000000    000   214 LOOPCT   OCT     0             LOOP COUNTER
000176  000000000000    000   215 SWITCH   OCT     0             UNIQUENESS SWITCH
000177  000000000001    000   216 ORCODE   OCT     1             BOOLEAN "OR" CODE
                              217
               000200         218          EIGHT
               000200         219 HLDREG   BSS     8             REGISTER SAVE AREA

                              223                  LAY-OUT OF THE SSA TABLE
                              224
                              225
               000012         226 .SSSIZ   SET     10            TABLE SIZE
               000000         227 .SEGAD   SET     0             SEG DEFINITION ADDRESS
               000000         228 .SUPLY   SET     0             FLAG FOR USER-SUPPLIED OR IMPLIED
               000001         229 .IOTAL   SET     1             I-O-AREA TALLY
               000002         230 .UNIQE   SET     2             UNIQUENESS INDICATOR
               000003         231 .EISWD   SET     3             EIS DESCRIPTOR WORD OF SEGMENT
               000004         232 .DCODE   SET     4             D COMMAND CODE (UPPER)
               000004         233 .NCODE   SET     4             N COMMAND-CODE (LOWER)
               000005         234 .FCODE   SET     5             F COMMAND CODE (UPPER)
               000005         235 .LCODE   SET     5             L COMMAND CODE (LOWER)
               000006         236 .UCODE   SET     6             U COMMAND CODE (UPPER)
               000006         237 .VCODE   SET     6             V COMMAND CODE (LOWER)
               000007         238 .PCODE   SET     7             P COMMAND CODE (UPPER)
               000010         239 .QLCNT   SET     8             NUMBER OF QUALIFIERS
               000011         240 .QLPTR   SET     9             INDEX OF FIRST ENTRY IN QUAL. TABLE
PATCH SSA TABLE FOR GU
                              242
                              243
                              244                  LAY-OUT OF THE QUALIFICATION TABLE
                              245
                              246
               000004         247 .QALSZ   SET     4             TABLE SIZE
               000000         248 .BOOLE   SET     0             BOOLEAN CODE (0=AND,1=OR)
               000001         249 .QLKEY   SET     1             ADDRESS OF THE KEY DEF
               000002         250 .OPCOD   SET     2             COMPARISON OPERATOR CODE
               000003         251 .SRCH    SET     3             TALLY WORD OF THE SEARCH VALUE

                              255                  LAY-OUT OF THE PCB DEFINITION TABLE ENTRY
                              256
                              257
               000000         258 .POSIT   SET     0             MULTIPLE-POSITIONING FLAG
               000000         259 .HOLD    SET     0             IMS "HOLD" FLAG
               000000         260 .STAT    SET     0             IMS STATUS
               000002         261 .CRSEG   SET     2             SEG ADDR OF SEGMENT LAST PROCESSED
               000002         262 .CRLVL   SET     2             LEVEL OF THE LAST SEGMENT PROCESSED
```

```
000003   .CRPAR SET    3                        SEG ADDR OF PARENTAGE SEGMENT            00000100
000003   .UNSAT SET    3                        "HIGHEST" UNSATISFIED SEGMENT            00000110
000004   .CRIDS SET    4                        IDS REFERENCE CODE                       00000120
000005   .SSTAB SET    5                        ADDRESS OF THE SSA TABLE                 00000130
000005   .QLTAB SET    5                        ADDRESS OF THE QUALIFICATION TABLE       00000140
000006   .OLSSA SET    6                        OLD SSA COUNT FOR THIS PCB               00000150
000007   .FRSTA SET    7                        OLD STATUS FOR THIS PCB                  00000160
                                                                                         00000170

PATCH SSA TABLE FOR GU

                                                                                         00000010
                                                                                         00000020
                         LAY-OUT OF THE IMS SEG DEFINITION TABLE ENTRY                   00000030
                                                                                         00000040
                                                                                         00000050
000000   .SGLEN SET    0                        SEGMENT LENGTH (DATA ONLY)               00000060
000000   .SQKEY SET    0                        ADDRESS OF THE SEQUENCE-KEY              00000070
000003   .LGCHL SET    3                        POINTER TO FIRST LOGICAL COMPONENT       00000080
000004   .SGORD SET    4                        LOCATION OF IDS ORD POINTER              00000090
000005   .LEVEL SET    5                        IMS LEVEL NUMBER                         00000100
000005   .RCNUM SET    5                        IMS RECORD NUMBER                        00000110
000006   .SGREA SET    6                        AREA FLAG WORD                           00000120
000006   .INDEX SET    6                        INDEX ROUTINE ADDRESS                    00000130
000007   .PERM  SET    7                        PERMISSION WORD (G,I,R,D,K,P)            00000140
000010   .RULE  SET    8                        LOGICAL RULES  AND INSERT RULES          00000150
000011   .PCHLD SET    9                        PC ADDR HOLD AREA                        00000160
000012   .CURNT SET    10                       IDS CURRENCY FOR THIS SEGMENT            00000170
000013   .SGNAM SET    11                       IMS SEGMENT NAME                         00000180

000000          BLOCK  C05                                                               00000010
000000   SSACNT BSS    1                        SSA COUNT IN CURRENT CALL                00000020
000001   SSATAB BSS    1                        ADDRESS OF THE CURRENT SSA TABLE         00000030
000002   QALTAB BSS    1                        ADDRESS OF QUALIFICATION TABLE           00000040
000003   PCBDEN BSS    1                        PCB DEFINITION ADDRESS                   00000050
000004   QUALDX BSS    1                        QUALIFICATION TABLE INDEX                00000060
000005   CURSSA BSS    1                        ADDRESS OF CURRENT USER SSA              00000070
000006   FRSTLV BSS    1                        FIRST USER-SUPPLIED LEVEL                00000080
000007   IOAREA BSS    1                        ADDRESS OF USER'S I-O-AREA               00000090
000010   LSTSEG BSS    1                        ADDRESS OF LAST ACCESSED SEG             00000100
000011   CURREF BSS    1                        REF. CODE OF LAST ACCESSED RECORD        00000110
000012   PCBADR BSS    1                        ADDRESS OF USER'S PCB                    00000120
000013   PRNTSW BSS    1                        SWITCH FOR IMS PARENT SETTING            00000130
000014   PRSTAT BSS    1                        STATUS OF PREVIOUS CALL                  00000140
000015   FUNCDE BSS    1                        IMS FUNCTION CODE                        00000150
000016   OLDSSA BSS    1                        OLD SSA COUNT (PREVIOUS CALL)            00000160
000017   PRIRSW BSS    1                        USE PRIOR DIRECTION SWITCH               00000170
000020   CCODEC BSS    1                        COMMAND CODE "C" SWITCH                  00000180
000021   USERIO BSS    1                        ADDRESS OF USER'S I-O-AREA               00000190
000022   MVETAL BSS    1                        TALLY WORD BUILD BY MVESEG WHEN NO SSA'S 00000200
                                                                                         00000210
                                                                                         00000220
                                                                                         00000230
                                                                                         00000240
                                                                                         00000250
000210          USE                                                                      00000260

IMS-IDS CHECT CURRENT SUBROUTINE

                LBL    .QGCUR                                                            00000040
                TTL    IMS-IDS CHECT CURRENT SUBROUTINE                                  00000050
                                                                                         00000055
                                                                                         00000060
                                                                                         00000070
                                                                                         00000080
                       THIS ROUTINE IS CALLED                                            00000090
                       TO CHECK THE CURRENT SEGMENT                                      00000100
                       (PHYSICAL OR LOGICAL) FOR                                         00000110
                       VALUES WHICH SATISFY ONE SSA                                      00000120
                                                                                         00000130
                       ON INPUT                                                          00000140
                                                                                         00000150
                       X3 = ADDR OF SSATABLE                                             00000160
                       X4 = ADDR OF SEG DEF                                              00000170

                                                                                         00000190
                                                                                         00000200
                SYMDEF .QGCUR                                                            00000210
                                                                                         00000220
                                                                                         00000230
                                                                                         00000240
                SYMREF CCB                                                               00000250
                SYMREF .QCREC                                                            00000260
                SYMREF .QCBUF                                                            00000270
                SYMREF DEFERR                                                            00000280
                                                                                         00000290
                                                                                         00000300
                                                                                         00000310
                                                                                         00000320
                                                                                         00000330
          000000   .QGCUR NULL                                                           00000340
000000 000170 7530 00 010  SREG   HLDREG                                                 00000350

IMS-IDS CHECT CURRENT SUBROUTINE

          000001   TSTRCD NULL                                                           00000370
000001 000010 7220 13 000  LXL2   .QLCNT,3       X2 = QUALIFIER COUNT                    00000380
000002 000154 6000 00 010  TZE    FNDRCD         EXIT (SATISFIED) IF ZERO                00000390
000003 000011 2360 13 000  LDQ    .QLPTR,3       COMPUTE ADDRESS OF                      00000420
000004 000001 1760 07 000  SBQ    1,DL           FIRST QUALIFICATION TAALE               00000430
000005 000004 4020 07 000  MPY    .QALSZ,DL      ENTRY FOR THIS SSA                      00000440
000006 000000 6270 06 000  EAX7   0,QL                                                   00000450
000007 010002 0670 00 030  ADX7   QALTAB         X7 = ADDR QUALIFICATION TABLE ENTRY     00000460
```

```
000010  020005 4500 00  030      43          STZ      CCB+ERRREF       INITIALIZE ERROR-REFERENCE               0000043
                                 44                                                                             0000044
                                 45                                                                             0000045
                   000011        46 CMPFLD   NULL                                                               0000046
000011  000001 2260 17  000      47          LDX6     .QLKEY,7         X6 = ADDR OF IMS KEY DEF                 0000047
000012  000002 7250 16  000      48          LXL5     2,6              X5 = ADDR OF SEG DEF                     0000048
000013  000012 2350 15  000      49          LDA      .CURNT,5         PICK UP CURRENT                          0000049
000014  020000 1150 00  030      50          CMPA     CCB+DIRREF       DOES IT EQUAL DIRECT-REFERENCE           0000050
000015  000027 6000 00  010      51          TZE      OPTYPE           YES                                      0000051
                                 52                                                                             0000052
000016  020000 7550 00  030      53          STA      CCB+DIRREF       NO - ISSUE A RETRIEVE DIRECT             0000053
000017  000156 7550 00  010      54          STA      CMP030                                                    0000054
000020  000200 7530 00  010      55          SREG     DEBUG                                                     0000055
000021  060000701000    030      56          CALL     .QGETD                                                    0000056
000022  000024710000    010
END OF BINARY CARD .QGCUR02
000023  000210000070    010
000024  020005 2350 00  030      57          LDA      CCB+ERRREF       EXIT (NOT SATISFIED) ON ERROR            0000057
000025  000157 7550 00  010      58          STA      CMP031                                                    0000058
000026  000151 6010 00  010      59          TNZ      NOTSAT                                                    0000060

                   000027        61 OPTYPE   NULL                                                               0000062
000027  000127 6210 00  010      62          EAX1     NOTFND                                                    0000062
000030  000002 7200 17  000      63          LXL0     .OPCOD,7         X0 = OPERATOR CODE                       0000063
000031  000032 7100 10  010      64          TRA      *+1,0                                                     0000064
000032  000043 7100 00  010      65          TRA      EQUAL            0 - EQUAL TO                             0000065
000033  000050 7100 00  010      66          TRA      GREATR           1 - GREATER THAN                         0000066
000034  000055 7100 00  010      67          TRA      GRTEQL           2 - GREATER THAN OR EQUAL TO             0000067
000035  000062 7100 00  010      68          TRA      NOTEQL           3 - NOT EQUAL TO                         0000068
000036  000067 7100 00  010      69          TRA      LESS             4 - LESS THAN                            0000069
000037  000074 7100 00  010      70          TRA      LESSEQ           5 - LESS THAN OR EQUAL TO                0000070
                                 71                                                                             0000071
                                 72                                                                             0000072
                                 73                                                                             0000073
                   000040        74 INVARG   NULL                                                               0000074
000040  502723 2240 03  000      75          LDX4     =3HQGC,DU                                                 0000075
000041  020005 4440 00  030      76          SXL4     CCB+ERRREF                                                0000076
000042  000154 7100 00  010      77          TRA      EXIT                                                      0000077
```

IMS-IDS CHECT CURRENT SUBROUTINE

```
                   000043        79 EQUAL    NULL                                                               0000079
000043  000125 7410 00  010      80          STX1     KEYLES           LESS THAN                                0000080
000044  000126 7410 00  010      81          STX1     KEYGTR           GREATER THAN                             0000081
000045  000131 6210 00  010      82          EAX1     FOUND            YIELD NOT FOUND                          0000082
END OF BINARY CARD .QGCUR03
000046  000124 7410 00  010      83          STX1     KEYEQL                                                    0000083
000047  000101 7100 00  010      84          TRA      TSTKEY                                                    0000084
                                 85                                                                             0000085
                   000050        86 GREATR   NULL                                                               0000086
000050  000125 7410 00  010      87          STX1     KEYLES           LESS THAN AND                            0000087
000051  000124 7410 00  010      88          STX1     KEYEQL           EQUAL TO YIELD                           0000088
000052  000131 6210 00  010      89          EAX1     FOUND            NOT FOUND                                0000089
000053  000126 7410 00  010      90          STX1     KEYGTR                                                    0000090
000054  000101 7100 00  010      91          TRA      TSTKEY                                                    0000091
                                 92                                                                             0000092
                   000055        93 GRTEQL   NULL                                                               0000093
000055  000125 7410 00  010      94          STX1     KEYLES           LESS THAN                                0000094
000056  000131 6210 00  010      95          EAX1     FOUND            YIELDS NOT FOUND                         0000095
000057  000124 7410 00  010      96          STX1     KEYEQL                                                    0000096
000060  000126 7410 00  010      97          STX1     KEYGTR                                                    0000097
000061  000101 7100 00  010      98          TRA      TSTKEY                                                    0000098
                                 99                                                                             0000099
                   000062       100 NOTEQL   NULL                                                               0000100
000062  000124 7410 00  010     101          STX1     KEYEQL           EQUAL TO                                 0000101
000063  000131 6210 00  010     102          EAX1     FOUND            YIELDS NOT FOUND                         0000102
000064  000125 7410 00  010     103          STX1     KEYLES                                                    0000103
000065  000126 7410 00  010     104          STX1     KEYGTR                                                    0000104
000066  000101 7100 00  010     105          TRA      TSTKEY                                                    0000105
                                106                                                                             0000106
                   000067       107 LESS     NULL                                                               0000107
000067  000124 7410 00  010     108          STX1     KEYEQL           GREATER THAN AND                         0000108
000070  000126 7410 00  010     109          STX1     KEYGTR           EQUAL TO                                 0000109
END OF BINARY CARD .QGCUR04
000071  000131 6210 00  010     110          EAX1     FOUND            YIELDS NOT FOUND                         0000110
000072  000125 7410 00  010     111          STX1     KEYLES                                                    0000111
000073  000101 7100 00  010     112          TRA      TSTKEY                                                    0000112
                                113                                                                             0000113
                   000074       114 LESSEQ   NULL                                                               0000114
000074  000126 7410 00  010     115          STX1     KEYGTR           GREATER THAN                             0000115
000075  000131 6210 00  010     116          EAX1     FOUND            YIELDS NOT FOUND                         0000116
000076  000125 7410 00  010     117          STX1     KEYLES                                                    0000117
000077  000124 7410 00  010     118          STX1     KEYEQL                                                    0000118
000100  000101 7100 00  010     119          TRA      TSTKEY                                                    0000119
```

IMS-IDS CHECT CURRENT SUBROUTINE

```
                   000101       121 TSTKEY   NULL                      X7 = ADDR OF QUALIFICATION TABLE         0000121
                                122                                    X6 = ADDR OF IMS KEY DEF                 0000122
000101  000002 2250 16  000     123          LDX5     .IDSFD,6         X5 = ADDR OF IDS FIELD DEF               0000123
000102  000000 2360 15  000     124          LDQ      0,5              PICK UP FIRST WORD OF FD                 0000124
000103  007777 3760 07  000     125          ANQ      =O7777,DL        ISOLATE CHARACTER POSITION IN RECORD     0000125
000104  050000 0760 00  030     126          ADQ      .QCREC           ADD CURRENT REC CHAR POS IN BUFFER       0000126
000105  000006 5060 07  000     127          DIV      6,DL             CONVERT TO WRODS                         0000127
000106  000022 7360 00  000     128          QLS      18                                                        0000128
000107  040000 0760 00  030     129          ADQ      .QCBUF           QU = WORD POSITION OF FIELD              0000129
000110  000156 7520 70  010     130          STCQ     CMP030,70        BUILD TALLY WORD FOR                     0000130
000111  000156 7510 01  010     131          STCA     CMP030,01        DATABASE FIELD                           0000131
000112  000003 2350 17  000     132          LDA      .SRCH,7          AR ( TALLY WORD OF USER-SUPPLIED KEY     0000132
000113  000157 7550 00  010     133          STA      CMP031                                                    0000133
END OF BINARY CARD .QGCUR05
000114  000156 7510 06  010     134          STCA     CMP030,06        SET UP LENGTH IN DATABASE TALLY          0000134
```

```
                                135                                                                          00001350
                                136                                                                          00001360
                                137                                                                          00001370
000115  000157 2350 52  010     138          LDA    CMP031,SC                                                00001380
000116  000156 1150 52  010     139          CMPA   CMP030,SC               COMPARE                          00001390
000117  000122 6010 00  010     140          TNZ    *+3                                                      00001400
000120  000115 6070 00  010     141          TTF    *-3                                                      00001410
000121  000124 7100 00  010     142          TRA    KEYEQL                                                   00001420
000122  000126 6020 00  010     143          TNC    KEYGTR                                                   00001430
000123  000125 7100 00  010     144          TRA    KEYLES                                                   00001440
                                145                                     THE FOLLOWING INSTRUCTIONS WERE  00001450
                                146                                     MODIFIED ACCORDING TO OPERATOR TYPE 00001460
000124  000124 7100 00  010     147 KEYEQL TRA   *                                                       00001470
000125  000125 7100 00  010     148 KEYLES TRA   *                                                       00001480
000126  000126 7100 00  010     149 KEYGTR TRA   *                                                       00001490

                          IMS-IDS CHECT CURRENT SUBROUTINE

                000127          151 NOTFND NULL                                                          00001510
000127  000160 4500 00  010     152          STZ    FNDSW           SET NOT-FOUND                            00001520
000130  000133 7100 00  010     153          TRA    NXTFLD          SEE IF THERE ARE ANY "OR" GROUPS         00001530
                                154                                                                          00001540
                                155                                                                          00001550
                000131          156 FOUND  NULL                                                          00001560
000131  000160 0540 00  010     157          AOS    FNDSW           SET-FOUND                                00001570
000132  000133 7100 00  010     158          TRA    NXTFLD          SEE IF THERE ARE "AND" CONDITIONS        00001580
                                159                                                                          00001590
                                160                                                                          00001600
                                161                                                                          00001610
                000133          162 NXTFLD NULL                 ARE THERE ANY MORE FIELDS                00001620
000133  000001 1620 03  000     163          SBX2   1,DU            DECREMENT QUALIFIER COUNT                00001630
000134  000146 6000 00  010     164          TZE    ENDKYS                                                   00001640
000135  000004 0670 03  000     165          ADX7   .QALSZ,DU       X7 = ADDR NEXT QUALIFICATION TABLE ENTRY 00001650
000136  000000 2340 17  000     166          SZN    .BOOLE,7        LOOK AT BOOLEAN CODE                     00001660
OF BINARY CARD .SGCUR06
000137  000143 6000 00  010     167          TZE    ANDFLD          ZERO INDICATES "AND"                     00001670
                                168                                                                          00001680
                000140          169 ORFLD  NULL                                                          00001690
000140  000160 2340 00  010     170          SZN    FNDSW           WAS LAST FIELD A HIT                     00001700
000141  000011 6000 00  010     171          TZE    CMPFLD          NO -GO BACK AND COMPARE THIS ONE         00001710
000142  000154 7100 00  010     172          TRA    FNDRCD          YES - GO TO RECORD -FOUND                00001720
                                173                                                                          00001730
                                174                                                                          00001740
                000143          175 ANDFLD NULL                                                          00001750
000143  000160 2340 00  010     176          SZN    FNDSW           WAS LAST FIELD A HIT                     00001760
000144  000133 6000 00  010     177          TZE    NXTFLD          NO - SKIP TO NEXT "OR" GROUP             00001770
000145  000011 7100 00  010     178          TRA    CMPFLD          YES - GO COMPARE THIS ONE                00001780

                000146          180 ENDKYS NULL                                                          00001800
000146  000160 2340 00  010     181          SZN    FNDSW           WAS SEARCH SUCCESSFUL                    00001810
000147  000151 6000 00  010     182          TZE    NOTSAT          NO -EXIT NOT SATISFIED                   00001820
000150  000154 7100 00  010     183          TRA    FNDRCD          YES - EXIT FOUND                         00001830
                                184                                                                          00001840
                                185                                                                          00001850
                                186                                                                          00001860
                000151          187 NOTSAT NULL                                                          00001870
000151  510004 2240 03  000     188          LDX4   =3HR04,DU                                                00001880
000152  020005 4440 00  030     189          SXL4   CCB+ERRREF                                               00001890
000153  000154 7100 00  010     190          TRA    EXIT                                                     00001900
                                191                                                                          00001910
                                192                                                                          00001920
                000154          193 FNDRCD NULL                                                          00001930
                000154          194 EXIT   NULL                                                          00001940
000154  000170 0730 00  010     195          LREG   HLDREG                                                   00001950
000155  000000 7100 11  000     196          TRA    0,1                                                      00001960

                          IMS-IDS CHECT CURRENT SUBROUTINE

                000156          198 CMP030 BSS   1               TALLY FOR IDS FIELD                      00001980
                000157          199 CMP031 BSS   1               TALLY FOR WS FIELD                       00001990
                000160          200 FNDSW  BSS   1               COMPARISON SUCCESS SWITCH                00002000
                                201                                                                          00002010
                000000          202 DIRREF SET   0                                                        00002020
                000005          203 ERRREF SET   5                                                        00002030
                                204                                                                          00002040
                                205                                                                          00002050
000161  000007710004    000
                000170          206          EIGHT                                                       00002060
                000170          207 HLDREG BSS   8                                                        00002070
                000200          208 DEBUG  BSS   8                                                        00002075
                                209                                                                          00000010
                                210                                                                          00000020
                                211                 LAY-OUT OF THE QUALIFICATION TABLE                      00000030
                                212                                                                          00000040
                                213                                                                          00000050
                000004          214 .QALSZ SET   4               TABLE SIZE                               00000060
                000000          215 .BOOLE SET   0               BOOLEAN CODE (0=AND,1=OR)                00000070
                000001          216 .QLKEY SET   1               ADDRESS OF THE KEY DEF                   00000080
                000002          217 .OPCOD SET   2               COMPARISON OPERATOR CODE                 00000090
                000003          218 .SRCH  SET   3               TALLY WORD OF THE SEARCH VALUE           00000100

                                222                 LAY-OUT OF THE SSA TABLE                                00000030
                                223                                                                          00000040
                                224                                                                          00000050
                000012          225 .SSSIZ SET   10              TABLE SIZE                               00000060
                000000          226 .SEGAD SET   0               SEG DEFINITION ADDRESS                   00000070
                000000          227 .SUPLY SET   0               FLAG FOR USER-SUPPLIED OR IMPLIED        00000080
                000001          228 .IOTAL SET   1               I-O-AREA TALLY                           00000090
                000002          229 .UNIQE SET   2               UNIQUENESS INDICATOR                     00000100
                000003          230 .EISWD SET   3               EIS DESCRIPTOR WORD OF SEGMENT           00000110
                000004          231 .DCODE SET   4               D COMMAND CODE (UPPER)                   00000120
                000004          232 .NCODE SET   4               N COMMAND-CODE (LOWER)                   00000125
                000005          233 .FCODE SET   5               F COMMAND CODE (UPPER)                   00000130
```

```
000005        .LCODE SET     5               L COMMAND CODE (LOWER)
000006        .UCODE SET     6               U COMMAND CODE (UPPER)
000006        .VCODE SET     6               V COMMAND CODE (LOWER)
000007        .PCODE SET     7               P COMMAND CODE (UPPER)
000010        .QLCNT SET     8               NUMBER OF QUALIFIERS
000011        .QLPTR SET     9               INDEX OF FIRST ENTRY IN QUAL. TABLE
```

IMS-IDS CHECT CURRENT SUBROUTINE

```
                             LAY-OUT OF THE IMS SEG DEFINITION TABLE ENTRY

000000        .SGLEN SET     0               SEGMENT LENGTH (DATA ONLY)
000000        .SQKEY SET     0               ADDRESS OF THE SEQUENCE-KEY
000003        .LGCHL SET     3               POINTER TO FIRST LOGICAL COMPONENT
000004        .SGORD SET     4               LOCATION OF IDS ORD POINTER
000005        .LEVEL SET     5               IMS LEVEL NUMBER
000005        .RCNUM SET     5               IMS RECORD NUMBER
000006        .SGREA SET     6               AREA FLAG WORD
000006        .INDEX SET     6               INDEX ROUTINE ADDRESS
000007        .PERM  SET     7               PERMISSION WORD (G+I+R+D+K+P)
000010        .RULE  SET     8               LOGICAL RULES  AND INSERT RULES
000011        .PCHLD SET     9               PC ADDR HOLD AREA
000012        .CURNT SET     10              IDS CURRENCY FOR THIS SEGMENT
000013        .SGNAM SET     11              IMS SEGMENT NAME

                             LAY-OUT OF THE IMS KEY DEFINITION ENTRY

000000        .FDTYP SET     0               CODED FIELD TYPE
000000        .SEQCD SET     0               CODE SEQUENCE CODE
000000        .FDLEN SET     0               FIELD LENGTH
000001        .FDSTR SET     1               STARTING CHARACTER
000002        .IDSFD SET     2               ADDRESS OF THE IDS FIELD DEFINITION
000003        .FDPOS SET     3               STARTING POSITION IN FEEDBACK AREA
000004        .FDNAM SET     4               IMS FIELD NAME

000000               BLOCK   C05
000000        SSACNT BSS     1               SSA COUNT IN CURRENT CALL
000001        SSATAB BSS     1               ADDRESS OF THE CURRENT SSA TABLE
000002        CALTAB BSS     1               ADDRESS OF QUALIFICATION TABLE
000003        PCBDFN BSS     1               PCB DEFINITION ADDRESS
000004        QUALDX BSS     1               QUALIFICATION TABLE INDEX
000005        CURSSA BSS     1               ADDRESS OF CURRENT USER SSA
000006        FRSTLV BSS     1               FIRST USER-SUPPLIED LEVEL
000007        IOAREA BSS     1               ADDRESS OF USER'S I-O-AREA
000010        LSTSEG BSS     1               ADDRESS OF LAST ACCESSED SEG
000011        CURREF BSS     1               REF. CODE OF LAST ACCESSED RECORD
000012        PCBADR BSS     1               ADDRESS OF USER'S PCB
000013        PRNTSW BSS     1               SWITCH FOR IMS PARENT SETTING
000014        PRSTAT BSS     1               STATUS OF PREVIOUS CALL
000015        FUNCDE BSS     1               IMS FUNCTION CODE
000016        OLDSSA BSS     1               OLD SSA COUNT (PREVIOUS CALL)
000017        PRIRSW BSS     1               USE PRIOR DIRECTION SWITCH
000020        CCODEC BSS     1               COMMAND CODE "C" SWITCH
000021        USERIO BSS     1               ADDRESS OF USER'S I-O-AREA
000022        MVETAL BSS     1               TALLY WORD BUILD BY MVESEG WHEN NO SSA'S

000023               USE
```

IMS REPLACE ROUTINE

```
                     LBL     REPL
                     TTL     IMS REPLACE ROUTINE




                             THIS ROUTINE HANDLES THE IMS FUNCTION "REPL"

                             IT PROCESSES THE SSA TABLE REPLACING SEGMENTS
                             WHICH MEET THE FOLLOWING CRITERIA

                             1.  THEY WERE USER-SPECIFIED IN THE PRECEDING
                                 GET FUNCTION
                             2.  THE COMMAND CODE N WAS NOT GIVEN
                             3.  THE PCB SPECIFIES REPLACE PERMISSION
                             4.  IF A SEGMENT IS LOGICAL, IT MUST HAVE A
                                 LOGICAL REPLACE RULE OF "V"
                             5.  THE HOLD FLAG MUST BE ON IN THE PCB

                             REPL JOURNALIZES THE BEFORE IMAGE AND
                             SETS THE MUST-WRITE SWITCH


                     SYMDEF  REPL
                     SYMDEF  FLDCHK

                     SYMREF  .QCREC
                     SYMREF  .QFBUF
                     SYMREF  CCB
                     SYMREF  DEFERR
```

```
                                                                                      00000360
                                                                                      00000370
                                                                                      00000380
                                                                                      00000390
                                GNCOMP MACRO                                          00000400
                                       LDX4     3,4                                   00000410
                                       LDA      0,4                                   00000420
                                       ANA      =0770000,DU                           00000430
                                       CMPA     =0510000,DU                           00000440
                                       TZE      *1                                    00000450
                                       CMPA     =0560000,DU                           00000460
                                       TNZ      DEFERR                                00000470
                                       ENDM     GNCOMP                                00000480
                                                                                      00000490
                                                                                      00000500
                                GMMAKE MACRO                                          00000510
                                       LXL4     1,4                                   00000520
                                       LDA      0,4                                   00000530
                                       ANA      =0770000,DU                           00000540
                                       CMPA     =0510000,DU                           00000550
                                       TNZ      DEFERR                                00000560
                                       ENDM     GMMAKE                                00000570

                              IMS REPLACE ROUTINE

                                                                                      00000590
                                                                                      00000600
                                                                                      00000610
              000000            REPL   NULL                                           00000620
000000  000130 7530 00  010            SREG     HLDREG                                00000630
                                                                                      00000640
                                                                                      00000650
000001  010003 2270 00  030            LDX7     PCBDFN     X7 = PCB DEF ADDR          00000660
                                                                                      00000670
000002  000001 2350 07  000            LDA      1,DL       SET SWITCH SO THAT USRPCB  00000680
000003  010013 7550 00  030            STA      PRNTSW     WILL NOT ESTABLISH PARENTAGE 00000690
                                                                                      00000700
000004  000000 2350 17  000            LDA      ,HOLD,7    PICK UP HOLD WORD          00000710
000005  000001 3750 03  000            ANA      =O1,DU     ISOLATE THE HOLD BIT       00000720
000006  000102 6000 00  010            TZE      NOTHLD     ERROR IF NOT ON            00000730
                                                                                      00000740
000007  000002 7200 17  000            LXLO     ,CRLVL,7   SSACNT = LEVEL NUMBER OF   00000750
000010  010000 4400 00  030            SXLO     SSACNT     CURRENT SEGMENT            00000760
                                                                                      00000770
000011  010000 2360 00  030            LDQ      SSACNT     COMPUTE SSA TABLE ADDRESS  00000780
000012  000102 6000 00  010            TZE      NOTHLD     ERROR IF CURRENT LEVEL ZERO 00000790
000013  000001 1760 07  000            SBQ      1,DL                                  00000800
000014  000012 4020 07  000            MPY      ,SSSIZ,DL                             00000810
000015  000000 6230 06  000            EAX3     0,QL                                  00000820
000016  010001 0630 00  030            ADX3     SSATAB     X3 = ADDR(SSA-TABLE(CURRENT-LEVEL)) 00000830
                                                                                      00000840
000017  000002 2200 17  000            LDXO     ,CRSEG,7   XO = CURRENT SEG DEF ADDR  00000850
000020  000000 7400 13  000            STXO     ,SEGAD,3   SET SEG DEF ADDR IN SSA-TABLE 00000860
                                                                                      00000870
000021  030000701000        030        CALL     BLDTAL     REBUILD I-O-AREA TALLIES   00000880
000022  000024710000        010
OF BINARY CARD REPL0003
000023  000474000126        010
000024  110000701000        030        CALL     MOVEIO     MOVE DATA FROM USER TO EMULATOR I-O-AREA 00000885
000025  000027710000        010
000026  000474000127        010
000027  110000701000        030        CALL     MOVEIO     MOVE DATA FROM USER TO EMULATOR I-O-AREA 00000890
000030  000032710000        010
000031  000474000130        010
                                                                                      00000900
000032  010001 2230 00  030            LDX3     SSATAB     X3 = ADDR(SSA-TABLE(1))    00000910
000033  000001 2350 07  000            LDA      1,DL       WRKLVL = 1                 00000920
000034  000122 7550 00  010            STA      WRKLVL                                00000930
              000035            CHKDON NULL                                           00000940
000035  000000 2240 13  000            LDX4     ,SEGAD,3   X4 = SEG DEF ADDR (I)      00000950
000036  000122 2350 00  010            LDA      WRKLVL     IF I >= SSACNT             00000960
000037  010000 1150 00  030            CMPA     SSACNT       THEN EXIT                00000970
000040  000046 6000 00  010            TZE      CHKNCD     IF EQUAL ALWAYS CHECK N    00000980
000041  000056 6050 00  010            TPL      MODIFY     IF GREATER GO TO MODIFY    00000990
                                                                                      00001000
000042  000000 7200 13  000            LXLO     ,SUPL?,3   SKIP ALL PROCESSING IF     00001010
000043  000053 6010 00  010            TNZ      NXTSSA     THIS SSA WAS NOT USER-SUPPLIED 00001020

                              IMS REPLACE ROUTINE

                                                                                      00001030
000044  000004 2200 13  000            LDXO     ,DCODE,3   SKIP REPLACEMENT           00001040
000045  000053 6000 00  010            TZE      NXTSSA     COMMAND CODE "D" WAS NOT GIVEN 00001050
              000046            CHKNCD NULL                                           00001060
OF BINARY CARD REPL0004
000046  000004 7200 13  000            LXLO     ,NCODE,3   SKIP REPLACEMENT IF        00001070
000047  000053 6010 00  010            TNZ      NXTSSA     COMMAND CODE N WAS GIVEN   00001080
                                                                                      00001090
000050  000140 7010 00  010            TSX1     FLDCHK     CALL FLDCHK (I)            00001100
                                                                                      00001110
000051  000123 2350 00  010            LDA      ERRSW                                 00001120
000052  000107 6010 00  010            TNZ      EXIT                                  00001130
                                                                                      00001140
              000053            NXTSSA NULL                                           00001150
000053  000122 0540 00  010            AOS      WRKLVL     INCREMENT I                00001160
000054  000012 0630 03  000            ADX3     ,SSSIZ,DU  ADJUST SSA-TABLE POINTER   00001170
000055  000035 7100 00  010            TRA      CHKDON                                00001180

              000056            MODIFY NULL                                           00001200
000056  010001 2230 00  030            LDX3     SSATAB     X3 = ADDR(SSA-TABLE(1))    00001210
000057  000001 2350 07  000            LDA      1,DL       WRKLVL = 1                 00001220
000060  000122 7550 00  010            STA      WRKLVL                                00001230
```

```
                        000061    123 CHKEND NULL                                                          0000124
000061  000000 2240 13  000       124        LDX4    .SEGAD,3        X4 = SEG DEF ADDR (I)                0000125
000062  000122 2350 00  010       125        LDA     WRKLVL          IF I >= SSACNT                       0000126
000063  010000 1150 00  030       126        CMPA    SSACNT          THEN EXIT                            0000127
000064  000072 6000 00  010       127        TZE     CHECKN          ALWAYS CHECK N IF EQUAL              0000128
000065  000105 6050 00  010       128        TPL     REPLOK                                               0000129
                                  129                                                                     0000130
000066  000000 7200 13  000       130        LXL0    .SUPLY,3        SKIP REPLACEMENT IF                  0000131
000067  000077 6010 00  010       131        TNZ     MODNXT          SSA WAS NOT USER-SUPPLIED            0000132
000070  000004 2200 13  000       132        LDX0    .DCODE,3        SKIP REPLACEMENT IF                  0000133
END OF BINARY CARD REPL0005
000071  000077 6000 00  010       133        TZE     MODNXT          COMMAND CODE "D" WAS NOT SPECIFIED   0000134
                        000072    134 CHECKN NULL                                                         0000135
000072  000004 7200 13  000       135        LXL0    .NCODE,3        SKIP REPLACEMENT IF                  0000136
000073  000077 6010 00  010       136        TNZ     MODNXT          COMMAND CODE "N" WAS GIVEN           0000137
                                  137                                                                     0000138
000074  000322 7010 00  010       138        TSX1    REPLAC          CALL REPLACE (I)                     0000139
000075  000123 2350 00  010       139        LDA     ERRSW           EXIT ON ERROR                        0000140
000076  000107 6010 00  010       140        TNZ     EXIT                                                 0000141
                                  141                                                                     0000142
                        000077    142 MODNXT NULL                                                         0000143
000077  000122 0540 00  010       143        AOS     WRKLVL          INCREMENT I                          0000144
000100  000012 0630 03  000       144        ADX3    .SSSIZ,DU       ADJUST SSA-TABLE POINTER             0000145
000101  000061 7100 00  010       145        TRA     CHKEND                                               0000146

                                  IMS REPLACE ROUTINE

                        000102    147 NOTHLD NULL                                                         0000148
000102  002441 2200 03  000       148        LDX0    =3HODJ,DU       SET IMS STATUS-CODE TO DJ            0000149
000103  000000 4400 17  000       149        SXL0    .STAT+7                                              0000150
000104  000107 7100 00  010       150        TRA     EXIT                                                 0000151
                                  151                                                                     0000152
                        000105    152 REPLOK NULL                    SET STATUS TO SHOW                   0000153
000105  000000 2200 03  000       153        LDX0    0,DU            THAT THE REPLACE WAS "OK"            0000154
000106  000000 4400 17  000       154        SXL0    .STAT+7                                              0000155
                                  155                                                                     0000156
                                  156                                                                     0000157
                        000107    157 EXIT   NULL                                                         0000158
000107  010001 2230 00  030       158        LDX3    SSATAB          MAKE SURE ALL                        0000159
000110  000000 2350 07  000       159        LDA     0,DL            "N" COMMAND CODES                    0000160
000111  000000 2200 03  000       160        LDX0    0,DU                                                 0000161
                        000112    161 CLRNCD NULL                    ARE CLEARED, SO                      0000162
000112  010000 1150 00  030       162        CMPA    SSACNT          THAT A SUBSEQUENT                    0000163
000113  000120 6050 00  010       163        TPL     QUIT            REPLACE WILL BE OKAY                 0000164
END OF BINARY CARD REPL0006
000114  000004 4400 13  000       164        SXL0    .NCODE,3                                             0000165
000115  000012 0630 03  000       165        ADX3    .SSSIZ,DU                                            0000166
000116  000001 0750 07  000       166        ADA     1,DL                                                 0000167
000117  000112 7100 00  010       167        TRA     CLRNCD                                               0000168
                        000120    168 QUIT   NULL                                                         0000169
000120  000130 0730 00  010       169        LREG    HLDREG                                               0000170
000121  000000 7100 11  000       170        TRA     0,1                                                  0000171
                                  171                                                                     0000172
                                  172                                                                     0000173
                                  173                                                                     0000174
                        000122    174 WRKLVL BSS     1                                                    0000175
                        000123    175 ERRSW  BSS     1                                                    0000176
                                  176                                                                     0000177
                                  177                                                                     0000178
000124  000004710004        000
                        000130    178        EIGHT                                                        0000179
                        000130    179 HLDREG BSS     8                                                    0000180

                                  IMS REPLACE ROUTINE

                        000140    181 FLDCHK NULL                                                         0000182
000140  000321 7410 00  010       182        STX1    FLDRET          SET UP RETURN                        0000183
000141  000123 4500 00  010       183        STZ     ERRSW           ERROR-SW = 0                         0000184
                                  184                                                                     0000185
000142  000010 2350 14  000       185        LDA     .RULE,4         IS SEGMENT LOGICAL                   0000186
000143  000001 3750 07  000       186        ANA     =O1,DL                                               0000187
000144  000232 6010 00  010       187        TNZ     LGLFLD          YES - IT MUST BE HANDLED DIFFERENTLY 0000188
                                  188                                                                     0000189
000145  000000 7200 14  000       189        LXL0    .SQKEY,4        X0 = SEQ KEY ADDR                    0000190
000146  000321 6000 00  010       190        TZE     FLDRET          EXIT IF NONE                         0000191
                                  191                                                                     0000192
000147  000001 2360 13  000       192        LDQ     .IOTAL,3                                             0000193
000150  000007 3760 07  000       193        ANQ     =O7,DL          ISOLATE STARTING CHAR IN I-O-AREA    0000194
000151  000464 7560 00  010       194        STQ     WORK                                                 0000195
END OF BINARY CARD REPL0007
000152  000001 2360 10  000       195        LDQ     .FCSTR,0        QR = STARTING CHAR IN SEGMENT        0000196
000153  000022 7320 00  000       196        QRS     18                                                   0000197
000154  000001 1760 07  000       197        SBQ     1,DL            ADJUST CHARACTER FOR RELATIVE ZERO   0000198
000155  000464 0760 00  010       198        ADQ     WORK                                                 0000199
000156  000006 5060 07  000       199        DIV     6,DL            CONVERT TO WROD & CHAR               0000200
000157  000466 7510 01  010       200        STCA    IOFLD+01        SAVE INITIAL CHAR POS                0000201
000160  000000 6260 06  000       201        EAX6    0,QL                                                 0000202
000161  000001 0660 13  000       202        ADX6    .IOTAL,3        X6 = WORD ADDR OF KEY IN I-O-AREA    0000203
000162  000466 7460 00  010       203        STX6    IOFLD                                                0000204
000163  000000 2350 10  000       204        LDA     .FCLEN,0        PICK UP KEY LENGTH                   0000205
000164  000006 7350 00  000       205        ALS     6               ALIGN FOR USE IN A TALLY WORD        0000206
000165  000466 7510 06  010       206        STCA    IOFLD,06        PUT LENGTH IN TALLY WORDS            0000207
000166  000470 7510 06  010       207        STCA    DBFLD,06                                             0000208
                        000167    208 DBACCE NULL                                                         0000209
000167  000012 2350 14  000       209        LDA     .CURNT,4        PICK UP CURRENCY                     0000210
000170  000307 6000 00  010       210        TZE     DBERR                                                0000211
000171  020000 1150 00  030       211        CMPA    CCB+DIRREF      DON'T BOTHER RETRIEVING IF           0000212
000172  000203 6000 00  010       212        TZE     COMTLY          RECORD IS ALREADY IDS CURRENT        0000213
000173  020000 7550 00  030       213        STA     CCB+DIRREF                                           0000214
000174  000473 7400 00  010       214        STX0    HOLDX0          SAVE X0 BECAUSE .QGETD DOESN'T       0000215
END OF BINARY CARD REPL0008
000175  070000701000        030   215        CALL    .QGETD          RETRIEVE RECORD                      0000216
000176  000200710000        010
```

```
000177  000474000327     010
000200  000473 2200 00   010    216          LDX0     HOLDX0        RESTORE X0                                       00002170
000201  020005 2350 00   030    217          LDA      CCB+ERRREF                                                     00002180
000202  000307 6010 00   010    218          TNZ      DBERR         CHECK FOR ERROR                                  00002190
              000203            219 COMTLY   NULL                                                                    00002200
000203  060000 2360 00   030    220          LDQ      .OCREC        PICK UP CHARACTER POSITION OF RECORD IN BUFF00002210
000204  000005 0760 07   000    221          ADQ      5,DL          ADD 5 FOR HEADER                                 00002220
000205  000005 2260 14   000    222          LDX6     .LEVEL,4                                                       00002230
000206  000001 1060 03   000    223          CMPX6    1,DU                                                           00002240
000207  000211 6010 00   010    224          TNZ      *+2                                                            00002250
000210  000004 0760 07   000    225          ADQ      4,DL          IF ROOT, ADD 4 FOR CALC POINTER                  00002260
000211  000022 7360 00   000    226          QLS      18                                                             00002270
000212  000001 0760 10   000    227          ADQ      .FDSTR,0      ADD POSITION OF KEY FIELD IN SEGMENT             00002280
000213  000022 7320 00   000    228          QRS      18                                                             00002290

                         IMS REPLACE ROUTINE

000214  000001 1760 07   000    229          SBQ      1,DL          ADJUST TO RELATIVE ZERO                          00002300
000215  000006 5060 07   000    230          DIV      6,DL          CONVERT TO WORDS & CHARS                         00002310
000216  000000 6250 06   000    231          EAX5     0,QL          X5 = WORD OFFSET IN BUFFER                       00002320
000217  050000 0650 00   030    232          ADX5     .CCBUF        X5 = CORE ADDRESS OF KEY FIELD                   00002330
OF BINARY CARD REPL0009
000220  000470 7450 00   010    233          STX5     DBFLD                                                          00002340
000221  000470 7510 01   010    234          STCA     DBFLD,01      SET INITIAL CHAR POS                             00002350
              000222            235 CHKFLD   NULL                                                                    00002360
000222  000466 2350 52   010    236          LDA      IOFLD,SC      DOES FIELD IN I-O-AREA                           00002370
000223  000470 1150 52   010    237          CMPA     DBFLD,SC      = FIELD IN BUFFER                                00002380
000224  000312 6010 00   010    238          TNZ      FLDERR        NO - ERROR                                       00002390
000225  000222 6070 00   010    239          TTF      *-3                                                            00002400
                                240                                                                                  00002410
000226  000471 2350 00   010    241          LDA      LGLSW         IF LOGICAL-SW IS OFF,                            00002420
000227  000321 6000 00   010    242          TZE      FLDRET        THEN EXIT                                        00002430
                                243                                                                                  00002440
000230  000472 2240 00   010    244          LDX4     HOLDX4                                                         00002450
000231  000233 7100 00   010    245          TRA      LGLCMP                                                         00002460

                         IMS REPLACE ROUTINE

              000232            247 LGLFLD   NULL                                                                    00002480
000232  000471 0540 00   010    248          AOS      LGLSW         SET THE LOGICAL SWITCH                           00002490
              000233            249 LGLCMP   NULL                                                                    00002500
              000233            250          GNCOMP   FLDRET        GET NEXT IN COMPOSED-OF CHAIN                    00002510
                                251                                 EXIT WHENBACK TO SEG DEF                         00002520
000242  000472 7440 00   010    252          STX4     HOLDX4        SAVE PLACE IN TABLES                             00002530
OF BINARY CARD REPL0010
000243  000002 2350 14   000    253          LDA      .LSTRT,4      PICK UP STARTING CHAR OF THIS COMP               00002540
000244  000022 7310 00   000    254          ARS      18                                                             00002550
000245  000464 7550 00   010    255          STA      WORK          SAVE IT                                          00002560
000246  000004 2360 14   000    256          LDQ      .LGCRN,4      PICK UP CURRENCY                                 00002570
                                257                                                                                  00002580
              000247            258          GMMAKE                 GET MASTER OF MAKES-UP CHAIN                     00002590
000254  000012 7560 14   000    259          STQ      .CURNT,4      SET CURRENCY                                     00002600
                                260                                                                                  00002610
000255  000010 2350 14   000    261          LDA      .RULE,4       PICK UP RULE WORD                                00002620
000256  000007 3750 03   000    262          ANA      =07,DU        ISOLATE LOGICAL REPLACEMENT TULE                 00002630
000257  000305 6000 00   010    263          TZE      SKPCMP        IF LOGICAL IGNORE THIS COMPONENT                 00002640
000260  000002 1150 03   000    264          CMPA     =02,DU        IF PHYSICAL, RX ERROR                            00002650
000261  000315 6000 00   010    265          TZE      LGLERR                                                         00002660
                                266                                                                                  00002670
000262  000000 7200 14   000    267          LXL0     .SQKEY,4      X0 = SEQ KEY ADDR                                00002680
000263  000305 6000 00   010    268          TZE      SKPCMP        SKIP THIS COMPONENT IF NONE                      00002690
000264  000001 2360 10   000    269          LDQ      .FDSTR,0      QR = STARTING CHAR OF SEQ KEY                    00002700
000265  000022 7320 00   000    270          QRS      18                                                             00002710
OF BINARY CARD REPL0011
000266  000464 0560 00   010    271          ASQ      WORK          ACCUMULATE CHAR OFFSET                           00002720
000267  000001 2360 13   000    272          LDQ      .IOTAL,3                                                       00002730
000270  000007 3760 07   000    273          ANQ      =07,DL        ISOLATE STARTING CHAR IN I-O-AREA                00002740
000271  000464 0760 00   010    274          ADQ      WORK          ADD TO CHAR OFFSET TOTAL                         00002750
000272  000001 1760 07   000    275          SBQ      1,DL          SUBTRACT 1 TO MAKE COUNT RELATIVE ZERO           00002760
000273  000006 5060 07   000    276          DIV      6,DL          CONVERT TO WORDS & CHARS                         00002770
000274  000000 6250 06   000    277          EAX5     0,QL                                                           00002780
000275  000001 0650 13   000    278          ADX5     .IOTAL,3      X5 = WORD ADDR OF SEQ KEY                        00002790
000276  000470 7450 00   010    279          STX5     DBFLD                                                          00002800
000277  000470 7510 01   010    280          STCA     DBFLD,01      SET UP INITIAL CHAR POS                          00002810
                                281                                                                                  00002820
000300  000000 2350 10   000    282          LDA      .FDLEN,0      PICK UP KEY LENGTH                               00002830
000301  000006 7350 00   000    283          ALS      6                                                              00002840
000302  000466 7510 06   010    284          STCA     IOFLD,06      PUT INTO TALLY WORDS                             00002850
000303  000470 7510 06   010    285          STCA     DBFLD,06                                                       00002860
000304  000167 7100 00   010    286          TRA      DBACCE        GO CHECK AGAINST DATABASE                        00002870
                                287                                                                                  00002880
                                288                                                                                  00002890
              000305            289 SKPCMP   NULL                   SKIP THIS COMPONENT                              00002900
000305  000472 2240 00   010    290          LDX4     HOLDX4                                                         00002910
000306  000233 7100 00   010    291          TRA      LGLCMP        GO GET NEXT COMPONENT                            00002920
              000307            293 DBERR    NULL                                                                    00002940
000307  002146 2200 03   000    294          LDX0     =3HOAD,DU                                                      00002950
000310  000000 4400 17   000    295          SXL0     .STAT,7                                                        00002960
OF BINARY CARD REPL0012
000311  000320 7100 00   010    296          TRA      ERRRET                                                         00002970
                                297                                                                                  00002980
                                298                                                                                  00002990
              000312            299 FLDERR   NULL                                                                    00003000
000312  002421 2200 03   000    300          LDX0     =3HODA,DU                                                      00003010
000313  000000 4400 17   000    301          SXL0     .STAT,7                                                        00003020
000314  000320 7100 00   010    302          TRA      ERRRET                                                         00003030
                                303                                                                                  00003040
                                304                                                                                  00003050
              000315            305 LGLERR   NULL                                                                    00003060
000315  005167 2200 03   000    306          LDX0     =3HORX,DU                                                      00003070
000316  000000 4400 17   000    307          SXL0     .STAT,7                                                        00003080
000317  000320 7100 00   010    308          TRA      ERRRET                                                         00003090
                                309                                                                                  00003100
```

```
                         000320    ERRRET NULL
000320   000123 0540 00  010                  AOS     ERRSW

                         000321    FLDRET NULL
000321   000000 7100 00  000                  TRA     **
                         000322    REPLAC NULL
000322   000463 7410 00  010                  STX1    REPLRT        SAVE RETURN ADDRESS
000323   000123 4500 00  010                  STZ     ERRSW         ERROR-SW = 0
000324   000007 2350 14  000                  LDA     .PERM.4       PICK UP PERMISSIONS WORD
000325   000001 3750 03  000                  ANA     =01.DU        DO WE HAVE "R" PERMISSION
000326   000463 6000 00  010                  TZE     REPXIT        NO -EXIT

000327   000010 2350 14  000                  LDA     .RULE.4
000330   000001 3750 07  000                  ANA     =01.DL        IS SEGMENT LOGICAL
000331   000400 6010 00  010                  TNZ     LGLSEG        YES - IT MUST BE HANDLED DIFFERENTLY
000332   000471 4500 00  010                  STZ     LGLSW         LOGICAL-SW = 0

000333   000001 2360 13  000                  LDQ     .IOTAL.3      PICK UP TALLY WORD
END OF BINARY CARD REPL0013
000334   000457 6000 00  010                  TZE     RXERR         ERROR IF NONE
000335   000465 7560 00  010                  STQ     IOTALY


                         000336    CMNTRY NULL
000336   000012 2350 14  000                  LDA     .CURNT.4      PICK UP CURRENCY
000337   000453 6000 00  010                  TZE     ADERR
000340   020000 7550 00  030                  STA     CCB+DIRREF
000341   070000701000        030              CALL    .QGETD        RETRIEVE DIRECT
000342   000344710000        010
000343   000474000523        010
000344   020005 2350 00  030                  LDA     CCB+ERRREF    EXIT ON ERROR
000345   000453 6010 00  010                  TNZ     ADERR

000346   060000 2360 00  030                  LDQ     .QCREC        BUILD A TALLY WORD
000347   000005 0760 07  000                  ADQ     5.DL          FOR THE RECORD IN THE BUFFER
000350   000005 2200 14  000                  LDX0    .LEVEL.4      IF LEVEL 1
000351   000001 1000 03  000                  CMPX0   1.DU          ADD 4 EXTRA FOR THE CALC POINTER
000352   000354 6010 00  010                  TNZ     *+2
000353   000004 0760 07  000                  ADQ     4.DL
000354   000464 7560 00  010                  STQ     WORK          SAVE CHAR POS FOR USE IN BUILDING FLD
000355   000006 5060 07  000                  DIV     6.DL          CONVERT TO WORD AND CHAR
000356   000467 7510 01  010                  STCA    DBTALY.01     AR = INITIAL CHAR POS
END OF BINARY CARD REPL0014
000357   000000 6250 06  000                  EAX5    0.QL
000360   050000 0650 00  030                  ADX5    .QCBUF        X5 = WORD POS
000361   000467 7450 00  010                  STX5    DBTALY
                                                                    PICK UP  SEGMENT LENGTH
000362   000465 2360 00  010                  LDQ     IOTALY        SET TALLY LENGTH
000363   000467 7520 06  010                  STCQ    DBTALY.06

                         000364    MOVSEG NULL
000364   100000701000        030              CALL    .QSBFF        JOURNALIZE BEFORE-IMAGE
000365   000367710000        010
000366   000474000550        010

000367   000465 2350 52  010                  LDA     IOTALY.SC     MOVE SEGMENT FROM I-O-AREA
000370   000467 7550 52  010                  STA     DBTALY.SC     TO DATABASE BUFFER
000371   000367 6070 00  010                  TTF     *-2

000372   400000 2350 07  000                  LDA     =0400000.DL   SET THE MUST-WRITE SWITCH
000373   050000 2550 51  030                  ORSA    .QCBUF.I

000374   000471 2350 00  010                  LDA     LGLSW         IF LOGICAL-SWITCH IS OFF.
000375   000463 6000 00  010                  TZE     REPXIT        THEN EXIT
000376   000472 2240 00  010                  LDX4    HOLDX4        X4 = SAVED X4
000377   000401 7100 00  010                  TRA     NXTCMP        GO GET NEXT IN COMPOSED-OF CHAIN

                         000400    LGLSEG NULL
000400   000471 0540 00  010                  AOS     LGLSW         SET THE LOGICAL SWITCH
                         000401    NXTCMP NULL
                         000401               GNCOMP  REPXIT        GET NEXT IN COMPOSED-OC CHAIN
END OF BINARY CARD REPL0015
                                                                    EXI WHEN BACK TO SEG DEF
000410   000472 7440 00  010                  STX4    HOLDX4        SAVE PLACE IN TABLES
000411   000002 2350 14  000                  LDA     .LSTRT.4      PICK UP STARTING CHAR OF THIS COMP
000412   000022 7310 00  000                  ARS     18
000413   000464 7550 00  010                  STA     WORK          SAVE IT
000414   000004 2360 14  000                  LDQ     .LGCRN.4      PICK UP CURRENCY

                         000415               GMMAKE                GET MASTER OF MAKES-UP CHAIN
000422   000012 7560 14  000                  STQ     .CURNT.4      SET CURRENCY

000423   000010 2350 14  000                  LDA     .RULE.4       PICK UP RULE WORD
000424   000007 3750 03  000                  ANA     =07.DU        ISOLATE LOGICAL REPLACEMENT RULE
END OF BINARY CARD REPL0016
000425   000451 6000 00  010                  TZE     SKIP          IF LOGICAL IGNORE
000426   000002 1150 03  000                  CMPA    =02.DU        IF PHYSICAL. RX ERROR
000427   000457 6000 00  010                  TZE     RXERR

000430   000001 2350 13  000                  LDA     .IOTAL.3      PICK TALLY WORD
000431   000465 7550 00  010                  STA     IOTALY
000432   000464 2340 00  010                  SZN     WORK          IS COMPONENT STARTING CHAR ZERO
000433   000445 6000 00  010                  TZE     SETLEN        YES - SKIP TALLY MODIFICATION
000434   000465 2360 00  010                  LDQ     IOTALY
000435   000007 3760 07  000                  ANQ     =07.DL        ISOLATE STARTING CHAR FROM TALLY
000436   000464 0760 00  010                  ADQ     WORK          ADD START CHAR OF THIS SEG
000437   000464 7560 00  010                  STQ     WORK
000440   000001 1760 07  000                  SBQ     1.DL          ADJUST FOR RELATIVE ZERO
000441   000006 5060 07  000                  DIV     6.DL          CONVERT TO WORD & CHAR
000442   000465 7510 01  010                  STCA    IOTALY.01     INSERT CHARACTER OFFSET
000443   000022 7360 00  000                  QLS     18
000444   000465 0560 00  010                  ASQ     IOTALY        INCREMENT WORD LOC
```

```
              000445       407 SETLEN NULL                                                        00004080
000445  000000 2350 14  000   408        LDA    .SGLEN,4                                         00004090
000446  000014 7310 00  000   409        ARS    12                                               00004100
000447  000465 7510 06  010   410        STCA   IOTALY,06        INSERT SEGMENT LENGTH           00004110
                              411                                                                00004120
CF BINARY CARD REPL0017
000450  000336 7100 00  010   412        TRA    CMNTRY           GO TO COMMON-ENTRY              00004130
                              413                                                                00004140
              000451       414 SKIP   NULL                      SKIP THIS COMPONENT             00004150
000451  000472 2240 00  010   415        LDX4   HOLDX4           RESTORE X4                      00004160
000452  000401 7100 00  010   416        TRA    NXTCMP           GO GET NEXT COMPONENT           00004170
              000453       418 AOERR  NULL                                                       00004190
000453  002146 2200 03  000   419        LDX0   =3HOAO,DU                                        00004200
000454  000000 4400 17  000   420        SXL0   .STAT,7          SET IMS STATUS AO               00004210
000455  000123 0540 00  010   421        AOS    ERRSW            SET ERROR-SW                    00004220
000456  000463 7100 00  010   422        TRA    REPXIT                                           00004230
                              423                                                                00004240
              000457       424 RXERR  NULL                                                       00004250
000457  005167 2200 03  000   425        LDX0   =3HORX,DU                                        00004260
000460  000000 4400 17  000   426        SXL0   .STAT,7          SET IMS STATUS RX               00004270
000461  000123 0540 00  010   427        AOS    ERRSW            SET ERROR SWITCH                00004280
000462  000463 7100 00  010   428        TRA    REPXIT                                           00004290
                              429                                                                00004300
                              430                                                                00004310
              000463       431 REPXIT NULL                                                       00004320
              000463       432 REPLRT NULL                                                       00004330
000463  000000 7100 00  000   433        TRA    **               EXIT FROM REPLACE SUBROUTINE    00004340
              000464       435 WORK   BSS    1                                                   00004360
              000465       436 IOTALY BSS    1                  SEG TALLY IN IO-AREA            00004370
              000466       437 IOFLD  BSS    1                  KEY FIELD TALLY IN I-O-AREA     00004380
              000467       438 DBTALY BSS    1                  SEG TALLY IN IDS BUFFER         00004390
              000470       439 DBFLD  BSS    1                  KEY FIELD TALLY IN IDS BUFFER   00004400
              000471       440 LGLSW  BSS    1                  LOGICAL-SWITCH                  00004410
              000472       441 HOLDX4 BSS    1                  X4 SAVE AREA                    00004420
              000473       442 HOLDX0 BSS    1                  X0 SAVE AREA                    00004430
                              443                                                                00004440
                              444                                                                00004450
              000000       445 DIRREF SET    0                                                   00004460
              000005       446 ERRREF SET    5                                                   00004470
                              450           LAY-OUT OF THE SSA TABLE                             00000030
                              451                                                                00000040
                              452                                                                00000050
              000012       453 .SSSIZ SET    10                 TABLE SIZE                      00000060
              000000       454 .SEGAD SET    0                  SEG DEFINITION ADDRESS          00000070
              000000       455 .SUPLY SET    0                  FLAG FOR USER-SUPPLIED OR IMPLIED 00000080
              000001       456 .IOTAL SET    1                  I-O-AREA TALLY                  00000090
              000002       457 .UNIQE SET    2                  UNIQUENESS INDICATOR            00000100
              000003       458 .EISWD SET    3                  EIS DESCRIPTOR WORD OF SEGMENT  00000110
              000004       459 .DCODE SET    4                  D COMMAND CODE (UPPER)          00000120
              000004       460 .NCODE SET    4                  N COMMAND-CODE (LOWER)          00000125
              000005       461 .FCODE SET    5                  F COMMAND CODE (UPPER)          00000130
              000005       462 .LCODE SET    5                  L COMMAND CODE (LOWER)          00000135
              000006       463 .UCODE SET    6                  U COMMAND CODE (UPPER)          00000140
              000006       464 .VCODE SET    6                  V COMMAND CODE (LOWER)          00000145
              000007       465 .PCODE SET    7                  P COMMAND CODE (UPPER)          00000150
              000010       466 .QLCNT SET    8                  NUMBER OF QUALIFIERS            00000160
              000011       467 .QLPTR SET    9                  INDEX OF FIRST ENTRY IN QUAL. TABLE 00000170
                              469                                                                00000010
                              470                                                                00000020
                              471           LAY-OUT OF THE PCB DEFINITION TABLE ENTRY            00000030
                              472                                                                00000040
                              473                                                                00000050
              000000       474 .POSIT SET    0                  MULTIPLE-POSITIONING FLAG       00000060
              000000       475 .HOLD  SET    0                  IMS "HOLD" FLAG                 00000070
              000000       476 .STAT  SET    0                  IMS STATUS                      00000080
              000002       477 .CRSEG SET    2                  SEG  ADDR OF SEGMENT LAST PROCESSED 00000090
              000002       478 .CRLVL SET    2                  LEVEL OF THE LAST SEGMENT PROCESSED 00000100
              000003       479 .CRPAR SET    3                  SEG ADDR OF PARENTAGE SEGMENT   00000110
              000003       480 .UNSAT SET    3                  "HIGHEST" UNSATISFIED SEGMENT   00000120
              000004       481 .CRIDS SET    4                  IDS REFERENCE CODE              00000130
              000005       482 .SSTAB SET    5                  ADDRESS OF THE SSA  TABLE       00000140
              000005       483 .QLTAB SET    5                  ADDRESS OF THE QUALIFICATION TABLE 00000150
              000006       484 .OLSSA SET    6                  OLD SSA COUNT FOR THIS PCB      00000160
              000007       485 .PRSTA SET    7                  OLD STATUS FOR THIS PCB         00000170
                              489           LAY-OUT OF THE IMS SEG DEFINITION TABLE ENTRY        00000030
                              490                                                                00000040
                              491                                                                00000050
              000000       492 .SGLEN SET    0                  SEGMENT LENGTH (DATA ONLY)      00000060
              000000       493 .SQKEY SET    0                  ADDRESS OF THE SEQUENCE-KEY     00000070
              000003       494 .LGCHL SET    3                  POINTER TO FIRST LOGICAL COMPONENT 00000080
              000004       495 .SGORD SET    4                  LOCATION OF IDS ORD POINTER     00000090
              000005       496 .LEVEL SET    5                  IMS LEVEL NUMBER                00000100
              000005       497 .RCNUM SET    5                  IMS RECORD NUMBER               00000110
              000006       498 .SGREA SET    6                  AREA FLAG WORD                  00000120
              000006       499 .INDEX SET    6                  INDEX ROUTINE ADDRESS           00000130
              000007       500 .PERM  SET    7                  PERMISSION WORD (G,I,R,D,K,P)   00000140
              000010       501 .RULE  SET    8                  LOGICAL RULES  AND INSERT RULES 00000150
              000011       502 .PCHLD SET    9                  PC ADDR HOLD AREA               00000160
              000012       503 .CURNT SET    10                 IDS CURRENCY FOR THIS SEGMENT   00000170
              000013       504 .SGNAM SET    11                 IMS SEGMENT NAME                00000180
                              508           LAY-OUT OF THE IMS KEY DEFINITION ENTRY              00000030
                              509                                                                00000040
                              510                                                                00000050
              000000       511 .FDTYP SET    0                  CODED FIELD TYPE                00000060
              000000       512 .SEQCD SET    0                  CODE SEQUENCE CODE              00000070
              000000       513 .FDLEN SET    0                  FIELD LENGTH                    00000080
              000001       514 .FDSTR SET    1                  STARTING CHARACTER              00000090
              000002       515 .IDSFD SET    2                  ADDRESS OF THE IDS FIELD DEFINITION 00000100
              000003       516 .FDPOS SET    3                  STARTING POSITION IN FEEDBACK AREA 00000110
              000004       517 .FDNAM SET    4                  IMS FIELD NAME                  00000120
```

```
                                     LAY-OUT OF THE IMS LSEG DEFINITION TABLE ENTRY

           000000    .LSRTV SET     0                  RETRIEVAL-TYPE INDICATOR
           000000    .LGCNT SET     0                  LOGICAL-CONTROL OWNER
           000002    .LSTRT SET     2                  STARTING CHARACTER POSITION
           000004    .LGCRN SET     4                  CURRENCY FOR THIS COMPONENT
                                                       OF THE LOGICAL SEGMENT

           000000           BLOCK   CDS
           000000    SSACNT BSS     1                  SSA COUNT IN CURRENT CALL
           000001    SSATAB BSS     1                  ADDRESS OF THE CURRENT SSA TABLE
           000002    QALTAB BSS     1                  ADDRESS OF QUALIFICATION TABLE
           000003    PCBDFN BSS     1                  PCB DEFINITION ADDRESS
           000004    QUALDX BSS     1                  QUALIFICATION TABLE INDEX
           000005    CURSSA BSS     1                  ADDRESS OF CURRENT USER SSA
           000006    FRSTLV BSS     1                  FIRST USER-SUPPLIED LEVEL
           000007    IOAREA BSS     1                  ADDRESS OF USER'S I-O-AREA
           000010    LSTSEG BSS     1                  ADDRESS OF LAST ACCESSED SEG
           000011    CURREF BSS     1                  REF. CODE OF LAST ACCESSED RECORD
           000012    PCBADR BSS     1                  ADDRESS OF USER'S PCB
           000013    PRNTSW BSS     1                  SWITCH FOR IMS PARENT SETTING
           000014    PRSTAT BSS     1                  STATUS OF PREVIOUS CALL
           000015    FUNCDE BSS     1                  IMS FUNCTION CODE
           000016    OLDSSA BSS     1                  OLD SSA COUNT (PREVIOUS CALL)
           000017    PRIRSW BSS     1                  USE PRIOR DIRECTION SWITCH
           000020    CCODEC BSS     1                  COMMAND CODE "C" SWITCH
           000021    USERIO BSS     1                  ADDRESS OF USER'S I-O-AREA
           000022    MVETAL BSS     1                  TALLY WORD BUILD BY MVESEG WHEN NO SSA'S

           000474           USE
```

RETRIEVAL ERROR HANDLER

```
                            LBL     RETERR
                            TTL     RETRIEVAL ERROR HANDLER

                                    THIS ROUTINES POSTS TO THE PCB
                                    WHENEVER AN ERROR IS ENCOUNTERED
                                    DURING RETRIEVAL

                                    ARGUMENTS ARE -

                                    1. STATUS-CODE - THE IMS CODE TO BE POSTED
                                    2. LEVEL NUMBER AT WHICH RETRIEVAL FAILED

                            SYMDEF  RETERR

           000000    RETERR NULL

000000  000040 7530 00  010      SREG    HLDREG        SAVE REGISTERS
000001  000002 2350 31  000      LDA     2,1*          TRANSFER
000002  000030 7550 00  010      STA     STATUS
000003  000003 2360 31  000      LDQ     3,1*          ARGUMENTS
000004  000031 7560 00  010      STQ     WRKLVL

000005  010003 2240 00  030      LDX4    PCBDFN        X4 = ADDR (PCB-DEF)

000006  000001 2350 07  000      LDA     1,DL          SET PARENT SWITCH ON ERROR,
000007  010013 7550 00  030      STA     PRNTSW        SO THAT USRPCB WILL NOT
                                                       TRY TO SET PARENTAGE
000010  000030 2350 00  010      LDA     STATUS        PICK UP STATUS CODE
000011  000030 7310 00  000      ARS     24            PUT INTO RIGHTMOST 2 CHARS
000012  000000 6270 05  000      EAX7    0,AL          X7 = STATUS CODE
000013  000000 4470 14  000      SXL7    .STAT,4       PUT STATUS INTO PCB

000014  000031 7270 00  010      LXL7    WRKLVL        PICKUP LEVEL NUMBER
000015  000002 4470 14  000      SXL7    .CRLVL,4      SAVE IT IN PCB
000016  000024 6000 00  010      TZE     NOCRNT        ZERO INDICATES NO CURRENCY
000017  000001 1760 07  000      SBQ     1,DL          COMPUTE SSA-TABLE ADDRESS
000020  000012 4020 07  000      MPY     .SSSIZ,DL
000021  000000 6230 06  000      EAX3    0,QL
000022  010001 0630 00  030      ADX3    SSATAB        X3 = ADDR(SSA-TABLE(WORK-LEVEL))

END OF BINARY CARD RETERR02
000023  000003 2270 13  000      LDX7    .SEGAD,3      PICK UP ADDRESS OF CURRENT SEG-DEF
000024  000002 7470 14  000  NOCRNT STX7 .CRSEG,4      STORE ADDRESS OF CURRENT IN PCB-DEF
000025  000026 7100 00  010      TRA     EXIT
           000026    EXIT   NULL
000026  000040 0730 00  010      LREG    HLDREG
000027  000000 7100 11  000      TRA     0,1

           000030    STATUS BSS     1                  IMS STATUS CODE
           000031    WRKLVL BSS     1                  LEVEL NUMBER WHERE ERROR ENCOUNTERED
```

```
000032  000006710004    000
        000040                  EIGHT                                                        00000620
        000040          HLDREG BSS    8                                                      00000630

                                       LAY-OUT OF THE SSA TABLE                              00000030
                                                                                             00000040
                                                                                             00000050
        000012          .SSSIZ SET    10                TABLE SIZE                           00000060
        000000          .SEGAD SET    0                 SEG DEFINITION ADDRESS               00000070
        000000          .SUPLY SET    0                 FLAG FOR USER-SUPPLIED OR IMPLIED    00000080
        000001          .IOTAL SET    1                 I-O-AREA TALLY                       00000090
        000002          .UNIQE SET    2                 UNIQUENESS INDICATOR                 00000100
        000003          .EISWD SET    3                 EIS DESCRIPTOR WORD OF SEGMENT       00000110
        000004          .DCODE SET    4                 D COMMAND CODE (UPPER)               00000120
        000004          .NCODE SET    4                 N COMMAND-CODE (LOWER)               00000125
        000005          .FCODE SET    5                 F COMMAND CODE (UPPER)               00000130
        000005          .LCODE SET    5                 L COMMAND CODE (LOWER)               00000135
        000006          .UCODE SET    6                 U COMMAND CODE (UPPER)               00000140
        000006          .VCODE SET    6                 V COMMAND CODE (LOWER)               00000145
        000007          .PCODE SET    7                 P COMMAND CODE (UPPER)               00000150
        000010          .QLCNT SET    8                 NUMBER OF QUALIFIERS                 00000160
        000011          .QLPTR SET    9                 INDEX OF FIRST ENTRY IN QUAL. TABLE  00000170
                                                                                             00000010
                                                                                             00000020
                                       LAY-OUT OF THE PCB DEFINITION TABLE ENTRY             00000030
                                                                                             00000040
                                                                                             00000050
        000000          .POSIT SET    0                 MULTIPLE-POSITIONING FLAG            00000060
        000000          .HOLD  SET    0                 IMS "HOLD" FLAG                      00000070
        000000          .STAT  SET    0                 IMS STATUS                           00000080
        000002          .CRSEG SET    2                 SEG  ADDR OF SEGMENT LAST PROCESSED  00000090
        000002          .CRLVL SET    2                 LEVEL OF THE LAST SEGMENT PROCESSED  00000100
        000003          .CRPAR SET    3                 SEG ADDR OF PARENTAGE SEGMENT        00000110
        000003          .UNSAT SET    3                 "HIGHEST" UNSATISFIED SEGMENT        00000120
        000004          .CRIDS SET    4                 IDS REFERENCE CODE                   00000130
        000005          .SSTAB SET    5                 ADDRESS OF THE SSA  TABLE            00000140
        000005          .QLTAB SET    5                 ADDRESS OF THE QUALIFICATION TABLE   00000150
        000006          .OLSSA SET    6                 OLD SSA COUNT FOR THIS PCB           00000160
        000007          .PPSTA SET    7                 OLD STATUS FOR THIS PCB              00000170

        000000                 BLOCK  C05                                                    00000010
        000000          SSACNT BSS    1                 SSA COUNT IN CURRENT CALL            00000020
        000001          SSATAB BSS    1                 ADDRESS OF THE CURRENT SSA TABLE     00000030
        000002          QALTAB BSS    1                 ADDRESS OF QUALIFICATION TABLE       00000040
        000003          PCBDEN BSS    1                 PCB DEFINITION ADDRESS               00000050
        000004          QUALDX BSS    1                 QUALIFICATION TABLE INDEX            00000060
        000005          CURSSA BSS    1                 ADDRESS OF CURRENT USER SSA          00000070
        000006          FRSTLV BSS    1                 FIRST USER-SUPPLIED LEVEL            00000080
        000007          IOAREA BSS    1                 ADDRESS OF USER'S I-O-AREA           00000090
        000010          LSTSEG BSS    1                 ADDRESS OF LAST ACCESSED SEG         00000100
        000011          CURREF BSS    1                 REF. CODE OF LAST ACCESSED RECORD    00000110
        000012          PCBADR BSS    1                 ADDRESS OF USER'S PCB                00000120
        000013          PRNTSW BSS    1                 SWITCH FOR IMS PARENT SETTING        00000130
        000014          PRSTAT BSS    1                 STATUS OF PREVIOUS CALL              00000140
        000015          FUNCDE BSS    1                 IMS FUNCTION CODE                    00000150
        000016          OLDSSA BSS    1                 OLD SSA COUNT (PREVIOUS CALL)        00000160
        000017          PRIRSW BSS    1                 USE PRIOR DIRECTION SWITCH           00000170
        000020          CCODEC BSS    1                 COMMAND CODE "C" SWITCH              00000180
        000021          USERIO BSS    1                 ADDRESS OF USER'S I-O-AREA           00000190
        000022          MVETAL BSS    1                 TALLY WORD BUILT BY MVESEG WHEN NO SSA'S 00000200
                                                                                             00000210
                                                                                             00000220
                                                                                             00000230
                                                                                             00000240
                                                                                             00000250
        000050                 USE                                                           00000260

GET THE NEXT ROOT

                               LBL    ROOTNX                                                 00000040
                               TTL    GET THE NEXT ROOT                                      00000050
                                                                                             00000055
                                                                                             00000060
                                                                                             00000070
                                      THIS ROUTINE GETS THE NEXT ROOT                        00000080
                                      SEGMENT                                                00000090
                                                                                             00000100
                                      IF THE DATABASE IS INDEXED, ROOTNX WILL                00000110
                                      "CALL" THE USER-CODED INDEXING ROUTINE                 00000120
                                                                                             00000130
                                      IF NON-INDEXED, ROOTNX WILL GO ACROSS THE              00000140
                                      I-D-S DATABASE IN A SPECIAL FASHION                    00000150
                                                                                             00000160
                                      ON ENTRY TO ROOTNX.                                    00000170
                                                                                             00000180
                                      X4 MUST BE POINTING TO THE SEGMENT DEFINITION          00000190
                                      OF THE ROOT RECORD                                     00000200

                                                                                             00000220
                                                                                             00000230
                                                                                             00000240
                                                                                             00000250
                        GNDET  MACRO                                                         00000260
                               LXL6   2,6                                                    00000270
                               LDA    0,6                                                    00000280
                               ANA    =0770000,DU                                            00000290
                               CMPA   =0010000,DU                                            00000300
                               TZE    #1                                                     00000310
                               CMPA   =0040000,DU                                            00000320
                               TNZ    DEFERR                                                 00000330
                               ENDM   GNDET                                                  00000340
                                                                                             00000350
                                                                                             00000360
```

```
                                  35 GMCHN  MACRO                                                           000003
                                  36        LDX6    2,6                                                     000003
                                  37        LDA     0,6                                                     000003
                                  38        ANA     =O77'000,DU                                             000004
                                  39        CMPA    =O020000,DU                                             000004
                                  40        TNZ     DEFERR                                                  000004
                                  41        ENDM    GMCHN                                                   000004

                                  43        SYMDEF  ROOTNX                                                  000004
                                  44                                                                        000004
                                  45                                                                        000004
                                  46        SYMREF  CCB                                                     000004
                                  47        SYMREF  DEFERR                                                  000004
                                  48        SYMREF  .DCURT                                                  000005
                                  49                                                                        000005
                                  50                                                                        000005
                                  51                                                                        000005
                                  52                                                                        000005
                    000000        53 ROOTNX NULL                                                            000005
000000  000200 7530 00  010       54        SREG    HLDREG                                                  000005
000001  000012 2350 14  000       56        LDA     .CURNT,4        PICK UP CURRENT REF-CODE                0000051
000002  000170 7550 00  010       57        STA     HLDREF          SAVE IT                                 000005
                                  58                                                                        000006
000003  000006 2270 14  000       59        LDX7    .INDEX,4        X7 = INDEX FLAG                         000006
000004  000077 3670 03  000       60        ANX7    =O000077,DU     ISOLATE FLAG BITS                       000006
000005  000021 6000 00  010       61        TZE     NOINDX          IF ZERO, INDICATES NO INDEX             000006
                                  62                                                                        000006
000006  040000701000      030     63        CALL    INDEX1(HLDREF)  USE THE INDEX                           000006
000007  000012710000      010
000010  000210000077      010
000011  000170000000      010
                                  64                                SUBROUTINE TO FIND THE NEXT             000006
                                  65                                "HIDAM" ROOT RECORD                     000006
000012  000170 2350 00  010       66        LDA     HLDREF          DID THE RETRIEVE WORD                   000006
000013  000163 6000 00  010       67        TZE     NOTFND          NO - SIMPLY EXIT                        000006
000014  010000 7550 00  030       68        STA     CCB+DIRREF                                              000007
000015  070000701000      030     69        CALL    UPDATE          UPDATE AREA CHAIN TABLES                000007
000016  000020710000      010
000017  000210000105      010
000020  000166 7100 00  010       70        TRA     EXIT                                                    000007
                    000021        72 NOINDX NULL                                                            000007
000021  000004 2250 14  000       73        LDX5    .SGORD,4        X5 = ORD ADDR                           000007
000022  000000 2270 15  000       74        LDX7    0,5                                                     000007
END OF BINARY CARD ROOTNX02
000023  001777 3670 03  000       75        ANX7    =O001777,DU                                             000007
000024  000172 4470 00  010       76        SXL7    RDTYPE          RDTYPE = RECORD TYPE OF ROOT SEGMENT    000007
000025  000174 2350 00  010       77        LDA     FRSTIM                                                  000007
000026  000053 6010 00  010       78        TNZ     CLCSET                                                  000008
000027  000000 6260 15  000       79        EAX6    0,5                                                     000008
                    000030        80 CLCDET NULL                                                            000008
                    000030        81        GNDET   DEFERR          GET THE NEXT DETAIL DEFINITION          000008
000037  000000 2350 16  000       82        LDA     0,6             IS IT THE CALC DETAIL                   000008
000040  000010 3750 07  000       83        ANA     =O10,DL           (ISOLATE CALC BIT)                    000008
000041  000030 6000 00  010       84        TZE     CLCDET          NO - GO GET NEXT DETAIL DEF             000008
                                  85                                                                        000008
                    000042        86        GMCHN                   X6 = ADDR (CALC-CHAIN MD)               000008
END OF BINARY CARD ROOTNX03
                                  87                                                                        000008
000047  000173 7460 00  010       88        STX6    MCADDR          SAVE MD FOR THE CALC CHAIN              000009
000050  000112 7460 00  010       89        STX6    NXTCLC+3                                                000009
000051  000174 0540 00  010       90        AOS     FRSTIM                                                  000009
000052  010000 4500 00  030       91        STZ     CCB+DIRREF                                              000009
                    000053        93 CLCSET NULL                                                            000009
000053  000170 2350 00  010       94        LDA     HLDREF          IF HLDREF IS NON-ZERO,                  000009
000054  000074 6010 00  010       95        TNZ     DIRECT          GO RETRIEVE IT                          000009
                                  96                                                                        000009
000055  000006 2350 14  000       97        LDA     .SGREA,4        PICK UP AREA FLAG                       000009
000056  007700 3750 03  000       98        ANA     =O007700,DU     ISOLATE FLAG BITS                       000010
000057  000064 6000 00  010       99        TZE     NOAREA          IF FLAG = 0, GO TO NO-AREA              000010
000060  000006 2350 14  000      100        LDA     .SGREA,4        PICK UP AREA WORD                       000010
000061  000014 7350 00  000      101        ALS     12              ISOLATE AREA NUMBER                     000010
000062  000175 7510 20  010      102        STCA    AREANM,20       AREANM = AREA-NUMBER                    000010
000063  000065 7100 00  010      103        TRA     BLDREF                                                  000010
                                 104                                                                        000010
                    000064       105 NOAREA NULL                                                            000010
000064  000175 4500 00  010      106        STZ     AREANM          AREA-NUMBER = 0                         000010
                                 107                                                                        000010
                                 108                                                                        000011
                    000065       109 BLDREF NULL                    BUILD A REFERENCE CODE FROM             000011
000065  000005 2350 15  000      110        LDA     .PGRNG,5        LOW PAGE RANGE AND AREA NUMBER          000011
000066  000072 6000 00  010      111        TZE     *+4             IF NO RANGE SPECIFIED, ASSUME 1-262143  000011
000067  000022 7310 00  000      112        ARS     18                                                      000011
000070  000006 7350 00  000      113        ALS     6                                                       000011
END OF BINARY CARD ROOTNX04
000071  000073 7100 00  010      114        TRA     *+2                                                     000011
000072  000100 2350 07  000      115        LDA     64,DL           START WITH PAGE 1 IF NO RANGE GIVEN     000011
000073  000175 0750 00  010      116        ADA     AREANM                                                  000011
                                 118                                                                        000012
                                 119                                                                        000012
                                 120                                                                        000012
                    000074       121 DIRECT NULL                                                            000012
000074  010000 1150 00  030      122        CMPA    CCB+DIRREF      DON'T BOTHER TO RETRIEVE IF             000012
000075  000107 6000 00  010      123        TZE     NXTCLC          IT IS ALREADY THE IDS CURRENT           000012
000076  010000 7550 00  030      124        STA     CCB+DIRREF      SET IDS DIRECT-REFERENCE                000012
000077  060000701000      030    125        CALL    .DGETD          RETRIEVE DIRECT                         000012
000100  000102710000      010
000101  000210000175      010
000102  010005 2350 00  030      126        LDA     CCB+ERRREF      EXIT ON ANY ERROR                       000012
000103  000107 6000 00  010      127        TZE     NXTCLC          IF OK, TRY TO FIND NEXT CALC RECORD     000012
000104  510011 1150 07  000      128        CMPA    =3HR09,DL       IF NOT R09, EXIT                        000013
000105  000166 6010 00  010      129        TNZ     EXIT                                                    000013
```

```
000106  000144 7100 00  010    130          TRA     CHKREA           IF IT IS R09, TRY NEXT AREA, IF ANY          00001320
                               131                                                                                00001330
                               132                                                                                00001340
                000107         133 NXTCLC   NULL                                                                  00001350
000107  020000701000      030  134          CALL    .OCHN(**+1)      RETRIEVE NEXT OF CALC CHAIN                  00001360
000110  000114710000      010
000111  000210000206      010
000112  000000000000      000
000113  000001000000      000
 OF BINARY CARD ROOTNX05
000114  010005 2350 00    030  135          LDA     CCB+ERRREF       EXIT ON ERROR                                00001370
000115  000166 6010 00    010  136          TNZ     EXIT                                                          00001380
                               137                                                                                00001390
000116  050000 2350 00    030  138          LDA     .OCCURT          PICK UP TYPE RETRIEVED                       00001400
000117  000172 1150 00    010  139          CMPA    RDTYPE           EXIT IF IT IS TYPE REQUESTED                 00001410
000120  000125 6010 00    010  140          TNZ     TRYNXT           IF NOT, TRY THE NEXT ONE                     00001420
000121  070000701000      030  141          CALL    UPDATE           UPDATE AREA CHAIN TABLE                      00001430
000122  000124710000      010
000123  000210000215      010
000124  000166 7100 00    010  142          TRA     EXIT             BEFORE EXITTIN                               00001440
                               143                                                                                00001450
                               144                                                                                00001460
                000125         145 TRYNXT   NULL                                                                  00001470
000125  001750 1150 07    000  146          CMPA    1000,DL          IF IT IS NOT THE PAGE-HEADER                 00001480
000126  000107 6010 00    010  147          TNZ     NXTCLC           GO GET THE NEXT CALC RECORD                  00001490
                               148                                                                                00001500
000127  010000 2350 00    030  149          LDA     CCB+DIRREF       SAVE PAGE AND LINE PORTION                   00001510
000130  000176 7510 17    010  150          STCA    CMPREF,17        OF DIRECT-REFERENCE                          00001520
000131  000175 7510 20    010  151          STCA    AREANM,20        SAVE AREA PORTION                            00001530
                               152                                                                                00001540
000132  000005 2350 15    000  153          LDA     .PGRNG,5         ISOLATE PAGE-RANGE UPPER BOUND               00001550
000133  000141 6000 00    010  154          TZE     NXTPGE           IF NO RANGE WAS SPECIFIED,                   00001560
                               155                                   JUST TRY THE NEXT PAGE                       00001570
000134  000022 7350 00    000  156          ALS     18                                                            00001580
000135  000014 7310 00    000  157          ARS     12               IF UPPER-BOUND <= CURRENT-REF-CODE           00001590
000136  000176 1150 00    010  158          CMPA    CMPREF           THEN THE RANGE IS EXHAUSTED                  00001600
 OF BINARY CARD ROOTNX06
000137  000144 6000 00    010  159          TZE     CHKREA           IF SO, GO CHECK MULTI-AREA                   00001610
000140  000144 6040 00    010  160          TMI     CHKREA                                                        00001620
                               161                                                                                00001630
                000141         162 NXTPGE   NULL                                                                  00001640
000141  010000 2350 00    030  163          LDA     CCB+DIRREF                                                    00001650
000142  000100 0750 07    000  164          ADA     64,DL            BUMP DIRECT-REFERENCE TO NEXT PAGE-HEADER00001660
000143  000074 7100 00    010  165          TRA     DIRECT                                                        00001670
                               166                                                                                00001680
                000144         167 CHKREA   NULL                                                                  00001690
000144  000006 2350 14    000  168          LDA     .SGREA,4         IS THIS A MULTI-AREA                         00001700
000145  007700 3750 03    000  169          ANA     =0007700,DU      SEGMENT (CODE = 2)                           00001710
000146  000200 1150 03    000  170          CMPA    =0000200,DU                                                   00001720
000147  000163 6010 00    010  171          TNZ     NOTFND           NO - GO TO NOT-FOUND                         00001730
                               172                                                                                00001740
000150  000006 2350 14    000  173          LDA     .SGREA,4         PICK UP AREA WORD                            00001750
000151  007700 3750 07    000  174          ANA     =0007700,DL      ISOLATE HIGHEST AREA NUMBER                  00001760
000152  000006 7310 00    000  175          ARS     6                                                             00001770
000153  000177 7550 00    010  176          STA     HIAREA           HIAREA = HIGHEST ALLOWABLE AREA              00001780
                               177                                                                                00001790
000154  000175 2350 00    010  178          LDA     AREANM           PICK UP AREA NUMBER FROM                     00001800
000155  000100 0750 03    000  179          ADA     =0000100,DU      DIRECT-REFERENCE AND INCREMENT IT            00001810
000156  000175 7550 00    010  180          STA     AREANM           IS THIS NUMBER GREATER                       00001820
000157  000006 7310 00    000  181          ARS     6                THAN THE HIGHEST AVAILABLE                   00001830
000160  000177 1150 00    010  182          CMPA    HIAREA                                                        00001840
000161  000065 6000 00    010  183          TZE     HLDREF           NO - GO START ON THIS AREA                   00001850
 OF BINARY CARD ROOTNX07
000162  000065 6040 00    010  184          TMI     HLDREF                                                        00001860
                               185                                   YES - SET NOT FOUND                          00001870
                000163         187 NOTFND   NULL                                                                  00001890
000163  510011 2350 07    000  188          LDA     =3HR09,DL        SET R09 ERROR                                00001900
000164  010005 7550 00    030  189          STA     CCB+ERRREF                                                    00001910
000165  000166 7100 00    010  190          TRA     EXIT                                                          00001920
                               191                                                                                00001930
                               192                                                                                00001940
                000166         193 EXIT     NULL                                                                  00001950
000166  000200 0730 00    010  194          LREG    HLDREG                                                        00001960
000167  000000 7100 11    000  195          TRA     0,1                                                           00001970
                               196                                                                                00001980
                               197                                                                                00001990
                               198                                                                                00002000
                               199                                                                                00002010
                               200                                                                                00002020
                000170         201 HLDREF   BSS     1                REFERENCE CODE CELL                          00002030
000171  000000000000      000  202 CODE     OCT     0                                                             00002040
000172  000000000000      000  203 RDTYPE   OCT     0                RECORD TYPE DESIRED                          00002050
000173  000000000000      000  204 MDADDR   OCT     0                ADDRESS OF CALC CHAIN MD                     00002060
000174  000000000000      000  205 FRSTIM   OCT     0                DIRST-TIME SWITCH                            00002070
000175  000000000000      000  206 AREANM   OCT     0                AREA-NUMBER                                  00002080
                000176         207 CMPREF   BSS     1                REFERENCE CODE COMPARE CELL                  00002090
                000177         208 HIAREA   BSS     1                HIGHEST ALLOWABLE AREA NUMBER                00002100
                               209                                                                                00002110
                               210                                                                                00002120
                000005         211 .PGRNG   SET     5                                                             00002130
                000000         212 DIRREF   SET     0                                                             00002140
                000005         213 ERRREF   SET     5                                                             00002150
                               214                                                                                00002160
                000200         215          EIGHT                                                                 00002170
                000200         216 HLDREG   BSS     8                                                             00002180

                               220                  LAY-OUT OF THE IMS SEG DEFINITION TABLE ENTRY                  00000030
                               221                                                                                00000040
                               222                                                                                00000050
                000000         223 .SGLEN   SET     0                SEGMENT LENGTH (DATA ONLY)                   00000060
                000000         224 .SQKEY   SET     0                ADDRESS OF THE SEQUENCE-KEY                  00000070
                000003         225 .LGCHL   SET     3                POINTER TO FIRST LOGICAL COMPONENT           00000080
                000004         226 .SGORD   SET     4                LOCATION OF IDS ORD POINTER                  00000090
```

```
000005        .LEVEL SET     5          IMS LEVEL NUMBER
000005        .RCNUM SET     5          IMS RECORD NUMBER
000006        .SGREA SET     6          AREA FLAG WORD
000006        .INDEX SET     6          INDEX ROUTINE ADDRESS
000007        .PERM  SET     7          PERMISSION WORD (G,I,R,D,K,P)
000010        .RULE  SET     8          LOGICAL RULES  AND INSERT RULES
000011        .PCHLD SET     9          PC ADDR HOLD AREA
000012        .CURNT SET     10         IDS CURRENCY FOR THIS SEGMENT
000013        .SGNAM SET     11         IMS SEGMENT NAME

000210        ERRLNK NULL
```

SATISFY AN SSA FOR GU

```
                      LBL     SATGU
                      TTL     SATISFY AN SSA FOR GU

                              SATGU ACTUALLY DOES RETRIEVAL
                              AGAINST A DATABASE
                              IT SATISFIES (OR ATTEMPTS TO) ONE SSA

                              ARGUMENTS ARE

                                 SSALVL - THE SSA LEVEL TO BE SATISFIED
                              2. VALIDITY-SWITCH - RETURN PARAMETER

                              SUBROUTINES CALLED
                              1. GETST - ESTABLISH A PARENT SEGMENT AS IDS CURRENT
                              2. .QGET - RETRIEVE SEGMENT-NAME
                              3. .QGETU - FIND SEGMENT USING NON-UNIQUE FIELDS
                              4. .FNDRT - FIND ROOT NON-UNIQUE
                              5. NXTSEG - RETRIEVE NEXT OF A PARTICULAR SEGMENT TYPE

                      SYMDEF  SATGU

                      SYMREF  DEFERR
                      SYMREF  CCB

               GNCHLD MACRO
                      LDX4    2,4
                      LDA     0,4
                      ANA     =0770000,DU
                      CMPA    =0510000,DU
                      TZE     #1
                      CMPA    =0540000,DU
                      TNZ     DEFERR
                      ENDM    GNCHLD

               GNCOMF MACRO
                      LDX4    3,4
                      LDA     0,4
                      ANA     =0770000,DU
                      CMPA    =0510000,DU
                      TZE     #1
                      CMPA    =0560000,DU
                      TNZ     DEFERR
                      ENDM    GNCOMF

               GHMAKE MACRO
                      LXL5    1,4
                      LDA     0,5
                      ANA     =0770000,DU
                      CMPA    =0510000,DU
                      TNZ     DEFERR
                      ENDM    GHMAKE

              000000
               SATGU  NULL
000000 000220 7530 00 010     SREG    HLDREG
000001 000002 2350 31 000     LDA     2,1*      PICK UP SSA
000002 000215 7550 00 010     STA     SSALVL
000003 000003 2350 11 000     LDA     3,1       PICK UP ADDRESSES OF
000004 000217 7550 00 010     STA     VALID     VALIDITY SWITCH
000005 000215 2360 00 010     LDQ     SSALVL
000006 000001 1760 07 000     SBQ     1,DL
000007 000012 4020 07 000     MPY     .SSSIZ,DL
000010 000000 6230 06 000     EAX3    0,QL
000011 010001 0630 00 030     ADX3    SSATAB    X3 = ADDR (SSA-TABLE(WORK-LEVEL))

000012 010017 4500 00 030     STZ     PPIRSW    RESET PRIOR SWITCH
000013 000035 7200 13 000     LXLO    .LCODE,3  IF "L" CODE WAS SPECIFIED,
000014 000016 6000 00 010     TZE     *+2
000015 010017 0540 00 030     AOS     PPIRSW    SET THE EMULATOR PRIOR-SWITCH

000016 000000 2240 13 000     LDX4    .SEGAD,3  X4 = SEG. DEF  ADDRESS

000017 000010 2350 14 000     LDA     .RULE,4   DETERMINE WHETHER SEGMENT IS
000020 000077 3750 07 000     ANA     =077,DL   LOGICAL OR PHYSICAL
000021 000135 6010 00 010     TNZ     LGLSEG    NON-ZERO INDICTES LOGICAL

000022 000010 7200 13 000     LXLO    .CLCNT,3  PICK UP QUALIFIER COUNT
END OF BINARY CARD SATGU003
```

```
000023  000175 6000 00  010           TZE    UNQUAL          ZERO COUNT INDICATES UNQUALIFIEDS SSA          00000890
                                                                                                            00000900
                                                                                                            00000910
000024  000012 2350 13  000           LDA    .UNIQE+3        IS THIS A SEQUENCE KEY "*" SSA                 00000920
000025  000146 6000 00  010           TZE    NONUNQ          IF NOT, GO TO NON-UNIQUE-HANDLER               00000930
                                                                                                            00000940
000026  000011 2360 13  000           LDQ    .QLPTR+3        COMPUTE ADDRESS                                00000950
000027  000001 1760 07  000           SBQ    1,DL            OF THE QUALIFICATION TABLE                     00000960
000030  000004 4020 07  000           MPY    .QALSZ,DL                                                      00000970
000031  000000 6260 06  000           EAX6   0,QL                                                           00000980
000032  010002 0660 00  030           ADX6   QALTAB          X6 = ADDRESS (QALTAB(I))                       00000990
000033  000001 2250 16  000    MOVTLY LDX5   .QLKEY,6        X5 = ADDRESS OF IMS KEY DEFINITION             00001000
000034  000002 2250 15  000           LDX5   .IDSFD,5        X5 = ADDRESS OF IDS QFD                        00001010
000035  000003 2350 16  000           LDA    .SRCH,6         SET UP WORKING-STORAGE                         00001020
000036  000001 7550 15  000           STA    1,5             TALLY WORD IN IDS QFD                          00001030
                                                                                                            00001040
000037  000004 0660 03  000           ADX6   .QALSZ,DU       X6 = ADDRESS OF NEXT QUALIFIER TABLE           00001050
000040  000001 1600 03  000           SBX0   1,DU                                                           00001060
000041  000033 6010 00  010           TNZ    MOVTLY                                                         00001070
000042  000004 2260 14  000           LDX6   .SGORD,4        PICK UP ORD ADDRESS                            00001080
000043  000065 7460 00  010           STX6   CLQGET+3        PUT IN QGET ARGUMENT SLOT                      00001090
                                                                                                            00001100
000044  010001 1030 00  030           CMPX3  SSATAB          TEST FOR THE ROOT SEGMENT                      00001110
000045  000052 6000 00  010           TZE    AREATS                                                         00001120
OF BINARY CARD SATGU004
000046  060000701000    030           CALL   GETMST          ESTABLISH THE PARENT SEGMENT AS CURRENT        00001130
000047  000051710000    010
000050  000230000157    010
000051  000062 7100 00  010           TRA    CLQGET          GO TRY TO FIND THE RECORD                      00001135
                000052         AREATS NULL                                                                  00001140
000052  000000 2350 16  000           LDA    0,6             DOES THIS RECORD SPECIFY                       00001150
000053  000040 3750 07  000           ANA    =O40,DL         VARIABLE AREA                                  00001160
000054  000062 6000 00  010           TZE    CLQGET          NO - DON'T TRY TO SET AREA                     00001170
000055  000061 7460 00  010           STX6   SETREA+3        SET UP ARGUMENT TO AREA ROUTINE                00001180
                000056         SETREA NULL                                                                  00001190
000056  070000701000    030           CALL   IDAREA(**)      SET AREA ACCORDING TO FIELD VALUE              00001200
000057  000062710000    010
000060  000230000167    010
000061  000000000000    000
                000062         CLQGET NULL                                                                  00001210
000062  040000701000    030           CALL   .QGET(**)       CALL QGET                                      00001220
000063  000066710000    010
000064  000230000171    010
000065  000000000000    000
                                                             RETRIEVE RECORD-NAME                           00001230
                                                                                                            00001240
000066  020005 2350 00  030           LDA    CCB+ERRREF      WAS RETRIEVE SUCCESSFUL                        00001250
000067  000211 6010 00  010           TNZ    FALURE          NO - EXIT UNSATISFIED                          00001260
                                                                                                            00001262
000070  020000 2350 00  030           LDA    CCB+CIRREF      TENATIVELY ESTABLISH                           00001263
OF BINARY CARD SATGU005
000071  000012 7550 14  000           STA    .CURNT,4        CURRENCY IN SEGMENT DEFINITION                 00001264
                                                                                                            00001265
000072  000010 2350 13  000           LDA    .QLCNT,3        WAS THERE MORE THAN ONE QUALIFIER              00001270
000073  000002 1150 07  000           CMPA   2,DL                                                       00001280
000074  000102 6040 00  010           TMI    UPDCHN          NO - GO UPDATE CHAIN TABLES                    00001290
000075  100000701000    030           CALL   .GGCUR          CHECK OTHER KEY VALUES                         00001300
000076  000100710000    010
000077  000230000205    010
000100  020005 2350 00  030           LDA    CCB+ERRREF      STILL SATISFIED                                00001310
000101  000211 6010 00  010           TNZ    FALURE          NO - EXIT UNSATIFIED                           00001320
                000102         UPDCHN NULL                                                                  00001330
000102  130000701000    030           CALL   UPDATE          UPDATE AREA CHAIN TABLES                       00001340
000103  000105710000    010
000104  000230000211    010
000105  000203 7100 00  010           TRA    RETROK          EXIT SATISFIED                                 00001350
                                                                                                            00001360
                                                                                                            00001370
                                                                                                            00001380
                000106         NONUNQ NULL                   NON-UNIQUE-HANDLER                             00001390
000106  010001 1030 00  030           CMPX3  SSATAB          IS THE SEGMENT A ROOT                          00001400
000107  000147 6000 00  010           TZE    ROOTNS          IF SO, GO TO ROOT-NONSEQUENCED                 00001410
                                                                                                            00001420
                                                             OTHERWISE, CALL GET-USING TOMFIND              00001430
                                                             THE APPROPRIATE DETAIL                         00001440
                                                                                                            00001450
000110  060000701000    030           CALL   GETMST          ESTABLISH THE PARENT OF THIS SEGMENT           00001460
000111  000113710000    010
000112  000230000225    010
000113  000216 7440 00  010           STX4   HOLDX4                                                         00001470
                000114                GNCHLD DEFERR          GET THE P-C DEFINITION                         00001480
OF BINARY CARD SATGU006
                                                             ON THE "CHILD-OF" SIDE                         00001490
000123  000000 7220 14  000           LXL2   .DEPND,4        SET UP ARGUMENTS FOR CGETU                     00001500
000124  000132 7420 00  010           STX2   CLGETU+3        X2 = ADDR (IDS OMD)                            00001510
000125  000133 7430 00  010           STX3   CLGETU+4        X3 = ADDR (SSA-TABLE)                          00001520
000126  000216 2240 00  010           LDX4   HOLDX4                                                         00001530
                                                                                                            00001540
                000127         CLGETU NULL                                                                  00001550
000127  110000701000    030           CALL   .QGETU(**,**)   CALL GET-USING                                 00001560
000130  000134710000    010
000131  000230000237    010
000132  000000000000    000
000133  000000000000    000
                                                                                                            00001570
                                                                                                            00001580
                                                                                                            00001590
000134  000201 7100 00  010           TRA    EVAL                                                           00001600
                000135         LGLSEG NULL                                                                  00001610
000135  120000701000    030           CALL   NXTSEG          GET THE NEXT LOGICAL SEGMENT                   00001620
000136  000140710000    010
OF BINARY CARD SATGU007
000137  000240000245    010
```

```
000140  020005 2350 00  030   166          LDA     CCB+ERRREF     EXIT ON ERR                        000016
000141  000211 6010 00  010   167          TNZ     FALURE                                            000016
                              168                                 PROPAGATE LOGICAL COMPONENT        000016
              000142          169 ESTCUP NULL                     CURRENCY TO INDIVIDUAL SEGS        000016
              000142          170          CNCOMP  CHKVAL         GET NEXT LSEG DEF                  000016
000151  000074 2360 14  000   171          LDQ     .LGCRN,4       PICK UP CURRENCY                   000016
              000152          172          GHMAKE                 GET SEG DEF FOR THIS COMPONENT     000016
000157  000012 7560 15  000   173          STQ     .CURNT,5       ESTABLISH CURRENCY                 000017
000160  000142 7100 00  010   174          TRA     ESTCUP         GO GET NEXT COMPONENT              000017
                              175                                                                    000017
              000161          176 CHKVAL NULL                     SEE IF LOGICAL SEGMENT             000017
000161  170000701000     030  177          CALL    .OGCUR         SATISFIES SEARCH CRITERIA          000017
END OF BINARY CARD SATGU008
000162  000164710000     010
000163  000230000261     010
000164  020005 2350 00  030   178          LDA     CCB+ERRREF     DID IT SATISFY SEARCH CRITERIA     000017
000165  000135 6010 00  010   179          TNZ     LGLSEG         NO - GO GET NEXT LOGICAL SEGMENT   000017
000166  000203 7100 00  010   180          TRA     RETROK         YES - EXIT O.K.                    000017
              000167          183 ROOTNS NULL                                                        000018
000167  000173 7430 00  010   184          STX3    CLRTNS+3                                          000018
                              185                                                                    000018
                              186                                                                    000018
              000170          187 CLRTNS NULL                                                        000018
000170  030000701000     030  188          CALL    FNDRT(**)      FIND-ROOT-NON-SEQUENCED            000018
000171  000174710000     010
000172  000230000274     010
000173  000000000000     000
                              189                                                                    000018
000174  000201 7100 00  010   190          TRA     EVAL           CHECK SUCCESS                      000018
                              191                                                                    000018
                              192                                                                    000018
                              193                                                                    000019
                              194                                                                    000019
                              195                                                                    000019
              000175          196 UNQUAL NULL                                                        000019
000175  120000701000     030  197          CALL    NXTSEG         RETRIEVE NEXT OF A PARTICULAR      000019
000176  000200710000     010
000177  000230000305     010
                              198                                 SEGMENT TYPE (UNQUALIFIED)         000019
                              199                                                                    000019
000200  000201 7100 00  010   200          TRA     EVAL           EVALUATE THE CALL                  000019

              000201          202 EVAL   NULL                                                        000019
000201  020005 2350 00  030   203          LDA     CCB+ERRREF     CHECK I-D-S STATUS OF CALL         000020
000202  000211 6010 00  010   204          TNZ     FALURE                                            000020
                              205                                                                    000020
                              206                                                                    000020
              000203          207 RETROK NULL                                                        000020
000203  020000 2350 00  030   208          LDA     CCB+DIRREF     PICK UP DIRECT-REFERENCE           000020
000204  010011 7550 00  030   209          STA     CURREF         SAVE IN CURRNT REF CELL            000020
END OF BINARY CARD SATGU009
000205  000012 7550 14  000   210          STA     .CURNT,4       SAVE IN SEGMENT DEF                000020
                              211                                                                    000020
000206  010010 7440 00  030   212          STX4    LSTSEG         SAVE SEGMENT DEFINITION            000020
000207  000217 4500 51  010   213          STZ     VALID,I        SET SUCCESSFUL SWITCH              000021
000210  000213 7100 00  010   214          TRA     EXIT           EXIT                               000021
                              215                                                                    000021
                              216                                                                    000021
                              217                                                                    000021
                              218                                                                    000021
                              219                                                                    000021
              000211          220 FALURE NULL                                                        000021
000211  000001 2350 07  000   221          LDA     1,DL                                              000021
000212  000217 7550 51  010   222          STA     VALID,I                                           000021
              000213          223 EXIT   NULL                                                        000022
000213  000220 0730 00  010   224          LREG    HLDREG                                            000022
000214  000000 7100 11  000   225          TRA     0,1                                               000022
              000215          226 SSALVL BSS     1                                                   000022
              000216          227 HOLDX4 BSS     1                                                   000022
              000217          228 VALID  BSS     1                                                   000022
              000005          229 ERRREF SET     5                                                   000022
              000000          230 DIRREF SET     0                                                   000022
                              231                                                                    000022
                              232                                                                    000022
                              233                                                                    000023
              000220          234          EIGHT                                                     000023
              000220          235 HLDREG BSS     8                                                   000023
                              237                                                                    000000
                              238                                                                    000000
                              239                 LAY-OUT OF THE SSA TABLE                           000000
                              240                                                                    000000
                              241                                                                    000000
              000012          242 .SSSIZ SET     10             TABLE SIZE                           000000
              000000          243 .SEGAD SET     0              SEG DEFINITION ADDRESS               000000
              000000          244 .SUPLY SET     0              FLAG FOR USER-SUPPLIED OR IMPLIED    000000
              000001          245 .IOTAL SET     1              I-O-AREA TALLY                       000000
              000002          246 .UNIQE SET     2              UNIQUENESS INDICATOR                 000001
              000003          247 .EISWD SET     3              EIS DESCRIPTOR WORD OF SEGMENT       000001
              000004          248 .DCODE SET     4              D COMMAND CODE (UPPER)               000001
              000004          249 .NCODE SET     4              N COMMAND-CODE (LOWER)               000001
              000005          250 .FCODE SET     5              F COMMAND CODE (UPPER)               000001
              000005          251 .LCODE SET     5              L COMMAND CODE (LOWER)               000001
              000006          252 .UCODE SET     6              U COMMAND CODE (UPPER)               000001
              000006          253 .VCODE SET     6              V COMMAND CODE (LOWER)               000001
              000007          254 .PCODE SET     7              P COMMAND CODE (UPPER)               000001
              000010          255 .QLCNT SET     8              NUMBER OF QUALIFIERS                 000001
              000011          256 .QLPTR SET     9              INDEX OF FIRST ENTRY IN QUAL. TABLE  000001

                              260                LAY-OUT OF THE QUALIFICATION TABLE                  000000
                              261                                                                    000000
                              262                                                                    000000
              000004          263 .QALSZ SET     4              TABLE SIZE                           000000
              000000          264 .BOOLF SET     0              BOLLEAN CODE (0=AND,1=OR)            000000
```

```
000001   .OLKEY SET    1                 ADDRESS OF THE KEY DEF                       0000008C
000002   .OPCOD SET    2                 COMPARISON OPERATOR CODE                     0000009C
000003   .SRCH  SET    3                 TALLY WORD OF THE SEARCH VALUE               0000010C
                  LAY-OUT OF THE IMS SEG DEFINITION TABLE ENTRY                       0000003C
                                                                                      0000004C
                                                                                      0000005C
000000   .SGLEN SET    0                 SEGMENT LENGTH (DATA ONLY)                   00000060
000000   .SQKEY SET    0                 ADDRESS OF THE SEQUENCE-KEY                  00000070
000003   .LGCHL SET    3                 POINTER TO FIRST LOGICAL COMPONENT           00000080
000004   .SGORD SET    4                 LOCATION OF IDS ORD POINTER                  0000009C
000005   .LEVEL SET    5                 IMS LEVEL NUMBER                             0000010C
000005   .RCNUM SET    5                 IMS RECORD NUMBER                            00000110
000006   .SGREA SET    6                 AREA FLAG WORD                               0000012C
000006   .INDEX SET    6                 INDEX ROUTINE ADDRESS                        00000130
000007   .PERM  SET    7                 PERMISSION WORD (G+I+R+D+K+P)                0000014C
000010   .RULE  SET    8                 LOGICAL RULES  AND INSERT RULES              0000C15C
000011   .PCHLD SET    9                 PC ADDR HOLD AREA                            0000016C
000012   .CURNT SET    10                IDS CURRENCY FOR THIS SEGMENT                0000017C
000013   .SGNAM SET    11                IMS SEGMENT NAME                             0000C18C
                                                                                      0000001C
                                                                                      0000002C
                  LAY-OUT OF THE IMS KEY DEFINITION ENTRY                             0000003C
                                                                                      0000004C
                                                                                      0000005C
000000   .FDTYP SET    0                 CODED FIELD TYPE                             0000006C
000000   .SEQCD SET    0                 CODE SEQUENCE CODE                           0000007C
000000   .FDLEN SET    0                 FIELD LENGTH                                 0000C08C
000001   .FDSTR SET    1                 STARTING CHARACTER                           0000009C
000002   .IDSFD SET    2                 ADDRESS OF THE IDS FIELD DEFINITION          0000010C
000003   .FDPOS SET    3                 STARTING POSITION IN FEEDBACK AREA           0000011C
000004   .FDNAM SET    4                 IMS FIELD NAME                               0000012C
                  LAY-OUT OF THE P-C DEFINITION TABLE ENTRY                           00000030
                                                                                      0000004C
                                                                                      0000005C
000000   .PCRTV SET    0                 RETRIEVAL-TYPE INDICATOR                     0000006C
000000   .DEPND SET    0                 DEPENDENCY OWNER                             0000007C
000001   .PRMST SET    1                 POINTER TO PARENT-CF MASTER (LOWER HALF)     00000080
000003   .PCLSG SET    3                 LSEG ADDRESS                                 00000090
                  LAY-OUT OF THE IMS LSEG DEFINITION TABLE ENTRY                      0000C03C
                                                                                      0000C04C
                                                                                      0000C05C
000000   .LSRTV SET    0                 RETRIEVAL-TYPE INDICATOR                     0000006C
000000   .LGCNT SET    0                 LOGICAL-CONTROL OWNER                        0000007C
000002   .LSTRT SET    2                 STARTING CHARACTER POSITION                  0000008C
000004   .LGCRN SET    4                 CURRENCY FOR THIS COMPONENT                  0000009C
                                         OF THE LOGICAL SEGMENT                       0000010C
000000          BLOCK  C05
000000   SSACNT BSS    1                 SSA COUNT IN CURRENT CALL                    00000020
000001   SSATAB BSS    1                 ADDRESS OF THE CURRENT SSA TABLE             0000003C
000002   QALTAB BSS    1                 ADDRESS OF QUALIFICATION TABLE               0000004C
000003   PCBDFN BSS    1                 PCB DEFINITION ADDRESS                       00C0005C
000004   QUALDX BSS    1                 QUALIFICATION TABLE INDEX                    00000060
000005   CURSSA BSS    1                 ADDRESS OF CURRENT USER SSA                  0000007C
000006   FRSTLV BSS    1                 FIRST USER-SUPPLIED LEVEL                    0000008C
000007   IOAREA BSS    1                 ADDRESS OF USER'S I-O-AREA                   0000009C
000010   LSTSEG BSS    1                 ADDRESS OF LAST ACCESSED SEG                 0000010C
000011   CURREF BSS    1                 REF. CODE OF LAST ACCESSED RECORD            0000011C
000012   PCBADR BSS    1                 ADDRESS OF USER'S PCB                        0000012C
000013   PRNTSW BSS    1                 SWITCH FOR IMS PARENT SETTING                0000C130
000014   PRSTAT BSS    1                 STATUS OF PREVIOUS CALL                      0000014C
000015   FUNCDE BSS    1                 IMS FUNCTION CODE                            0000C150
000016   OLDSSA BSS    1                 OLD SSA COUNT (PREVIOUS CALL)                00000160
000017   PRIRSW BSS    1                 USE PRIOR DIRECTION SWITCH                   0000017C
000020   CCODEC BSS    1                 COMMAND CODE "C" SWITCH                      0000C18C
000021   USERIO BSS    1                 ADDRESS OF USER'S I-O-AREA                   00000190
000022   MVETAL BSS    1                 TALLY WORD BUILD BY MVESEG WHEN NO SSA'S     0000C20C
                                                                                      0000C21C
                                                                                      0000C22C
                                                                                      0000023C
                                                                                      0000024C
                                                                                      0C00C25C
000230          USE                                                                   00000260
```

UPDATE AREA CHAIN TABLES

```
                LBL    UPDATE                                                         00000040
                TTL    UPDATE AREA CHAIN TABLES                                       00000050
                                                                                      00000055
                                                                                      00000060
                                                                                      00000070
                                                                                      00000080
                       THIS ROUTINE UPDATES THE AREA CHAIN                            00000090
                       TABLES FOR ALL AREA CHAINS IN WHICH THE                        00000100
                       CURRENT RECORD PARTICIPATES                                    00000110
                                                                                      00000120
                       ON ENTRY EITHER X4 OR X6 MUST BE POINTING                      00000130
                       TO A SEG DEF                                                   00000140
                                                                                      00000150
                       IF X4 IS NOT POINTING TO A SEG DEF,                            00000160
                       UPDATE FALLS BACK ON X6                                        0000017C
                                                                                      00000200
         GNCHLD MACRO                                                                 00000210
                LDX4   2,4                                                            00000220
                LDA    0,4                                                            00000230
                ANA    =O770000,DU                                                    00000240
                CMPA   =O510000,DU                                                    00000250
                TZE    #1                                                             00000260
                CMPA   =O540000,DU                                                    00000270
                TNZ    [illegible]                                                    00000280
                ENDM   GNCHLD                                                         00000290
                                                                                      00000300
                                                                                      00000310
```

```
                                GNPRNT MACRO
                                       LXL4    2,4
                                       LDA     ,4
                                       ANA     =0770000,DU
                                       CMPA    =0530000,DU
                                       TZE     *1
                                       CMPA    =0540000,DU
                                       TNZ     DEFERR
                                       ENDM    GNPRNT

                                GNLCHN MACRO
                                       LXL4    4,4
                                       LDA     ,4
                                       ANA     =0770000,DU
                                       CMPA    =0510000,DU
                                       TZE     *1
                                       CMPA    =0570000,DU
                                       TNZ     DEFERR
                                       ENDM    GNLCHN

                                GNACHN MACRO
                                       LXL2    0,2
                                       LDA     0,2
                                       ANA     =0770000,DU
                                       CMPA    =0320000,DU
                                       TZE     *1
                                       CMPA    =0340000,DU
                                       TNZ     DEFERR
                                       ENDM    GNACHN



                                       SYMDEF  UPDATE
                                       SYMDEF  UPDSNG



                                       SYMREF  DEFERR
                                       SYMREF  CCB
                                       SYMREF  .QCBUF
                                       SYMREF  .QCREC
                                       SYMREF  .QCURT



                   000000       UPDATE NULL
[illegible]  [illegible]140 7530 [illegible]   SREG    HLDREG

000001  [illegible]000 2350 00 030     LDA     .QCURT
000002  000022 7350 00 000             ALS     18       SAVE RECORD TYPE
000003  000132 7550 [illegible]        STA     RECTYP   OF CURRENT RECORD

000004  000000 2350 14 000             LDA     0,4      IS X4 POINTING TO A
000005  770000 3750 03 000             ANA     =0770000,DU
000006  510000 1150 03 [illegible]     CMPA    =0510000,DU
000007  000015 6000 00 010             TZE     STRTUP   YES - GO TO START-UPDATE
000010  000000 6240 16 000             EAX4    0,6      X4 = X6
000011  000000 2350 14 000             LDA     0,4      MAKE SURE X6 WAS POINTING
000012  770000 3750 03 000             ANA     =0770000,DU   TO A SEGMENT DEFINITION
000013  510000 1150 03 000             CMPA    =0510000,DU
000014  000000 6010 00 030             TNZ     DEFERR   FATAL ERROR IF NOT
                   000015       STRTUP NULL
000015  000131 7440 00 010             STX4    HOLDX4
                   000016              GNCHLD  DETAIL   UPDATE CHAIN IN WHICH THIS
END OF BINARY CARD UPDATE02
                                                SEGMENT IS A DETAIL
000025  000000 7220 14 000             LXL2    .DEPND,4   X2 = MD ADDRESS

000026  000062 7010 00 010             TSX1    AREA     UPDATE THE AREA CHAIN TABLE
000027  000131 2240 00 010             LDX4    HOLDX4

                   000030       DETAIL NULL             UPDATE CHAINS FOR WHICH
                   000030              GNPRNT  LGLCHN   THIS SEGMENT IS A MASTER

000037  000000 7220 14 000             LXL2    .DEPND,4   X2 = MD ADDRESS

000040  000062 7010 00 010             TSX1    AREA     UPDATE THE AREA CHAIN TABLE
000041  000030 7100 00 010             TRA     DETAIL


                   000042       LGLCHN NULL             UPDATE CHAINS IN WHICH
                                                        THIS SEGMENT IS A "LOGICAL"
                                                        PARTICIPANT, RATHER PARENT OR CHILD
                   000042              GNLCHN  EXIT     PICK UP LOGICAL CHAIN DEF
END OF BINARY CARD UPDATE03

000051  000000 7220 14 000             LXL2    .DEPND,4   X2 = MD ADDRESS

000052  000062 7010 00 010             TSX1    AREA     UPDATE AREA CHAIN TABLE

000053  000042 7100 00 010             TRA     LGLCHN


                   [illegible]  UPDSNG NULL             UPDATE A SINGLE TABLE
                                                        X2 = MD ADDR
                                                        .QCURT CONTAINS THE RECORD TYPE
000054  000140 7530 00 010             SREG    HLDREG
000055  050000 2350 00 030             LDA     .QCURT   PICK UP RECORD TYPE
000056  000022 7350 00 000             ALS     18       ALIGN FOR USE BY AREA
000057  000132 7550 00 010             STA     RECTYP
000060  000062 7010 00 010             TSX1    AREA     UPDATE CHAIN TABLE
000061  000127 7100 00 010             TRA     EXIT     EXIT
```

```
                                 133                                                                      00001350
                                 134                                                                      00001360
                    000062       135 AREA    NULL                                                         00001370
000062  000126 7410 00  010      136         STXI    AREAXT                                               00001380
                                 137                                                                      00001390
000063  000000 2350 12  000      138         LDA     0,2               DO NOTHING                         00001400
000064  770000 3750 03  000      139         ANA     =0770000,DU       UNLESS X2 IS POINTING              00001410
000065  320000 1150 03  000      140         CMPA    =0320000,DU       TO AN AREA MD                      00001420
000066  000126 6010 00  010      141         TNZ     AREAXT                                               00001430
                                 142                                                                      00001440
000067  000000 6200 12  000      143         EAXO    0,2               X0 = MD ADDRESS                    00001450
                                 144                                                                      00001460
                    000070       145 TYPCHK  NULL                                                         00001470
000070  000000 2350 12  000      146         LDA     0,2               ISOLATE RECORD TYPE                00001480
OF BINARY CARD UPDATE04
000071  001777 3750 03  000      147         ANA     =0001777,DU                                          00001490
000072  000132 1150 00  010      148         CMPA    RECTYP            IS THIS THE TYPE FOUND             00001500
000073  000104 6000 00  010      149         TZE     FIXTAB            YES - GO FIX THE CHAIN TABLE       00001510
                    000074       150         GNACHN  AREAXT            NO - GET NEXT IN THE ACHN          00001520
000103  000070 7100 00  010      151         TRA     TYPCHK                                               00001530
                                 152                                                                      00001540
                                 153                                                                      00001550
                    000104       154 FIXTAB  NULL                                                         00001560
000104  000000 2350 00  000      155         LDA     CCB+DIRREF                                           00001570
000105  000003 7550 10  000      156         STA     .CURR,0           CHAIN-TAB(CURR) = DIRECT-REFERENCE 00001580
                                 157                                                                      00001590
000106  000004 6250 10  000      158         EAX5    .NEXT,0           GET STARTING WORD OF "NEXT"        00001600
000107  000134 7450 00  010      159         STX5    TOTALY            POINTER IN CHAIN TABLE             00001610
000110  000135 7250 00  010      160         LXL5    BASTAL            SET UP LENGTH OF MOVE              00001620
000111  000133 4450 00  010      161         SXL5    FROMTL                                               00001630
000112  000134 4450 00  010      162         SXL5    TOTALY                                               00001640
                                 163         X2 POINTS TO AN AMD OR AN ADD                                00001650
000113  000001 2360 12  000      164         LDQ     .PTRPO,2          QR = STARTING CHAR IN RECORD       00001660
OF BINARY CARD UPDATE05
000114  000030 7320 00  000      165         QRS     24                ALIGN NEXT LOC PROPERLY            00001670
000115  040000 0760 00  030      166         ADQ     .OCREC            QR = CHAR POS IN BUFFER            00001680
000116  000006 5060 07  000      167         DIV     6,DL              CONVERT TO WORD 6 CHAR             00001690
000117  000000 6250 06  000      168         EAX5    0,QL                                                 00001700
000120  030000 0650 00  030      169         ADX5    .OCBUF            X5 = WORD ADDR OF PTRS IN RECORD   00001710
000121  000133 7450 00  010      170         STX5    FROMTL                                               00001720
000122  000133 7510 01  010      171         STCA    FROMTL,01         SET UP INITIAL CHAR OF PTRS IN RECORD 00001730
                                 172                                                                      00001740
                                 173                                                                      00001750
000123  000133 2350 52  010      174         LDA     FROMTL,SC         MOVE CHAIN POINTERS                00001760
000124  000134 7550 52  010      175         STA     TOTALY,SC         INTO CHAIN TABLE                   00001770
000125  000123 6070 00  010      176         TTF     *-2                                                  00001780
                                 177                                                                      00001790
                                 178                                                                      00001800
                    000126       179 AREAXT  NULL                                                         00001810
000126  000000 7100 00  000      180         TRA     **                RETURN                             00001820
                                 182                                                                      00001840
                                 183                                                                      00001850
                    000127       184 EXIT    NULL                                                         00001860
000127  000140 0730 00  010      185         LREG    HLDREG                                               00001870
000130  000000 7100 11  000      186         TRA     0,1                                                  00001880
                                 187                                                                      00001890
                                 188                                                                      00001900
                                 189                                                                      00001910
                                 190                                                                      00001920
                    000131       191 HOLDX4  BSS     1                 X4 STORAGE CELL                    00001930
                    000132       192 RECTYP  BSS     1                 RECORD TYPE OF CURRENT RECORD      00001940
                    000133       193 FROMTL  BSS     1                 TALLY FOR POINTERS IN BUFFER       00001950
                    000134       194 TOTALY  BSS     1                 TALLY FOR POINTERS IN CHAIN TABLE  00001960
000135  000000 0022 00  000      195 BASTAL  TALLY   **,18,0           LENGTH OF MOVE IN TALLY FORMAT     00001970
                                 196                                                                      00001980
                                 197                                                                      00001990
                                 198                                                                      00002000
                    000000       199 DIRREF  SET     0                                                    00002010
                    000005       200 ERRREF  SET     5                                                    00002020
                                 201                                                                      00002030
                                 202                                                                      00002040
                                 203                                                                      00002050
000136  000002710004    000
                    000140       204         EIGHT                                                        00002060
                    000140       205 HLDREG  BSS     8                                                    00002070
                                 209         LAY-OUT OF THE P-C DEFINITION TABLE ENTRY                    00000030
                                 210                                                                      00000040
                                 211                                                                      00000050
                    000000       212 .PCRTV  SET     0                 RETRIEVAL-TYPE INDICATOR           00000060
                    000000       213 .DEPND  SET     0                 DEPENDENCY OWNER                   00000070
                    000001       214 .PRMST  SET     1                 POINTER TO PARENT-OF MASTER (LOWER HALF) 00000080
                    000003       215 .PCLSG  SET     3                 LSEG ADDRESS                       00000090

                                 219         LAY-OUT OF THE IMS LCHN DEFINITION TABLE ENTRY               00000030
                                 220                                                                      00000040
                                 221                                                                      00000050
                    000000       222 .LCPRC  SET     0                 PARENT VS CHILD SWITCH             00000060
                    000000       223 .LCVIR  SET     0                 PHYSICAL-VIRTUAL SWITCH            00000070
                    000000       224 .LMDAD  SET     0                 MD ADDRESS                         00000080
                    000001       225 .LCHMS  SET     1                 LGL-CHN MASTER                     00000090
                    000004       226 .LCHNX  SET     4                 LGL-CHN NEXT                       00000100

                                 230         LAY-OUT OF THE AREA MD                                       00000030
                                 231                                                                      00000040
                                 232                                                                      00000050
                    000000       233 .ACHNX  SET     0                 NEXT IN THE ACHN                   00000060
                    000001       234 .PTRPO  SET     1                 WORD CONTAINS CHAIN PTR LOC IN REC 00000070
                    000002       235 .RECND  SET     2                 ADDRESS OF RECORD DEFINITION       00000080
                    000002       236 .CHORD  SET     2                 CHAIN-ORDER CODE                   00000090
                    000003       237 .CURR   SET     3                 CURRENT REF-CODE IN CHAIN          00000100
                    000004       238 .NEXT   SET     4                 NEXT REF-CODE IN CHAIN             00000110
                    000005       239 .MASTR  SET     5                 MASTER REF-CODE IN CHAIN           00000120
                    000006       240 .PRIOR  SET     6                 PRIOR REF-CODE IN CHAIN            00000130
```

INSERT VALUES INTO USER'S PCB

```
                                          CBL     USRPCB
                                          TTL     INSERT VALUES INTO USER'S PCB



                                                  THIS ROUTINE TAKES VALUES FROM
                                                  THE CURRENT PCB DEFINITION AND
                                                  PLACES THEM IN THE USER'S PCB AREA

                                                  IN ADDITION, THE LENGTH OF THE KEY
                                                  FEEDBACK AREA IS COMPUTED ANDPLACED
                                                  IN THE USER'S PCB

                                                  ARGUMENT

                                                    1. ADDRESS OF THE USER'S PCB


                                   GNCHLD MACRO
                                          LDA4    2,4
                                          LDA     0,4
                                          ANA     =0770000,DU
                                          CMPA    =0510000,DU
                                          TZE     #1
                                          CMPA    =0540000,DU
                                          TNZ     DEFERR
                                          ENDM    GNCHLD


                                   GMPRNT MACRO
                                          LDA     0,4
                                          ANA     =0770000,DU
                                          CMPA    =0510000,DU
                                          TZE     *+
                                          LXL4    1,4
                                          LDA     0,4
                                          ANA     =0770000,DU
                                          CMPA    =0510000,DU
                                          TNZ     DEFERR
                                          ENDM    GMPRNT



                                          SYMDEF  USRPCB



                        000000     USRPCB NULL
    000000  000100 7530 00  010           SREG    HLDREG
    000001  010003 2230 00  030           LDX3    PCBDFN     X3 = PCB DEF ADDR
    000002  000002 2260 31  000           LDX6    2,1*       X6 = ADDR (USER'S PCB)
    000003  000001 2350 16  000           LDA     .SGLVL,6   PICK UP WORD CONTAINING LEVEL 6 STATUS
    000004  000076 7550 00  010           STA     HOLDWD
    000005  000002 2350 13  000           LDA     .CRLVL,3   PICK UP LEVEL NUMBER
    000006  000014 7350 00  000           ALS     12         JUSTIFY IT FOR USER'S PCB PLACEMENT
    000007  000076 7510 14  010           STCA    HOLDWD,14  PUT IT IN HOLD WORD
    000010  000000 2350 13  000           LDA     .STAT,3    PICK UP THE WORD CONTAINING THE STATUS
    000011  007777 3750 07  000           ANA     =07777,DL  ISOLATE THE STATUS-CODE
    000012  000007 7550 13  000           STA     .PRSTA,3   SAVE THE STATUS IN THE PRIOR SLOT
    000013  000062 6000 00  010           TZE     SNDSPC     IF STATUS = ZERO SEND THE USER SPACES
    000014  000076 7510 03  010           STCA    HOLDWD,03  MOVE IN THE STATUS

    000015  000076 2350 00  01     SEGNNM LDA     HOLDWD     PUT THE LEVEL-STATUS WORD BACK
    000016  000001 7550 16  000           STA     .SGLVL,6
    000017  000002 2240 13  000           LDX4    .CRSEG,3   X4 = ADDR (CURRENT SEG DEF)
    000020  000074 6000 00  01            TZE     NCSGMT
    000021  010013 2350 00  030           LDA     PRNTSW     IS PARENT ALREADY SET
    000022  000024 6010 00  010           TNZ     *+2        YES - THEN DO NOTHING
END OF BINARY CARD USRPCB02
    000023  000003 7440 13  000           STX4    .CPPAR,3   NO  - THEN SET PARENTAGE CELL
    000024  000013 2350 14  000           LDA     .SGNAM,4   MOVE SEGMENT NAME FROM
    000025  000004 7550 16  000           STA     .PNAME,6   SEG DEF TO
    000026  000014 2350 14  000           LDA     .SGNAM+1,4 USER'S PCB
    000027  000005 7550 16  000           STA     .PNAME+1,6
                        000030     KEYFBK NULL
    000030  000077 4500 00  010           STZ     FBLEN      INITIALIZE FEED-BACK LENGTH CELL
    000031  000000 7230 14  000           LXL3    .SQKEY,4   CHECK FOR A SEQUENCE KEY
    000032  000054 6010 00  010           TNZ     CMPFBK     IF THERE IS ONE, GO COMPUTE FB-LENGTH
                                                             IF NONE, BACK UP (HIERARCHICALLY)
                        000033            GNCHLD  SETLEN     UNTIL ONE IS FOUND OR TOP IS REACHED

                        000042            GMPRNT
END OF BINARY CARD USRPCB03
    000053  000030 7100 00  010           TRA     KEYFBK


                        000054     CMPFBK NULL
    000054  000010 7200 13  000           LXLO    .FDLEN,3   XO = KEY-LENGTH
    000055  000013 0600 13  000           ADXO    .FDPOS,3   XO = XO + START-POSITION IN KEY FB AREA
    000056  000077 4400 00  010           SXLO    FBLEN

                        000057     SETLEN NULL
    000057  000077 2350 00  010           LDA     FBLEN      PUT KEY FEED-BACK LENGTH
    000060  000006 7550 16  000           STA     .LNKEY,6   IN USER'S PCB
    000061  000074 7100 00  010           TRA     EXIT       EXIT
```

```
                                   93                                                                  00000950
                      000062       94 SNDSPC NULL                                                      00000960
000062  232000 2350 07  000        95        LDA    =3H   ,DL       PUT SPACES (SUCCESS) IN            00000970
000063  000076 7510 03  010        96        STCA   HOLDWD,03       STATUS-CELL IN USER'S PCB          00000980
000064  000015 7100 00  010        97        TRA    SEGNNM                                             00000990
                                   98                                                                  00001000
                                   99                                                                  00001010
                      000065      100 DEFERR NULL                   FATAL ERROR IN TABLES              00001020
                                  101                               USRPCB HANDLES THIS CONDITION ITSELF 00001030
                                  102                               BECAUSE OF THE POSSIBILITY OF AN   00001040
                                  103                               ENDLESS LOOP IF IT WENT TO THE SYSTEM 00001050
                                  104                               FATAL HANDLER IN ANLYZR, FOR ANLYZR 00001060
                                  105                               ENDS UP CALLING USRPCB IN THAT CASE 00001070
                                  106                               THEREBY OPENING UP THE CHANCE FOR  00001080
                                  107                               A NON-TERMINAL SITUATION           00001090
                                  108                                                                  00001100
000065  000001 2350 16  000       109        LDA    .SGLVL,6        PICK UP STATUS WORD                00001110
000066  000076 7550 00  010       110        STA    HOLDWD                                             00001120
000067  000171 2350 07  000       111        LDA    =3HOAZ,DL       SET "AZ" ERROR                     00001130
000070  000076 7510 03  010       112        STCA   HOLDWD,03                                          00001140
) OF BINARY CARD USRPCB04
000071  000076 2350 00  010       113        LDA    HOLDWD          REPLACE WORD IN USER'S PCB         00001150
000072  000001 7550 16  000       114        STA    .SGLVL,6                                           00001160
000073  000074 7100 00  010       115        TRA    EXIT                                               00001170

                      000074      117 NOSGMT NULL                                                      00001190
                      000074      118 EXIT   NULL                                                      00001200
000074  000100 0730 00  010       119        LREG   HLDREG          RESTORE REGISTERS                  00001210
000075  000000 7100 11  000       120        TRA    0,1             RETURN                             00001220
                                  121                                                                  00001230
                                  122                                                                  00001240
                                  123                                                                  00001250
                      000076      124 HOLDWD BSS    1                                                  00001260
                      000077      125 FBLEN  BSS    1               FEED-BACK LENGTH CELL              00001270
                                  126                                                                  00001280
                                  127                                                                  00001290
                      000100      128        EIGHT                                                     00001300
                      000100      129 HLDREG BSS    8                                                  00001310

                                  133               LAY-OUT OF THE IMS SEG DEFINITION TABLE ENTRY      00000030
                                  134                                                                  00000040
                                  135                                                                  00000050
                      000000      136 .SGLEN SET    0               SEGMENT LENGTH (DATA ONLY)         00000060
                      000001      137 .SGKEY SET    1               ADDRESS OF THE SEQUENCE-KEY        00000070
                      000003      138 .LGCMP SET    3               POINTER TO FIRST LOGICAL COMPONENT 00000080
                      000004      139 .SGORG SET    4               LOCATION OF IDS ORG POINTER        00000090
                      000005      140 .LEVEL SET    5               IMS LEVEL NUMBER                   00000100
                      000005      141 .RCNUM SET    5               IMS RECORD NUMBER                  00000110
                      000006      142 .SGREA SET    6               AREA FLAG WORD                     00000120
                      000006      143 .INDEX SET    6               INDEX ROUTINE ADDRESS              00000130
                      000007      144 .PERM  SET    7               PERMISSION WORD (G+I+R+D+K+P)      00000140
                      000010      145 .RULE  SET    8               LOGICAL RULES AND INSERT RULES     00000150
                      000011      146 .PCHLD SET    9               PC ADDR HOLD AREA                  00000160
                      000012      147 .CURNT SET    10              IDS CURRENCY FOR THIS SEGMENT      00000170
                      000013      148 .SGNAM SET    11              IMS SEGMENT NAME                   00000180

                                  150                                                                  00000010
                                  151                                                                  00000020
                                  152               LAY-OUT OF THE IMS KEY DEFINITION ENTRY            00000030
                                  153                                                                  00000040
                                  154                                                                  00000050
                      000000      155 .FLTYP SET    0               CODED FIELD TYPE                   00000060
                      000000      156 .SEQCD SET    0               CODE SEQUENCE CODE                 00000070
                      000000      157 .FDLEN SET    0               FIELD LENGTH                       00000080
                      000001      158 .FDSTR SET    1               STARTING CHARACTER                 00000090
                      000002      159 .IDSFD SET    2               ADDRESS OF THE IDS FIELD DEFINITION 00000100
                      000003      160 .FDPOS SET    3               STARTING POSITION IN FEEDBACK AREA 00000110
                      000004      161 .FDNAM SET    4               IMS FIELD NAME                     00000120

                                  163               LAY-OUT OF USER'S PCB AREA                         00000030
                                  164                                                                  00000040
                                  165                                                                  00000050
                      000010      166 .OPCSZ SET    8               PCB AREA SIZE                      00000060
                      000000      167 .DBDNM SET    0               DBD-NAME                           00000070
                      000001      170 .SGLVL SET    1               SEG. LEVEL OF SEGMENT LAST PROCESSED 00000080
                      000001      171 .USTAT SET    1               IMS STATUS CODE                    00000090
                      000002      172 .PROPT SET    2               PROCESSING OPTIONS                 00000100
                      000003      173 .PCBAD SET    3               ADDRESS OF PCB DEF.                00000110
                      000004      174 .PNAME SET    4               SEGMENT NAME OF SEGMENT LAST PROCESSED 00000120
                      000006      175 .LNKEY SET    6               LENGTH OF FEED-BACK KEY            00000130
                      000007      176 .SNSEG SET    7               NUMBER OF SENSITIVE SEGMENTS       00000140
                      000010      177 .FDBCK SET    8               START OF FEED-BACK AREA            00000150

                                  179                                                                  00000010
                                  180                                                                  00000020
                                  181               LAY-OUT OF THE PCB DEFINITION TABLE ENTRY          00000030
                                  182                                                                  00000040
                                  183                                                                  00000050
                      000000      184 .MULIT SET    0               MULTIPLE-POSITIONING FLAG          00000060
                      000000      185 .HOLD  SET    0               IMS "HOLD" FLAG                    00000070
                      000000      186 .STAT  SET    0               IMS STATUS                         00000080
                      000002      187 .CRSEG SET    2               SEG ADDR OF SEGMENT LAST PROCESSED 00000090
                      000002      188 .CRLVL SET    2               LEVEL OF THE LAST SEGMENT PROCESSED 00000100
                      000003      189 .CRPAR SET    3               SEG ADDR OF PARENTAGE SEGMENT      00000110
                      000003      190 .UNSAT SET    3               "HIGHEST" UNSATISFIED SEGMENT      00000120
                      000004      191 .CRIDS SET    4               IDS REFERENCE CODE                 00000130
                      000005      192 .SSTAB SET    5               ADDRESS OF THE SSA TABLE           00000140
                      000005      193 .QLTAB SET    5               ADDRESS OF THE QUALIFICATION TABLE 00000150
                      000006      194 .OLSSA SET    6               OLD SSA COUNT FOR THIS PCB         00000160
                      000007      195 .PRSTA SET    7               OLD STATUS FOR THIS PCB            00000170
```

```
[illegible]      [illegible]          BLOCK   [illegible]                                                        00000010
[illegible]      [illegible] SSACNT   BSS     1   SSA COUNT IN CURRENT CALL                                      00000020
[illegible]      [illegible] SSATAB   BSS     1   ADDRESS OF THE CURRENT SSA TABLE                               00000030
                             [illegible] BSS  [illegible] ADDRESS OF QUALIFICATION TABLE                         00000040
[illegible]                  PCBDFN   BSS     [illegible] PCB DEFINITION ADDRESS                                 00000050
[illegible]      [illegible] QUALDX   BSS     [illegible] QUALIFICATION TABLE INDEX                              00000060
[illegible]      [illegible] CURSSA   BSS     1   ADDRESS OF CURRENT USER SSA                                    00000070
[illegible]      [illegible] FRSTLV   BSS     1   FIRST USER-SUPPLIED LEVEL                                      00000080
[illegible]      [illegible] IOAREA   BSS     1   ADDRESS OF USER'S I-O-AREA                                     00000090
[illegible]      [illegible] LSTSEG   BSS     1   ADDRESS OF LAST ACCESSED SEG                                   00000100
000011           [illegible] CURREF   BSS     1   REF. CODE OF LAST ACCESSED RECORD                              00000110
[illegible]      [illegible] PCBADR   BSS     1   ADDRESS OF USER'S PCB                                          00000120
[illegible]      [illegible] PRNTSW   BSS     1   SWITCH FOR IMS PARENT SETTING                                  00000130
[illegible]      [illegible] PRSTAT   BSS     1   STATUS OF PREVIOUS CALL                                        00000140
[illegible]      [illegible] FUNCDE   BSS     1   IMS FUNCTION CODE                                              00000150
[illegible]      [illegible] OLDSSA   BSS     1   OLD SSA COUNT (PREVIOUS CALL)                                  00000160
[illegible]      [illegible] PRIRSW   BSS     1   USE PRIOR DIRECTION SWITCH                                     00000170
[illegible]      [illegible] CCODEC   BSS     1   COMMAND CODE "C" SWITCH                                        00000180
[illegible]      [illegible] USRAIO   BSS     1   ADDRESS OF USER'S I-O-AREA                                     00000190
[illegible]      [illegible] MVETAL   BSS     1   TALLY WORD BUILD BY [illegible] WHEN NO [illegible]            00000200
                                                                                                                 [illegible]
                                                                                                                 [illegible]
                                                                                                                 [illegible]
                                                                                                                 [illegible]
                                                                                                                 [illegible]
                                                                                                                 [illegible]
```

APPENDIX - Part 2, Pg 1
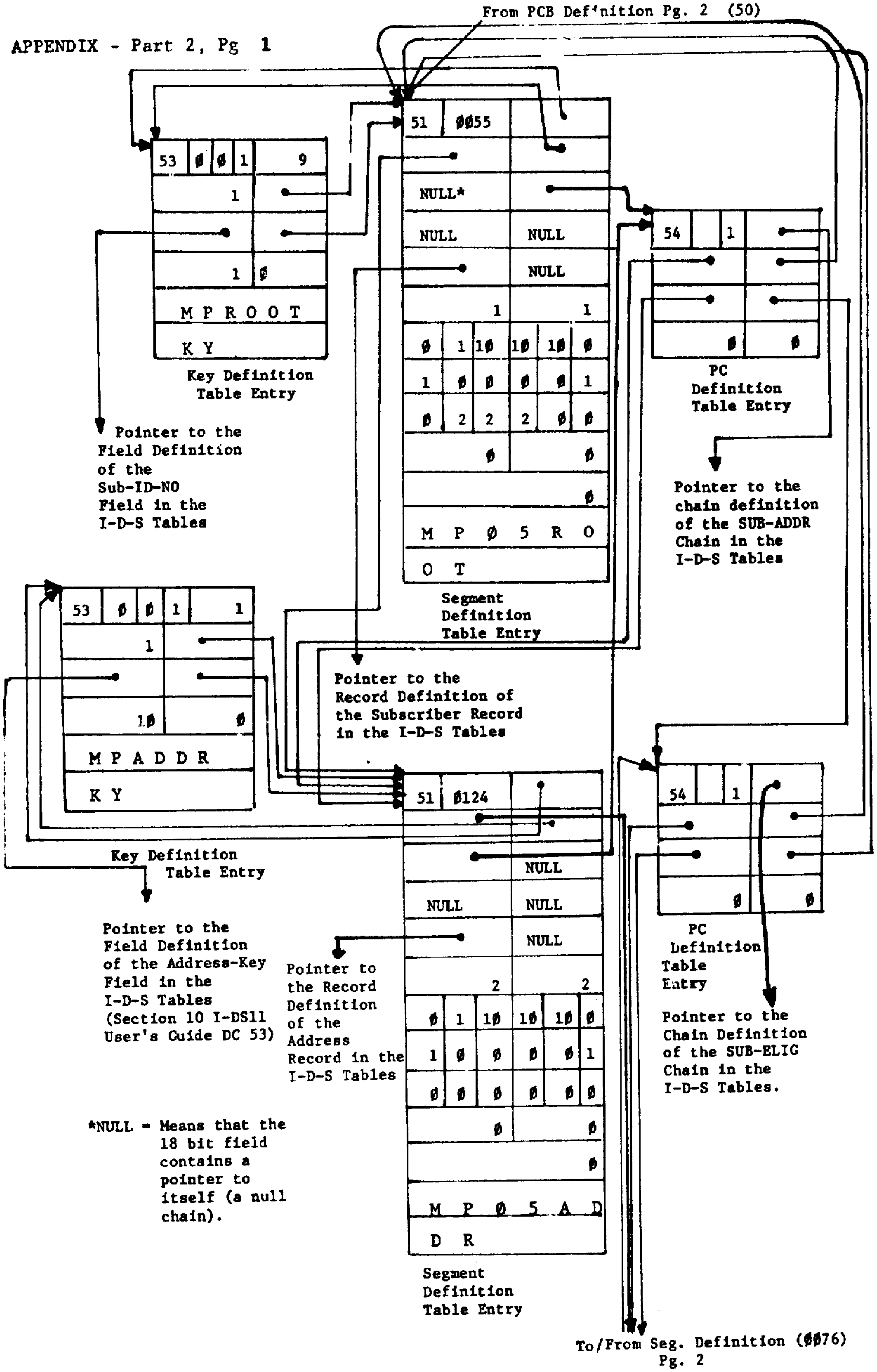

APPENDIX - Part 2, Pg. 2
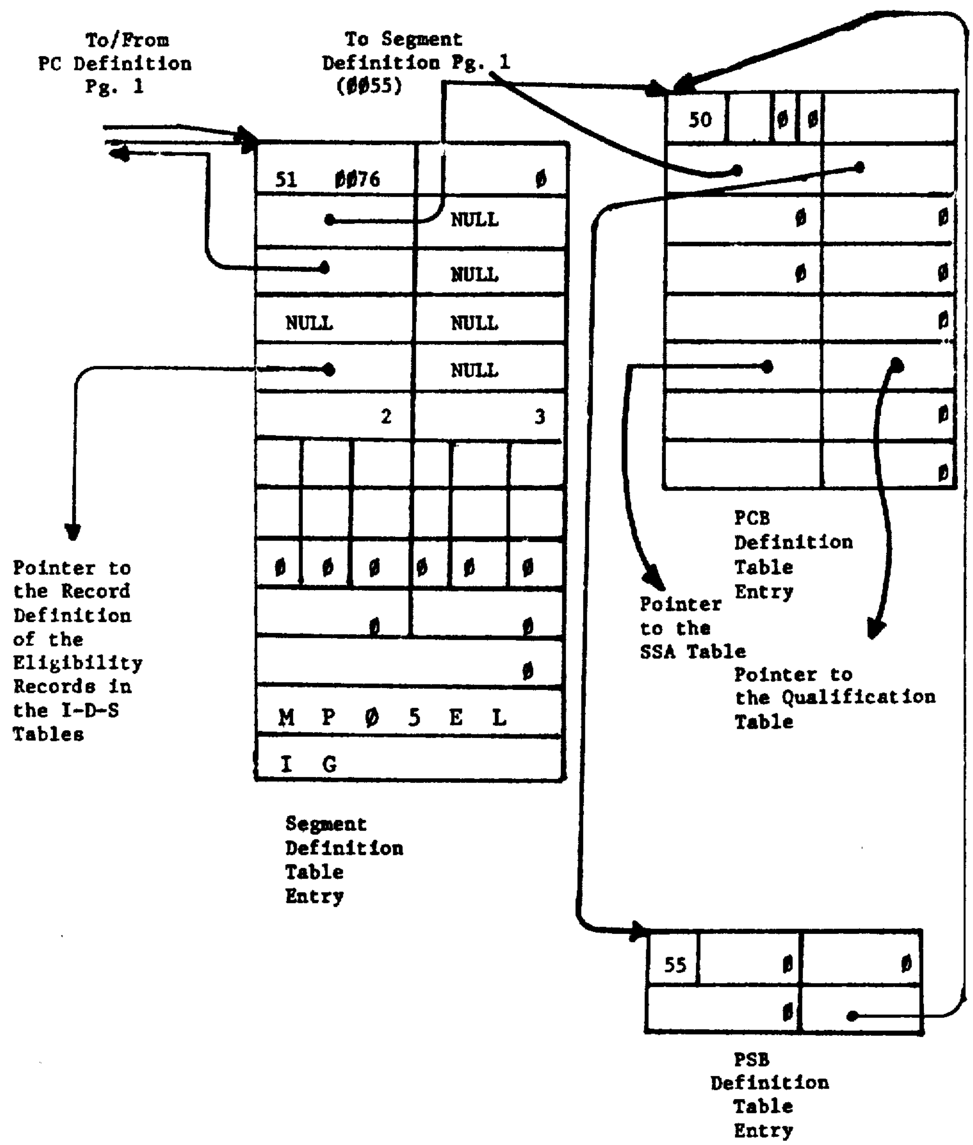

APPENDIX

SYNTAX DEFINITION FOR DBD AND PSB FILE GENERATION

DATABASE DESCRIPTION

Prior to executing an application program using the emulator, DBD and PCB translations must have been generated.

The Database Description (DBD) is the data language used to describe in detail the logical data structure and the Physical storage organization of a database.

The Program Communication Block (PCB) is the data language used to define the relations between the DBD and the User's application program.

When DBD and PCB generations have been successfully completed, the presence of a PSBGEN statement in the PCB will generate a Program Specification Block (PSB) which supplies the identification and the characteristics for the user's program interface.

INPUT SUBMISSION

Source input syntax to DBD and PCB generations is free form. Commas and/or spaces may be used for reader clarification.

ERROR MESSAGES

Errors encountered during DBD and PCB generations will be printed following the statement line in error. The error line format is: * * * * * * (reason for error)

Each DBD and PCB execution will be processed until the source statements are exhausted, to allow for a complete syntax check of all the statements.

```
DBD     NAME = dbdname-1
        ACCESS = access-name
        [REPLACE]
SEGM    NAME = segment-name-1
        ( IDS = NAME = ids-record-name                                                            )
        { [ [LOGICAL-CHILD = ids-record-name VIA chain-name      [ PHYSICAL ] ]                    }
        ( [ [LOGICAL-PARENT = ids-record-name VIA chain-name]    [ VIRTUAL  ] ]                    )

                                                  (OR)

        ( SOURCE = segment-name-2 { KEY  } dbd-name-2 ) [AREA = integer-1 [THRU integer-2]]
        {                         { DATA }            }
        {            ( NEXT   chain-name )            }
        { LINKAGE =  { MASTER chain-name }            }* [INDEXED]
        {            { DIRECT field-name }            }
        (            ( KEY    field-name )            )
        PARENT = φ
                                                  (OR)
        ( PARENT = segment-name-3                                            )
        {          ( NEXT   chain-name                                       }
        ( PATH =   { DIRECT field-name   [FROM segment-name-4]               )
                   ( KEY    field-name
        BYTES = integer
        [           ( [ PPP ]   [ FIRST ] ) ]
        [ RULES =   { [ LLL ]   [ LAST  ] } ]
        [           ( [ VVV ]   [ HERE  ] ) ]
FIELD
        NAME = field-name [ SEQ [ U ] ]
                          [     [ M ] ]
        IDS-NAME = ids-field-name
        BYTES = bytes
        START = start-pos
        [        ( X ) ]
        [ TYPE = { P } ]
        [        ( C ) ]
END
```

-continued

*THE SOURCE LINKAGE PAIR MAY OCCUR TWICE

FUNCTION:

To define the DBD structure and access method.

FORMAT:

```
DBD  NAME = dbdname-1
     ACCESS = access-name
     [REPLACE]
```

NOTES:

1. DBD must be the first keyword of the syntax entered. This identifies the statement as a DBD control statement.
2. dbdname-1 is the name of the DBD for the database being described. This dbdname may be from one to eight alphameric characters.
3. access-name specifies the access method to be used with this database. The value of the access-name can be any one of the following:
   HISAM
   HDAM
   HIDAM
   INDEX
   LOGICAL

*HSAM is not supported.

4. REPLACE is optional. When used, it allows a previous DBD genration with the same dbdname to be replaced with this DBD.

FUNCTION:

To specify the physical or logical characteristics of the segment currently being defined.

FORMAT-1:

```
{ IDS-NAME = ids-record-name-1                                                   }
{ [ LOGICAL-CHILD = ids-record-name-2 VIA chain-name [ PHYSICAL ] ]              }
{ [                                                  [ VIRTUAL  ] ]              }
{ [LOGICAL-PARENT = ids-record-name-3 VIA chain-name]                            }
```

FORMAT-2:

```
{ SOURCE = segment-name-2 { KEY  } dbd-name-2 }
{                         { DATA }            }
{                                             }
{            { NEXT   chain-name }            }
{ LINKAGE =  { MASTER chain-name }            }
{            { DIRECT field-name }            }
{            { KEY    field-name }            }
```

NOTES:

1. format-1 is used when defining a physical segment.
2. format-2 is used when defining a logical segment.
3. format-2 may occur twice.
4. ids-record-name-1, ids-record-name-2, ids-record-name-3 and chain-name specify the record or chain name assigned in the IDS structure definition when IDS-SETUP was generated.
5. LOGICAL-CHILD/LOGICAL-PARENT clauses are used within a physical segment definition to notify that the segment currently being defined also participates in a logical relationship. This segment is a physical child of its physical parent and a logical child of its logical parent segment.
6. PHYSICAL indicates that the fully concatenated key of the logical parent and logical child is present. This is the default parameter.
7. VIRTUAL indicates that the fully concatenated key of the logical parent is not present.
8. The SOURCE clause is required in the definition of a logical segment. Segment-name-2 must have been previously defined in a physical DBD generation and stored under dbd-name-2.
9. KEY specifies that only the key portion of segment-name-2 is to be placed in the key feedback area and that no data for segment-name-3 is present in the I/0 area.
10. DATA specifies that both the key and data portions of segment-name-2 are to be placed in this logical segment.
11. LINKAGE specifies the path linkage between the logical and physical segments.

FUNCTION:

To specify the Parent/Child relationship for the currently defined segment.

FORMAT-1:

PARENT = 0

FORMAT-2:

```
{ PARENT = segment-name-3                                       }
{ PATH = { NEXT    chain-name                                 } }
{        { DIRECT  field-name  [FROM segment-name-4]          } }
{        { KEY     field-name                                 } }
```

NOTES:

1. segment-name-3 specifies the parent for this named segment(SEGM). The

-continued parent segment must have been previously defined within this DBD generation. IF this segment is a root segment, then its parent will equal zero.
2. chain-name/field-name specify the chain or field name assigned in the IDS structure definition.
3. PATH chain-name/field-name defines the logical relationship between segment-name-3 and segment-name-4.
4. segment-name-4 must have been defined in a source clause of the segment currently being defined.

FUNCTION:

Specifies the number of bytes in this segment.

FORMAT:

BYTES = integer

NOTES:

1. The maximum number of bytes cannot exceed 3840.
2. If the segment is a logical child, the size of the logical parent segment's fully concatenated key must be included in the integer value.

FUNCTION:

To specify the rules for insertion, deletion, and replacement of the segment defined by this SEGM statement.

FORMAT:

$$\left[\text{RULES} = \left(\begin{bmatrix}\text{PPP}\\ \text{LLL}\\ \text{VVV}\end{bmatrix}\begin{bmatrix}\text{FIRST}\\ \text{LAST}\\ \text{HERE}\end{bmatrix}\right)\right]$$

NOTES:

1. In the first parameter:
P = PHYSICAL
L = LOGICAL
V = VIRTUAL
The 1st value x.. applies to segment insertion.
The 2nd value .x. applies to segment deletion.
The 3rd value ..x applies to segment replacement.
If this parameter is omitted, (LLL) is assumed.
2. The second parameter value determines where new occurrences of this segment are to be inserted.
FIRST - the new occurrence of this segment is inserted before the first existing occurrence of this segment.
LAST - the new occurrence of this segment is inserted after the last existing occurrence of this segment.
HERE - assumes the user has determined positioning by a previous call and the new occurrence is inserted before the segment which satisfied the last call.
If this parameter is omitted, (LAST) is assumed.

FUNCTION:

Specifies the I-D-S area(s) occupied by the segment.

FORMAT:

[AREA = integer-1 [THRU integer-2]]

NOTES:

1. integer-1 (0 ≦ integer-1 ≦ 63) defines the I-D-S area number which contains this segment.
2. integer-2 (0 ≦ integer-1 ≦ integer-2 ≦ 63), if specified, indicates that the segment occurs in multiple area.
3. If the THRU option is used, all areas between integer-1 and integer-2 are assumed to be capable of containing this segment.

FUNCTION:

Specifies that the root segment is indexed.

FORMAT:

[INDEXED]

NOTES:

1. If INDEXED is specified, the Emulator will maintain a set of I-D-S records allowing the root segments to be retrieved in ascending key sequence
2. The I-D-S database description must contain the description for the indexing records if INDEXED is specified in segment definition.
3. Indexing is implemented using two levels of RANGE MASTER RECORDS and one so-called super-chief (a one-of-a-kind record).

FUNCTION:

The FIELD statement defines a field within the segment currently being defined

FORMAT:

$$\text{FIELD NAME} = \text{field-name}\left[\text{SEQ}\begin{bmatrix}\text{U}\\ \hline \text{M}\end{bmatrix}\right]$$

IDS-NAME = ids-field-name
BYTES = integer

-continued

START = start-pos $$\left[ \text{TYPE} = \begin{Bmatrix} X \\ P \\ C \end{Bmatrix} \right]$$

NOTES:
1. A FIELD statement may follow only a SEGM statement or another FIELD statement.
2. A maximum of 255 fields can be defined for any specific segment.
3. field-name specifies the name of a field that is to be referenced by an application program. The field name defined may be from one to eight alphameric characters.
4. The presence of the keyword SEQ identifies this field as a sequence (Key) field in the segment to which it is associated. The sequence field must be provided for the root segment of all databases.
5. The presence of the keyword U indicates that only UNIQUE values of the sequence field are allowed.
The presence of the keyword M indicates that duplicate values of the sequence field can occur in multiple occurrences of the segment.
The keyword M must not be specified for the sequence field of a root segment of all databases. IF the keyword U or M is not provided, U (UNIQUE) is assumed.
6. ids-field-name specifies the field name assigned in the IDS structure definition.
7. integer specifies the length of this field. The maximum number of bytes allowed for a field may not exceed 255.
8. start-pos specifies the starting position of this field relative to the beginning of the segment within which this field is defined.
The start-pos being defined must not exceed 3840.
9. X = hexadecimal data
P = packed decimal data
C = alphameric data or a combination of types of data FUNCTION:
To logically terminate a DBD generation.
FORMAT: END
NOTES:
1. The END statement must be the last statement entered for a DBD generation While in accordance with the provisions and statutes there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. A system for executing user programs written for execution on another system and to access data files in said system originally organized in accordance with a first data structure to form a data base, said system comprising:

auxiliary storage means for storing signal representations of said data files organized in accordance with a second data structure to form another data base which is characteristically different from the data base said first data structure;

working memory means having a plurality of sections, one section storing at least one user program, said program including instructions coded to define at least one call directing said system to perform a data base operation upon said data files of said another data base, said call having a predetermined format required for accessing data files corresponding to said first data structure and a second section having a plurality of tables, each table for storing a plurality of entries, said entries of different ones of said plurality of tables being coded for referencing said data base organized in said first data structure in terms of said second data structure;

processor means for executing said instructions of said user programs, said processor means being coupled to said memory means and to said auxiliary storage means; and, emulator control module means included in said working memory means, said control module means being operatively coupled to said processor means and to said auxiliary storage means, said module means including a plurality of modules, said control module means being operative in response to said instructions of said call for conditioning said processor means to reference different ones of said modules, said processing means including means being conditioned by said different ones of said modules to reference said plurality of tables for interpreting said call instructions to perform the operation specified upon said data files thereby requiring no change in the normal logical operation of said user program when executed by said another system.

2. The system of claim 1 wherein the entries of each of said second section tables are coded to include information for referencing the entries of at least another table thereby forming a ring structure.

3. The system of claim 1 wherein a number of said entries of a predetermined number of said plurality of tables are coded prior to the execution of said user programs to include address information for referencing different ones of a plurality of tables containing information coded to define said second data structure.

4. The system of claim 1 wherein said entries of a number of said plurality of said tables are generated by said emulator control module means during the processing of said call of said one user program.

5. The system of claim 3 wherein said auxiliary storage means includes a plurality of addressable segments, each segment being divided into at least one page for storing a plurality of records organized in said second data structure and wherein one of said predetermined number of said plurality of said tables is a program control block definition table including entries for referencing all of said addressable segments containing the records said one user program can reference.

6. The system of claim 5 wherein said program control block definition table includes entries coded for referencing another number of said tables including entries generated by said emulator control module means during the processing of said call of said one user program.

7. The system of claim 5 wherein said call is coded in a predetermined format including coded arguments qualifying said data base operation and wherein said another number of tables includes:

a segment search argument table for storing information defining the number and signal indications of said coded arguments identified in said call; and, a qualification table for storing information further specifying the qualification and comparative values specified in said call.

8. The system of claim 3 wherein one of said predetermined number of said plurality of said tables is a segment definition table for storing entries for defining segments of said first data structure in terms of said second data structure.

9. The system of claim 8 wherein said call is coded to include segment name signals and wherein said segment definition table entries include signal representations corresponding to said segment name, information indicating the permissions granted to said one user program and information identifying the presence and location of one of said records in said auxiliary storage means corresponding to said segment name.

10. The system of claim 8 wherein another one of said predetermined number of said plurality of said tables is a parent child definition table including entries for defining said first data structure of said another system and wherein said segment definition table includes information for referencing said parent child definition table.

11. The system of claim 8 wherein said call is coded to include key information included in said segment and wherein another one of said predetermined number of said plurality of said tables is a key definition table including entries corresponding to signals representative of said key information used by said one user program to qualify further said data base operation.

12. The system of claim 3 wherein one of said predetermined number of said plurality of said tables is a L segment definition table including entries defining the relationship between segments in said first data structure to said records in said second data structure.

13. The system of claim 12 wherein another one of said predetermined number of said plurality of said tables is a L chain definition table including entries for defining when a particular segment in said first data structure is involved in more than one chain of said records of said second data structure.

14. The system of claim 3 wherein said first data structure is a hierarchical non set data structure and wherein in said second data structure said plurality of records are organized in sets of records, each set having one master record and at least one member record.

15. The system of claim 1 wherein said system further includes a plurality of system modules operative to perform different data base operations in said system in response to user programs written to operate with said second data structure and said emulator control means being operative in response to said call to reference at least one of said system modules for conditioning said processor means to perform the data base operation upon said data files of said data base whereby said system modules enable said processor means to access said data files in response to user programs written for files of said data base organized in accordance with either said first or second data structures.

16. The system of claim 1 wherein different ones of said module means are coded to include sequences of instructions for verifying the correctness of said call and for generating status code signals in response to errors for return to said one user program, said status code signals corresponding to the same status codes generated when said one user program is being executed by said another system.

17. The system of claim 16 wherein said different ones of said module means are coded to include other sequences of instructions for referencing entries of different ones of said plurality of tables coded to define rules governing said data base operations for accessing said data files organized in accordance with said first data structure and said processor means being conditioned by said different ones of said module means to detect variations from said rules defined by said entries thereby ensuring that the logical operation of said one user program proceeds the same as in said another system.

18. The system of claim 15 wherein said number of said plurality of system modules are coded to include instructions for conditioning said processor means to perform one of a number of different data base operations defined by said call, said number including:

a get unique operation for finding a specific segment occurrence in said data files without regard to a current data base position; and, a replace operation for replacing the current segment in the data base provided that the segment has been retrieved with a previous get hold call.

19. The system of claim 18 wherein said number further includes:

a get next operation for finding the next specified segment occurrence based upon said current data base position;

an insert operation for adding a specified segment to said data files;

a delete operation for removing said current segment from the data base provided that the segment has been first retrieved with a get hold call; and, a get next within parent operation for finding the next specified segment occurrence belonging to the established parent.

20. A data processing system having a host processor, a working store for storing at least one user program coded to include at least one call request for a data base operation, and auxiliary memory storage means, said auxiliary storage means including a plurality of addressable segments, each segment being divided into at least one page for storing a plurality of records organized in sets of records, each set having one owner record and at least one member record and a data base management system for accessing records in response to requests from user programs coded for accessing records stored in pages of said auxiliary memory storage means, said system further including an emulation control system for enabling said host processor using said data base management system to process said one call for a data base operation specified for execution on a second system including files containing records organized in a hierarchical non set data structure, said emulation control system comprising:

memory means having a plurality of addressable sections, each section including a different one of a plurality of tables, each said different one of said tables storing a number of word entries, entries of different ones of said plurality of said tables being coded initially for referencing said records in segments organized into said sets of records corresponding to segments organized in said hierarchical non set data structure; and, a plurality of module means included in said memory means and operatively coupled to said host processor and to said auxiliary memory storage means each said module means including a plurality of instructions, selected ones of said module means being operative in response to said call to condition said host processor to reference said plurality of addressable sections for obtaining entries to interpret said call and said data base management system including means being conditioned by predetermined ones of said plurality of module means for performing the operation specified upon a specified segment without requiring changes in the logical operation of said one user program.

21. The system of claim 20 wherein said data management system includes a plurality of modules operative to perform different data base operations upon said plurality of records in response to user programs written for accessing said sets of records whereby said modules condition said host processor to perform data base operations specified by user programs written for accessing said data base organized into sets of records and user programs written for accessing data organized in a hierarchical non set data structure.

22. The system of claim 21 wherein different ones of said plurality of module means include sequences of instructions for verifying the correctness of said call and for generating status code signals in response to errors for return to said one user program, said status signals corresponding to the same status codes generated when said one user program is executed by said second system.

23. The system of claim 22 wherein said different ones of said module means are coded to include other sequences of instructions for referencing word entries of different ones of said plurality of tables coded so as to define rules governing said data base operations for accessing data organized in said hierarchical non set data structure and said host processor being conditioned by said different ones of said module means to detect any variation from said rules thereby ensuring that execution of said one user program proceeds the same as in said second system.

24. A method for enabling a data processing system to process calls for different data base operations included as instructions of a user program written for accessing data files of a data base organized in a hierarchical non set manner, said data processing system further including a data processing unit for executing instructions of said user program, a working store coupled to said processing unit, one section for storing said user program, an auxiliary storage unit coupled to said processing unit, said auxiliary storage unit including a plurality of addressable segments, each segment being divided into at least one page for storing a plurality of records organized in sets of records to form another data base, each set having one owner record and at least one member record and a data base management system for accessing said plurality of records, said method comprising the steps of:

storing a plurality of tables in a second section of said working store, each of said tables including a plurality of entries, said entries of different ones of said plurality of tables being coded for referencing said data files organized in said hierarchical non set manner from said data files organized as said sets of records;

storing a plurality of emulator control modules in another section of said working store, each of said emulator control modules including a plurality of instructions; and, accessing different ones of plurality of said control modules in a predetermined sequence; conditioning said processing unit by said plurality of instructions of said different ones of said control modules to reference said plurality of tables to interpret said call and conditioning said data base management system by predetermined ones of said control modules to perform the data base operation indicated upon data specified by certain entries of different ones of said plurality of said tables in a manner requiring no change in the logical operation of said user program.

25. A method for enabling a host processor to execute data base operations specified by calls included in a user program upon a data base organized in a hierarchical non set data structure for use with another data base system, said processor being coupled to and auxiliary storage unit and to a main store, said auxiliary unit and main store including a plurality of addressable segments, each segment being divided into at least one page, said method comprising the steps of:

storing said data base organized in said hierarchical data structure in the pages of said addressable segments of said auxiliary unit as pluralities of records organized in a second data structure which is characterized as having sets of records, each set having one owner record and at least one member record;

storing instructions of said user program in one segment of said main store without modifying the logical sequence specified by the user program as originally written for execution on said another system;

storing coded descriptions of said data base organized in said hierarchical data structure in terms of said second data structure;

storing a plurality of modules in another segment of said main store, each said module including a plurality of instructions; and, referencing different ones of said referenced plurality of modules in a predetermined sequence and conditioning said host processor by said instructions of said different ones of said modules to process said call by referencing different ones of said plurality of said tables to perform the data base operations indicated upon the data arguments specified in said calls.

* * * * *